(12) United States Patent
Fujiwara et al.

(10) Patent No.: US 12,170,496 B2
(45) Date of Patent: Dec. 17, 2024

(54) MOTOR CONTROL DEVICE

(71) Applicants: Mitsubishi Electric Corporation, Tokyo (JP); JAPAN AEROSPACE EXPLORATION AGENCY, Tokyo (JP)

(72) Inventors: Kenji Fujiwara, Tokyo (JP); Hisatoshi Fukumoto, Tokyo (JP); Tomoki Takegami, Tokyo (JP); Tetsuya Kojima, Tokyo (JP); Akihiko Iwata, Tokyo (JP); Masahiro Sugahara, Tokyo (JP); Hiroshi Kobayashi, Tokyo (JP); Mari Nishiyama, Tokyo (JP); Akira Nishizawa, Tokyo (JP)

(73) Assignees: MITSUBISHI ELECTRIC CORPORATION, Tokyo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 263 days.

(21) Appl. No.: 17/798,563

(22) PCT Filed: Mar. 4, 2020

(86) PCT No.: PCT/JP2020/009043
§ 371 (c)(1),
(2) Date: Aug. 10, 2022

(87) PCT Pub. No.: WO2021/176579
PCT Pub. Date: Sep. 10, 2021

(65) Prior Publication Data
US 2023/0084424 A1 Mar. 16, 2023

(51) Int. Cl.
*H02H 3/04* (2006.01)
*B64C 39/02* (2023.01)
(Continued)

(52) U.S. Cl.
CPC .......... *H02P 27/06* (2013.01); *B64C 39/024* (2013.01); *B64D 31/00* (2013.01); *H02M 7/539* (2013.01)

(58) Field of Classification Search
CPC ...... H02P 27/06; H02M 7/539; B64C 39/024; B64D 31/00
(Continued)

(56) References Cited

U.S. PATENT DOCUMENTS 9,998,058 B2  6/2018  Takahashi
10,924,055 B2  2/2021  Kuroki
(Continued)

FOREIGN PATENT DOCUMENTS

DE   10 2018 206 213 A1   10/2019
EP        2 880 734 B1    6/2015
(Continued)

OTHER PUBLICATIONS

International Search Report and Written Opinion mailed on Jun. 2, 2020, received for PCT Application PCT/JP2020/009043, filed on Mar. 4, 2020, 8 pages including English Translation.
(Continued)

*Primary Examiner* — Erick D Glass
(74) *Attorney, Agent, or Firm* — XSENSUS LLP

(57) ABSTRACT

A motor control device includes: a power source device including a DC-output power conversion device having a first mode for outputting first voltage and a second mode for outputting second voltage higher than the first voltage; a power supply device; and a control device, and controls a motor. When a flying object takes off, the control device controls the power conversion device in the second mode. When the control device judges that flight information which is one or both of information of a motor parameter obtained along with control for the motor and information of
(Continued)

an environmental factor relevant to the flight altitude satisfies a predetermined condition, or when the control device has received an operation mode signal for which the first mode is selected on the basis of the flight information during control for the motor, the control device controls the power conversion device in the first mode.

15 Claims, 53 Drawing Sheets

(51) Int. Cl.
 *B64D 31/00* (2006.01)
 *H02H 7/08* (2006.01)
 *H02K 11/00* (2016.01)
 *H02M 7/539* (2006.01)
 *H02P 27/06* (2006.01)

(58) Field of Classification Search
 USPC .......................................... 318/490
 See application file for complete search history.

(56) References Cited

U.S. PATENT DOCUMENTS

| | | |
|---|---|---|
| 2014/0197681 A1 | 7/2014 | Iwashima et al. |
| 2015/0183385 A1 | 7/2015 | Iwashima et al. |
| 2017/0201186 A1 | 7/2017 | Yuasa et al. |
| 2019/0152617 A1 | 5/2019 | Anton et al. |

FOREIGN PATENT DOCUMENTS

| | | |
|---|---|---|
| JP | 2009-247174 A | 10/2009 |
| JP | 2011-188655 A | 9/2011 |
| JP | 2017-50977 A | 3/2017 |
| WO | 2016/035209 A1 | 3/2016 |
| WO | 2017/137537 A1 | 8/2017 |

OTHER PUBLICATIONS

Akturk et al., "Single Event Effects in Si and SiC Power MOSFETs Due to Terrestrial Neutrons", IEEE Transactions on Nuclear Science, vol. 64, No. 1, Jan. 2017, pp. 529-535.

Extended European Search Report issued Mar. 31, 2023 in corresponding European Patent Application No. 20923173.7, 11 pages.

Forouzesh Mojtaba et al: "Step-Up DCDC Converters: a Comprehensive Review of Voltage-Boosting Techniques, Topologies, and Applications", IEEE Transactions on Power Electronics, Institute of Electrical and Electronics Engineers, USA, vol. 32, No. 12, Dec. 1, 2017 (Dec. 1, 2017), pp. 9143-9178, XP011658038, ISSN: 0885-8993, 001: 10.1109/TPEL.2017.2652318 [retrieved on Aug. 3, 2017].

European Office Action issued Oct. 4, 2024, in corresponding Patent Application No. 20 923 173.7, 9pp.

FIG. 12

| Environmental information | Information type | Threshold X | Threshold Y |
|---|---|---|---|
| Altitude information | Convex upward | X1 | Y1 |
| Outside air pressure information | Convex downward | X2 | Y2 |
| Air component concentration information | Convex downward | X3 | Y3 |
| Oxygen concentration information | Convex downward | X3a | Y3a |
| Nitrogen concentration information | Convex downward | X3b | Y3b |
| Carbon dioxide concentration information | Convex downward | X3c | Y3c |
| Outside air temperature information | Convex downward | X4 | Y4 |
| Radiation dose information | Convex upward | X5 | Y5 |

| Motor parameter command | Threshold Za | Threshold Wa |
|---|---|---|
| Motor AC voltage command | Za1 | Wa1 |
| Motor speed command | Za2 | Wa2 |
| Motor output command | Za3 | Wa3 |
| Motor torque command | Za4 | Wa4 |
| Motor current command | Za5 | Wa5 |

| Detected motor parameter information | Threshold Zb | Threshold Wb |
|---|---|---|
| Detected motor AC voltage information | Zb1 | Wb1 |
| Detected motor speed information | Zb2 | Wb2 |
| Detected motor output information | Zb3 | Wb3 |
| Detected motor torque information | Zb4 | Wb4 |
| Detected motor current information | Zb5 | Wb5 |

FIG. 52
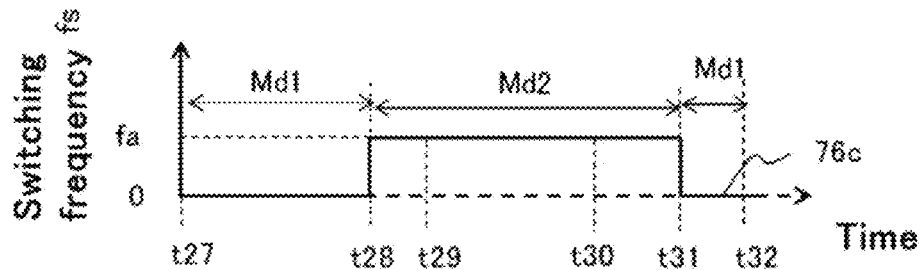
FIG. 53
| Estimated motor parameter information | Threshold Zc | Threshold Wc |
|---|---|---|
| Estimated motor speed information | Zc1 | Wc1 |
| Estimated motor output information | Zc2 | Wc2 |
| Estimated motor torque information | Zc3 | Wc3 |
FIG. 54
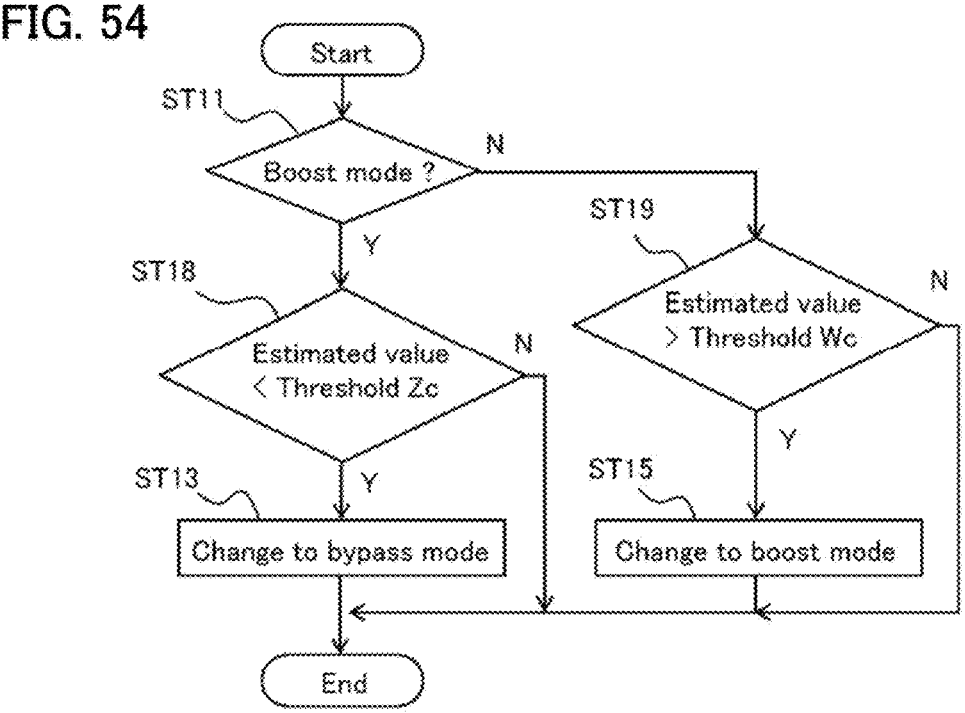

FIG. 63

| Environmental information | Priority | Detected value | Threshold X* | Threshold Y* |
|---|---|---|---|---|
| Altitude information | 1 | dataA | X1 | Y1 |
| Outside air pressure information | 2 | dataB | X2 | Y2 |
| Air component concentration information | | | X3 | Y3 |
| Oxygen concentration information | | | X3a | Y3a |
| Nitrogen concentration information | | | X3b | Y3b |
| Carbon dioxide concentration information | | | X3c | Y3c |
| Outside air temperature information | 3 | dataC | X4 | Y4 |
| Radiation dose information | | | X5 | Y5 |

87

MOTOR CONTROL DEVICE

CROSS-REFERENCE TO RELATED APPLICATION

The present application is based on PCT filing PCT/JP2020/009043, filed Mar. 4, 2020, the entire contents of which are incorporated herein by reference.

TECHNICAL FIELD

The present disclosure relates to a motor control device.

BACKGROUND ART

In recent years, an electrification system such as motor driving from an engine is increasingly spreading in electric vehicles, ships, and the like, and further, also for aircrafts, studies for electrification are being pursued worldwide in an attempt of reducing $CO_2$. Patent Document 1 discloses a DC/AC power conversion control device which performs power conversion from DC power to AC power to drive a motor. A boost chopper circuit in the DC/AC power conversion control device of Patent Document 1 performs 2-level operation in low-speed operation of the motor and performs 3-level operation in high-speed operation, so as to improve efficiency of the boost chopper circuit.

CITATION LIST

Patent Document

Patent Document 1: Japanese Laid-Open Patent Publication No. 2011-188655 (FIG. 1 and FIG. 2)

Non-Patent Document

Non-Patent Document 1: A. Akturk, et al., "Single Event Effects in Si and SiC Power MOSFETs Due to Terrestrial Neutrons", IEEE TRANSACTIONS on NUCLEAR SCIENCE, Vol. 64, No. 1, 2017

SUMMARY OF INVENTION

Problems to be Solved by Invention

In the DC/AC power conversion control device of Patent Document 1, AC output voltage of an inverter in high-speed operation of the motor is set to be higher than the AC output voltage in low-speed operation. As in the DC/AC power conversion control device of Patent Document 1, it is general that the AC output voltage of the inverter for motor driving increases in accordance with output power. Therefore, DC-link voltage of a capacitor for DC link connecting the chopper and the inverter is set to a voltage value that can achieve the AC output voltage of the inverter. However, as described in Non-Patent Document 1, if the DC-link voltage is constantly set in a high-voltage state, cosmic ray resistance is reduced because of voltage dependency of long term DC stability (LTDS) against cosmic rays (proton beam, electron beam, neutron beam, etc.) to semiconductor elements composing the chopper and the inverter, so that accidental failure (single event) becomes more likely to occur. In particular, the influence of the neutron beam which readily penetrates metal is great. In the troposphere, it is general that the dose of cosmic rays showering from space increases as the altitude above sea level becomes higher.

Such a motor control device that has a chopper and an inverter and controls a motor has a problem that, in a case of operating at a high altitude where the cosmic ray dose is high, the failure rate due to a single event on semiconductor elements increases and thus the reliability is lowered.

An object of the present disclosure is to improve reliability of a motor control device even in a case of operating at a high altitude where the cosmic ray dose is high.

Solution to Problems

A motor control device according to one aspect of the present disclosure controls a motor of a flying object that takes off from a ground and flies. The motor control device includes: a power source device which outputs DC power; a power supply device which converts the DC power to AC power and outputs the AC power to the motor; and a control device for controlling the power source device and the power supply device. The power source device includes a power source, a DC-output power conversion device for converting output of the power source to DC power, and an output capacitor for smoothing output voltage of the DC-output power conversion device. The DC-output power conversion device has a first operation mode for outputting first voltage and a second operation mode for outputting second voltage higher than the first voltage. When the flying object takes off from the ground, the control device controls the DC-output power conversion device in the second operation mode. When the control device judges that flight information which is one or both of information of a motor parameter obtained along with control for the motor and information of an environmental factor relevant to a flight altitude of the flying object satisfies a predetermined condition, or when the control device has received an operation mode signal for which the first operation mode is selected on the basis of the flight information during control for the motor, the control device controls the DC-output power conversion device in the first operation mode.

Effect of Invention

In the motor control device according to one aspect of the present disclosure, while the DC-output power conversion device is controlled in the second operation mode, when the flight information is judged to satisfy a predetermined condition or when the operation mode signal for which the first operation mode is selected on the basis of the flight information is received during control for the motor, the DC-output power conversion device is controlled in the first operation mode. Thus, even in a case of operating at a high altitude where the cosmic ray dose is high, reliability of the motor control device is improved.

BRIEF DESCRIPTION OF DRAWINGS

FIG. 12 shows environmental information and thresholds according to embodiment 1.

FIG. 52 shows timings for explaining operation of the motor control device in FIG. 48.

FIG. 53 shows estimated motor parameter information and thresholds according to embodiment 7.

FIG. 54 shows a flowchart for explaining operation of an operation mode judgment unit in FIG. 48.

FIG. 63 shows priority information according to embodiment 10.

DESCRIPTION OF EMBODIMENTS

Embodiment 1

Figure 1:
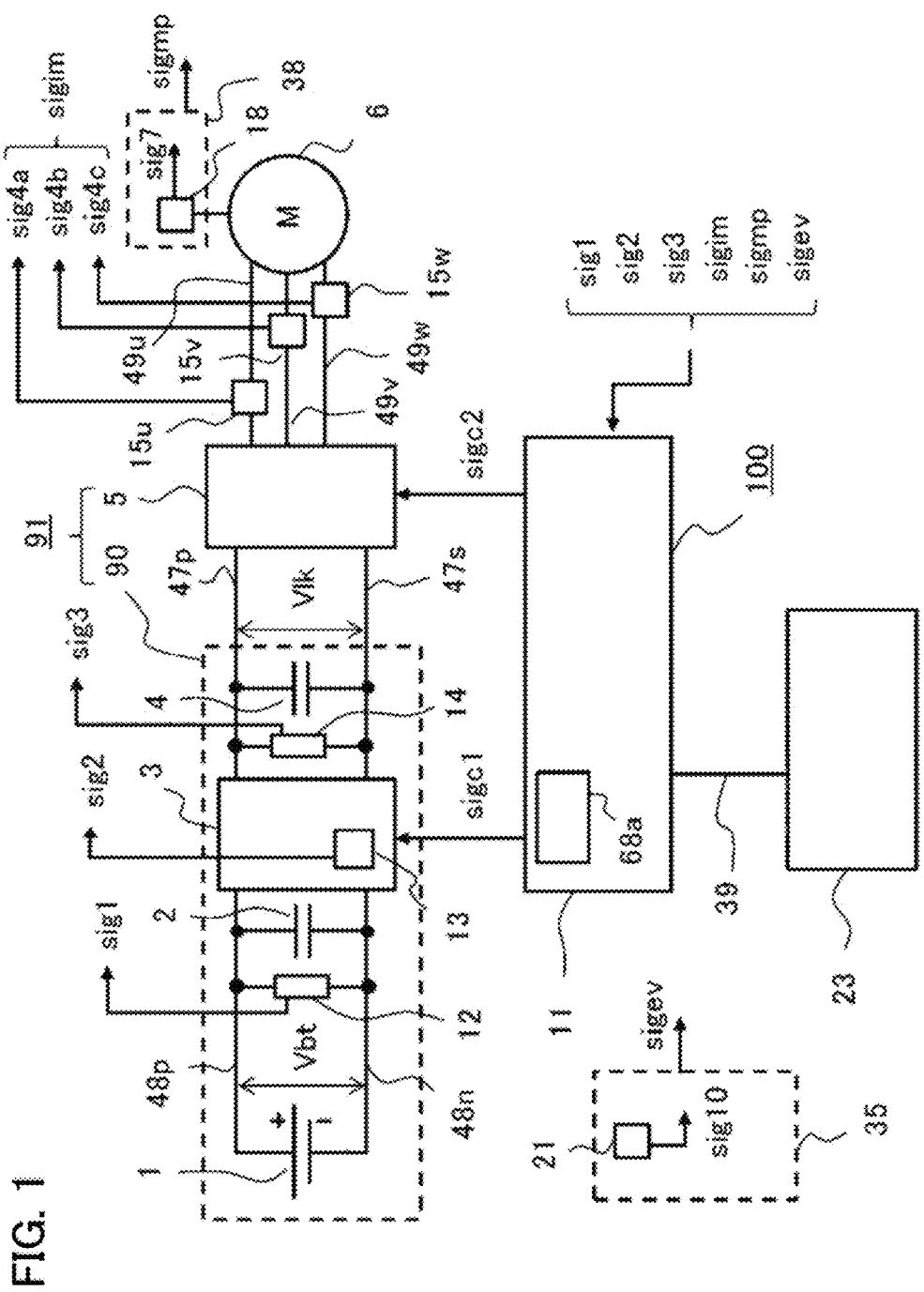
FIG. 1 shows a first example of a motor control device according to embodiment 1.
Figure 2:
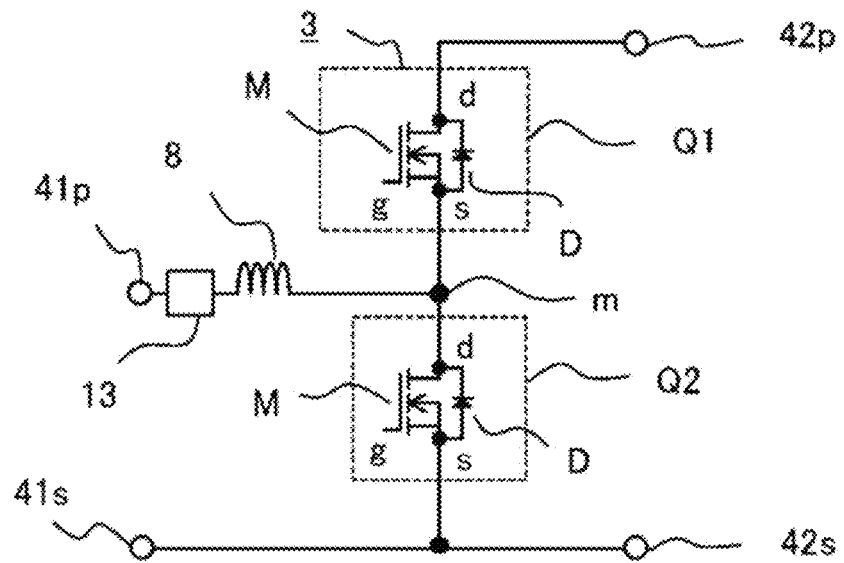
FIG. 2 shows a first example of a chopper in FIG. 1.
Figure 3:
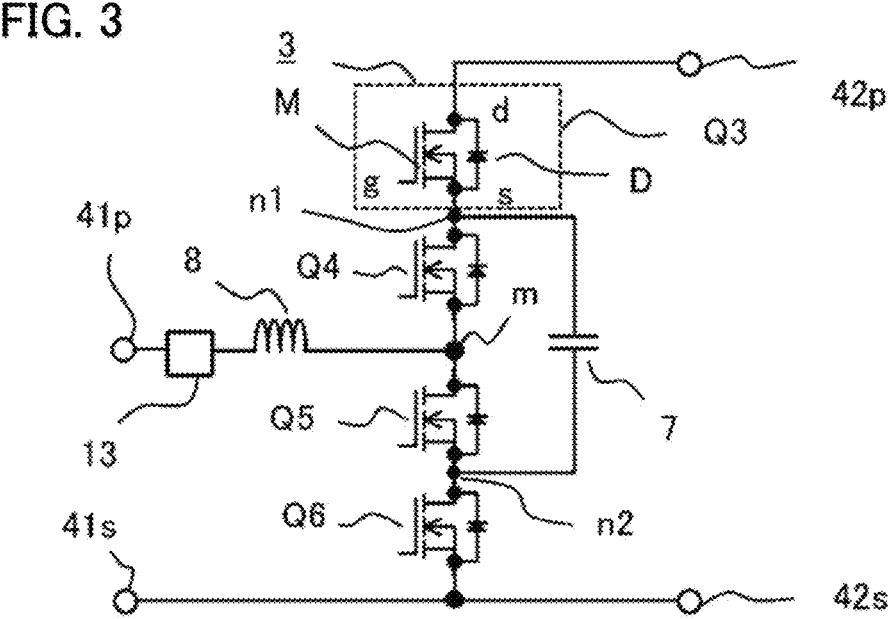
FIG. 3 shows a second example of the chopper in FIG. 1.
Figure 4:
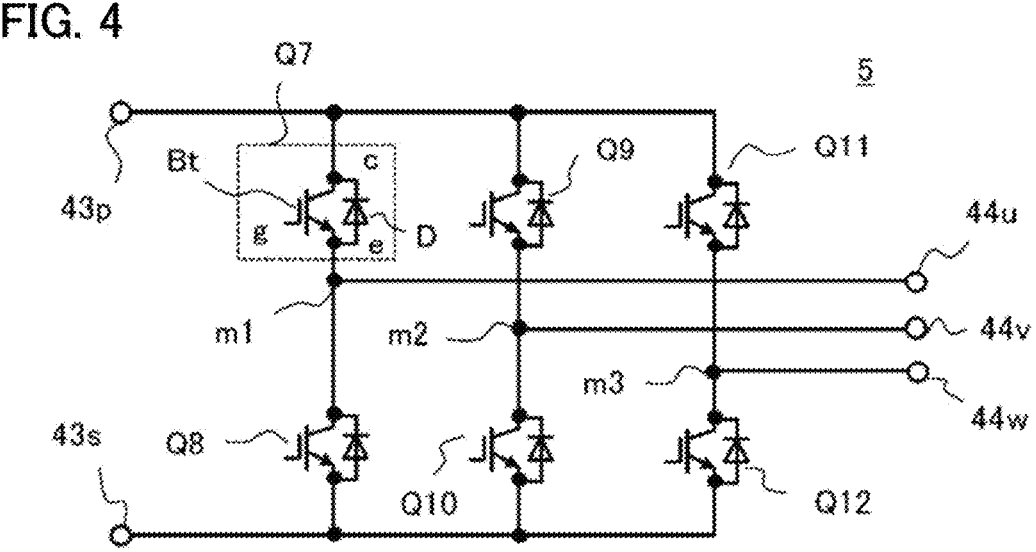
FIG. 4 shows the configuration of an inverter in FIG. 1.
Figure 5:
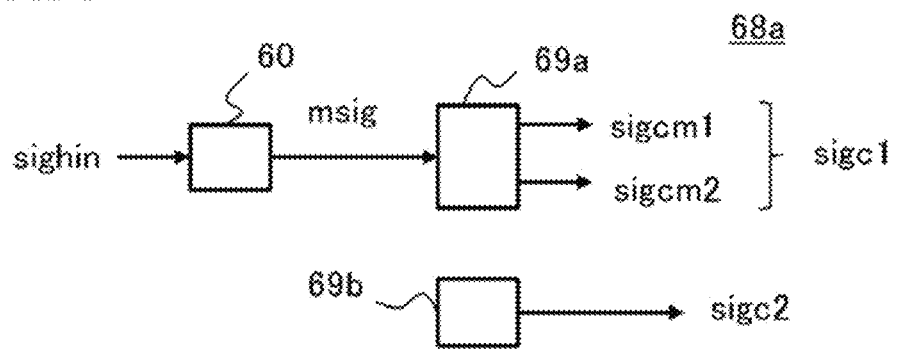
FIG. 5 shows the configuration of a control signal generation unit in FIG. 1.
Figure 6:
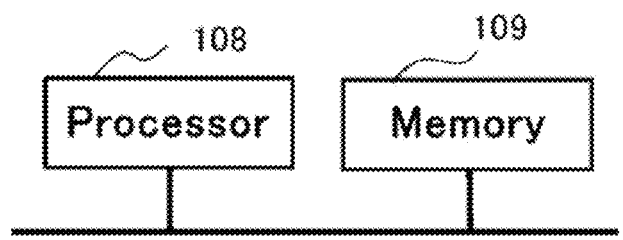
FIG. 6 shows a hardware configuration example for implementing the function of a control device in FIG. 1.
Figure 7:
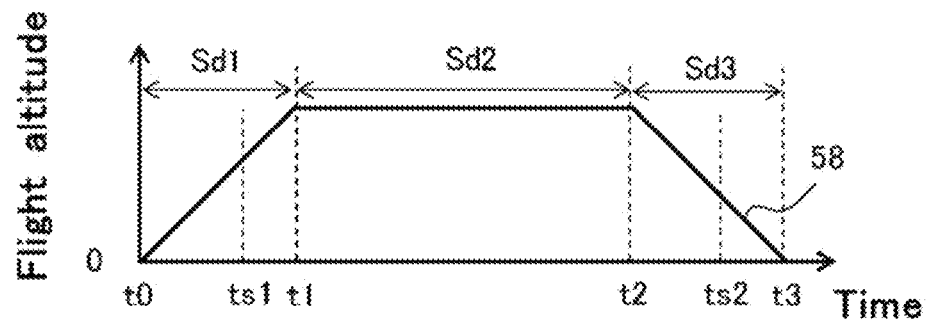
FIG. 7 shows timings for explaining operation of the motor control device according to embodiment 1.
Figure 8:
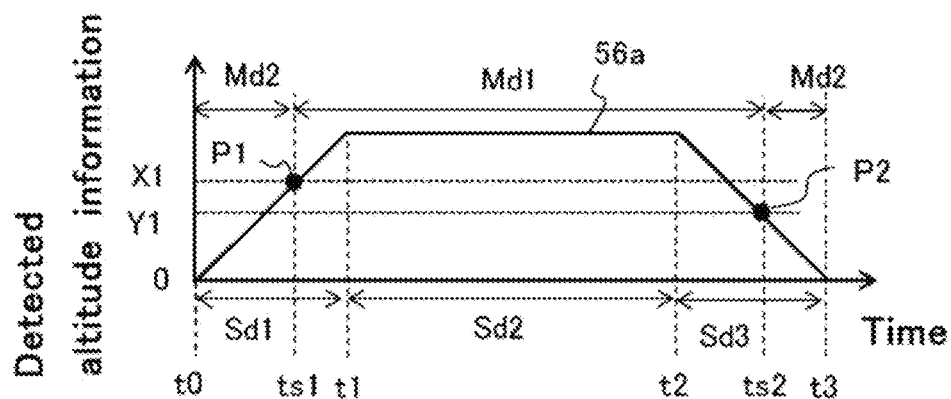
FIG. 8 shows timings for explaining operation of the motor control device according to embodiment 1.
Figure 9:
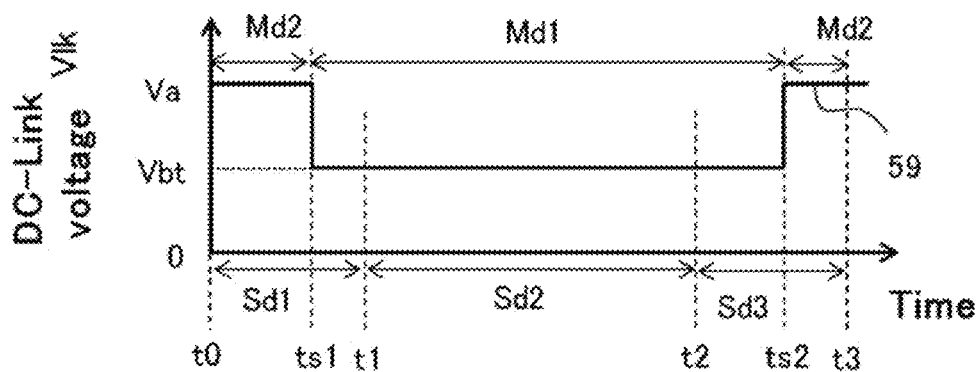
FIG. 9 shows timings for explaining operation of the motor control device according to embodiment 1.
Figure 10:
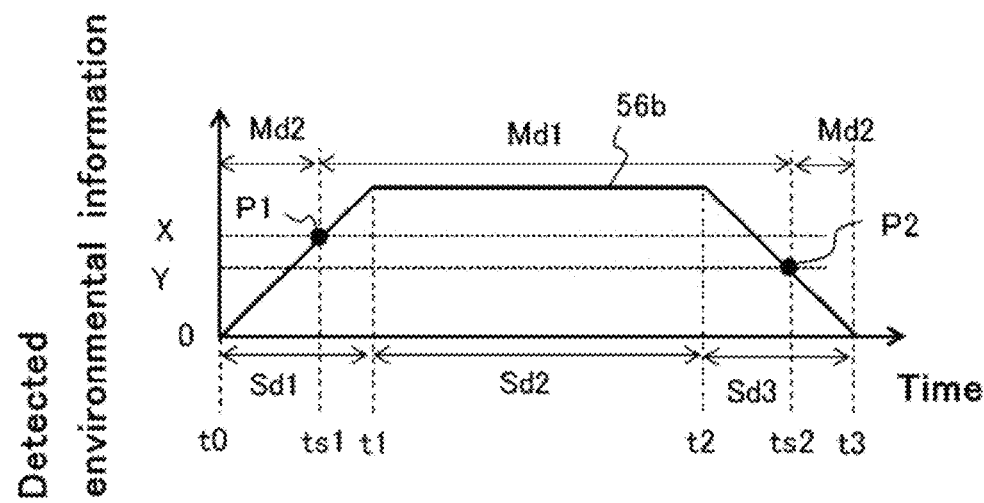
FIG. 10 shows timings in a first example of detected environmental information according to embodiment 1.
Figure 11:
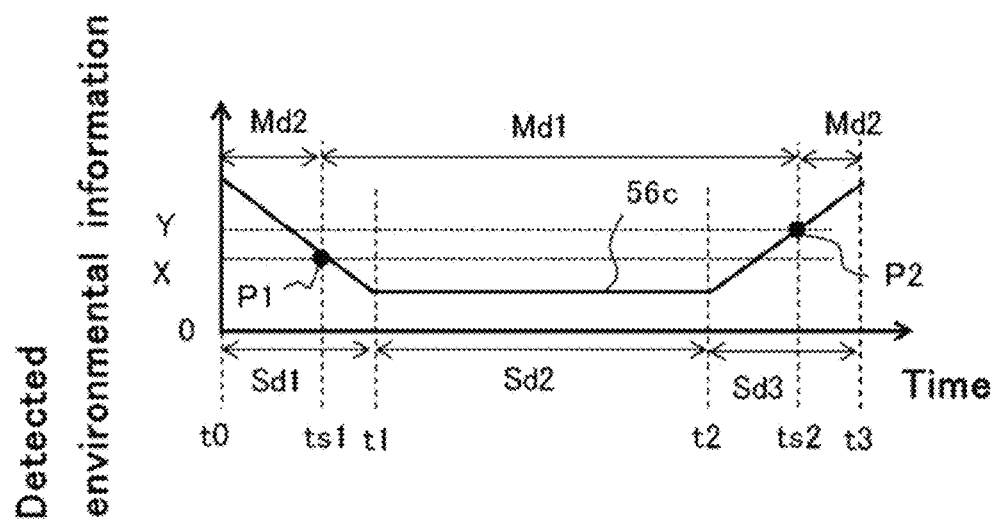
FIG. 11 shows timings in a second example of detected environmental information according to embodiment 1.
Figure 13:
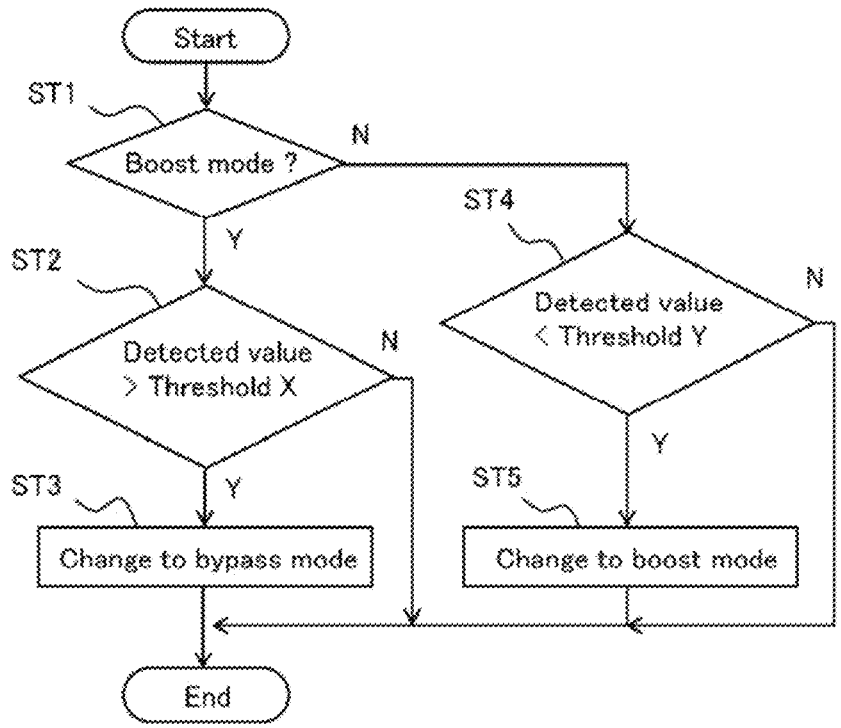
FIG. 13 shows a flowchart in a first example for explaining operation of an operation mode judgment unit in FIG. 5.
Figure 14:
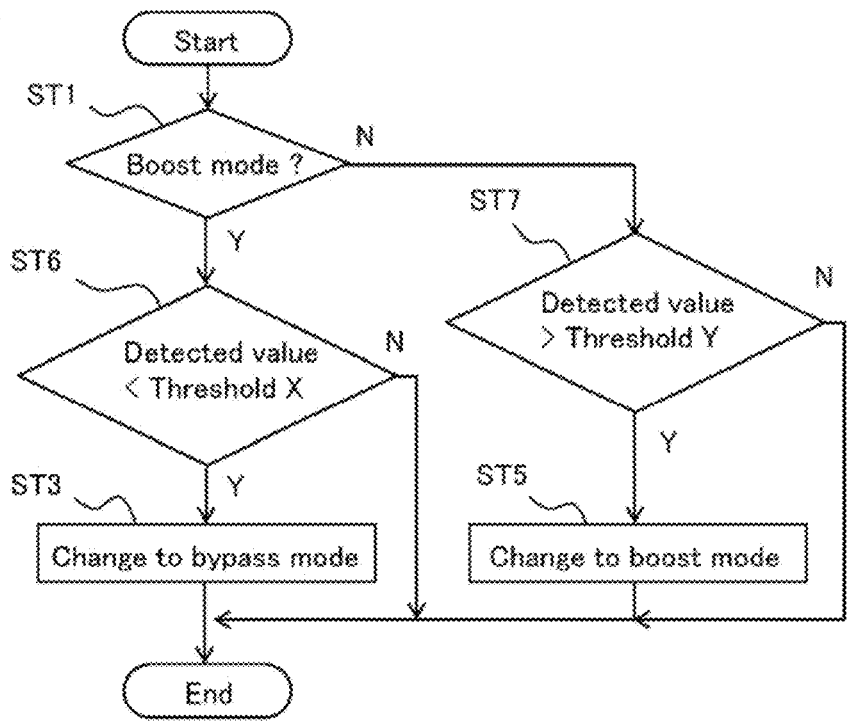
FIG. 14 shows a flowchart in a second example for explaining operation of the operation mode judgment unit in FIG. 5.
Figure 15:
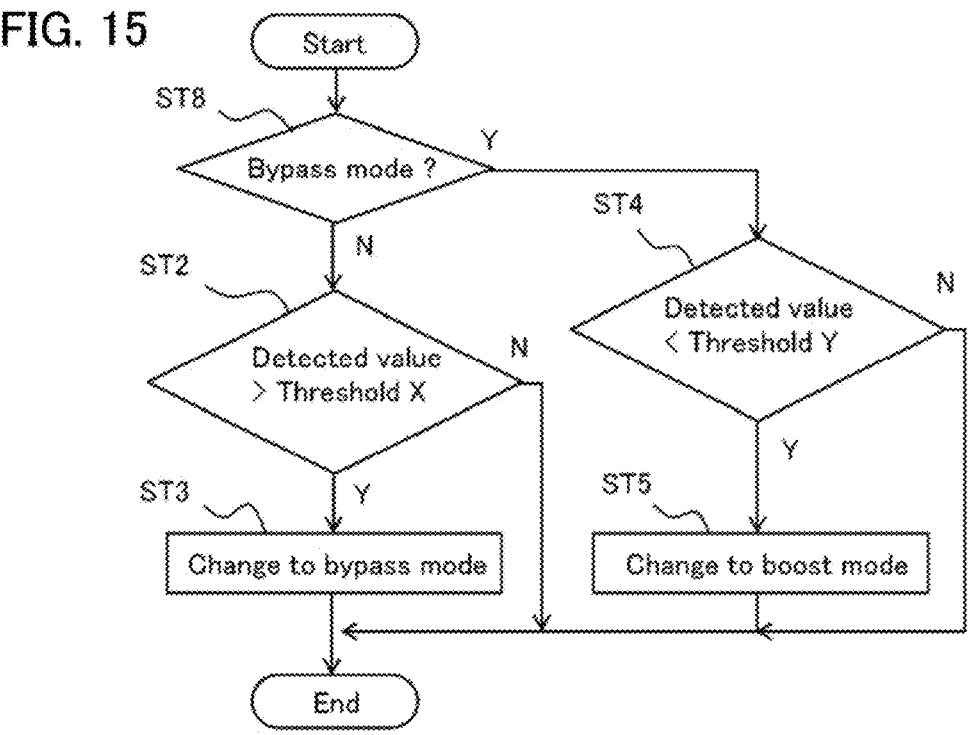
FIG. 15 shows a flowchart in a third example for explaining operation of the operation mode judgment unit in FIG. 5.
Figure 16:
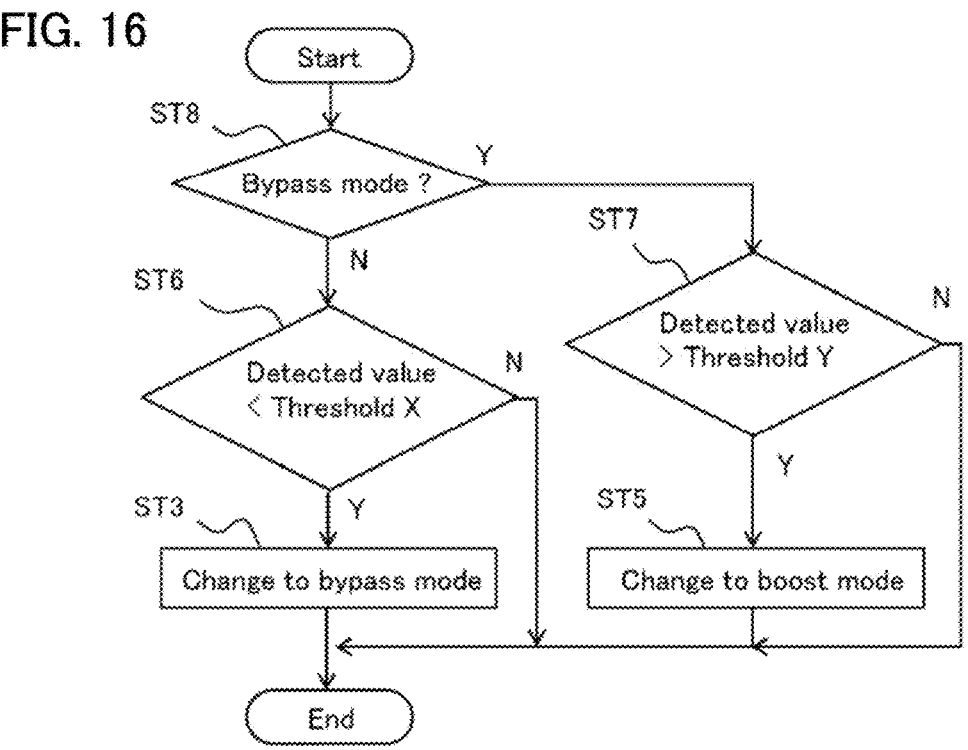
FIG. 16 shows a flowchart in a fourth example for explaining operation of the operation mode judgment unit in FIG. 5.
Figure 17:
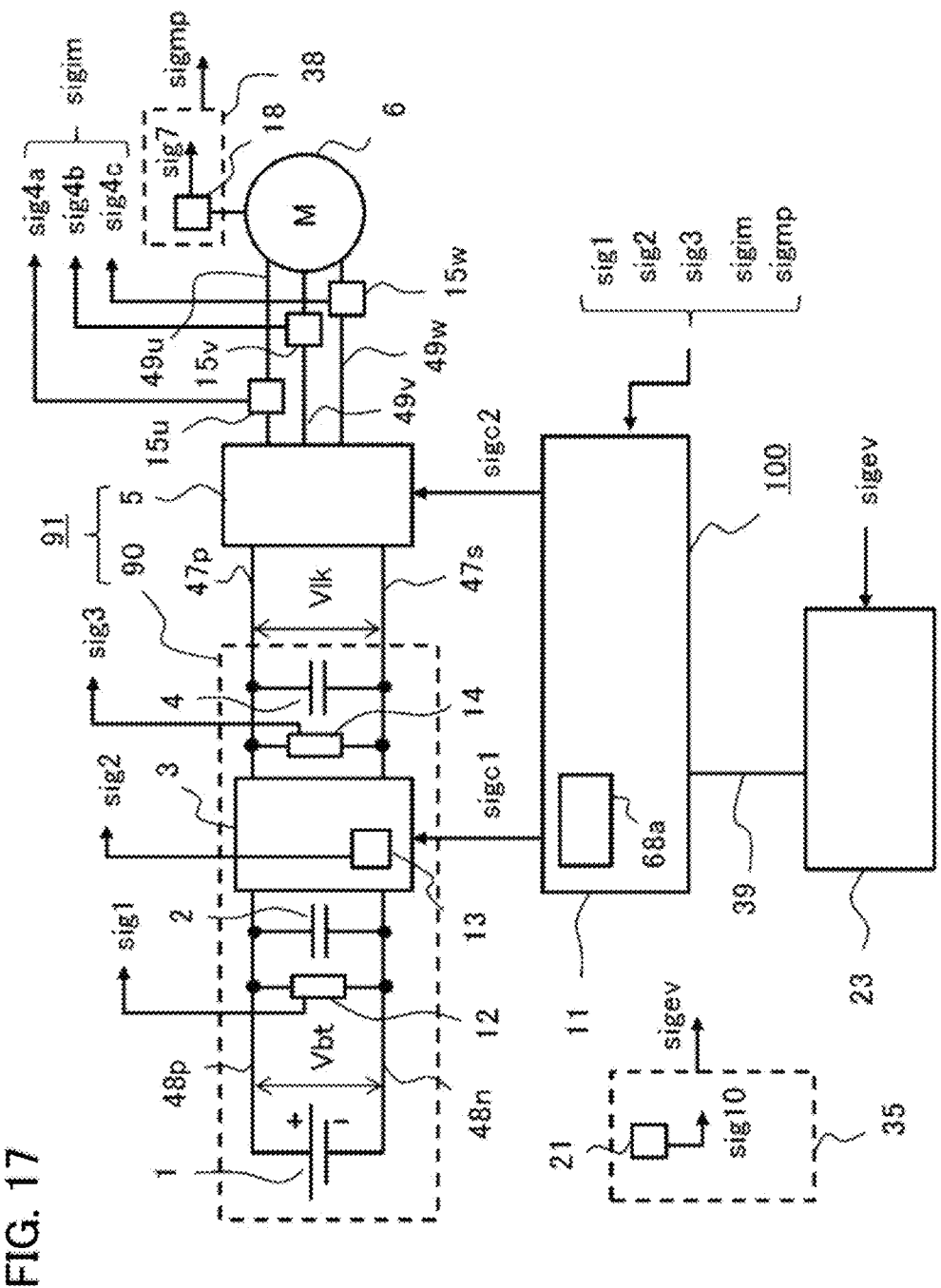
FIG. 17 shows a second example of the motor control device according to embodiment 1.
Figure 18:
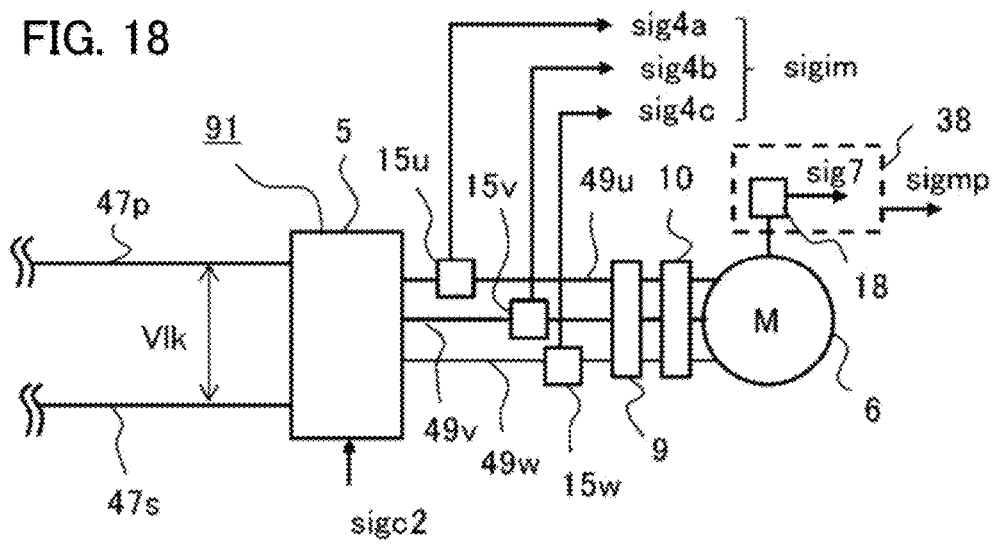
FIG. 18 shows a specific part in a second example of a driving device according to embodiment 1.

FIG. 1 shows a first example of a motor control device according to embodiment 1. FIG. 2 shows a first example of a chopper in FIG. 1, and FIG. 3 shows a second example of the chopper in FIG. 1. FIG. 4 shows the configuration of an inverter in FIG. 1, and FIG. 5 shows the configuration of a control signal generation unit in FIG. 1. FIG. 6 shows a hardware configuration example for implementing the function of a control device in FIG. 1. FIG. 7, FIG. 8, and FIG. 9 show timings for explaining operation of the motor control device according to embodiment 1. FIG. 10 shows timings in a first example of detected environmental information according to embodiment 1, and FIG. 11 shows timings in a second example of detected environmental information according to embodiment 1. FIG. 12 shows environmental information and thresholds according to embodiment 1. FIG. 13 shows a flowchart in a first example for explaining operation of an operation mode judgment unit in FIG. 5, and FIG. 14 shows a flowchart in a second example for explaining operation of the operation mode judgment unit in FIG. 5. FIG. 15 shows a flowchart in a third example for explaining operation of the operation mode judgment unit in FIG. 5, and FIG. 16 shows a flowchart in a fourth example for explaining operation of the operation mode judgment unit in FIG. 5. FIG. 17 shows a second example of the motor control device according to embodiment 1, and FIG. 18 shows a specific part in a second example of a driving device according to embodiment 1.

A motor control device 100 according to embodiment 1 includes a driving device 91, a control device 11, and an operating panel 23, and controls a motor 6. The motor control device 100 is provided to a flying object such as an aircraft, for example. The motor 6 is an AC motor such as an induction motor or a permanent magnet synchronous motor (PMSM). The driving device 91 includes a power source device 90 for outputting DC power, and an inverter 5 which is a power supply device for converting DC power to AC power and outputting the AC power to the motor 6. The control device 11 controls the power source device 90 and the inverter 5. The power source device 90 includes a battery 1 as a DC power source, a capacitor 2 connected between output terminals of the battery 1, a non-isolated boost chopper 3 for boosting battery voltage Vbt of the battery 1, and a DC-link capacitor 4 connected between output terminals of the chopper 3. The chopper 3 is a DC-output power conversion device for converting output of the battery 1 which is a DC power source to DC power, and the capacitor 4 is an output capacitor for smoothing output voltage of the chopper 3. The chopper 3 has a first operation mode Md1 for outputting the battery voltage Vbt which is first voltage, and a second operation mode Md2 for outputting boost voltage Va which is second voltage higher than the first voltage. The power source device 90 further includes a positive-side power line 48p connecting the positive side of the battery 1 and a high-potential-side input terminal 41p of the chopper 3, a negative-side power line 48n connecting the negative side of the battery 1 and a low-potential-side input terminal 41s of the chopper 3, a high-potential-side power line 47p connecting a high-potential-side output terminal 42p of the chopper 3 and a high-potential-side input terminal 43p of the inverter 5, a low-potential-side power line 47s connecting a low-potential-side output terminal 42s of the chopper 3 and a low-potential-side input terminal 43s of the inverter 5, a battery voltage sensor 12 for detecting voltage between the positive-side power line 48p and the negative-side power line 48n, and a DC-link voltage sensor 14 for detecting DC-link voltage Vlk of the capacitor 4 which is voltage between the high-potential-side power line 47p and the low-potential-side power line 47s. The high-potential-side power line 47p and the low-potential-side power line 47s are DC bus bars of the inverter 5.

The motor 6 is a three-phase AC motor, for example, and the inverter 5 is an inverter of a three-phase inverter type as shown in FIG. 4, for example. The inverter 5 is an inverter applicable to variable-speed driving for the motor 6. The inverter 5 converts the DC-link voltage Vlk to three-phase AC power having such voltage and a frequency that achieve required torque and rotational speed of the motor 6, and outputs the three-phase AC power to the motor 6. A U-side output terminal 44u, a V-side output terminal 44v, and a W-side output terminal 44w of the inverter 5 are respectively connected to input terminals for U phase, V phase, and W phase of the motor 6 via a U-phase power line 49u, a V-phase power line 49v, and a W-phase power line 49w.

The chopper 3 may be, for example, a chopper in a first example shown in FIG. 2, a chopper in a second example shown in FIG. 3, or the like. The chopper 3 in the first example is a DC/DC converter composed of two semiconductor switching elements Q1, Q2 and a reactor 8. The chopper 3 in the second example is a DC/DC converter of a multilevel chopper type composed of four semiconductor switching elements Q3, Q4, Q5, Q6, a reactor 8, and a flying capacitor 7. Hereinafter, the DC/DC converter of a multilevel chopper type is referred to as multilevel-type chopper. The multilevel-type chopper 3 shown in FIG. 3 can output multilevel voltages and can perform multilevel voltage conversion. The semiconductor switching elements Q1 to Q6 are self-turn-off power semiconductor elements such as insulated gate bipolar transistors (IGBTs) or metal-oxide-semiconductor field-effect transistors (MOSFETs). In this example, the semiconductor switching elements Q1 to Q6 are MOSFETs. Terminals of each semiconductor switching element Q1 to Q6 are a drain terminal d, a source terminal s, and a gate terminal g. Each semiconductor switching element Q1 to Q6 has a MOS transistor M and a diode D. The diode D may be an element separate from the MOS transistor M, or may be a parasitic diode.

In the examples shown in FIG. 2 and FIG. 3, a reactor current sensor 13 for detecting current flowing through the reactor 8 is connected between the high-potential-side input terminal 41p and the reactor 8. In the chopper 3 in the first example, the reactor 8 is connected to a connection point m between the semiconductor switching elements Q1, Q2 connected in series. The drain terminal d of the semiconductor switching element Q1 is connected to the high-potential-side output terminal 42p, and the source terminal s of the semiconductor switching element Q2 is connected to the low-potential-side input terminal 41s and the low-potential-side output terminal 42s. The source terminal s of the semiconductor switching element Q1 is connected to the drain terminal d of the semiconductor switching element Q2.

In the chopper 3 in the second example, the semiconductor switching elements Q3, Q4, Q5, Q6 are connected in series, and the reactor 8 is connected to a connection point m between the semiconductor switching elements Q4, Q5. The flying capacitor 7 is connected between a connection point n1 between the semiconductor switching elements Q3, Q4 and a connection point n2 between the semiconductor switching elements Q5, Q6. The drain terminal d of the semiconductor switching element Q3 is connected to the high-potential-side output terminal 42p, and the source terminal s of the semiconductor switching element Q6 is connected to the low-potential-side input terminal 41s and the low-potential-side output terminal 42s. The source terminal s of the semiconductor switching element Q3 is connected to the drain terminal d of the semiconductor switching element Q4. The source terminal s of the semiconductor switching element Q4 is connected to the drain terminal d of the semiconductor switching element Q5. The source terminal s of the semiconductor switching element Q5 is connected to the drain terminal d of the semiconductor switching element Q6. The multilevel-type chopper 3 includes, between the high-potential-side output terminal 42p, and the low-potential-side output terminal 42s and the low-potential-side input terminal 41s, a high-potential-side series unit composed of a plurality of semiconductor switching elements Q3, Q4 connected in series and a low-potential-side series unit composed of a plurality of semiconductor switching elements Q5, Q6 connected in series, and includes the reactor 8 between the high-potential-side input terminal 41p and the connection point m between the high-potential-side series unit and the low-potential-side series unit.

The inverter 5 includes, for example, six semiconductor switching elements Q7, Q8, Q9, Q10, Q11, Q12. The semiconductor switching elements Q7 to Q12 are self-turn-off power semiconductor elements such as IGBTs or MOSFETs. In this example, the semiconductor switching elements Q7 to Q12 are IGBTs. Terminals of each semiconductor switching element Q7 to Q12 are a collector terminal c, an emitter terminal e, and a gate terminal g. Each semiconductor switching element Q7 to Q12 has a transistor Bt which is an IGBT, and a diode D. The collector terminals c of the semiconductor switching elements Q7, Q9, Q11 are connected to the high-potential-side input terminal 43p, and the emitter terminals e of the semiconductor switching elements Q8, Q10, Q12 are connected to the low-potential-side input terminal 43s. The semiconductor switching elements Q7, Q8 are connected in series, and the emitter terminal e of the semiconductor switching element Q7 and the collector terminal c of the semiconductor switching element Q8 are connected to each other. The semiconductor switching elements Q9, Q10 are connected in series, and the emitter terminal e of the semiconductor switching element Q9 and the collector terminal c of the semiconductor switching element Q10 are connected to each other. The semiconductor switching elements Q11, Q12 are connected in series, and the emitter terminal e of the semiconductor switching element Q11 and the collector terminal c of the semiconductor switching element Q12 are connected to each other. A connection point m1 between the semiconductor switching elements Q7, Q8 is connected to the U-side output terminal 44u. A connection point m2 between the semiconductor switching elements Q9, Q10 is connected to the V-side output terminal 44v, and a connection point m3 between the semiconductor switching elements Q11, Q12 is connected to the W-side output terminal 44w.

The motor control device 100 includes, besides the battery voltage sensor 12, the reactor current sensor 13, and the DC-link voltage sensor 14 connected to the power source device 90, a U phase current sensor 15u, a V phase current sensor 15v, a W phase current sensor 15w, a motor parameter sensor 38 such as a position sensor 18, and an environmental information detection sensor 35 such as an altitude sensor 21. The battery voltage sensor 12 outputs detected information sig1 which is information of the battery voltage Vbt. The reactor current sensor 13 outputs detected information sig2 which is information of current flowing through the reactor 8. The DC-link voltage sensor 14 outputs detected information sig3 which is information of the DC-link voltage Vlk. The U phase current sensor 15u outputs detected information sig4a which is information of current flowing through the U-phase power line 49u. The V phase current sensor 15v outputs detected information sig4b which is information of current flowing through the V-phase power line 49v, and the W phase current sensor 15w outputs detected information sig4c which is information of current flowing through the W-phase power line 49w. The detected information sig4a, sig4b, sig4c is motor current detected information sigim.

The motor parameter sensor 38 outputs motor parameter detected information sigmp which is state information of the motor 6. The environmental information detection sensor 35 is a sensor for detecting information of an environmental factor, and outputs environmental detected information sigev which is environmental information of the aircraft or the like provided with the motor control device 100. The position sensor 18 outputs detected information sig7 which is information of the magnetic pole position of the motor 6. In a case where the motor parameter sensor 38 is the position sensor 18, the motor parameter detected information sigmp is the detected information sig7. The altitude sensor 21 outputs detected information sig10 which is information of the altitude of the aircraft or the like provided with the motor control device 100. In a case where the environmental information detection sensor 35 is the altitude sensor 21, the environmental detected information sigev is the detected information sig10. It is noted that, depending on the motor control type, the U phase current sensor 15u, the V phase current sensor 15v, the W phase current sensor 15w, the motor parameter sensor 38 such as the position sensor 18 need not be provided.

The operating panel 23 is provided with a device for a pilot of the aircraft or the like to perform operation, and the control device 11 and the operating panel 23 are connected via a signal line 39. The control device 11 receives the detected information sig1, sig2, sig3, the motor current detected information sigim, the motor parameter detected information sigmp, and the environmental detected information sigev. On the basis of the detected information sig1, sig2, sig3, the motor current detected information sigim, the motor parameter detected information sigmp, the environmental detected information sigev, and an input signal from the operating panel 23, the control device 11 outputs a control signal sigc1 for controlling the chopper 3 and a control signal sigc2 for controlling the inverter 5. The control device 11 includes a control signal generation unit 68a. The control signal generation unit 68a includes an operation mode judgment unit 60, a first signal generation unit 69a, and a second signal generation unit 69b.

The operation mode judgment unit 60 performs judgment about two operation modes of the chopper 3 described later on the basis of input information sighin, and outputs an operation mode signal msig. For example, a first operation mode is an operation mode in which the DC-link voltage Vlk is not boosted and is made equal to the battery voltage Vbt, and the second operation mode is an operation mode in which the DC-link voltage Vlk is boosted from the battery voltage Vbt to the boost voltage Va. That is, the first operation mode is a bypass mode and the second operation mode is a boost mode. For example, in a case where the operation mode signal msig is at a low level, the operation mode signal msig indicates the first operation mode, and in a case where the operation mode signal msig is at a high level, the operation mode signal msig indicates the second operation mode. The high level corresponds to voltage of the control device 11, and the low level corresponds to the voltage of the ground of the control device 11. In response to the operation mode signal msig at a low level, the first signal generation unit 69a outputs, as the control signal sigc1, a first mode control signal sigcm1 for controlling the chopper 3 in the first operation mode. In response to the operation mode signal msig at a high level, the first signal generation unit 69a outputs, as the control signal sigc1, a second mode control signal sigcm2 for controlling the chopper 3 in the second operation mode. The second signal generation unit 69b outputs a control signal sigc2 for controlling the inverter 5 on the basis of the detected information sig1, sig2, sig3 and the motor current detected information sigim.

In the motor control device 100 of embodiment 1, the input information sighin is the environmental detected information sigev. The function of the control device 11 is implemented by a processor 108 such as a central processing unit (CPU) and a field programmable gate array (FPGA), and a memory 109, as shown in FIG. 6, for example. The function blocks of the operation mode judgment unit 60, the first signal generation unit 69a, the second signal generation unit 69b, and the like are implemented by the processor 108 executing a program stored in the memory 109. A plurality of processors 108 and a plurality of memories 109 may execute functions in cooperation with each other.

Operations of the chopper 3 and the control device 11 will be described. In the first operation mode, the chopper 3 stops switching operations of the semiconductor switching elements and directly transmits power from the battery 1 to the capacitor 4 without performing voltage conversion. Specifically, in the chopper 3 in the first example, the semiconductor switching element Q2 is turned off and the semiconductor switching element Q1 is turned on. In the chopper 3 in the second example, the semiconductor switching elements Q5, Q6 are turned off, and the semiconductor switching elements Q3, Q4 are turned on. Alternatively, in the first operation mode, without using synchronous rectification, the semiconductor switching elements may be all turned off and current may be conducted through the diode D of the semiconductor switching element Q1 or the diodes D of the semiconductor switching elements Q3, Q4. In the second operation mode, the chopper 3 performs power conversion through switching operations of the semiconductor elements so that the DC-link voltage Vlk which is the voltage across the capacitor 4 becomes predetermined boost voltage Va which is approximately two times of the value of the battery voltage Vbt of the battery 1. These power conversion controls are executed by the control signal sigc1 from the control device 11. It is noted that "approximately two times" means, for example, "1.7 times or more and 2.3 times or less", and preferably, "1.9 times or more and 2.1 times or less". That is, the boost voltage Va is, for example, voltage that is 1.7 times or more and 2.3 times or less of the battery voltage Vbt, and preferably, voltage that is 1.9 times or more and 2.1 times or less of the battery voltage Vbt.

In the motor control device 100 of embodiment 1, the operation mode of the chopper 3 is changed using the altitude sensor 21 as the environmental information detection sensor 35. It is assumed that the flight altitude of the aircraft provided with the motor control device 100 changes as in flight altitude characteristics 58 shown in FIG. 7. In FIG. 7, the horizontal axis indicates time, and the vertical axis indicates the flight altitude. The aircraft starts to ascend at time t0, and cruises at a constant altitude from time t1 to time t2. The aircraft starts to descend at time t2 and lands on the ground at time t3. A state from time t0 to time t1 is a first flight state Sd1, a state from time t1 to time t2 is a second flight state Sd2, and a state from time t2 to time t3 is a third flight state Sd3. In the case where the aircraft provided with the motor control device 100 flies as shown in FIG. 7, characteristics of detected altitude information calculated from the detected information sig10 outputted from the altitude sensor 21 are as shown by detected altitude information characteristics 56a in FIG. 8, and the DC-link voltage Vlk of the chopper 3 changes as in DC-link voltage characteristics 59 shown in FIG. 9. In FIG. 8, the horizontal axis indicates time, and the vertical axis indicates the detected altitude information. In FIG. 9, the horizontal axis indicates time, and the vertical axis indicates the DC-link voltage Vlk.

At time t0, the control device 11 operates the chopper 3 in the second operation mode Md2, i.e., the boost mode. That is, at time t0, the chopper 3 operates in the second operation mode Md2, i.e., the boost mode. In the first flight state Sd1, when the detected altitude information inputted from the altitude sensor 21 indicates a value exceeding a threshold X1, the control device 11 changes the operation mode to the first operation mode Md1, i.e., the bypass mode, to start operation of the chopper 3 in the bypass mode, i.e., bypass operation, thus reducing the DC-link voltage Vlk from the boost voltage Va to the battery voltage Vbt. The detected altitude information exceeds the threshold X1 at time ts1, and the DC-link voltage Vlk changes from the boost voltage Va to the battery voltage Vbt at time ts1. In the second flight state Sd2 from time t1 to time t2, the control device 11 keeps the bypass operation of the chopper 3. During operation in the first operation mode Md1, i.e., the bypass mode, if, in the third flight state Sd3, the detected altitude information inputted from the altitude sensor 21 indicates a value lower than a threshold Y1, the control device 11 changes the operation mode to the second operation mode Md2, i.e., the boost mode, to start operation of the chopper 3 in the boost mode, i.e., boost operation, thus increasing the DC-link voltage Vlk to the boost voltage Va. When the detected altitude information becomes lower than the threshold Y1 at time ts2, the DC-link voltage Vlk changes from the battery voltage Vbt to the boost voltage Va at time ts2. Operation in the bypass mode may be referred to as bypass operation, and operation in the boost mode may be referred to as boost operation. An action in the bypass mode may be referred to as bypass action, and an action in the boost mode may be referred to as boost action. The first operation mode Md1 and the second operation mode Md2 may be simply referred to as first operation mode and second operation mode, respectively.

A unit of the detected altitude information may be a unit representing a length, such as meter or foot, or may be a unit that can be compared by a relative value as in a per-unit (PU) system. In embodiment 1, the threshold X1 is greater than the threshold Y1. A point where the detected altitude information in the detected altitude information characteristics 56a in the first flight state Sd1 becomes the threshold X1 is a mode change point P1, and a point where the detected altitude information in the detected altitude information characteristics 56a in the third flight state Sd3 becomes the threshold Y1 is a mode change point P2.

In the above description, the example in which the environmental information detection sensor 35 is the altitude sensor 21 has been shown. However, the environmental information detection sensor 35 is not limited to the altitude sensor 21. In the case where the environmental information detection sensor 35 is the altitude sensor 21, characteristics of detected environmental information calculated from the environmental detected information sigev outputted from the environmental information detection sensor 35 are as shown by detected environmental information characteristics 56b in FIG. 10. As described in embodiment 2 later, in a case where the environmental information detection sensor 35 is an outside air pressure sensor 20, characteristics of detected outside air pressure information calculated from detected information sig9 outputted from the outside air pressure sensor 20 are as shown by detected outside air pressure information characteristics 56d in FIG. 20. That is, in the case where the environmental information detection sensor 35 is the outside air pressure sensor 20, characteristics of detected environmental information calculated from the environmental detected information sigev outputted from the environmental information detection sensor 35 are as shown by detected environmental information characteristics 56c in FIG. 11. In FIG. 10 and FIG. 11, the horizontal axes indicate time, and the vertical axes indicate the detected environmental information. The detected environmental information characteristics 56b shown in FIG. 10 exhibit change similar to the flight altitude characteristics 58 in FIG. 7, and have, as it were, an upward convex shape. The detected environmental information characteristics 56c shown in FIG. 11 exhibit change in the direction opposite to the flight altitude characteristics 58 in FIG. 7, and have, as it were, a downward convex shape.

The environmental detected information sigev is information of an environmental factor relevant to the flight altitude of the flying object, and is flight information. When the flying object such as the aircraft takes off from the ground, the control device 11 controls the chopper 3 in the second operation mode Md2, and when the control device 11 judges that flight information which is information of an environmental factor relevant to the flight altitude of the flying object, i.e., the environmental detected information sigev, satisfies a predetermined condition, the control device 11 controls the chopper 3 in the first operation mode Md1.

Next, operation of the operation mode judgment unit 60 of the control device 11 will be described with reference to the flowcharts in FIG. 13 to FIG. 16. The flowchart in the first example shown in FIG. 13 is a flowchart corresponding to the detected environmental information characteristics 56b in the first example shown in FIG. 10. The detected environmental information characteristics 56b in the first example shown in FIG. 10 have a shape similar to the detected altitude information characteristics 56a in FIG. 8, the threshold at the mode change point P1 is X, and the threshold at the mode change point P2 is Y. At time t0, the control device 11 operates the chopper 3 in the second operation mode Md2, i.e., the boost mode. That is, at time t0, the chopper 3 operates in the second operation mode Md2, i.e., the boost mode. In the first flight state Sd1, when the detected environmental information inputted from the environmental information detection sensor 35 indicates a value exceeding the threshold X which is a first environmental threshold, the control device 11 changes the operation mode to the first operation mode Md1, i.e., the bypass mode, to start bypass operation of the chopper 3, thus reducing the DC-link voltage Vlk from the boost voltage Va to the battery voltage Vbt. The detected altitude information exceeds the threshold X at time ts1, and the DC-link voltage Vlk changes from the boost voltage Va to the battery voltage Vbt at time ts1. The control device 11 keeps the bypass operation of the chopper 3 in the second flight state Sd2 from time t1 to time t2. During operation in the first operation mode Md1, i.e., the bypass mode, if, in the third flight state Sd3, the detected environmental information inputted from the environmental information detection sensor 35 indicates a value lower than the threshold Y which is a second environmental threshold, the control device 11 changes the operation mode to the second operation mode Md2, i.e., the boost mode, to start boost operation of the chopper 3, thus increasing the DC-link voltage Vlk to the boost voltage Va. When the detected environmental information becomes lower than the threshold Y at time ts2, the DC-link voltage Vlk changes from the battery voltage Vbt to the boost voltage Va at time ts2.

In step ST1, whether or not the chopper 3 is in the boost mode (second operation mode) is judged. Specifically, in step ST1, whether or not the operation mode signal msig indicates the boost mode, for example, whether or not the operation mode signal msig is at a high level, is judged. In step ST1, if it is judged that the chopper 3 is in the boost mode, the process proceeds to step ST2, and if it is judged that the chopper 3 is not in the boost mode, the process proceeds to step ST4. In step ST2, if the detected value of the detected environmental information is greater than the threshold X, i.e., if an operation mode change judgment criterion is satisfied, the process proceeds to step ST3, and if the detected value of the detected environmental information is not greater than the threshold X, i.e., if the operation mode change judgment criterion is not satisfied, the operation mode signal msig is kept in the boost mode and the process is ended. In step ST3, the operation mode signal msig is changed to the bypass mode and the process is ended. In step ST4, if the detected value of the detected environmental information is smaller than the threshold Y, i.e., if the operation mode change judgment criterion is satisfied, the process proceeds to step ST5, and if the detected value of the detected environmental information is not smaller than the threshold Y, i.e., if the operation mode change judgment criterion is not satisfied, the operation mode signal msig is kept in the bypass mode and the process is ended. In step ST5, the operation mode signal msig is changed to the boost mode and the process is ended.

The flowchart in the second example shown in FIG. 14 is a flowchart corresponding to the detected environmental information characteristics 56c in the second example shown in FIG. 11. The detected environmental information characteristics 56c in the second example shown in FIG. 11 have a shape reversed upside down from the detected altitude information characteristics 56a in FIG. 8 and the detected environmental information characteristics 56b in FIG. 10, the threshold at the mode change point P1 is X, and the threshold at the mode change point P2 is Y. In the detected environmental information characteristics 56c in the second example shown in FIG. 11, the detected value is reduced as the flight altitude becomes higher as in the detected outside air pressure information characteristics 56d, for example. At time t0, the control device 11 operates the chopper 3 in the second operation mode Md2, i.e., the boost mode. That is, at time t0, the chopper 3 operates in the second operation mode Md2, i.e., the boost mode. In the first flight state Sd1, when the detected environmental information inputted from the environmental information detection sensor 35 indicates a value lower than the threshold X, the control device 11 changes the operation mode to the first operation mode Md1, i.e., the bypass mode, to start bypass operation of the chopper 3, thus reducing the DC-link voltage Vlk from the boost voltage Va to the battery voltage Vbt. The detected environmental information becomes lower than the threshold X at time ts1, and the DC-link voltage Vlk changes from the boost voltage Va to the battery voltage Vbt at time ts1. In the second flight state Sd2 from time t1 to time t2, the control device 11 keeps the bypass operation of the chopper 3. During operation in the first operation mode Md1, i.e., the bypass mode, if, in the third flight state Sd3, the detected environmental information inputted from the environmental information detection sensor 35 indicates a value exceeding the threshold Y, the control device 11 changes the operation mode to the second operation mode Md2, i.e., the boost mode, to start boost operation of the chopper 3, thus increasing the DC-link voltage Vlk to the boost voltage Va. When the detected environmental information exceeds the threshold Y at time ts2, the DC-link voltage Vlk changes from the battery voltage Vbt to the boost voltage Va at time ts2.

The flowchart in the second example shown in FIG. 14 is different from the flowchart in the first example shown in FIG. 13 in that steps ST2 and ST4 are replaced with steps ST6 and ST7, respectively. In step ST1, whether or not the chopper 3 is in the boost mode (second operation mode) is judged. Specifically, in step ST1, whether or not the operation mode signal msig indicates the boost mode, for example, whether or not the operation mode signal msig is at a high level, is judged. In step ST1, if it is judged that the chopper 3 is in the boost mode, the process proceeds to step ST6, and if it is judged that the chopper 3 is not in the boost mode, the process proceeds to step ST7. In step ST6, if the detected value of the detected environmental information is smaller than the threshold X, i.e., if the operation mode change judgment criterion is satisfied, the process proceeds to step ST3, and if the detected value of the detected environmental information is not smaller than the threshold X, i.e., if the operation mode change judgment criterion is not satisfied, the operation mode signal msig is kept in the boost mode and the process is ended. In step ST3, the operation mode signal msig is changed to the bypass mode and the process is ended. In step ST7, if the detected value of the detected environmental information is greater than the threshold Y, i.e., if the operation mode change judgment criterion is satisfied, the process proceeds to step ST5, and if the detected value of the detected environmental information is not greater than the threshold Y, i.e., if the operation mode change judgment criterion is not satisfied, the operation mode signal msig is kept in the bypass mode and the process is ended. In step ST5, the operation mode signal msig is changed to the boost mode and the process is ended.

In the examples shown in FIG. 13 and FIG. 14, whether or not the chopper 3 is in the boost mode is judged in step ST1 which is the first step from the start of the flowchart.

However, as shown in FIG. 15 and FIG. 16, whether or not the chopper 3 is in the bypass mode may be judged in step ST8 which is the first step. The flowchart in the third example shown in FIG. 15 is a flowchart corresponding to the detected environmental information characteristics 56b in the first example shown in FIG. 10. The flowchart in the fourth example shown in FIG. 16 is a flowchart corresponding to the detected environmental information characteristics 56c in the second example shown in FIG. 11. In the flowchart in the third example shown in FIG. 15, in step ST8, whether or not the chopper 3 is in the bypass mode (first operation mode) is judged. Specifically, in step ST8, whether or not the operation mode signal msig indicates the bypass mode, for example, whether or not the operation mode signal msig is at a low level, is judged. In step ST8, if it is judged that the chopper 3 is in the bypass mode, the process proceeds to step ST4, and if it is judged that the chopper 3 is not in the bypass mode, the process proceeds to step ST2. Operations in steps ST2 to ST5 are the same as those in the flowchart in the first example shown in FIG. 13, and therefore the description thereof is not repeated.

In the flowchart in the fourth example shown in FIG. 16, in step ST8, whether or not the chopper 3 is in the bypass mode (first operation mode) is judged as described above. In step ST8, if it is judged that the chopper 3 is in the bypass mode, the process proceeds to step ST7, and if it is judged that the chopper 3 is not in the bypass mode, the process proceeds to step ST6. Operations in steps ST6, ST3, ST7, ST5 are the same as those in the second example shown in FIG. 14, and therefore the description thereof is not repeated.

FIG. 12 shows specific examples of the environmental detected information sigev to be inputted to the operation mode judgment unit 60 of the control device 11, and thresholds to be used in judgment. In a case where the altitude sensor 21 shown in FIG. 1 is used as a specific example of the environmental information detection sensor 35, information in the row of the altitude information shown in FIG. 12 is used. As the thresholds X and Y, thresholds X1 and Y1 are used, respectively. In a case where the outside air pressure sensor 20 (see FIG. 19) described later is used as a specific example of the environmental information detection sensor 35, information in the row of the outside air pressure information shown in FIG. 12 is used, and as the thresholds X and Y, thresholds X2 and Y2 are used, respectively. In a case where an air component concentration sensor 22 (see FIG. 21) described later is used as a specific example of the environmental information detection sensor 35, information in the row of the air component concentration information shown in FIG. 12 is used, and as the thresholds X and Y, thresholds X3 and Y3 are used, respectively.

In a case where an oxygen concentration sensor 55a is used as a specific example of the air component concentration sensor 22, information in the row of the oxygen concentration information shown in FIG. 12 is used, and as the thresholds X and Y, thresholds X3a and Y3a are used, respectively. In a case where a nitrogen concentration sensor 55b is used as a specific example of the air component concentration sensor 22, information in the row of the nitrogen concentration information shown in FIG. 12 is used, and as the thresholds X and Y, thresholds X3b and Y3b are used, respectively. In a case where a carbon dioxide concentration sensor 55c is used as a specific example of the air component concentration sensor 22, information in the row of the carbon dioxide concentration information shown in FIG. 12 is used, and as the thresholds X and Y, thresholds X3c and Y3c are used, respectively. In a case where an outside air temperature sensor 19 (see FIG. 26) described later is used as a specific example of the environmental information detection sensor 35, information in the row of the outside air temperature information shown in FIG. 12 is used, and as the thresholds X and Y, thresholds X4 and Y4 are used, respectively. In a case where a radiation sensor 24 (see FIG. 28) described later is used as a specific example of the environmental information detection sensor 35, information in the row of the radiation dose information shown in FIG. 12 is used, and as the thresholds X and Y, thresholds X5 and Y5 are used, respectively.

Regarding the threshold X which is the first environmental threshold and the threshold Y which is the second environmental threshold, depending on the kind of the environmental factor information, i.e., flight information, the detected environmental information characteristics are different (56b or 56c), i.e., the shape thereof is different (upward convex shape or downward convex shape). Therefore, using the threshold X which is the first environmental threshold and the threshold Y which is the second environmental threshold, operation of the control device 11 can be expressed as follows. In a state in which the chopper 3 is controlled in the second operation mode Md2, when the control device 11 judges that an information value based on information of an environmental factor has passed through the threshold X which is the first environmental threshold, the control device 11 controls the chopper 3 in the first operation mode Md1. In a state in which the chopper 3 is controlled in the first operation mode Md1, when the control device 11 judges that the information value based on the information of the environmental factor has passed through the threshold Y which is the second environmental threshold, the control device 11 controls the chopper 3 in the second operation mode Md2. The first environmental threshold and the second environmental threshold may be referred to as follows, in a case of discriminating them for each environmental factor information. If the information of the environmental factor, i.e., the flight information is altitude information of the flying object, the first environmental threshold and the second environmental threshold are referred to as first altitude threshold and second altitude threshold. If the information of the environmental factor, i.e., the flight information is outside air pressure information outside the flying object, the first environmental threshold and the second environmental threshold are referred to as first outside air pressure threshold and second outside air pressure threshold, respectively.

If the information of the environmental factor, i.e., the flight information is air component concentration information outside the flying object, the first environmental threshold and the second environmental threshold are referred to as first air component concentration threshold and second air component concentration threshold, respectively. If the information of the environmental factor is oxygen concentration information, the first environmental threshold and the second environmental threshold are referred to as first oxygen concentration threshold and second oxygen concentration threshold, respectively. If the information of the environmental factor is nitrogen concentration information, the first environmental threshold and the second environmental threshold are referred to as first nitrogen concentration threshold and second nitrogen concentration threshold, respectively. If the information of the environmental factor is carbon dioxide concentration information, the first environmental threshold and the second environmental threshold are referred to as first carbon dioxide concentration threshold and second carbon dioxide concentration threshold. If the information of the environmental factor, i.e., the flight information is outside air temperature information outside the flying object, the first environmental threshold and the second environmental threshold are referred to as first outside air temperature threshold and second outside air temperature threshold, respectively. If the information of the environmental factor, i.e., the flight information is radiation dose information of radiation showering to the flying object, the first environmental threshold and the second environmental threshold are referred to as first radiation dose threshold and second radiation dose threshold, respectively.

In operation of the aircraft or the like, the period of operation at a high altitude where the dose of cosmic rays showering from space is high, i.e., operation in the second flight state Sd2, is generally long as compared to an ascent period from takeoff, i.e., the period of the first flight state Sd1, and a descent period to land, i.e., the period of the third flight state Sd3. In the motor control device 100 of embodiment 1, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 1 is improved in reliability of the entire device.

FIG. 1 has shown the example in which the environmental detected information sigev is inputted to the control device 11. However, as shown in FIG. 17, the environmental detected information sigev may be inputted to the operating panel 23. In the case of FIG. 17, the environmental detected information sigev is inputted as the input information sighin to the operation mode judgment unit 60 of the control device 11 via the signal line 39.

FIG. 1 has shown the example in which no filters are provided between the inverter 5 and the motor 6. However, as shown in FIG. 18, a normal mode filter 9 for attenuating normal mode noise and a common mode filter 10 for attenuating common mode noise may be provided between the inverter 5 and the motor 6.

In the motor control device 100 of embodiment 1, since the DC-link voltage Vlk is reduced when the aircraft or the like operates at a high altitude where the cosmic ray dose is high, the failure rate due to a single event on the semiconductor elements composing the chopper 3 and the inverter 5 during the high-altitude period can be reduced. In addition, since the high-altitude period occupies a most part of the operation cycle, the failure rates of the chopper 3 and the inverter 5 in terms of product cycle are significantly improved. This means that it is possible to use low-withstand-voltage elements without using semiconductor elements having withstand voltages higher than necessary, and the insulation parts of the chopper 3, the inverter 5, and the motor 6 can be simplified. Thus, the motor control device 100 can be reduced in size and weight.

The LTDS against cosmic rays to the semiconductor elements composing the chopper and the inverter are more influenced by a neutron beam, as described above. Examples of materials that can shield against a neutron beam include water and concrete. However, if these are used, the motor control device including the chopper and the inverter is increased in size and weight. An electric device for high-altitude application such as a motor control device provided to an aircraft or the like and including a power source, is susceptible to cosmic rays. Therefore, it is important to take measures for protecting the motor control device from the influence of cosmic rays. However, if the component weight increases for shielding, energy efficiency of the aircraft or the like is reduced, so that the fuel efficiency is deteriorated. In addition, in a low-air-pressure state as in a high-altitude environment where the aircraft or the like operates, electric discharge is likely to occur, and therefore, it is necessary to take insulation measures for the inverter which uses high voltage and the motor which is a load, resulting in weight increase in electric devices. In contrast, in the motor control device 100 of embodiment 1, low-withstand-voltage elements can be used for the chopper 3 and the inverter 5, and the DC-link voltage Vlk is reduced during operation of the aircraft or the like at a high altitude where the cosmic ray dose is high, whereby the insulation parts of the chopper 3, the inverter 5, and the motor 6 can be simplified. Thus, the motor control device 100 can be reduced in size and weight.

As described above, the motor control device 100 of embodiment 1 controls the motor 6 of the flying object that takes off from the ground and flies. The motor control device 100 includes the power source device 90 which outputs DC power, the power supply device (inverter 5) which converts DC power to AC power and outputs the AC power to the motor 6, and the control device 11 for controlling the power source device 90 and the power supply device (inverter 5). The power source device 90 includes a power source (battery 1), a DC-output power conversion device (chopper 3) which converts output of the power source (battery 1) to DC power, and an output capacitor (capacitor 4) for smoothing output voltage (DC-link voltage Vlk) of the DC-output power conversion device (chopper 3). The DC-output power conversion device (chopper 3) has the first operation mode Md1 for outputting the first voltage (battery voltage Vbt) and the second operation mode Md2 for outputting the second voltage (boost voltage Va) higher than the first voltage (battery voltage Vbt). When the flying object takes off from the ground, the control device 11 controls the DC-output power conversion device (chopper 3) in the second operation mode Md2, and when the control device 11 judges that flight information which is information of an environmental factor (environmental detected information sigev) relevant to the flight altitude of the flying object satisfies a predetermined condition, the control device 11 controls the DC-output power conversion device (chopper 3) in the first operation mode Md1. With this configuration, in the motor control device 100 of embodiment 1, while the DC-output power conversion device (chopper 3) is controlled in the second operation mode Md2, when the flight information is judged to satisfy a predetermined condition, the DC-output power conversion device (chopper 3) is controlled in the first operation mode Md1. Thus, even in a case of operating at a high altitude where the cosmic ray dose is high, reliability of the motor control device is improved.

The motor control device 100 of embodiment 1 includes the environmental information detection sensor 35 for detecting the information of the environmental factor (environmental detected information sigev). Here, the case where "flight information satisfies the predetermined condition" corresponds to a case where, in a state in which the DC-output power conversion device (chopper 3) is controlled in the second operation mode Md2, the information value (detected value of environmental detected information sigev) based on the information of the environmental factor (environmental detected information sigev) has passed through the first environmental threshold (threshold X). In embodiment 1, in a state in which the DC-output power conversion device (chopper 3) is controlled in the second operation mode Md2, when the control device 11 judges that the information value (detected value of environmental detected information sigev) based on the information of the environmental factor (environmental detected information sigev) has passed through the first environmental threshold (threshold X), the control device 11 controls the DC-output power conversion device (chopper 3) in the first operation mode Md1. In embodiment 1, in a state in which the DC-output power conversion device (chopper 3) is controlled in the first operation mode Md1, when the control device 11 judges that the information value (detected value of environmental detected information sigev) based on the information of the environmental factor (environmental detected information sigev) has passed through the second environmental threshold (threshold Y), the control device 11 controls the DC-output power conversion device (chopper 3) in the second operation mode Md2.

In a case where the environmental information detection sensor 35 is the altitude sensor 21 for detecting the altitude information (detected information sig10) of the flying object, the control device 11 in embodiment 1 performs control as follows. In embodiment 1, in a state in which the DC-output power conversion device (chopper 3) is controlled in the second operation mode Md2, when the control device 11 judges that the detected value based on the altitude information (detected information sig10) is greater than the first altitude threshold (threshold X1) (change condition B1), the control device 11 controls the DC-output power conversion device (chopper 3) in the first operation mode Md1. In embodiment 1, in a state in which the DC-output power conversion device (chopper 3) is controlled in the first operation mode Md1, when the control device 11 judges that the detected value based on the altitude information (detected information sig10) is smaller than the second altitude threshold (threshold Y1) smaller than the first altitude threshold (threshold X1), the control device 11 controls the DC-output power conversion device (chopper 3) in the second operation mode. With this configuration, in the motor control device 100 of embodiment 1, while the DC-output power conversion device (chopper 3) is controlled in the second operation mode Md2, when the flight information is judged to satisfy the predetermined condition, i.e., the change condition B1, the DC-output power conversion device (chopper 3) is controlled in the first operation mode Md1. Thus, even in a case of operating at a high altitude where the cosmic ray dose is high, reliability of the motor control device is improved.

Embodiment 2

Figure 19:
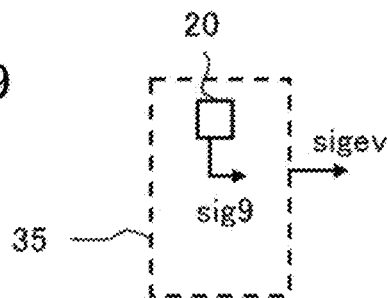
FIG. 19 shows an environmental information detection sensor according to embodiment 2.
Figure 20:
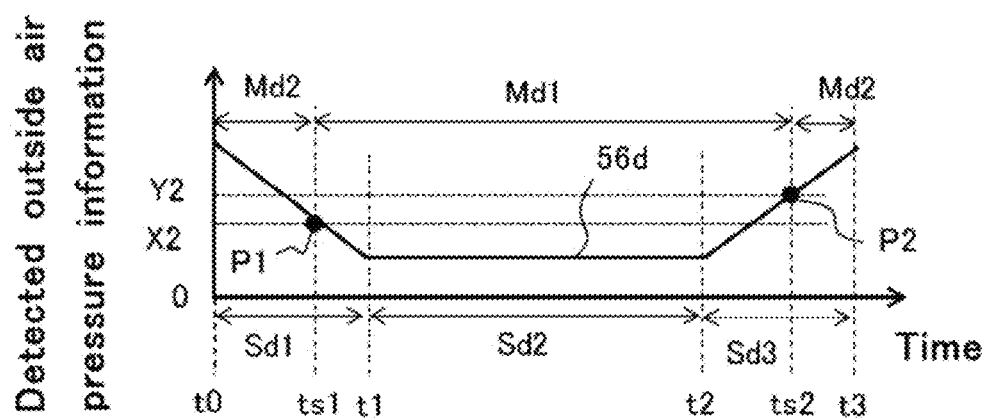
FIG. 20 shows timings for explaining operation of a motor control device according to embodiment 2.

FIG. 19 shows an environmental information detection sensor according to embodiment 2, and FIG. 20 shows timings for explaining operation of a motor control device according to embodiment 2. The motor control device 100 of embodiment 2 is different from the motor control device 100 of embodiment 1 in that the environmental information detection sensor 35 is the outside air pressure sensor 20. Differences from the motor control device 100 of embodiment 1 will be mainly described. The outside air pressure sensor 20 outputs detected information sig9 which is information of the air pressure outside the aircraft or the like provided with the motor control device 100, i.e., outside air pressure information. In the case where the environmental information detection sensor 35 is the outside air pressure sensor 20, the environmental detected information sigev is the detected information sig9.

In the motor control device 100 of embodiment 2, the operation mode of the chopper 3 is changed using the outside air pressure information inputted from the outside air pressure sensor 20. It is assumed that the flight altitude of the aircraft provided with the motor control device 100 changes as in the flight altitude characteristics 58 shown in FIG. 7. When the flight altitude becomes high, the air pressure becomes low, and when the flight altitude becomes low, the air pressure becomes high. Therefore, the flight altitude can be estimated from outside air pressure information. In many aircrafts, an altitude instrument having an altimeter using outside air pressure information is mounted in a cockpit. In a case where the flight altitude changes as in the flight altitude characteristics 58 shown in FIG. 7, the detected outside air pressure information characteristics 56d exhibit change as shown in FIG. 20, and the DC-link voltage Vlk of the chopper 3 changes as in the DC-link voltage characteristics 59 shown in FIG. 9. In FIG. 20, the horizontal axis indicates time, and the vertical axis indicates the detected outside air pressure information.

In the first flight state Sd1, when the detected outside air pressure information inputted from the outside air pressure sensor 20 indicates a value lower than the threshold X2, the control device 11 changes the operation mode to the first operation mode Md1, i.e., the bypass mode, to start bypass operation of the chopper 3, thus reducing the DC-link voltage Vlk from the boost voltage Va to the battery voltage Vbt. When the detected outside air pressure information becomes lower than the threshold X2 at time ts1, the DC-link voltage Vlk changes from the boost voltage Va to the battery voltage Vbt at time ts1. In the second flight state Sd2 from time t1 to time t2, the control device 11 keeps the bypass operation of the chopper 3. During operation in the first operation mode Md1, i.e., the bypass mode, if, in the third flight state Sd3, the detected outside air pressure information inputted from the outside air pressure sensor 20 indicates a value exceeding the threshold Y2, the control device 11 changes the operation mode to the second operation mode Md2, i.e., the boost mode, to start boost operation of the chopper 3, thus increasing the DC-link voltage Vlk to the boost voltage Va. When the detected outside air pressure information exceeds the threshold Y2 at time ts2, the DC-link voltage Vlk changes from the battery voltage Vbt to the boost voltage Va at time ts2.

A unit of the detected outside air pressure information may be a unit representing a pressure, such as pascal or millimeter of mercury, or may be a unit that can be compared by a relative value as in a PU system. In embodiment 2, the threshold X2 is lower than the threshold Y2. A point where the detected outside air pressure information in the detected outside air pressure information characteristics 56d in the first flight state Sd1 becomes the threshold X2 is a mode change point P1, and a point where the detected outside air pressure information in the detected outside air pressure information characteristics 56d in the third flight state Sd3 becomes the threshold Y2 is a mode change point P2.

Since the detected outside air pressure information characteristics 56d have a downward convex shape, the operation mode judgment unit 60 of the control device 11 operates as in the flowchart in the second example shown in FIG. 14 or the flowchart in the fourth example shown in FIG. 16. The thresholds X and Y in the flowchart in the second example and the flowchart in the fourth example are replaced with the thresholds X2 and Y2.

The motor control device 100 of embodiment 2 is the same as the motor control device 100 of embodiment 1 except that the environmental information detection sensor 35 is the outside air pressure sensor 20. Therefore, the same effects as in the motor control device 100 of embodiment 1 are provided. In the motor control device 100 of embodiment 2, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 2 is improved in reliability of the entire device.

As described above, the motor control device 100 of embodiment 2 includes the power source device 90, the power supply device (inverter 5), the control device 11, and the outside air pressure sensor 20 for detecting outside air pressure information (detected information sig9) outside the flying object. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). In embodiment 2, in a state in which the DC-output power conversion device (chopper 3) is controlled in the second operation mode Md2, when the control device 11 judges that the detected value based on the outside air pressure information (detected information sig9) is smaller than the first outside air pressure threshold (threshold X2) (change condition B2), the control device 11 controls the DC-output power conversion device (chopper 3) in the first operation mode Md1. In embodiment 2, in a state in which the DC-output power conversion device (chopper 3) is controlled in the first operation mode Md1, when the control device 11 judges that the detected value based on the outside air pressure information (detected information sig9) is greater than the second outside air pressure threshold (threshold Y2) greater than the first outside air pressure threshold (threshold X2), the control device 11 controls the DC-output power conversion device in the second operation mode. With this configuration, in the motor control device 100 of embodiment 2, while the DC-output power conversion device (chopper 3) is controlled in the second operation mode Md2, when the flight information is judged to satisfy the predetermined condition, i.e., the change condition B2, the DC-output power conversion device (chopper 3) is controlled in the first operation mode Md1. Thus, even in a case of operating at a high altitude where the cosmic ray dose is high, reliability of the motor control device is improved.

Embodiment 3

Figure 21:
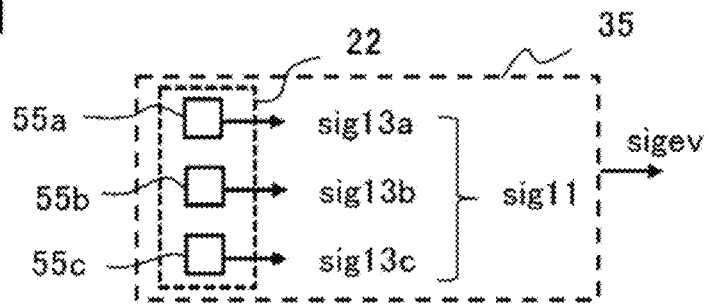
FIG. 21 shows an environmental information detection sensor according to embodiment 3.
Figure 22:
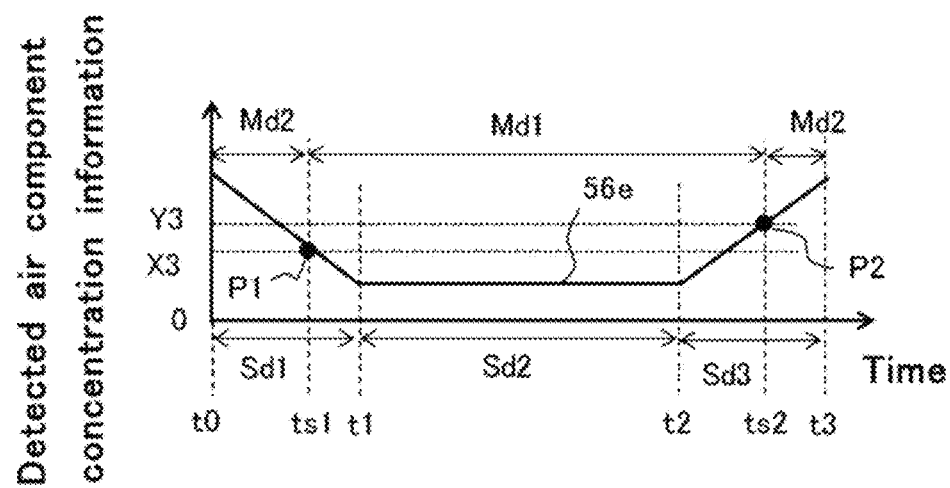
FIG. 22 shows timings for explaining operation of a motor control device according to embodiment 3.
Figure 23:
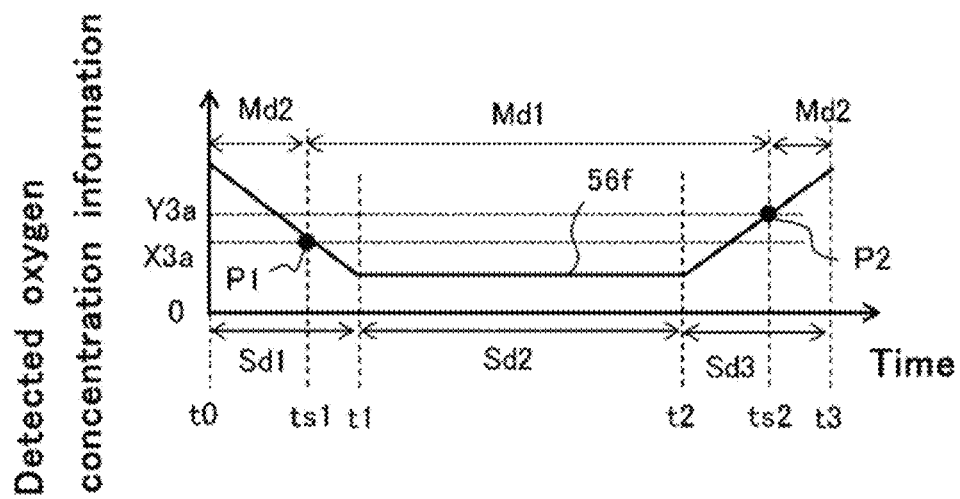
FIG. 23 shows timings in a first example of detected air component concentration information according to embodiment 3.
Figure 24:
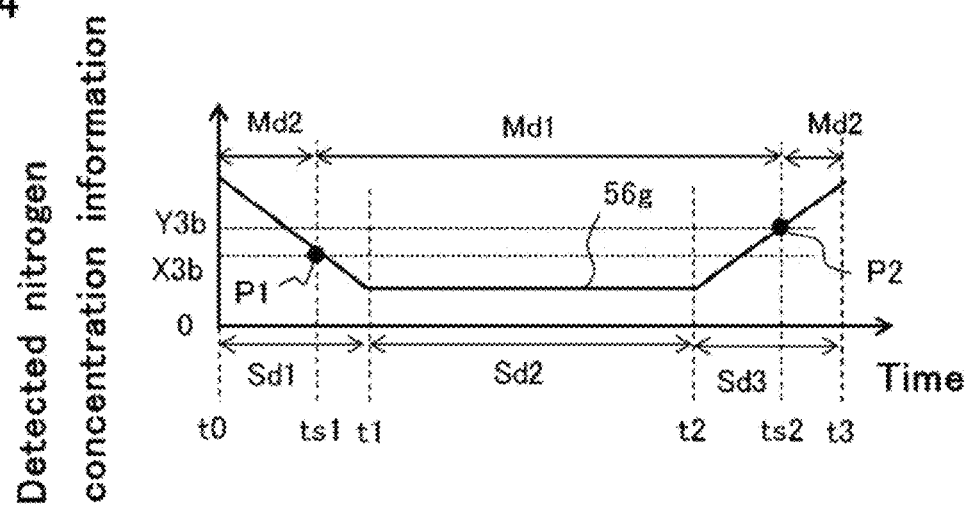
FIG. 24 shows timings in a second example of detected air component concentration information according to embodiment 3.
Figure 25:
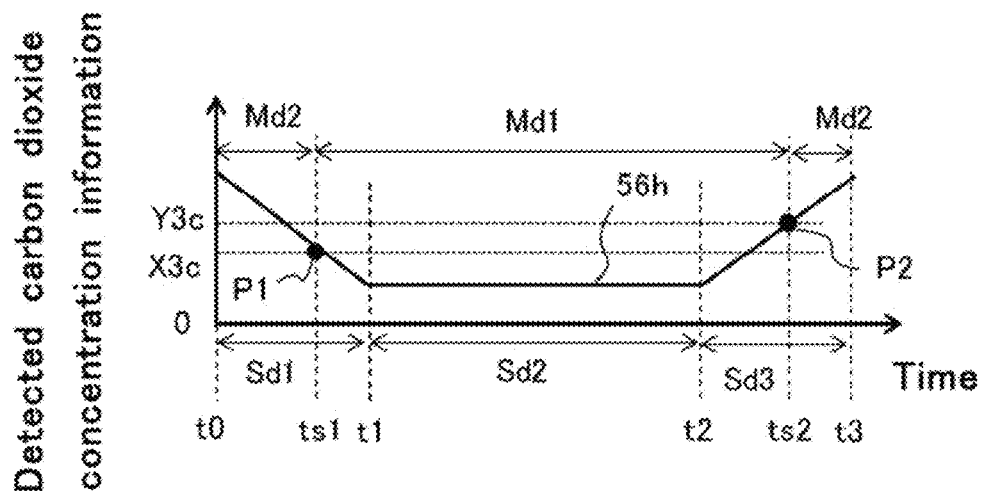
FIG. 25 shows timings in a third example of detected air component concentration information according to embodiment 3.

FIG. 21 shows an environmental information detection sensor according to embodiment 3, and FIG. 22 shows timings for explaining operation of a motor control device according to embodiment 3. FIG. 23, FIG. 24, and FIG. 25 respectively show timings in a first example, a second example, and a third example of detected air component concentration information according to embodiment 3. The motor control device 100 of embodiment 3 is different from the motor control device 100 of embodiment 1 in that the environmental information detection sensor 35 is the air component concentration sensor 22. Differences from the motor control device 100 of embodiment 1 will be mainly described. The air component concentration sensor 22 outputs detected information sig11 which is information of the air component concentration outside the aircraft or the like provided with the motor control device 100, i.e., air component concentration information. In the case where the environmental information detection sensor 35 is the air component concentration sensor 22, the environmental detected information sigev is the detected information sig11. The air component concentration is, for example, an oxygen concentration, a nitrogen concentration, or a carbon dioxide concentration. In the troposphere where the aircraft generally flies, the gas component ratio in the air is not influenced by the altitude and the air pressure. Therefore, not only the oxygen concentration but also the concentration of another substance contained in the air such as nitrogen or carbon dioxide may be used to change the operation mode of the chopper 3.

In a case where the oxygen concentration sensor 55a is used as a specific example of the air component concentration sensor 22, the detected information sig11 is detected information sig13a, and the environmental detected information sigev is the detected information sig13a. In a case where the nitrogen concentration sensor 55b is used as a specific example of the air component concentration sensor 22, the detected information sig11 is detected information sig13b, and the environmental detected information sigev is the detected information sig13b. In a case where the carbon dioxide concentration sensor 55c is used as a specific example of the air component concentration sensor 22, the detected information sig11 is detected information sig13c, and the environmental detected information sigev is the detected information sig13c.

In the motor control device 100 of embodiment 3, the operation mode of the chopper 3 is changed using the air component concentration information inputted from the air component concentration sensor 22. It is assumed that the flight altitude of the aircraft provided with the motor control device 100 changes as in the flight altitude characteristics 58 shown in FIG. 7. When the flight altitude becomes high, the air pressure becomes low, so that the air component concentration of oxygen, nitrogen, carbon dioxide, or the like becomes low. When the flight altitude becomes low, the air pressure becomes high, so that the air component concentration of oxygen, nitrogen, carbon dioxide, or the like becomes high. Thus, the air component concentration information changes in accordance with the flight altitude, and therefore the flight altitude can be estimated from the air component concentration information. In a case where the flight altitude changes as in the flight altitude characteristics 58 shown in FIG. 7, detected air component concentration information characteristics 56e exhibit change as shown in FIG. 22, and the DC-link voltage Vlk of the chopper 3 changes as in the DC-link voltage characteristics 59 shown in FIG. 9. In FIG. 22, the horizontal axis indicates time, and the vertical axis indicates the detected air component concentration information.

In a case where the oxygen concentration sensor 55a is used as a specific example of the air component concentration sensor 22, the detected air component concentration information characteristics 56e are detected oxygen concentration information characteristics 56f. In a case where the nitrogen concentration sensor 55b is used as a specific example of the air component concentration sensor 22, the detected air component concentration information characteristics 56e are detected nitrogen concentration information characteristics 56g. In a case where the carbon dioxide concentration sensor 55c is used as a specific example of the air component concentration sensor 22, the detected air component concentration information characteristics 56e are detected carbon dioxide concentration information characteristics 56h. In FIG. 23, FIG. 24, and FIG. 25, the horizontal axes indicate time. In FIG. 23, FIG. 24, and FIG. 25, the vertical axes indicate the detected oxygen concentration information, the detected nitrogen concentration information, and the detected carbon dioxide concentration information, respectively.

In the first flight state Sd1, when the detected air component concentration information inputted from the air component concentration sensor 22 indicates a value lower than the threshold X3, the control device 11 changes the operation mode to the first operation mode Md1, i.e., the bypass mode, to start bypass operation of the chopper 3, thus reducing the DC-link voltage Vlk from the boost voltage Va to the battery voltage Vbt. When the detected air component concentration information becomes lower than the threshold X3 at time ts1, the DC-link voltage Vlk changes from the boost voltage Va to the battery voltage Vbt at time ts1. The control device 11 keeps the bypass operation of the chopper 3 in the second flight state Sd2 from time t1 to time t2. During operation in the first operation mode Md1, i.e., the bypass mode, if, in the third flight state Sd3, the detected air component concentration information inputted from the air component concentration sensor 22 indicates a value exceeding the threshold Y3, the control device 11 changes the operation mode to the second operation mode Md2, i.e., the boost mode, to start boost operation of the chopper 3, thus increasing the DC-link voltage Vlk to the boost voltage Va. When the detected air component concentration information exceeds the threshold Y3 at time ts2, the DC-link voltage Vlk changes from the battery voltage Vbt to the boost voltage Va at time ts2.

A unit of the detected air component concentration information may be a unit representing a gas concentration, such as percent or mole per liter, or may be a unit that can be compared by a relative value as in a PU system. In embodiment 3, the threshold X3 is lower than the threshold Y3. In the case of detected oxygen concentration information which is a specific example of the detected air component concentration information, the threshold X3a is lower than the threshold Y3a. In the case of detected nitrogen concentration information, the threshold X3b is lower than the threshold Y3b, and in the case of detected carbon dioxide concentration information, the threshold X3c is lower than the threshold Y3c. A point where the detected air component concentration information in the detected air component concentration information characteristics 56e in the first flight state Sd1 becomes the threshold X3 is a mode change point P1, and a point where the detected air component concentration information in the detected air component concentration information characteristics 56e in the third flight state Sd3 becomes the threshold Y3 is a mode change point P2. The same applies to the detected oxygen concentration information, the detected nitrogen concentration information, and the detected carbon dioxide concentration information which are specific examples of the detected air component concentration information. A point where the detected oxygen concentration information in the detected oxygen concentration information characteristics 56f in the first flight state Sd1 becomes the threshold X3a is a mode change point P1, and a point where the detected oxygen concentration information in the detected oxygen concentration information characteristics 56f in the third flight state Sd3 becomes the threshold Y3a is a mode change point P2. A point where the detected nitrogen concentration information in the detected nitrogen concentration information characteristics 56g in the first flight state Sd1 becomes the threshold X3b is a mode change point P1, and a point where the detected nitrogen concentration information in the detected nitrogen concentration information characteristics 56g in the third flight state Sd3 becomes the threshold Y3b is a mode change point P2. A point where the detected carbon dioxide concentration information in the detected carbon dioxide concentration information characteristics 56h in the first flight state Sd1 becomes the threshold X3c is a mode change point P1, and a point where the detected carbon dioxide concentration information in the detected carbon dioxide concentration information characteristics 56h in the third flight state Sd3 becomes the threshold Y3c is a mode change point P2.

Since the detected air component concentration information characteristics 56e have a downward convex shape, the operation mode judgment unit 60 of the control device 11 operates as in the flowchart in the second example shown in FIG. 14 or the flowchart in the fourth example shown in FIG. 16. The thresholds X and Y in the flowchart in the second example and the flowchart in the fourth example are replaced with the thresholds X3 and Y3. In the case of detected oxygen concentration information which is a specific example of the detected air component concentration information, the thresholds X and Y in the flowchart in the second example and the flowchart in the fourth example are replaced with the thresholds X3a and Y3a. In the case of detected nitrogen concentration information which is a specific example of the detected air component concentration information, the thresholds X and Y in the flowchart in the second example and the flowchart in the fourth example are replaced with the thresholds X3b and Y3b. In the case of detected carbon dioxide concentration information which is a specific example of the detected air component concentration information, the thresholds X and Y in the flowchart in the second example and the flowchart in the fourth example are replaced with the thresholds X3c and Y3c.

The motor control device 100 of embodiment 3 is the same as the motor control device 100 of embodiment 1 except that the air component concentration sensor 22 such as the oxygen concentration sensor 55a, the nitrogen concentration sensor 55b, or the carbon dioxide concentration sensor 55c is the environmental information detection sensor 35. Therefore, the same effects as in the motor control device 100 of embodiment 1 are provided. In the motor control device 100 of embodiment 3, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 3 is improved in reliability of the entire device.

In embodiment 3, the example in which the operation mode of the chopper 3 is changed through detection of the air component concentration, has been described. However, instead of the air component concentration, an air component density may be used. In this case, "concentration" is replaced with "density. That is, the detected air component concentration information is replaced with detected air component density information. The air component concentration sensor denoted by reference character 22 is replaced with an air component density sensor. The oxygen concentration sensor denoted by reference character 55a is replaced with an oxygen density sensor, the nitrogen concentration sensor denoted by reference character 55b is replaced with a nitrogen density sensor, and the carbon dioxide concentration sensor denoted by reference character 55c is replaced with a carbon dioxide density sensor. A unit of the detected air component density information may be a unit representing a gas density, such as percent or gram per cubic meter, or may be a unit that can be compared by a relative value as in a PU system. Specific examples of the detected air component density information are detected oxygen density information, detected nitrogen density information, and detected carbon dioxide density information. In the motor control device 100 of embodiment 3, the same effects are provided even in a case where the detected air component concentration information such as detected oxygen concentration information, detected nitrogen concentration information, or detected carbon dioxide concentration information is replaced with the detected air component density information such as detected oxygen density information, detected nitrogen density information, or detected carbon dioxide density information.

As described above, the motor control device 100 of embodiment 3 includes the power source device 90, the power supply device (inverter 5), the control device 11, and the air component concentration sensor 22 for detecting air component concentration information (detected information sig11) outside the flying object. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). In embodiment 3, in a state in which the DC-output power conversion device (chopper 3) is controlled in the second operation mode Md2, when the control device 11 judges that the detected value based on the air component concentration information (detected information sig11) is smaller than the first air component concentration threshold (threshold X3) (change condition B3), the control device 11 controls the DC-output power conversion device (chopper 3) in the first operation mode Md1. In embodiment 3, in a state in which the DC-output power conversion device (chopper 3) is controlled in the first operation mode Md1, when the control device 11 judges that the detected value based on the air component concentration information (detected information sig11) is greater than the second air component concentration threshold (threshold Y3) greater than the first air component concentration threshold (threshold X3), the control device 11 controls the DC-output power conversion device (chopper 3) in the second operation mode Md2. With this configuration, in the motor control device 100 of embodiment 3, while the DC-output power conversion device (chopper 3) is controlled in the second operation mode Md2, when the flight information is judged to satisfy the predetermined condition, i.e., the change condition B3, the DC-output power conversion device (chopper 3) is controlled in the first operation mode Md1. Thus, even in a case of operating at a high altitude where the cosmic ray dose is high, reliability of the motor control device is improved.

Embodiment 4

Figure 26:
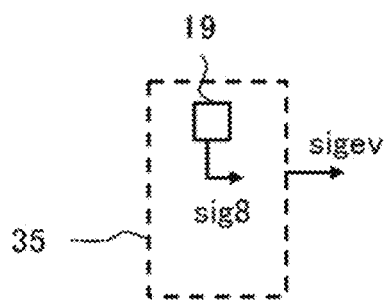
FIG. 26 shows an environmental information detection sensor according to embodiment 4.
Figure 27:
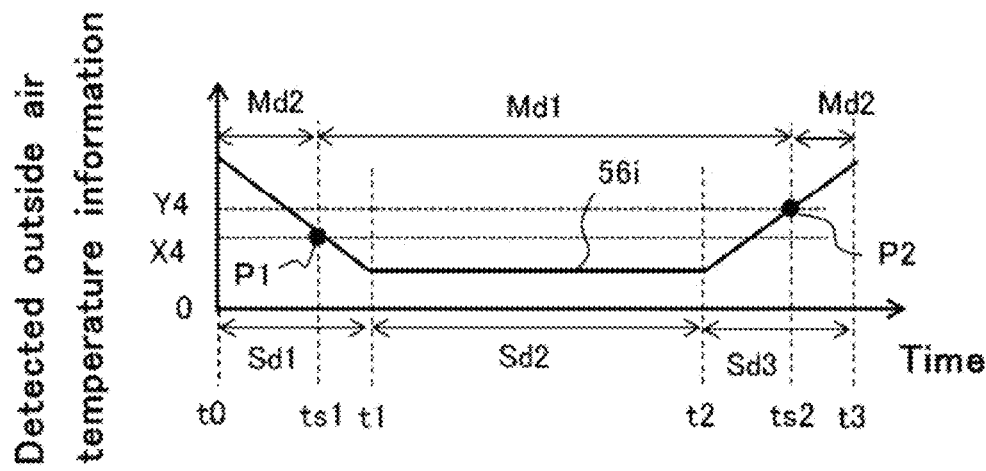
FIG. 27 shows timings for explaining operation of a motor control device according to embodiment 4.

FIG. 26 shows an environmental information detection sensor according to embodiment 4, and FIG. 27 shows timings for explaining operation of a motor control device according to embodiment 4. The motor control device 100 of embodiment 4 is different from the motor control device 100 of embodiment 1 in that the environmental information detection sensor 35 is the outside air temperature sensor 19. Differences from the motor control device 100 of embodiment 1 will be mainly described. The outside air temperature sensor 19 outputs detected information sig8 which is information of the air temperature outside the aircraft or the like provided with the motor control device 100, i.e., outside air temperature information. In the case where the environmental information detection sensor 35 is the outside air temperature sensor 19, the environmental detected information sigev is the detected information sig8.

In the motor control device 100 of embodiment 4, the operation mode of the chopper 3 is changed using the outside air temperature information inputted from the outside air temperature sensor 19. It is assumed that the flight altitude of the aircraft provided with the motor control device 100 changes as in the flight altitude characteristics 58 shown in FIG. 7. In the troposphere where the aircraft generally flies, when the flight altitude becomes high, the outside air temperature becomes low, and when the flight altitude becomes low, the outside air temperature becomes high. Therefore, the flight altitude can be estimated from the temperature on the ground and the outside air temperature information. In a case where the flight altitude changes as in the flight altitude characteristics 58 shown in FIG. 7, detected outside air temperature information characteristics 56i exhibit change as shown in FIG. 27, and the DC-link voltage Vlk of the chopper 3 changes as in the DC-link voltage characteristics 59 shown in FIG. 9. In FIG. 27, the horizontal axis indicates time, and the vertical axis indicates the detected outside air temperature information.

In the first flight state Sd1, when the detected outside air temperature information inputted from the outside air temperature sensor 19 indicates a value lower than the threshold X4, the control device 11 changes the operation mode to the first operation mode Md1, i.e., the bypass mode, to start bypass operation of the chopper 3, thus reducing the DC-link voltage Vlk from the boost voltage Va to the battery voltage Vbt. When the detected outside air temperature information becomes lower than the threshold X4 at time ts1, the DC-link voltage Vlk changes from the boost voltage Va to the battery voltage Vbt at time ts1. In the second flight state Sd2 from time t1 to time t2, the control device 11 keeps the bypass operation of the chopper 3. During operation in the first operation mode Md1, i.e., the bypass mode, if, in the third flight state Sd3, the detected outside air temperature information inputted from the outside air temperature sensor 19 indicates a value exceeding the threshold Y4, the control device 11 changes the operation mode to the second operation mode Md2, i.e., the boost mode, to start boost operation of the chopper 3, thus increasing the DC-link voltage Vlk to the boost voltage Va. When the detected outside air temperature information exceeds the threshold Y4 at time ts2, the DC-link voltage Vlk changes from the battery voltage Vbt to the boost voltage Va at time ts2.

A unit of the detected outside air temperature information may be degree Fahrenheit, degree Celsius, or another unit representing a temperature, or may be a unit that can be compared by a relative value as in a PU system. In embodiment 4, the threshold X4 is lower than the threshold Y4. A point where the detected outside air temperature information in the detected outside air temperature information characteristics 56i in the first flight state Sd1 becomes the threshold X4 is a mode change point P1, and a point where the detected outside air temperature information in the detected outside air temperature information characteristics 56i in the third flight state Sd3 becomes the threshold Y4 is a mode change point P2.

Since the detected outside air temperature information characteristics 56i have a downward convex shape, the operation mode judgment unit 60 of the control device 11 operates as in the flowchart in the second example shown in FIG. 14 or the flowchart in the fourth example shown in FIG. 16. The thresholds X and Y in the flowchart in the second example and the flowchart in the fourth example are replaced with the thresholds X4 and Y4.

The motor control device 100 of embodiment 4 is the same as the motor control device 100 of embodiment 1 except that the environmental information detection sensor 35 is the outside air temperature sensor 19. Therefore, the same effects as in the motor control device 100 of embodiment 1 are provided. In the motor control device 100 of embodiment 4, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 4 is improved in reliability of the entire device.

As described above, the motor control device 100 of embodiment 4 includes the power source device 90, the power supply device (inverter 5), the control device 11, and the outside air temperature sensor 19 for detecting outside air temperature information (detected information sig8) outside the flying object. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). In embodiment 4, in a state in which the DC-output power conversion device (chopper 3) is controlled in the second operation mode Md2, when the control device 11 judges that the detected value based on the outside air temperature information (detected information sig8) is smaller than the first outside air temperature threshold (threshold X4) (change condition B4), the control device 11 controls the DC-output power conversion device (chopper 3) in the first operation mode Md1. In embodiment 4, in a state in which the DC-output power conversion device (chopper 3) is controlled in the first operation mode Md1, when the control device 11 judges that the detected value based on the outside air temperature information (detected information sig8) is greater than the second outside air temperature threshold (threshold Y4) greater than the first outside air temperature threshold (threshold X4), the control device 11 controls the DC-output power conversion device (chopper 3) in the second operation mode Md2. With this configuration, in the motor control device 100 of embodiment 4, while the DC-output power conversion device (chopper 3) is controlled in the second operation mode Md2, when the flight information is judged to satisfy the predetermined condition, i.e., the change condition B4, the DC-output power conversion device (chopper 3) is controlled in the first operation mode Md1. Thus, even in a case of operating at a high altitude where the cosmic ray dose is high, reliability of the motor control device is improved.

Embodiment 5

Figure 28:
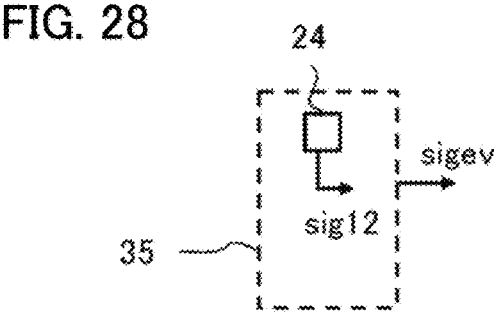
FIG. 28 shows an environmental information detection sensor according to embodiment 5.
Figure 29:
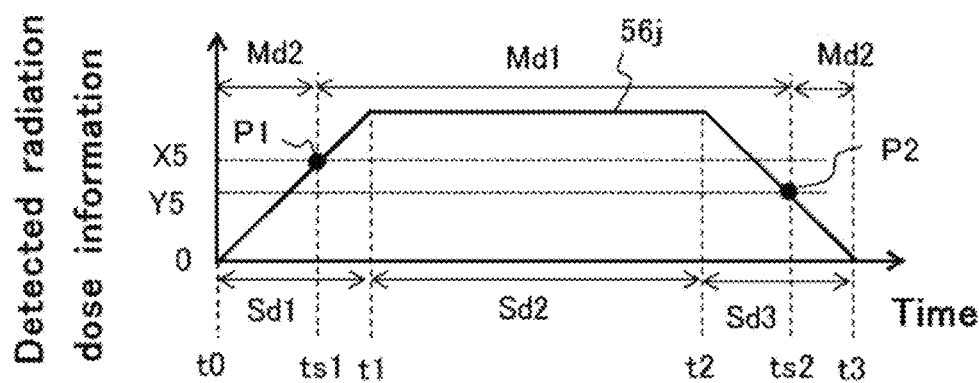
FIG. 29 shows timings for explaining operation of a motor control device according to embodiment 5.

FIG. 28 shows an environmental information detection sensor according to embodiment 5, and FIG. 29 shows timings for explaining operation of a motor control device according to embodiment 5. The motor control device 100 of embodiment 5 is different from the motor control device 100 of embodiment 1 in that the environmental information detection sensor 35 is the radiation sensor 24. Differences from the motor control device 100 of embodiment 1 will be mainly described. The radiation sensor 24 outputs detected information sig12 which is information of the radiation dose outside or inside the aircraft or the like provided with the motor control device 100, i.e., radiation dose information. In the case where the environmental information detection sensor 35 is the radiation sensor 24, the environmental detected information sigev is the detected information sig12.

In the motor control device 100 of embodiment 5, the operation mode of the chopper 3 is changed using the radiation dose information inputted from the radiation sensor 24. It is assumed that the flight altitude of the aircraft provided with the motor control device 100 changes as in the flight altitude characteristics 58 shown in FIG. 7. In the troposphere where the aircraft generally flies, the dose of cosmic rays (i.e., the radiation dose) showering from space has characteristics that, when the flight altitude becomes high, the radiation dose becomes high, and when the flight altitude becomes low, the radiation dose becomes low. Thus, since the radiation dose information changes in accordance with the flight altitude, the flight altitude can be estimated from the radiation dose information. In a case where the flight altitude changes as in the flight altitude characteristics 58 shown in FIG. 7, detected radiation dose information characteristics 56j exhibit change as shown in FIG. 29, and the DC-link voltage Vlk of the chopper 3 changes as in the DC-link voltage characteristics 59 shown in FIG. 9. In FIG. 29, the horizontal axis indicates time, and the vertical axis indicates the detected radiation dose information.

In the first flight state Sd1, when the detected radiation dose information inputted from the radiation sensor 24 indicates a value higher than the threshold X5, the control device 11 changes the operation mode to the first operation mode Md1, i.e., the bypass mode, to start bypass operation of the chopper 3, thus reducing the DC-link voltage Vlk from the boost voltage Va to the battery voltage Vbt. When the detected radiation dose information becomes higher than the threshold X5 at time ts1, the DC-link voltage Vlk changes from the boost voltage Va to the battery voltage Vbt at time ts1. In the second flight state Sd2 from time t1 to time t2, the control device 11 keeps the bypass operation of the chopper 3. During operation in the first operation mode Md1, i.e., the bypass mode, if, in the third flight state Sd3, the detected radiation dose information inputted from the radiation sensor 24 indicates a value lower than the threshold Y5, the control device 11 changes the operation mode to the second operation mode Md2, i.e., the boost mode, to start boost operation of the chopper 3, thus increasing the DC-link voltage Vlk to the boost voltage Va. When the detected radiation dose information becomes lower than the threshold Y5 at time ts2, the DC-link voltage Vlk changes from the battery voltage Vbt to the boost voltage Va at time ts2.

A unit of the detected radiation dose information may be a unit representing a radiation dose, such as sievert or gray, or may be a unit that can be compared by a relative value as in a PU system. In embodiment 5, the threshold X5 is higher than the threshold Y5. A point where the detected radiation dose information in the detected radiation dose information characteristics 56j in the first flight state Sd1 becomes the threshold X5 is a mode change point P1, and a point where the detected radiation dose information in the detected radiation dose information characteristics 56j in the third flight state Sd3 becomes the threshold Y5 is a mode change point P2.

Since the detected radiation dose information characteristics 56j have an upward convex shape, the operation mode judgment unit 60 of the control device 11 operates as in the flowchart in the first example shown in FIG. 13 or the flowchart in the third example shown in FIG. 15. The thresholds X and Y in the flowchart in the first example and the flowchart in the third example are replaced with the thresholds X5 and Y5.

The motor control device 100 of embodiment 5 is the same as the motor control device 100 of embodiment 1 except that the environmental information detection sensor 35 is the radiation sensor 24. Therefore, the same effects as in the motor control device 100 of embodiment 1 are provided. In the motor control device 100 of embodiment 5, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter is improved. Owing to improvement in reliability of the chopper 3 and the inverter 5, the motor control device 100 of embodiment 5 is improved in reliability of the entire device.

As described above, the motor control device 100 of embodiment 5 includes the power source device 90, the power supply device (inverter 5), the control device 11, and the radiation sensor 24 for detecting radiation dose information (detected information sig12) of radiation showering to the flying object. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). In embodiment 5, in a state in which the DC-output power conversion device (chopper 3) is controlled in the second operation mode Md2, when the control device 11 judges that the detected value based on the radiation dose information (detected information sig12) is greater than the first radiation dose threshold (threshold X5) (change condition B5), the control device 11 controls the DC-output power conversion device (chopper 3) in the first operation mode Md1. In embodiment 5, in a state in which the DC-output power conversion device (chopper 3) is controlled in the first operation mode Md1, when the control device 11 judges that the detected value based on the radiation dose information (detected information sig12) is smaller than the second radiation dose threshold (threshold Y5) smaller than the first radiation dose threshold (threshold X5), the control device 11 controls the DC-output power conversion device (chopper 3) in the second operation mode Md2. With this configuration, in the motor control device 100 of embodiment 5, while the DC-output power conversion device (chopper 3) is controlled in the second operation mode Md2, when the flight information is judged to satisfy the predetermined condition, i.e., the change condition B5, the DC-output power conversion device (chopper 3) is controlled in the first operation mode Md1. Thus, even in a case of operating at a high altitude where the cosmic ray dose is high, reliability of the motor control device is improved.

Embodiment 6

Figure 30:
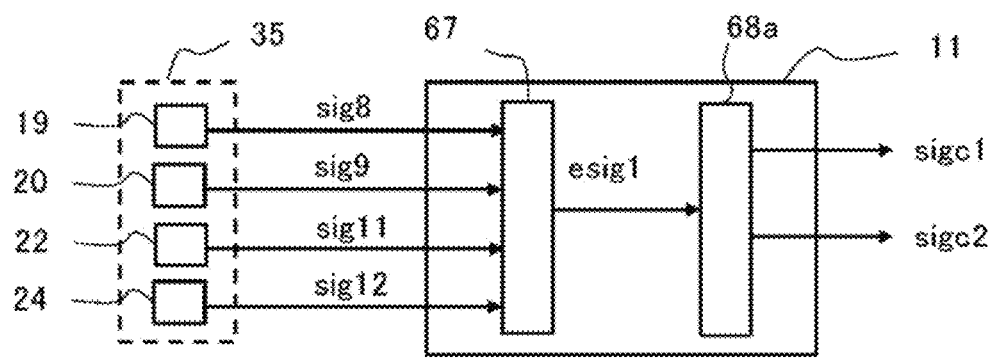
FIG. 30 shows the configuration of a control device according to embodiment 6.
Figure 31:
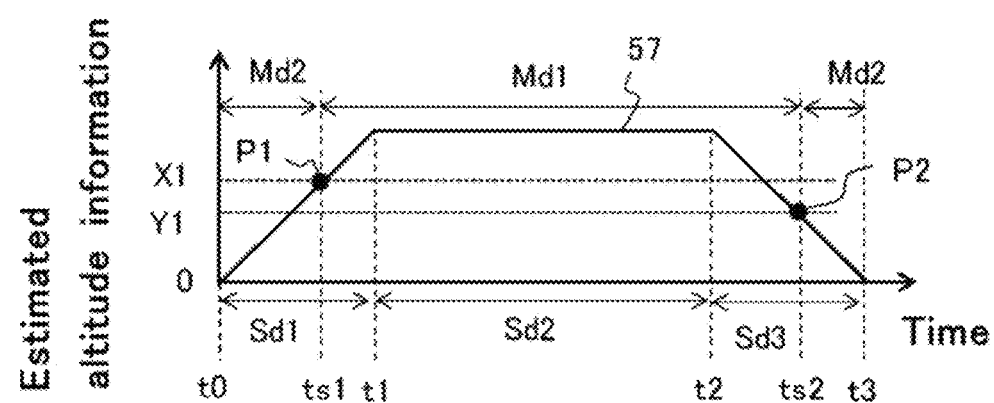
FIG. 31 shows timings for explaining operation of a motor control device according to embodiment 6.

FIG. 30 shows the configuration of a control device according to embodiment 6, and FIG. 31 shows timings for explaining operation of a motor control device according to embodiment 6. The motor control device 100 of embodiment 6 is different from the motor control device 100 of embodiment 1 in that the environmental information detection sensor 35 is any of the outside air temperature sensor 19, the outside air pressure sensor 20, the air component concentration sensor 22, or the radiation sensor 24, and the control device 11 further includes an altitude estimation unit 67. Differences from the motor control device 100 of embodiment 1 will be mainly described. On the basis of the environmental detected information sigev such as the detected information sig8, sig9, sig11, sig12, the altitude estimation unit 67 estimates the altitude, and outputs estimated altitude information esig1. The operation mode judgment unit 60 of the control signal generation unit 68a performs judgment about two operation modes of the chopper 3, using the estimated altitude information esig1 as the input information sighin, and outputs the operation mode signal msig.

In the motor control device 100 of embodiment 6, the operation mode of the chopper 3 is changed using the estimated altitude information estimated by the altitude estimation unit 67. It is assumed that the flight altitude of the aircraft provided with the motor control device 100 changes as in the flight altitude characteristics 58 shown in FIG. 7. Since the outside air pressure information changes in accordance with the flight altitude as described in embodiment 2, the flight altitude can be estimated from the outside air pressure information. In addition, since the air component concentration information, the outside air temperature information, and the radiation dose information change in accordance with the flight altitude as described in embodiments 3 to 5, the flight altitude can be estimated from the air component concentration information, the outside air temperature information, or the radiation dose information. In a case where the flight altitude changes as in the flight altitude characteristics 58 shown in FIG. 7, estimated altitude information characteristics 57 exhibit change as shown in FIG. 31, and the DC-link voltage Vlk of the chopper 3 changes as in the DC-link voltage characteristics 59 shown in FIG. 9. In FIG. 31, the horizontal axis indicates time, and the vertical axis indicates the estimated altitude information.

In the first flight state Sd1, when the estimated altitude information estimated by the altitude estimation unit 67 indicates a value higher than the threshold X1, the control device 11 changes the operation mode to the first operation mode Md1, i.e., the bypass mode, to start bypass operation of the chopper 3, thus reducing the DC-link voltage Vlk from the boost voltage Va to the battery voltage Vbt. When the estimated altitude information becomes higher than the threshold X1 at time ts1, the DC-link voltage Vlk changes from the boost voltage Va to the battery voltage Vbt at time ts1. In the second flight state Sd2 from time t1 to time t2, the control device 11 keeps the bypass operation of the chopper 3. During operation in the first operation mode Md1, i.e., the bypass mode, if, in the third flight state Sd3, the estimated altitude information indicates a value lower than the threshold Y1, the control device 11 changes the operation mode to the second operation mode Md2, i.e., the boost mode, to start boost operation of the chopper 3, thus increasing the DC-link voltage Vlk to the boost voltage Va. When the estimated altitude information becomes lower than the threshold Y1 at time ts2, the DC-link voltage Vlk changes from the battery voltage Vbt to the boost voltage Va at time ts2.

Since the estimated altitude information characteristics 57 have an upward convex shape, the operation mode judgment unit 60 of the control device 11 operates as in the flowchart in the first example shown in FIG. 13 or the flowchart in the third example shown in FIG. 15. The thresholds X and Y in the flowchart in the first example and the flowchart in the third example are replaced with the thresholds X1 and Y1. It is noted that, since the estimated altitude information is information obtained by estimating the altitude information, the thresholds X1 and Y1 for the altitude information are used.

The motor control device 100 of embodiment 6 is the same as the motor control device 100 of embodiment 1 except that the environmental information detection sensor 35 is any of the outside air temperature sensor 19, the outside air pressure sensor 20, the air component concentration sensor 22, or the radiation sensor 24, and the control device 11 further includes the altitude estimation unit 67. Therefore, the same effects as in the motor control device 100 of embodiment 1 are provided. In the motor control device 100 of embodiment 6, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 6 is improved in reliability of the entire device.

As described above, the motor control device 100 of embodiment 6 includes the power source device 90, the power supply device (inverter 5), the control device 11, and the environmental information detection sensor 35 for detecting information of an environmental factor (environmental detected information sigev). The environmental information detection sensor 35 is any of the outside air pressure sensor 20 for detecting the outside air pressure information (detected information sig9) outside the flying object, the air component concentration sensor 22 for detecting the air component concentration information (detected information sig11) outside the flying object, the outside air temperature sensor 19 for detecting the outside air temperature information (detected information sig8) outside the flying object, or the radiation sensor 24 for detecting the radiation dose information (detected information sig12) of radiation showering to the flying object. The information of the environmental factor is the estimated altitude information esig1 obtained by estimating the altitude from any of the outside air pressure information (detected information sig9), the air component concentration information (detected information sig11), the outside air temperature information (detected information sig8), or the radiation dose information (detected information sig12) detected by the environmental information detection sensor 35. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). In embodiment 6, in a state in which the DC-output power conversion device (chopper 3) is controlled in the second operation mode Md2, when the control device 11 judges that the estimated value based on the estimated altitude information esig1 is greater than the first altitude threshold (threshold X1) (change condition B6), the control device 11 controls the DC-output power conversion device (chopper 3) in the first operation mode Md1. In embodiment 6, in a state in which the DC-output power conversion device (chopper 3) is controlled in the first operation mode Md1, when the control device 11 judges that the estimated value based on the estimated altitude information esig1 is smaller than the second altitude threshold (threshold Y1) smaller than the first altitude threshold (threshold X1), the control device 11 controls the DC-output power conversion device (chopper 3) in the second operation mode. With this configuration, in the motor control device 100 of embodiment 6, while the DC-output power conversion device (chopper 3) is controlled in the second operation mode Md2, when the flight information is judged to satisfy the predetermined condition, i.e., the change condition B6, the DC-output power conversion device (chopper 3) is controlled in the first operation mode Md1. Thus, even in a case of operating at a high altitude where the cosmic ray dose is high, reliability of the motor control device is improved.

Embodiment 7

Figure 32:
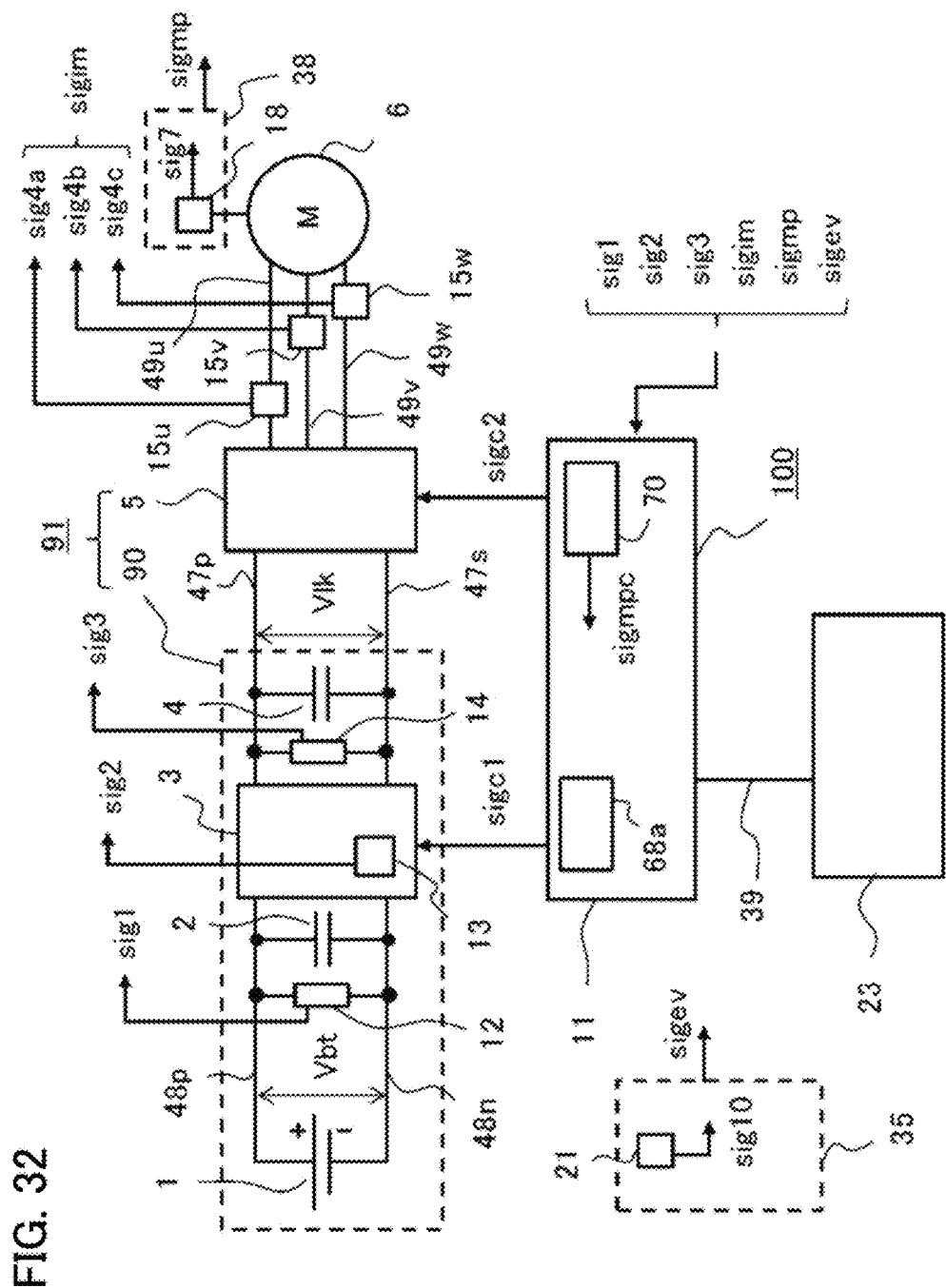
FIG. 32 shows a first example of a motor control device according to embodiment 7.
Figure 33:
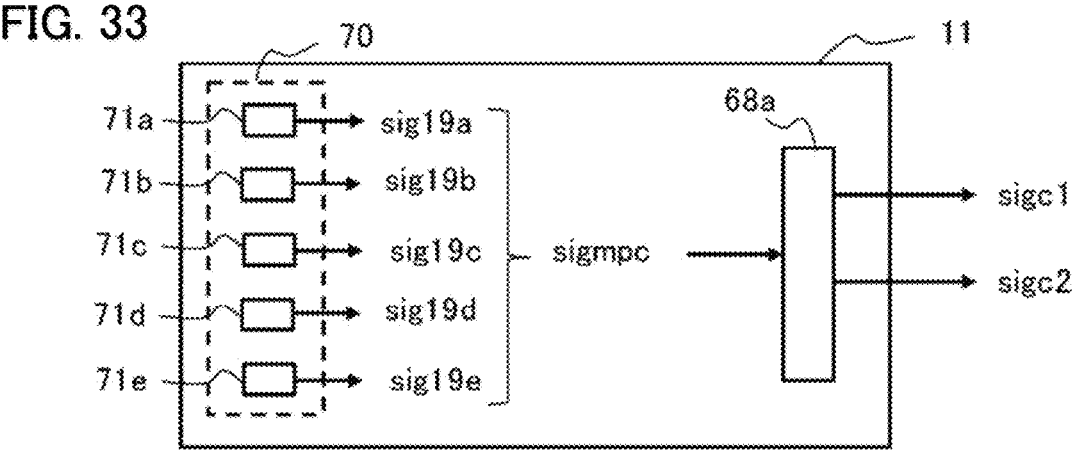
FIG. 33 shows the configuration of a control device in FIG. 32.
Figure 34:
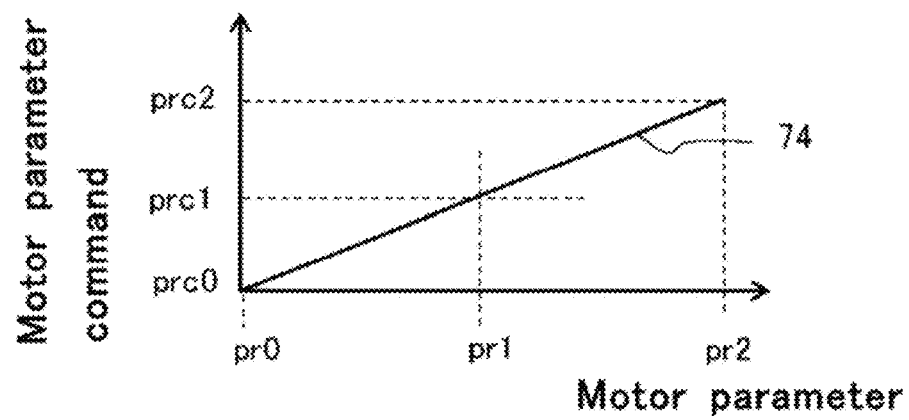
FIG. 34 illustrates the relationship between a motor parameter and a motor parameter command according to embodiment 7.
Figure 35:
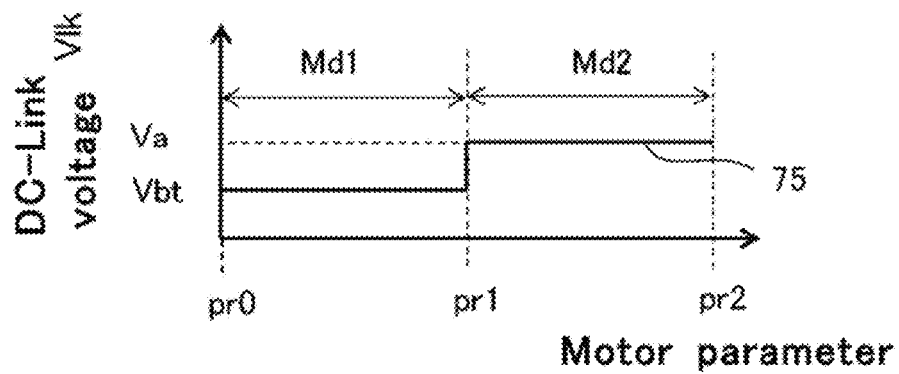
FIG. 35 illustrates the relationship between a motor parameter and DC-link voltage according to embodiment 7.
Figure 36:
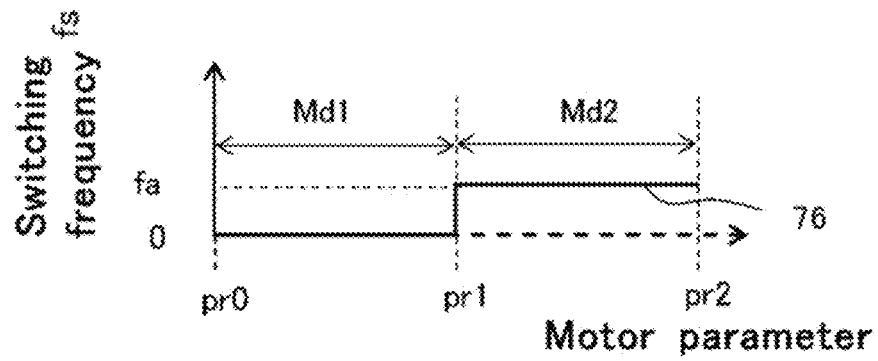
FIG. 36 illustrates the relationship between a motor parameter and a switching frequency of the chopper according to embodiment 7.
Figure 37:
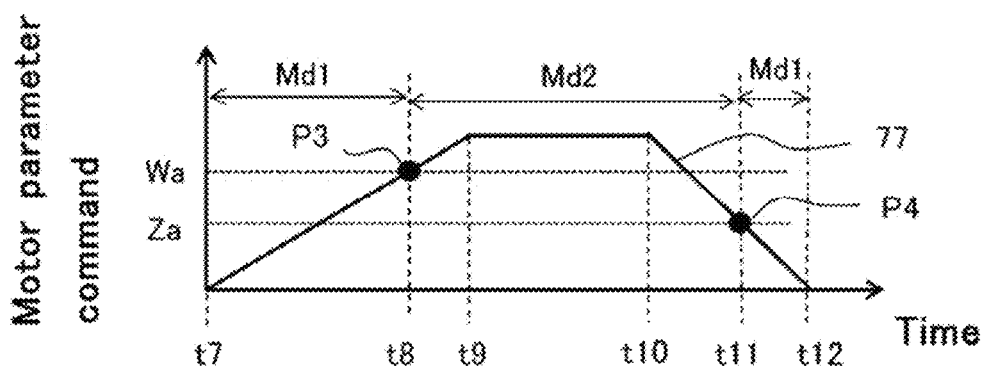
FIG. 37 shows timings for explaining operation of the motor control device in FIG. 32.
Figure 38:
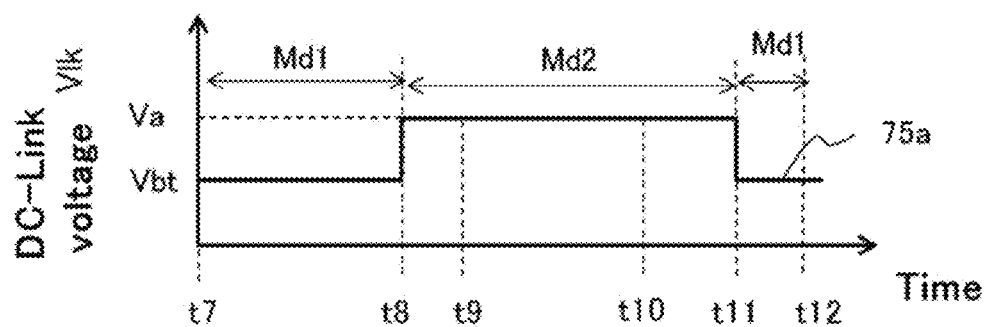
FIG. 38 shows timings for explaining operation of the motor control device in FIG. 32.
Figures 39, 40:
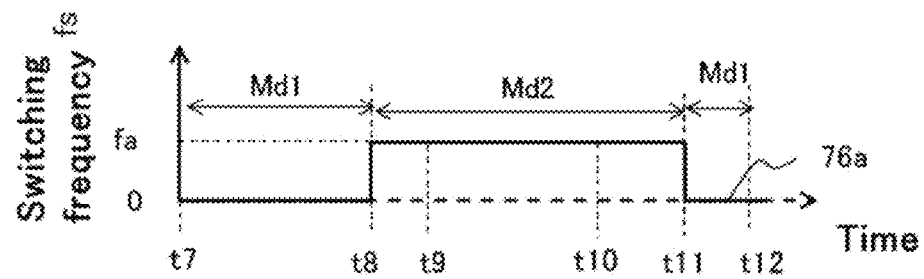
FIG. 39 shows timings for explaining operation of the motor control device in FIG. 32.
FIG. 40 shows motor parameter commands and thresholds according to embodiment 7.
Figure 41:
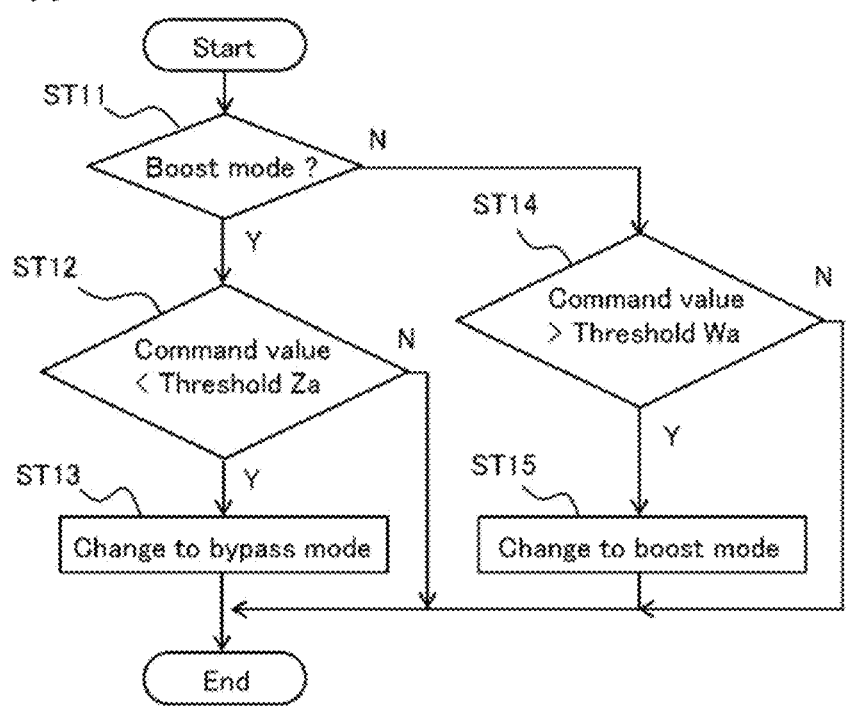
FIG. 41 shows a flowchart for explaining operation of an operation mode judgment unit in FIG. 32.

FIG. 32 shows a first example of a motor control device according to embodiment 7, and FIG. 33 shows the configuration of a control device in FIG. 32. FIG. 34 illustrates the relationship between a motor parameter and a motor parameter command according to embodiment 7. FIG. 35 illustrates the relationship between the motor parameter and the DC-link voltage according to embodiment 7, and FIG. 36 illustrates the relationship between the motor parameter and a switching frequency of the chopper according to embodiment 7. FIG. 37, FIG. 38, and FIG. 39 show timings for explaining operation of the motor control device shown in FIG. 32. FIG. 40 shows motor parameter commands and thresholds according to embodiment 7, and FIG. 41 shows a flowchart for explaining operation of the operation mode judgment unit in FIG. 32. In the motor control device 100 of embodiment 7, the operation mode of the chopper 3 is changed using information of the motor parameter which changes along with driving of the motor 6 which is a load. The information of the motor parameter which is flight information is a motor parameter command, detected information of the motor parameter, estimated information of the motor parameter, or the like. The information of the motor parameter is information obtained along with control for the motor 6. First, an example in which the operation mode of the chopper 3 is changed using a motor parameter command will be described as a first example. Thereafter, an example in which the operation mode of the chopper 3 is changed using detected information of a motor parameter will be described as a second example, and then an example in which the operation mode of the chopper 3 is changed using estimated information of a motor parameter will be described as a third example. The motor parameter command may be a command generated in the control device 11 without being detected by a sensor, or may be motor parameter command detected information which is a motor parameter command detected by a sensor.

The motor control device 100 in the first example of embodiment 7 is different from the motor control device 100 of embodiment 1 in that the control device 11 includes a motor parameter command sensor 70 for detecting a motor parameter command, and motor parameter command detected information sigmpc outputted from the motor parameter command sensor 70 is inputted as the input information sighin to the operation mode judgment unit 60 of the control signal generation unit 68a. Differences from the motor control device 100 of embodiment 1 will be mainly described. The control signal sigc2 to be outputted to the inverter 5 changes in accordance with change in the motor parameter command. For example, in a case where the motor parameter command is a motor AC voltage command, the value of the motor AC voltage command increases as the speed, the output, or the like of the motor 6 increases. In a case of increasing the value of the motor AC voltage command, the switching frequency for the semiconductor switching elements Q7 to Q12 of the inverter 5 may be increased. That is, in a case of increasing the value of the motor AC voltage command, the control signal sigc2 having a frequency set to be higher than the present value is inputted to the semiconductor switching elements Q7 to Q12.

The motor parameter command sensor 70 is at least one of a motor speed command sensor 71a, a motor output command sensor 71b, a motor AC voltage command sensor 71c, a motor current command sensor 71d, or a motor torque command sensor 71e, for example. The motor speed command sensor 71a outputs a motor speed command, i.e., detected information sig19a, as the motor parameter command detected information sigmpc. The motor output command sensor 71b outputs a motor output command, i.e., detected information sig19b, as the motor parameter command detected information sigmpc. The motor AC voltage command sensor 71c outputs a motor AC voltage command, i.e., detected information sig19c, as the motor parameter command detected information sigmpc. The motor current command sensor 71d outputs a motor current command, i.e., detected information sig19d, as the motor parameter command detected information sigmpc. The motor torque command sensor 71e outputs a motor torque command, i.e., detected information sig19e, as the motor parameter command detected information sigmpc. The control signal generation unit 68a outputs the control signals sigc1 and sigc2 on the basis of the motor parameter command detected information sigmpc. That is, the operation mode judgment unit 60 of the control signal generation unit 68a performs judgment about two operation modes of the chopper 3, using the motor parameter command detected information sigmpc as the input information sighin, and outputs the operation mode signal msig.

In the case of the aircraft, the output of the motor 6 increases at the time of takeoff and ascent. However, during cruise operation at a target flight altitude, the output of the motor 6 is low and therefore the value of the motor AC voltage command is lowered. In the case where the value of the motor AC voltage command for the inverter 5 is low, the DC-link voltage Vlk which is the output voltage of the chopper 3 may be low. On the other hand, in a case where the value of the motor AC voltage command for the inverter 5 is high, the DC-link voltage Vlk which is the output voltage of the chopper 3 is required to be high. As shown in FIG. 34, the motor parameter indicating the state of the motor 6 changes in accordance with the motor parameter command. In FIG. 34, the horizontal axis indicates the motor parameter, and the vertical axis indicates the motor parameter command. Motor characteristics 74 are an example in which the motor parameter command and the motor parameter change linearly. For example, the motor parameter command is the motor AC voltage command, and the motor parameter is the motor speed. When values of the motor parameter are motor parameter values pr0, pr1, pr2, values of the motor parameter command are motor parameter command values prc0, prc1, prc2, respectively.

As shown in FIG. 36, in a case of changing the motor parameter, the switching frequency fs for the chopper 3 is changed along with change of the operation mode of the chopper 3. In FIG. 36, the horizontal axis indicates the motor parameter, and the vertical axis indicates the switching frequency fs. The horizontal axis in FIG. 36 is shown by a broken line for discrimination from switching frequency characteristics 76. In the switching frequency characteristics 76, when the motor parameter value is pr0 or more and less than pr1, the value of the switching frequency fs is 0, and when the motor parameter value is pr1 or more and pr2 or less, the value of the switching frequency fs is a switching frequency fa. In addition, as shown in FIG. 35, in the case of changing the motor parameter, the DC-link voltage Vlk which is the output voltage of the chopper 3 may be changed as described above. In FIG. 35, the horizontal axis indicates the motor parameter, and the vertical axis indicates the DC-link voltage Vlk. In DC-link voltage characteristics 75, when the motor parameter value is pr0 or more and less than pr1, the DC-link voltage Vlk is the battery voltage Vbt, and when the motor parameter value is pr1 or more and pr2 or less, the DC-link voltage Vlk is the boost voltage Va. When the value of the motor parameter command becomes high, for meeting the requirement, the DC-link voltage Vlk needs to be boosted to the boost voltage Va from the battery voltage Vbt. That is, as shown in FIG. 34, FIG. 35, and FIG.

36, when the motor parameter command value becomes high in accordance with the motor parameter value of the motor 6, for meeting the requirement, the DC-link voltage Vlk needs to be boosted to the boost voltage Va from the battery voltage Vbt.

In the motor control device 100 in the first example of embodiment 7, when the motor parameter command is changed as in motor parameter command characteristics 77 of the inverter 5 shown in FIG. 37, the DC-link voltage and the switching frequency are changed as in DC-link voltage characteristics 75a and switching frequency characteristics 76a shown in FIG. 38 and FIG. 39. In FIG. 37, FIG. 38, and FIG. 39, the horizontal axes indicate time. In FIG. 37, FIG. 38, and FIG. 39, the vertical axes indicate the motor parameter command, the DC-link voltage Vlk, and the switching frequency fs, respectively. The horizontal axis in FIG. 39 is shown by a broken line for discrimination from the switching frequency characteristics 76a. The motor parameter command characteristics 77 are an example in which the value thereof increases from time t7 to time t9, remains constant from time t9 to time t10, and decreases from time t10 to time t12. At time t7, the control device 11 operates the chopper 3 in the first operation mode Md1, i.e., the bypass mode, with the switching frequency fs for the chopper 3 set at 0.

While the chopper 3 is operating in the first operation mode Md1, when the motor parameter command characteristics 77 of the inverter 5 indicate a value higher than a threshold Wa at time t8, the control device 11 changes the operation mode of the chopper 3 to the second operation mode Md2, i.e., the boost mode, to start boost operation of the chopper 3, thus increasing the DC-link voltage Vlk from the battery voltage Vbt to the boost voltage Va. At time t8, the control device 11 increases the switching frequency fs from 0 to the switching frequency fa.

While the chopper 3 is operating in the second operation mode Md2, when the motor parameter command characteristics 77 of the inverter 5 indicate a value lower than a threshold Za at time t11, the control device 11 changes the operation mode of the chopper 3 to the first operation mode Md1, i.e., the bypass mode, to start bypass operation of the chopper 3, thus reducing the DC-link voltage Vlk from the boost voltage Va to the battery voltage Vbt. At time t11, the control device 11 reduces the switching frequency fs from the switching frequency fa to 0. The threshold Za is lower than the threshold Wa. A point where the value of the motor parameter command characteristics 77 in the first operation mode becomes the threshold Wa is a mode change point P3, and a point where the value of the motor parameter command characteristics 77 in the second operation mode becomes the threshold Za is a mode change point P4. The threshold Za is a first parameter command threshold, and the threshold Wa is a second parameter command threshold. The motor parameter command is an example of information of the motor parameter, and therefore the threshold Za can also be referred to as first parameter threshold and the threshold Wa can also be referred to as second parameter threshold.

FIG. 40 shows specific examples of motor parameter commands and thresholds used for judgment. As specific examples of motor parameter commands, a motor AC voltage command, a motor speed command, a motor output command, a motor torque command, and a motor current command are shown. The thresholds Za and Wa for the motor AC voltage command are thresholds Za1 and Wa1, respectively. The thresholds Za and Wa for the motor speed command are thresholds Za2 and Wa2, respectively, and the thresholds Za and Wa for the motor output command are thresholds Za3 and Wa3, respectively. The thresholds Za and Wa for the motor torque command are thresholds Za4 and Wa4, respectively, and the thresholds Za and Wa for the motor current command are thresholds Za5 and Wa5, respectively. In accordance with each specific example of the motor parameter command, the first parameter command threshold and the second parameter command threshold may be specifically written. The threshold Za1 and the threshold Wa1 may be referred to as first motor AC voltage command threshold and second motor AC voltage command threshold, respectively. The threshold Za2 and the threshold Wa2 may be referred to as first motor speed command threshold and second motor speed command threshold, respectively, and the threshold Za3 and the threshold Wa3 may be referred to as first motor output command threshold and second motor output command threshold, respectively. The threshold Za4 and the threshold Wa4 may be referred to as first motor torque command threshold and second motor torque command threshold, respectively, and the threshold Za5 and the threshold Wa5 may be referred to as first motor current command threshold and second motor current command threshold, respectively.

The motor parameter command detected information sigmpc is information of a motor parameter obtained along with control for the motor 6, and is flight information. When the flying object such as the aircraft takes off from the ground, the control device 11 controls the chopper 3 in the second operation mode Md2, and when the control device 11 judges that the flight information which is information of a motor parameter obtained along with control for the motor 6, i.e., the motor parameter command detected information sigmpc, satisfies a predetermined condition, the control device 11 controls the chopper 3 in the first operation mode Md1.

The operation mode judgment unit 60 of the control device 11 operates as in the flowchart shown in FIG. 41, for example. The flowchart in FIG. 41 corresponds to the flowchart in FIG. 14. In step ST11, whether or not the chopper 3 is in the boost mode (second operation mode) is judged. Specifically, in step ST11, whether or not the operation mode signal msig indicates the boost mode, for example, whether or not the operation mode signal msig is at a high level, is judged. In step ST11, if it is judged that the chopper 3 is in the boost mode, the process proceeds to step ST12, and if it is judged that the chopper 3 is not in the boost mode, the process proceeds to step ST14. In step ST12, if the command value for the motor parameter is smaller than the threshold Za, i.e., if the operation mode change judgment criterion is satisfied, the process proceeds to step ST13, and if the command value for the motor parameter is not smaller than the threshold Za, i.e., if the operation mode change judgment criterion is not satisfied, the operation mode signal msig is kept in the boost mode and the process is ended. In step ST13, the operation mode signal msig is changed to the bypass mode and the process is ended. In step ST14, if the command value for the motor parameter is greater than the threshold Wa, i.e., if the operation mode change judgment criterion is satisfied, the process proceeds to step ST15, and if the command value for the motor parameter is not greater than the threshold Wa, i.e., if the operation mode change judgment criterion is not satisfied, the operation mode signal msig is kept in the bypass mode and the process is ended. In step ST15, the operation mode signal msig is changed to the boost mode and the process is ended. In this example, whether or not the chopper 3 is in the boost mode is judged in step ST11. However, as shown in FIG. 16, in step ST11 which is the first step, whether or not the chopper 3 is in the bypass mode may be judged. In step ST11, if it is judged that the chopper 3 is in the bypass mode, the process proceeds to step ST14, and if it is judged that the chopper 3 is not in the bypass mode, the process proceeds to step ST12.

In the motor control device 100 in the first example of embodiment 7, the control device 11 changes the operation mode on the basis of the motor parameter command detected information sigmpc, instead of the environmental detected information sigev. Therefore, the same effects as in the motor control device 100 of embodiment 1 are provided. In the motor control device 100 in the first example of embodiment 7, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 in the first example of embodiment 7 is improved in reliability of the entire device.

Figure 42:
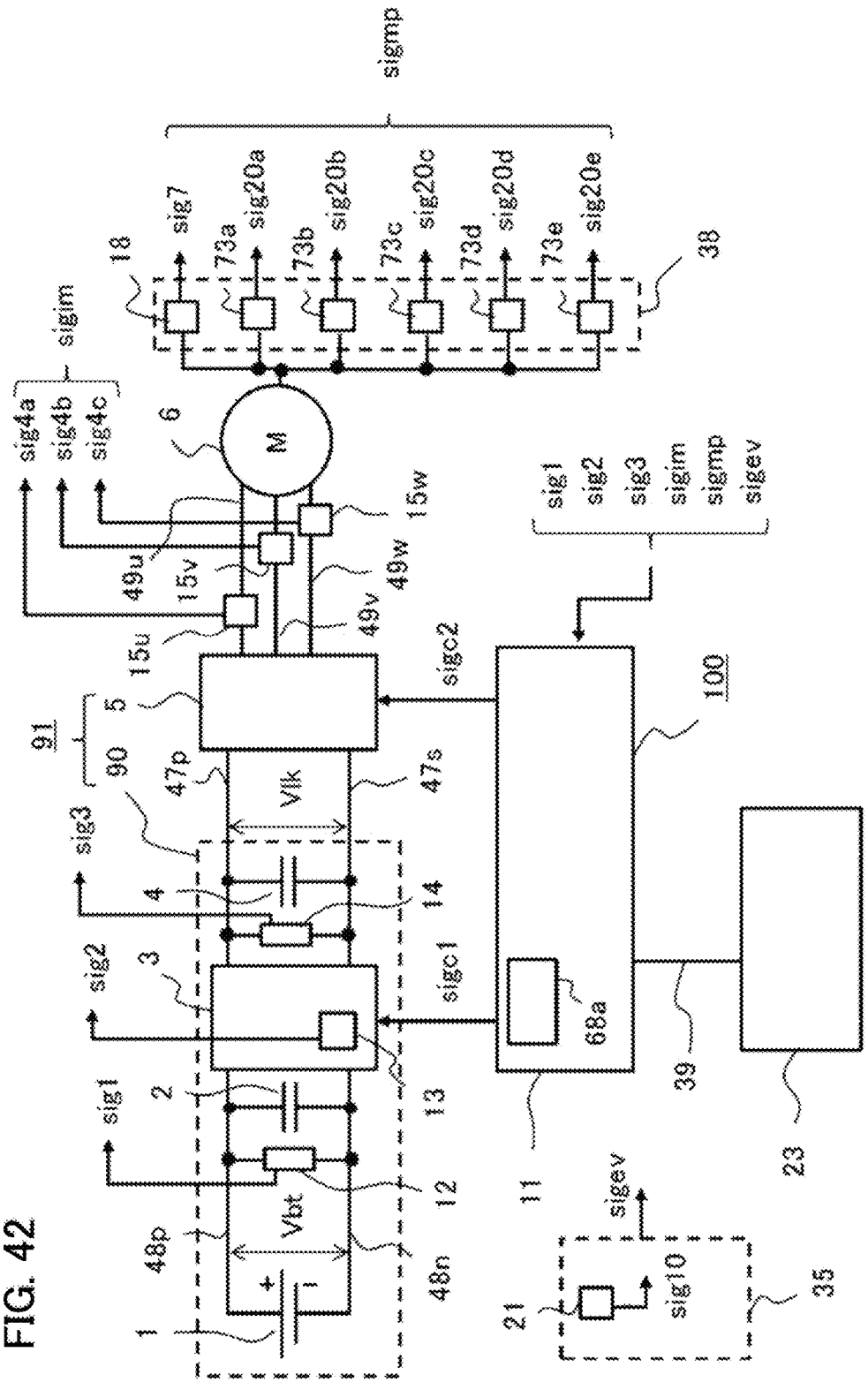
FIG. 42 shows a second example of the motor control device according to embodiment 7.
Figure 43:
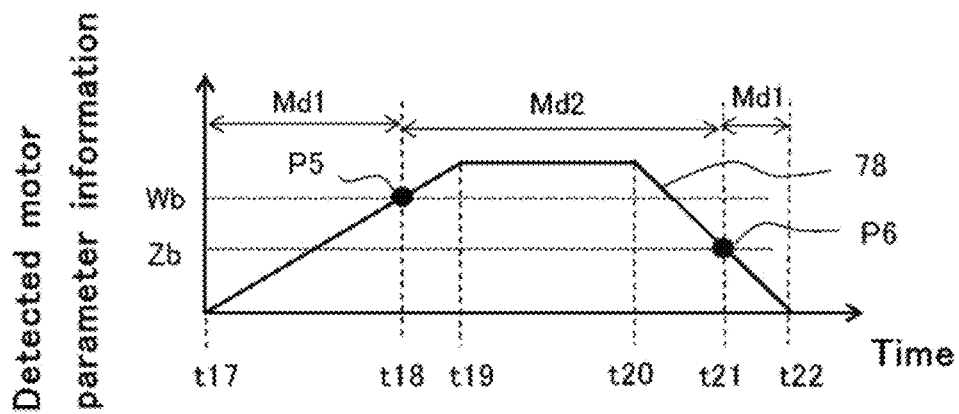
FIG. 43 shows timings for explaining operation of the motor control device in FIG. 42.
Figure 44:
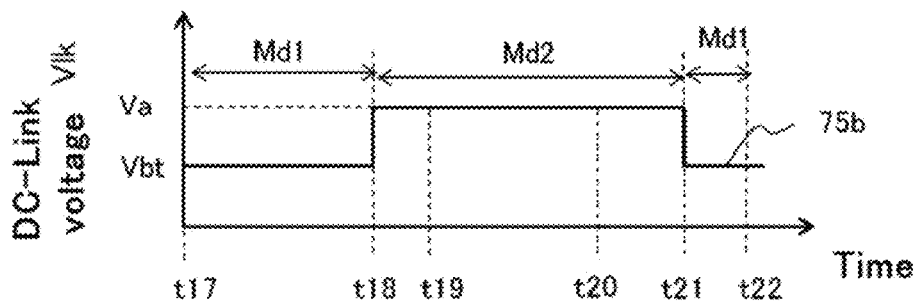
FIG. 44 shows timings for explaining operation of the motor control device in FIG. 42.
Figure 45:
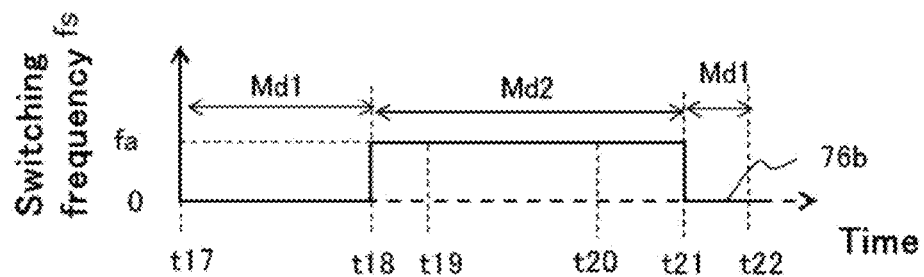
FIG. 45 shows timings for explaining operation of the motor control device in FIG. 42.
Figures 46, 47:
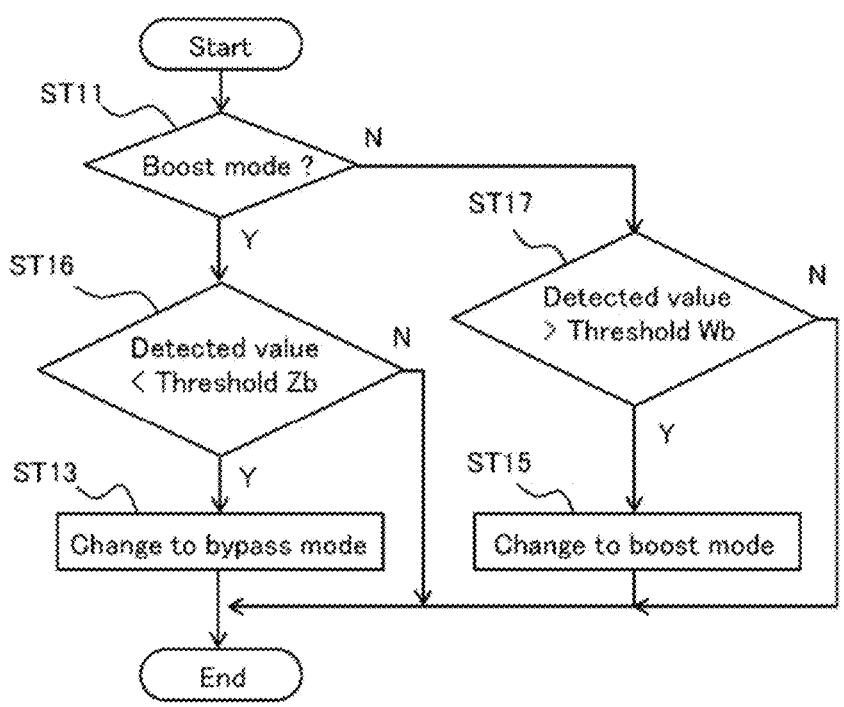
FIG. 46 shows detected motor parameter information and thresholds according to embodiment 7.
FIG. 47 shows a flowchart for explaining operation of an operation mode judgment unit in FIG. 42.

FIG. 42 shows a second example of the motor control device according to embodiment 7. FIG. 43, FIG. 44, and FIG. 45 show timings for explaining operation of the motor control device shown in FIG. 42. FIG. 46 shows detected motor parameter information and thresholds according to embodiment 7, and FIG. 47 shows a flowchart for explaining operation of the operation mode judgment unit in FIG. 42. The motor control device 100 in the second example of embodiment 7 is different from the motor control device 100 of embodiment 1 in that the control device 11 is provided with at least one other sensor for outputting detected information of a motor parameter besides the position sensor 18, as motor parameter sensors 38, and motor parameter detected information sigmp outputted from the motor parameter sensors 38 is inputted as the input information sighin to the operation mode judgment unit 60 of the control signal generation unit 68a. The detected information of the motor parameter may be referred to as motor parameter detected information. Other sensors for outputting detected information of motor parameters are a motor speed sensor 73a, a motor output sensor 73b, a motor AC voltage sensor 73c, a motor current sensor 73d, and a motor torque sensor 73e. The motor speed sensor 73a outputs information of the motor speed, i.e., detected information sig20a, as the motor parameter detected information sigmp. The motor output sensor 73b outputs information of the motor output, i.e., detected information sig20b, as the motor parameter detected information sigmp.

The motor AC voltage sensor 73c outputs information of the motor AC voltage, i.e., detected information sig20c, as the motor parameter detected information sigmp. The motor current sensor 73d outputs information of the motor current, i.e., detected information sig20d, as the motor parameter detected information sigmp. The motor torque sensor 73e outputs information of the motor torque, i.e., detected information sig20e, as the motor parameter detected information sigmp.

The motor control device 100 in the second example of embodiment 7 is different from the motor control device 100 in the first example of embodiment 7 in that the operation mode of the chopper 3 is changed using the detected information of the motor parameter. Differences from the motor control device 100 of embodiment 1 and the motor control device 100 in the first example of embodiment 7 will be mainly described.

In the motor control device 100 in the second example of embodiment 7, while detected motor parameter characteristics 78 of the motor 6 exhibit change as shown in FIG. 43, the DC-link voltage and the switching frequency are changed as in DC-link voltage characteristics 75b and switching frequency characteristics 76b shown in FIG. 44 and FIG. 45. In FIG. 43, FIG. 44, and FIG. 45, the horizontal axes indicate time. In FIG. 43, FIG. 44, and FIG. 45, the vertical axes indicate the detected motor parameter information, the DC-link voltage Vlk, and the switching frequency fs, respectively. The horizontal axis in FIG. 45 is shown by a broken line for discrimination from the switching frequency characteristics 76b. The detected motor parameter characteristics 78 are an example in which the value thereof increases from time t17 to time t19, remains constant from time t19 to time t20, and decreases from time t20 to time t22. At time t17, the control device 11 operates the chopper 3 in the first operation mode Md1, i.e., the bypass mode, with the switching frequency fs for the chopper 3 set at 0.

While the chopper 3 is operating in the first operation mode Md1, when the detected motor parameter characteristics 78 of the motor 6 indicate a value higher than a threshold Wb at time t18, the control device 11 changes the operation mode of the chopper 3 to the second operation mode Md2, i.e., the boost mode, to start boost operation of the chopper 3, thus increasing the DC-link voltage Vlk from the battery voltage Vbt to the boost voltage Va. At time t18, the control device 11 increases the switching frequency fs from 0 to the switching frequency fa.

While the chopper 3 is operating in the second operation mode Md2, when the detected motor parameter characteristics 78 of the motor 6 indicate a value lower than a threshold Zb at time t21, the control device 11 changes the operation mode of the chopper 3 to the first operation mode Md1, i.e., the bypass mode, to start bypass operation of the chopper 3, thus reducing the DC-link voltage Vlk from the boost voltage Va to the battery voltage Vbt. At time t21, the control device 11 reduces the switching frequency fs from the switching frequency fa to 0. The threshold Zb is lower than the threshold Wb. A point where the value of the detected motor parameter characteristics 78 in the first operation mode becomes the threshold Wb is a mode change point P5, and a point where the value of the detected motor parameter characteristics 78 in the second operation mode becomes the threshold Zb is a mode change point P6. The threshold Zb is a first parameter detection threshold, and the threshold Wb is a second parameter detection threshold. The motor parameter detected information is an example of information of the motor parameter, and therefore the threshold Zb can also be referred to as first parameter threshold and the threshold Wb can also be referred to as second parameter threshold.

FIG. 46 shows specific examples of detected motor parameter information and thresholds used for judgment. As specific examples of detected motor parameter information, detected motor AC voltage information, detected motor speed information, detected motor output information, detected motor torque information, and detected motor current information are shown. The thresholds Zb and Wb for the detected motor AC voltage information are thresholds Zb1 and Wb1, respectively. The thresholds Zb and Wb for the detected motor speed information are thresholds Zb2 and Wb2, respectively, and the thresholds Zb and Wb for the detected motor output information are thresholds Zb3 and Wb3, respectively. The thresholds Zb and Wb for the detected motor torque information are thresholds Zb4 and Wb4, respectively, and the thresholds Zb and Wb for the detected motor current information are thresholds Zb5 and Wb5, respectively. In accordance with each specific example of the motor parameter detected information, i.e., the detected motor parameter information, the first parameter detection threshold and the second parameter detection threshold may be specifically written. The threshold Zb1 and the threshold Wb1 may be referred to as first motor AC voltage detection threshold and second motor AC voltage detection threshold, respectively. The threshold Zb2 and the threshold Wb2 may be referred to as first motor speed detection threshold and second motor speed detection threshold, respectively, and the threshold Zb3 and the threshold Wb3 may be referred to as first motor output detection threshold and second motor output detection threshold, respectively. The threshold Zb4 and the threshold Wb4 may be referred to as first motor torque detection threshold and second motor torque detection threshold, respectively, and the threshold Zb5 and the threshold Wb5 may be referred to as first motor current detection threshold and second motor current detection threshold, respectively.

The motor parameter detected information sigmp is information of a motor parameter obtained along with control for the motor 6, and is flight information. When the flying object such as the aircraft takes off from the ground, the control device 11 controls the chopper 3 in the second operation mode Md2, and when the control device 11 judges that the flight information which is information of a motor parameter obtained along with control for the motor 6, i.e., the motor parameter detected information sigmp, satisfies a predetermined condition, the control device 11 controls the chopper 3 in the first operation mode Md1.

The operation mode judgment unit 60 of the control device 11 operates as in the flowchart shown in FIG. 47, for example. The flowchart in FIG. 47 corresponds to the flowcharts in FIG. 14 and FIG. 41. The flowchart in FIG. 47 is different from the flowchart in FIG. 41 in that step ST12 is replaced with step ST16 and step ST14 is replaced with step ST17. Differences from the flowchart in FIG. 41 will be described. In step ST11, if it is judged that the chopper 3 is in the boost mode, the process proceeds to step ST16, and if it is judged that the chopper 3 is not in the boost mode, the process proceeds to step ST17. In step ST16, if the detected value of the detected motor parameter information is smaller than the threshold Zb, i.e., if the operation mode change judgment criterion is satisfied, the process proceeds to step ST13, and if the detected value of the detected motor parameter information is not smaller than the threshold Zb, i.e., if the operation mode change judgment criterion is not satisfied, the operation mode signal msig is kept in the boost mode and the process is ended. In step ST13, the operation mode signal msig is changed to the bypass mode and the process is ended. In step ST17, if the detected value of the detected motor parameter information is greater than the threshold Wb, i.e., if the operation mode change judgment criterion is satisfied, the process proceeds to step ST15, and if the detected value of the detected motor parameter information is not greater than the threshold Wb, i.e., if the operation mode change judgment criterion is not satisfied, the operation mode signal msig is kept in the bypass mode and the process is ended. In step ST15, the operation mode signal msig is changed to the boost mode and the process is ended. In this example, whether or not the chopper 3 is in the boost mode is judged in step ST11. However, as shown in FIG. 16, in step ST11 which is the first step, whether or not the chopper 3 is in the bypass mode may be judged. In step ST11, if it is judged that the chopper 3 is in the bypass mode, the process proceeds to step ST17, and if it is judged that the chopper 3 is not in the bypass mode, the process proceeds to step ST16.

In the motor control device 100 in the second example of embodiment 7, the control device 11 changes the operation mode on the basis of the motor parameter detected information sigmp of the motor 6 instead of the environmental detected information sigev. Therefore, the same effects as in the motor control device 100 of embodiment 1 are provided. In the motor control device 100 in the second example of embodiment 7, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 in the second example of embodiment 7 is improved in reliability of the entire device.

Figure 48:
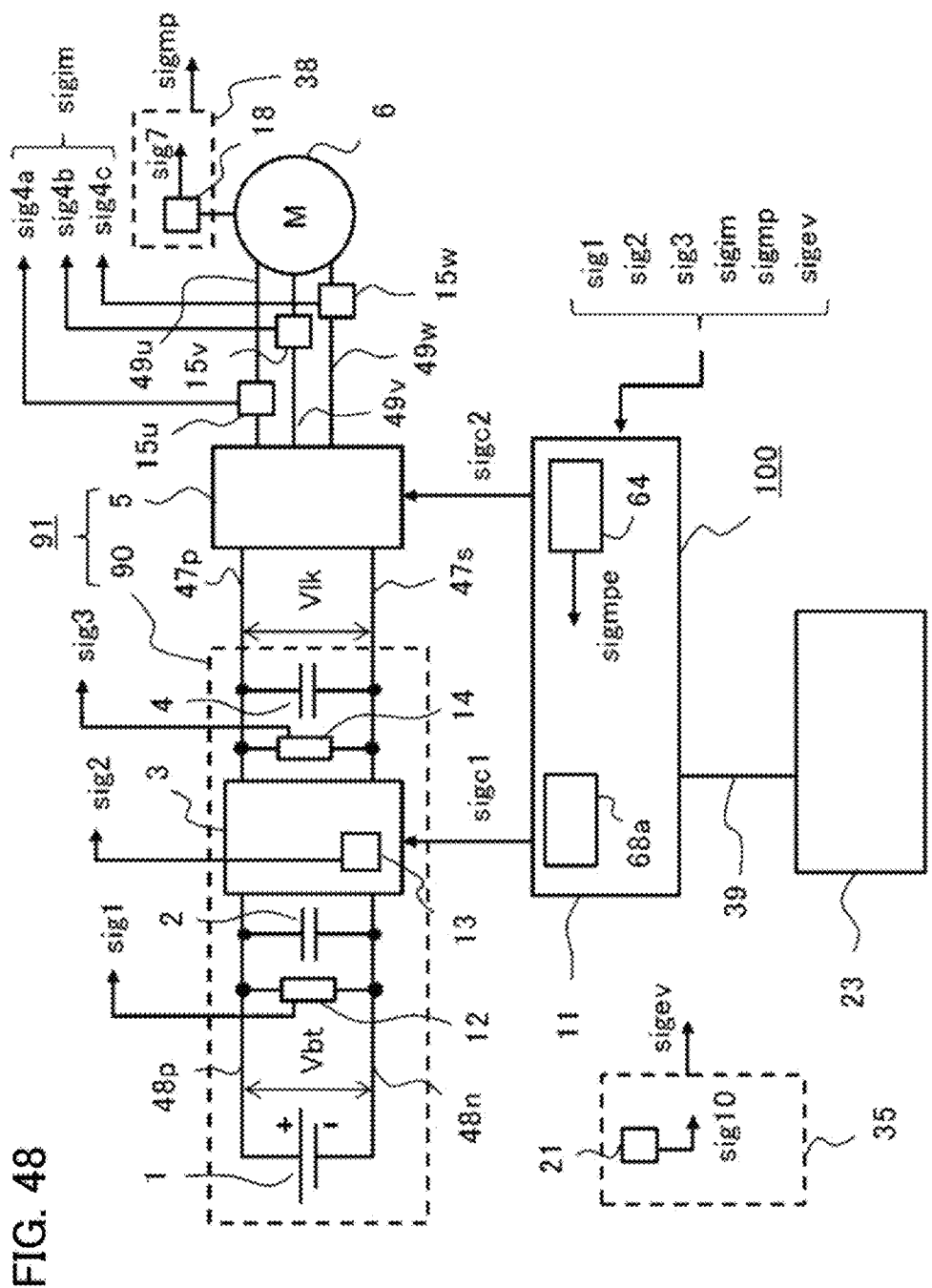
FIG. 48 shows a third example of the motor control device according to embodiment 7.
Figure 49:
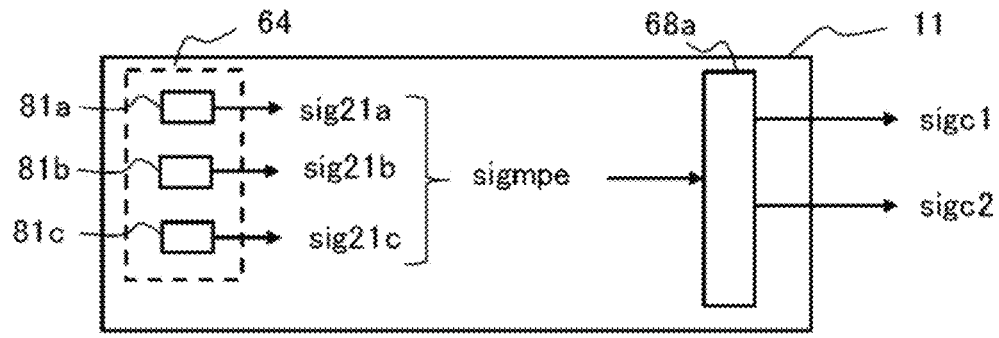
FIG. 49 shows the configuration of a control device in FIG. 48.
Figure 50:
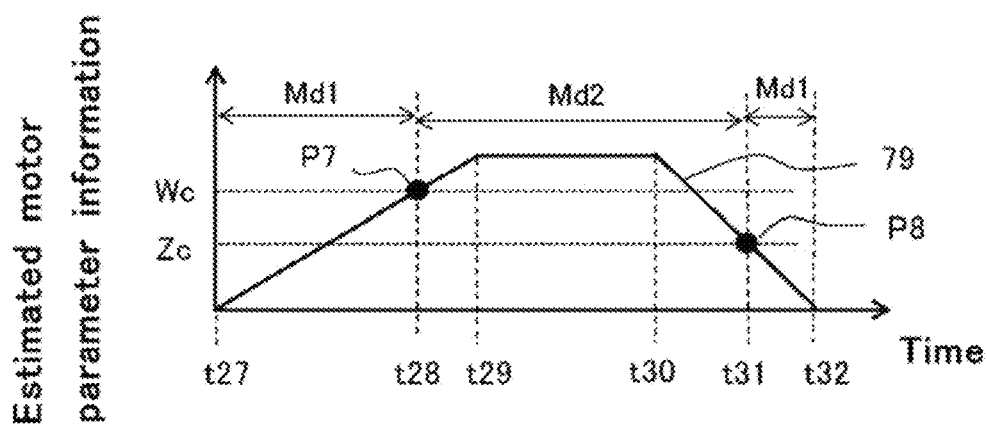
FIG. 50 shows timings for explaining operation of the motor control device in FIG. 48.
Figure 51:
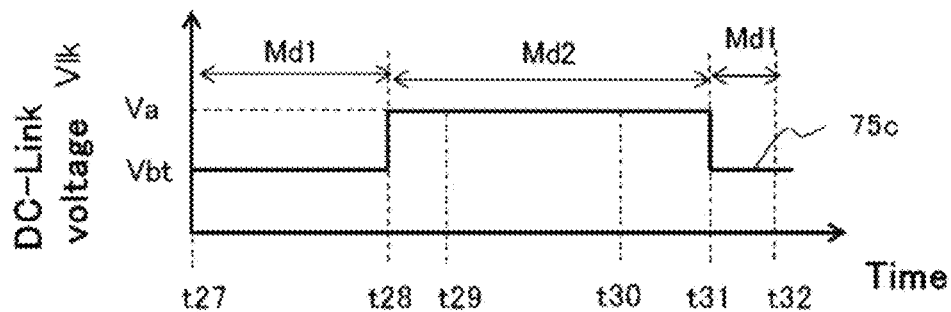
FIG. 51 shows timings for explaining operation of the motor control device in FIG. 48.

FIG. 48 shows a third example of the motor control device according to embodiment 7, and FIG. 49 shows the configuration of a control device in FIG. 48. FIG. 50, FIG. 51, and FIG. 52 show timings for explaining operation of the motor control device shown in FIG. 48. FIG. 53 shows estimated motor parameter information and thresholds according to embodiment 7, and FIG. 54 shows a flowchart for explaining operation of the operation mode judgment unit in FIG. 48. The motor control device 100 in the third example of embodiment 7 is different from the motor control device 100 of embodiment 1 in that the control device 11 includes an observer 64 for estimating a motor parameter and motor parameter estimated information sigmpe outputted from the observer 64 is inputted as the input information sighin to the operation mode judgment unit 60 of the control signal generation unit 68a. The motor control device 100 in the third example of embodiment 7 is different from the motor control device 100 in the first example of embodiment 7 in that the operation mode of the chopper 3 is changed using the estimated information of the motor parameter. The estimated information of the motor parameter may be referred to as motor parameter estimated information. Differences from the motor control device 100 of embodiment 1 and the motor control device 100 in the first example of embodiment 7 will be mainly described.

The observer 64 is at least one of a motor speed estimation unit 81a, a motor output estimation unit 81b, or a motor torque estimation unit 81c, for example. The motor speed estimation unit 81a estimates the motor speed on the basis of the motor current detected information sigim, and outputs the estimated value of the motor speed, i.e., estimated information sig21a, as the motor parameter estimated information sigmpe. The motor output estimation unit 81b estimates the motor output on the basis of the motor current detected information sigim, and outputs the estimated value of the motor output, i.e., estimated information sig21b, as the motor parameter estimated information sigmpe. The motor torque estimation unit 81c estimates the motor torque on the basis of the motor current detected information sigim, and outputs the estimated value of the motor torque, i.e., estimated information sig21c, as the motor parameter estimated information sigmpe. The control signal generation unit 68a outputs the control signals sigc1 and sigc2 on the basis of the motor parameter estimated information sigmpe. That is, the operation mode judgment unit 60 of the control signal generation unit 68a performs judgment about two operation modes of the chopper 3, using the motor parameter estimated information sigmpe as the input information sighin, and outputs the operation mode signal msig.

In the motor control device 100 in the third example of embodiment 7, while motor parameter characteristics estimated for the motor 6, i.e., estimated motor parameter characteristics 79 exhibit change as shown in FIG. 50, the DC-link voltage and the switching frequency are changed as in DC-link voltage characteristics 75c and switching frequency characteristics 76c shown in FIG. 51 and FIG. 52. In FIG. 50, FIG. 51, and FIG. 52, the horizontal axes indicate time. In FIG. 50, FIG. 51, and FIG. 52, the vertical axes indicate the estimated motor parameter information, the DC-link voltage Vlk, and the switching frequency fs, respectively. The horizontal axis in FIG. 52 is shown by a broken line for discrimination from the switching frequency characteristics 76c. The estimated motor parameter characteristics 79 are an example in which the value thereof increases from time t27 to time t29, remains constant from time t29 to time t30, and decreases from time t30 to time t32. At time t27, the control device 11 operates the chopper 3 in the first operation mode Md1, i.e., the bypass mode, with the switching frequency fs for the chopper 3 set at 0.

While the chopper 3 is operating in the first operation mode Md1, when the estimated motor parameter characteristics 79 of the motor 6 indicate a value higher than a threshold Wc at time t28, the control device 11 changes the operation mode of the chopper 3 to the second operation mode Md2, i.e., the boost mode, to start boost operation of the chopper 3, thus increasing the DC-link voltage Vlk from the battery voltage Vbt to the boost voltage Va. At time t28, the control device 11 increases the switching frequency fs from 0 to the switching frequency fa.

While the chopper 3 is operating in the second operation mode Md2, when the estimated motor parameter characteristics 79 of the motor 6 indicate a value lower than a threshold Zc at time t31, the control device 11 changes the operation mode of the chopper 3 to the first operation mode Md1, i.e., the bypass mode, to start bypass operation of the chopper 3, thus reducing the DC-link voltage Vlk from the boost voltage Va to the battery voltage Vbt. At time t31, the control device 11 reduces the switching frequency fs from the switching frequency fa to 0. The threshold Zc is lower than the threshold Wc. A point where the value of the estimated motor parameter characteristics 79 in the first operation mode becomes the threshold Wc is a mode change point P7, and a point where the value of the estimated motor parameter characteristics 79 in the second operation mode becomes the threshold Zc is a mode change point P8. The threshold Zc is a first parameter estimation threshold, and the threshold Wc is a second parameter estimation threshold. The motor parameter estimated information is an example of information of the motor parameter, and therefore the threshold Zc can also be referred to as first parameter threshold and the threshold Wc can also be referred to as second parameter threshold.

FIG. 53 shows specific examples of estimated motor parameter information and thresholds used for judgment. As specific examples of estimated motor parameter information, estimated motor speed information, estimated motor output information, and estimated motor torque information are shown. The thresholds Zc and Wc for the estimated motor speed information are thresholds Zc1 and Wc1, respectively. The thresholds Zc and Wc for the estimated motor output information are thresholds Zc2 and Wc2, respectively, and the thresholds Zc and Wc for the estimated motor torque information are thresholds Zc3 and Wc3, respectively. In accordance with each specific example of the motor parameter estimated information, the first parameter estimation threshold and the second parameter estimation threshold may be specifically written. The threshold Zc1 and the threshold Wc1 may be referred to as first motor speed estimation threshold and second motor speed estimation threshold, respectively. The threshold Zc2 and the threshold Wc2 may be referred to as first motor output estimation threshold and second motor output estimation threshold, respectively, and the threshold Zc3 and the threshold Wc3 may be referred to as first motor torque estimation threshold and second motor torque estimation threshold, respectively.

The motor parameter estimated information sigmpe is information of a motor parameter obtained along with control for the motor 6, and is flight information. When the flying object such as the aircraft takes off from the ground, the control device 11 controls the chopper 3 in the second operation mode Md2, and when the control device 11 judges that the flight information which is information of a motor parameter obtained along with control for the motor 6, i.e., the motor parameter estimated information sigmpe, satisfies a predetermined condition, the control device 11 controls the chopper 3 in the first operation mode Md1.

The operation mode judgment unit 60 of the control device 11 operates as in the flowchart shown in FIG. 54, for example. The flowchart in FIG. 54 corresponds to the flowcharts in FIG. 14 and FIG. 41. The flowchart in FIG. 54 is different from the flowchart in FIG. 41 in that step ST12 is replaced with step ST18 and step ST14 is replaced with step ST19. Differences from the flowchart in FIG. 41 will be described. In step ST11, if it is judged that the chopper 3 is in the boost mode, the process proceeds to step ST18, and if it is judged that the chopper 3 is not in the boost mode, the process proceeds to step ST19. In step ST18, if the estimated value of the estimated motor parameter information is smaller than the threshold Zc, i.e., if the operation mode change judgment criterion is satisfied, the process proceeds to step ST13, and if the estimated value of the estimated motor parameter information is not smaller than the threshold Zc, i.e., if the operation mode change judgment criterion is not satisfied, the operation mode signal msig is kept in the boost mode and the process is ended. In step ST13, the operation mode signal msig is changed to the bypass mode and the process is ended. In step ST19, if the estimated value of the estimated motor parameter information is greater than the threshold Wc, i.e., if the operation mode change judgment criterion is satisfied, the process proceeds to step ST15, and if the estimated value of the estimated motor parameter information is not greater than the threshold Wc, i.e., if the operation mode change judgment criterion is not satisfied, the operation mode signal msig is kept in the bypass mode and the process is ended. In step ST15, the operation mode signal msig is changed to the boost mode and the process is ended. In this example, whether or not the chopper 3 is in the boost mode is judged in step ST11. However, as shown in FIG. 16, in step ST11 which is the first step, whether or not the chopper 3 is in the bypass mode may be judged. In step ST11, if it is judged that the chopper 3 is in the bypass mode, the process proceeds to step ST19, and if it is judged that the chopper 3 is not in the bypass mode, the process proceeds to step ST18.

In the motor control device 100 in the third example of embodiment 7, the control device 11 changes the operation mode on the basis of the motor parameter estimated information sigmpe of the motor 6 instead of the environmental detected information sigev. Therefore, the same effects as in the motor control device 100 of embodiment 1 are provided. In the motor control device 100 in the third example of embodiment 7, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 in the third example of embodiment 7 is improved in reliability of the entire device.

As described above, the motor control device 100 of embodiment 7 controls the motor 6 of the flying object that takes off from the ground and flies. The motor control device 100 includes the power source device 90 which outputs DC power, the power supply device (inverter 5) which converts DC power to AC power and outputs the AC power to the motor 6, and the control device 11 for controlling the power source device 90 and the power supply device (inverter 5). The power source device 90 includes a power source (battery 1), a DC-output power conversion device (chopper 3) which converts output of the power source (battery 1) to DC power, and an output capacitor (capacitor 4) for smoothing output voltage (DC-link voltage Vlk) of the DC-output power conversion device (chopper 3). The DC-output power conversion device (chopper 3) has the first operation mode Md1 for outputting the first voltage (battery voltage Vbt) and the second operation mode Md2 for outputting the second voltage (boost voltage Va) higher than the first voltage (battery voltage Vbt). When the flying object takes off from the ground, the control device 11 controls the DC-output power conversion device (chopper 3) in the second operation mode Md2, and when the control device 11 judges that flight information which is information of a motor parameter (motor parameter command detected information sigmpc, motor parameter detected information sigmp, motor parameter estimated information sigmpe) obtained along with control for the motor 6 satisfies a predetermined condition, the control device 11 controls the DC-output power conversion device (chopper 3) in the first operation mode Md1. With this configuration, in the motor control device 100 of embodiment 7, while the DC-output power conversion device (chopper 3) is controlled in the second operation mode Md2, when the flight information is judged to satisfy the predetermined condition, the DC-output power conversion device (chopper 3) is controlled in the first operation mode Md1. Thus, even in a case of operating at a high altitude where the cosmic ray dose is high, reliability of the motor control device is improved.

In the motor control device 100 of embodiment 7, the case where "the flight information satisfies the predetermined condition" corresponds to a case where, in a state in which the DC-output power conversion device (chopper 3) is controlled in the second operation mode Md2, an information value (a command value of motor parameter command detected information sigmpc, a detected value of motor parameter detected information sigmp, an estimated value of motor parameter estimated information sigmpe) based on information of a motor parameter (motor parameter command detected information sigmpc, motor parameter detected information sigmp, motor parameter estimated information sigmpe) is smaller than the first parameter threshold (thresholds Za, Zb, Zc). In the motor control device 100 in the first example of embodiment 7, the control device 11 includes the motor parameter command sensor 70 for detecting the motor parameter command (motor parameter command detected information sigmpc) which is information of the motor parameter. In the motor control device 100 in the first example of embodiment 7, in a state in which the DC-output power conversion device (chopper 3) is controlled in the second operation mode Md2, when it is judged that the information value (the command value of motor parameter command detected information sigmpc) based on the motor parameter command (motor parameter command detected information sigmpc) is smaller than the first parameter command threshold (threshold Za) which is the first parameter threshold (change condition B7a), the DC-output power conversion device (chopper 3) is controlled in the first operation mode Md1. In the first example of embodiment 7, in a state in which the DC-output power conversion device (chopper 3) is controlled in the first operation mode Md1, when the control device 11 judges that the information value (the command value of motor parameter command detected information sigmpc) based on the motor parameter command (motor parameter command detected information sigmpc) is greater than the second parameter command threshold (threshold Wa) which is the second parameter threshold greater than the first parameter threshold (threshold Za), the control device 11 controls the DC-output power conversion device (chopper 3) in the second operation mode Md2. With this configuration, in the motor control device 100 in the first example of embodiment 7, while the DC-output power conversion device (chopper 3) is controlled in the second operation mode Md2, when the flight information is judged to satisfy the predetermined condition, i.e., the change condition B7a, the DC-output power conversion device (chopper 3) is controlled in the first operation mode Md1. Thus, even in a case of operating at a high altitude where the cosmic ray dose is high, reliability of the motor control device is improved.

The motor control device 100 in the second example of embodiment 7 includes the motor parameter sensor 38 for detecting motor parameter detected information (motor parameter detected information sigmp) of the motor 6 which is information of the motor parameter. In the motor control device 100 in the second example of embodiment 7, in a state in which the DC-output power conversion device (chopper 3) is controlled in the second operation mode Md2, when it is judged that the information value (the detected value of motor parameter detected information sigmp) based on the motor parameter detected information (motor parameter detected information sigmp) is smaller than the first parameter detection threshold (threshold Zb) which is the first parameter threshold (change condition B7b), the DC-output power conversion device (chopper 3) is controlled in the first operation mode Md1. In the second example of embodiment 7, in a state in which the DC-output power conversion device (chopper 3) is controlled in the first operation mode Md1, when the control device 11 judges that the information value (the detected value of motor parameter detected information sigmp) based on the motor parameter detected information (motor parameter detected information sigmp) is greater than the second parameter detection threshold (threshold Wb) which is the second parameter threshold greater than the first parameter threshold (threshold Zb), the control device 11 controls the DC-output power conversion device (chopper 3) in the second operation mode Md2. With this configuration, in the motor control device 100 in the second example of embodiment 7, while the DC-output power conversion device (chopper 3) is controlled in the second operation mode Md2, when the flight information is judged to satisfy the predetermined condition, i.e., the change condition B7b, the DC-output power conversion device (chopper 3) is controlled in the first operation mode Md1. Thus, even in a case of operating at a high altitude where the cosmic ray dose is high, reliability of the motor control device is improved.

In the motor control device 100 in the third example of embodiment 7, the control device 11 includes the observer 64 for outputting the motor parameter estimated information of the motor 6 (motor parameter estimated information sigmpe) which is information of the motor parameter. In the motor control device 100 in the third example of embodiment 7, in a state in which the DC-output power conversion device (chopper 3) is controlled in the second operation mode Md2, when it is judged that the information value (the estimated value of motor parameter estimated information sigmpe) based on the motor parameter estimated information (motor parameter estimated information sigmpe) is smaller than the first parameter estimation threshold (threshold Zc) which is the first parameter threshold (change condition B7c), the DC-output power conversion device (chopper 3) is controlled in the first operation mode Md1. In the third example of embodiment 7, in a state in which the DC-output power conversion device (chopper 3) is controlled in the first operation mode Md1, when the control device 11 judges that the information value (the estimated value of motor parameter estimated information sigmpe) based on the motor parameter estimated information (motor parameter estimated information sigmpe) is greater than the second parameter estimation threshold (threshold Wc) which is the second parameter threshold greater than the first parameter threshold (threshold Zc), the control device 11 controls the DC-output power conversion device (chopper 3) in the second operation mode Md2. With this configuration, in the motor control device 100 in the third example of embodiment 7, while the DC-output power conversion device (chopper 3) is controlled in the second operation mode Md2, when the flight information is judged to satisfy the predetermined condition, i.e., the change condition B7c, the DC-output power conversion device (chopper 3) is controlled in the first operation mode Md1. Thus, even in a case of operating at a high altitude where the cosmic ray dose is high, reliability of the motor control device is improved.

Embodiment 8

Figure 55:
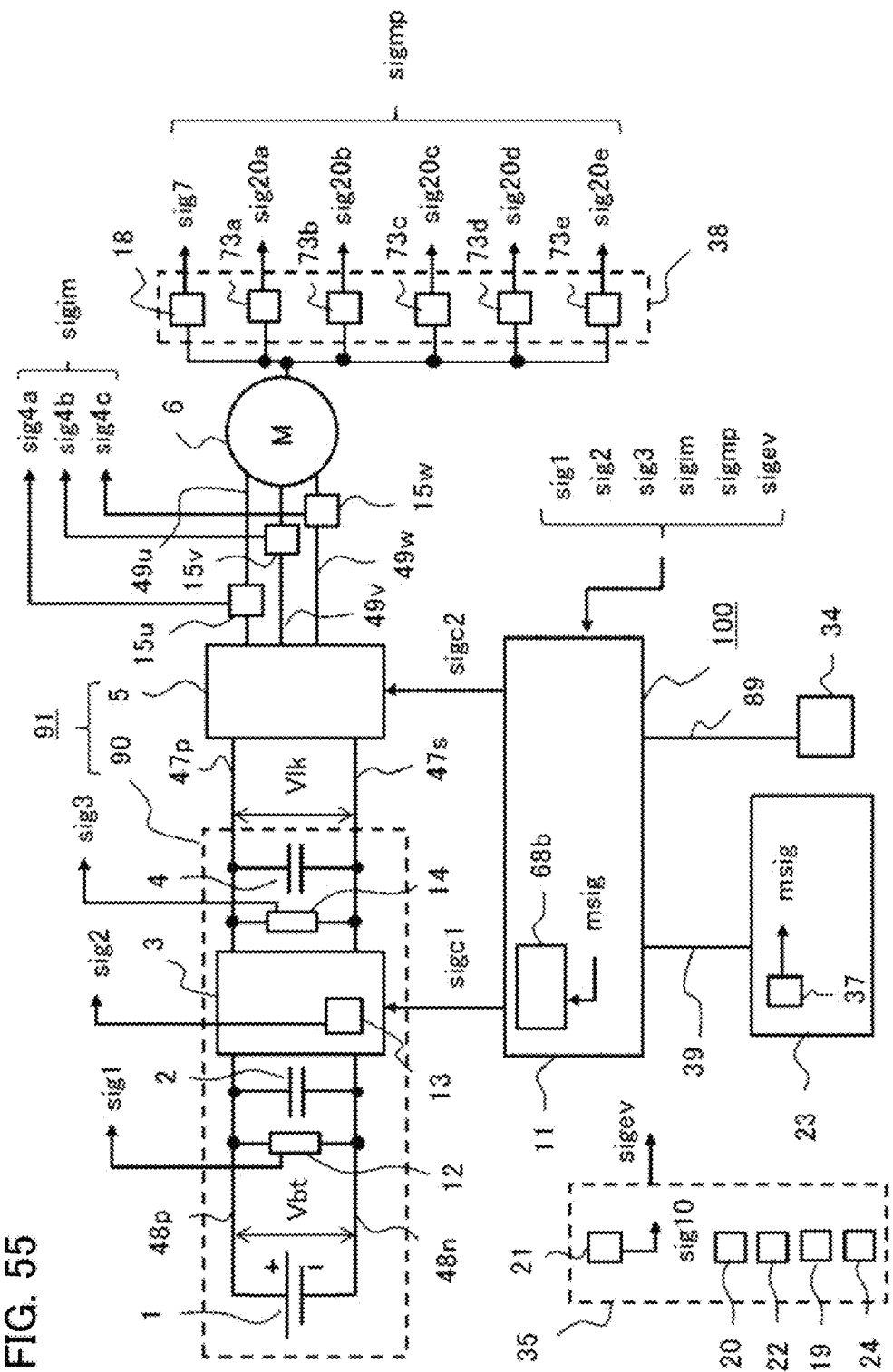
FIG. 55 shows the configuration of a motor control device according to embodiment 8.
Figure 56:
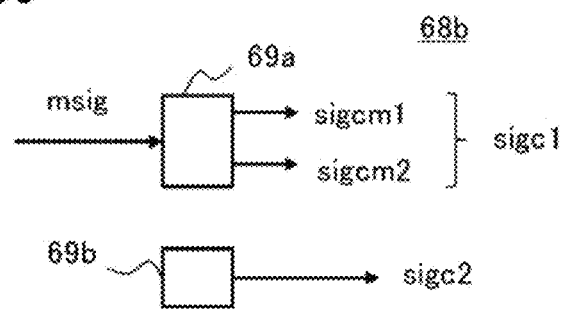
FIG. 56 shows the configuration of a control signal generation unit in FIG. 55.
Figure 57:
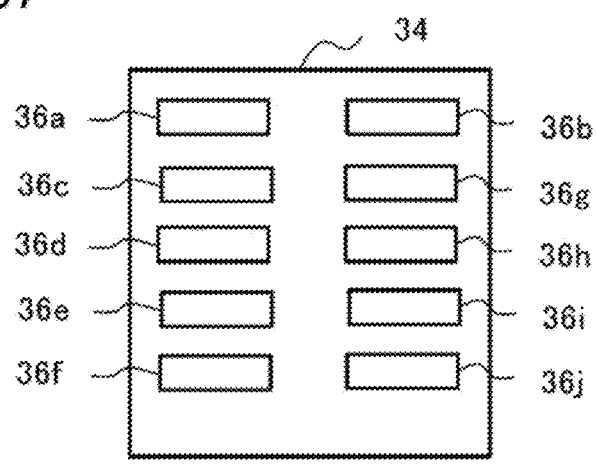
FIG. 57 shows an indication example of a display in FIG. 55.

FIG. 55 shows the configuration of a motor control device according to embodiment 8. FIG. 56 shows the configuration of a control signal generation unit in FIG. 55, and FIG. 57 shows an indication example of a display in FIG. 55. In the motor control device 100 of embodiment 8, the operation mode of the chopper 3 is changed on the basis of an instruction from the pilot. The motor control device 100 of embodiment 8 is different from the motor control device 100 of embodiment 1 in that a display 34 is provided for displaying environmental information detected by the environmental information detection sensors 35, motor parameter information detected by the motor parameter sensors 38, and the like, the operating panel 23 includes a selection switch 37, and the control device 11 includes a control signal generation unit 68b for outputting the control signals sigc1 and sigc2 on the basis of the operation mode signal msig from the selection switch 37. Differences from the motor control device 100 of embodiment 1 will be mainly described.

In FIG. 55, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. In FIG. 55, as examples of the motor parameter sensors 38, the motor speed sensor 73a, the motor output sensor 73b, the motor AC voltage sensor 73c, the motor current sensor 73d, and the motor torque sensor 73e described in the second example (see FIG. 42) of embodiment 7, as well as the position sensor 18, are provided. The display 34 is connected to the control device 11 via a signal line 89.

The control signal generation unit 68b is different from the control signal generation unit 68a shown in FIG. 5 in that the operation mode judgment unit 60 is not provided and the operation mode signal msig outputted from the selection switch 37 of the operating panel 23 is inputted to the first signal generation unit 69a. On the display 34, an altitude indication 36a, a motor output indication 36b, an outside air pressure indication 36c, an air component concentration indication 36d, an outside air temperature indication 36e, a radiation dose indication 36f, a motor speed indication 36g, a motor AC voltage indication 36h, a motor current indication 36i, and a motor torque indication 36j are displayed as an example. The altitude indication 36a is an indication of altitude information detected by the altitude sensor 21, and the motor output indication 36b is an indication of motor output information detected by the motor output sensor 73b. The outside air pressure indication 36c is an indication of outside air pressure information detected by the outside air pressure sensor 20, and the air component concentration indication 36d is an indication of air component concentration information detected by the air component concentration sensor 22. The outside air temperature indication 36e is an indication of outside air temperature information detected by the outside air temperature sensor 19, and the radiation dose indication 36f is an indication of radiation dose information detected by the radiation sensor 24. The motor speed indication 36g is an indication of motor speed information detected by the motor speed sensor 73a, and the motor AC voltage indication 36h is an indication of motor AC voltage information detected by the motor AC voltage sensor 73c. The motor current indication 36i is an indication of motor current information detected by the motor current sensor 73d, and the motor torque indication 36j is an indication of motor torque information detected by the motor torque sensor 73e.

The pilot of the aircraft or the like determines whether or not it is possible to change the operation mode of the chopper 3, by referring to values such as the flight altitude, the motor output of the motor 6, and processed information thereof displayed on the display 34, and operates the selection switch 37, to change the operation mode of the chopper 3. When the pilot selects the bypass mode which is the first operation mode on the operating panel 23, the operation mode signal msig which is the selection information is transmitted to the control device 11 via the signal line 39. In response to the operation mode signal msig at a low level, the control device 11 sets the operation mode to the first operation mode, so that the chopper 3 stops switching and performs bypass operation. When the pilot selects the boost mode which is the second operation mode on the operating panel 23, the operation mode signal msig which is the selection information is transmitted to the control device 11 via the signal line 39. In response to the operation mode signal msig at a high level, the control device 11 sets the operation mode to the second operation mode, so that the chopper 3 starts switching and performs boost operation.

In the motor control device 100 of embodiment 8, unlike the configuration in which the operation mode of the chopper 3 is automatically changed on the basis of the environmental detected information sigev, the motor parameter detected information sigmp, and the like, the operation mode of the chopper 3 is changed on the basis of an instruction from the pilot who refers to the value of environmental detected information and the value of motor parameter detected information which are displayed as numerical values converted from the environmental detected information sigev, the motor parameter detected information sigmp, and the like. Since the motor control device 100 of embodiment 8 changes the operation mode of the chopper 3 on the basis of an instruction from the pilot who refers to the value of environmental detected information and the value of motor parameter detected information, the same effects as in the motor control device 100 of embodiment 1 are provided. In the motor control device 100 of embodiment 8, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 8 is improved in reliability of the entire device. In addition, in the motor control device 100 of embodiment 8, even if some of the plurality of environmental information detection sensors 35 and the plurality of motor parameter sensors 38 have failed or the display 34 has failed, it is possible to change the operation mode of the chopper 3 as appropriate through determination by the pilot, and thus, it is possible to restore the motor output even when the motor output or the like has become insufficient unexpectedly.

As described above, the motor control device 100 of embodiment 8 includes the power source device 90, the power supply device (inverter 5), the control device 11, and the operating panel 23 connected to the control device 11. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). The operating panel 23 includes the selection switch 37 for selecting the first operation mode Md1 or the second operation mode Md2 of the DC-output power conversion device (chopper 3). In embodiment 8, in a state in which the DC-output power conversion device (chopper 3) is controlled in the second operation mode Md2, when the control device 11 has received the operation mode signal msig for which the first operation mode Md1 is selected from the selection switch 37, the control device 11 controls the DC-output power conversion device (chopper 3) in the first operation mode Md1. In embodiment 8, in a state in which the DC-output power conversion device (chopper 3) is controlled in the first operation mode Md1, when the control device 11 has received the operation mode signal msig for which the second operation mode Md2 is selected from the selection switch 37, the control device 11 controls the DC-output power conversion device (chopper 3) in the second operation mode Md2. With this configuration, in the motor control device 100 of embodiment 8, while the DC-output power conversion device (chopper 3) is controlled in the second operation mode Md2, when the operation mode signal msig for which the first operation mode Md1 is selected is received during control for the motor 6, the DC-output power conversion device (chopper 3) is controlled in the first operation mode Md1. Thus, even in a case of operating at a high altitude where the cosmic ray dose is high, reliability of the motor control device is improved.

Embodiment 9

Figure 58:
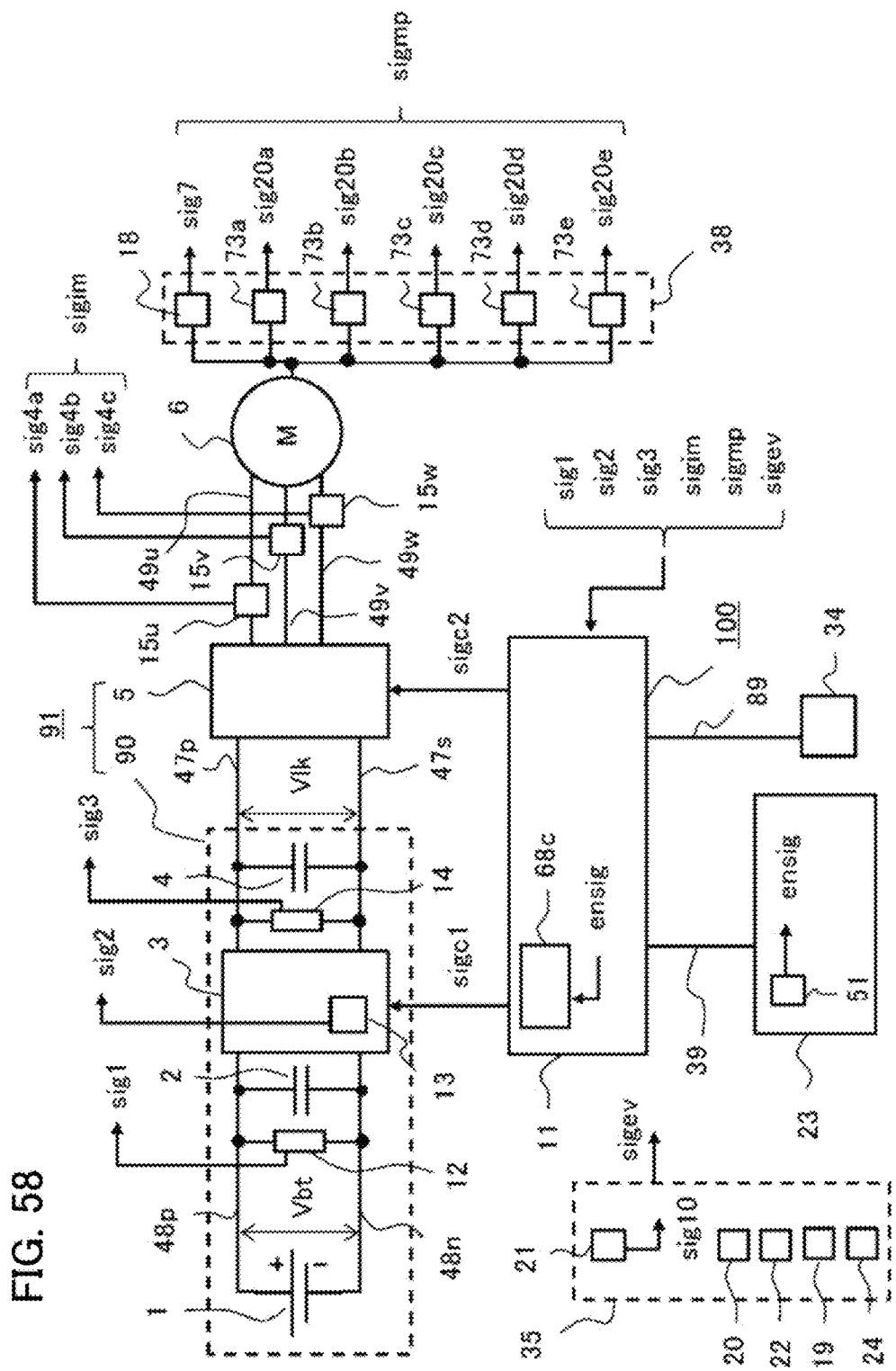
FIG. 58 shows the configuration of a motor control device according to embodiment 9.
Figure 59:
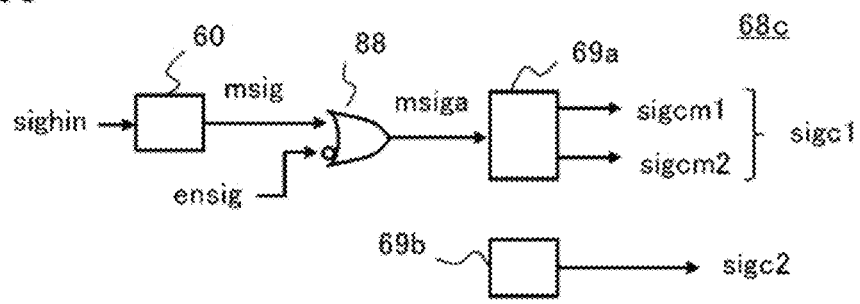
FIG. 59 shows the configuration of a control signal generation unit in FIG. 58.
Figure 60:
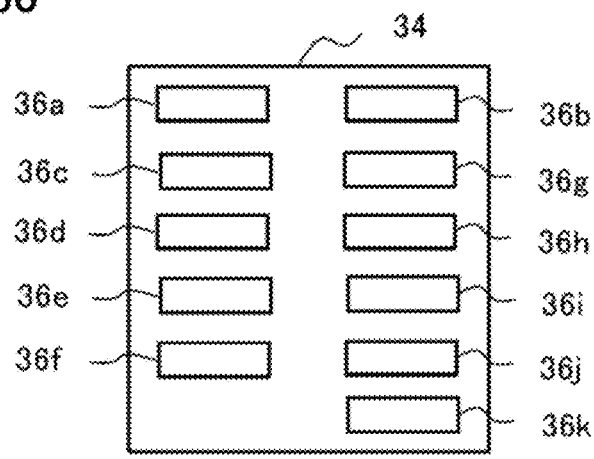
FIG. 60 shows an indication example of a display in FIG. 58.

FIG. 58 shows the configuration of a motor control device according to embodiment 9. FIG. 59 shows the configuration of a control signal generation unit in FIG. 58, and FIG. 60 shows an indication example of a display in FIG. 58. In the motor control device 100 of embodiment 9, the operation mode of the chopper 3 is changed on the basis of operation mode change permission from a pilot, the environmental detected information sigev, the motor parameter detected information sigmp, and the like. The motor control device 100 of embodiment 9 is different from the motor control device 100 of embodiment 8 in that the operating panel 23 includes a permission switch 51 for permitting automatic change of the operation mode, and the control device 11 includes a control signal generation unit 68c for outputting the control signals sigc1 and sigc2 on the basis of a change permission signal ensig from the permission switch 51 and the input information sighin such as the environmental detected information sigev and the motor parameter detected information sigmp. Differences from the motor control device 100 of embodiment 8 and the motor control device 100 of embodiment 1 will be mainly described.

The control signal generation unit 68c is different from the control signal generation unit 68b shown in FIG. 56 in that the operation mode judgment unit 60 and a logical operation circuit 88 are added. The control signal generation unit 68c is different from the control signal generation unit 68a shown in FIG. 5 in that the logical operation circuit 88 is added between the operation mode judgment unit 60 and the first signal generation unit 69a. The logical operation circuit 88 outputs, to the first signal generation unit 69a, an operation mode signal msiga obtained through logical operation between the operation mode signal msig outputted from the operation mode judgment unit 60 and the change permission signal ensig outputted from the permission switch 51. In a case of permitting the operation mode of the chopper 3 to be automatically changed to the bypass mode which is the first operation mode, the change permission signal ensig indicates a high level, and in a case of not permitting the operation mode of the chopper 3 to be automatically changed to the bypass mode which is the first operation mode, the change permission signal ensig indicates a low level.

When the change permission signal ensig is at a high level, the logical operation circuit 88 outputs the operation mode signal msig as the operation mode signal msiga. In this case, the control signal generation unit 68c outputs the first mode control signal sigcm1 or the second mode control signal sigcm2 as the control signal sigc1 in accordance with the high/low level of the operation mode signal msig, respectively. Thus, in the case where the change permission signal ensig is at a high level, the control signal generation unit 68c performs control so as to automatically change the operation mode, i.e., so as to perform automatic operation mode change. On the other hand, in the case where the change permission signal ensig is at a low level, the logical operation circuit 88 outputs the operation mode signal msiga indicating a high level. In response to the operation mode signal msiga at a high level, the first signal generation unit 69a outputs, as the control signal sigc1, the second mode control signal sigcm2 for performing control in the second operation mode, i.e., the boost mode. Thus, in the case where the change permission signal ensig is at a low level, the control signal generation unit 68c performs control so as not to automatically change the operation mode, i.e., so as not to perform automatic operation mode change. On the display 34, the indications shown in FIG. 57 and an indication of a judgment result of the operation mode judgment unit 60, i.e., a judgment result indication 36k are shown as an example.

The pilot of the aircraft or the like determines whether or not it is possible to change the operation mode, by referring to the judgment result of the operation mode judgment unit 60 and values such as the flight altitude and the motor output of the motor 6 displayed on the display 34. The pilot operates the permission switch 51 on the basis of determination for whether or not it is possible to change the operation mode, and determines permission for operation mode change of the chopper 3. As shown in FIG. 7 to FIG. 9, in the first flight state Sd1 when the aircraft starts to fly, the chopper 3 is in the second operation mode Md2, i.e., the boost mode. Therefore, the permission for operation mode change of the chopper 3 is permission for automatic change to the first operation mode Md1, i.e., the bypass mode from the second operation mode Md2, i.e., the boost mode at the time of starting operation.

When the pilot permits automatic change to the bypass mode which is the first operation mode Md1 on the operating panel 23, the permission information, i.e., the change permission signal ensig indicating permission is transmitted to the control device 11 via the signal line 39. The control device 11 changes the operation mode of the chopper 3 in accordance with the operation mode change methods described in embodiments 1 to 7. For example, the change permission signal ensig indicating permission is a high-level signal, and the change permission signal ensig indicating non-permission is a low-level signal. On the other hand, when the pilot does not permit automatic change to the bypass mode which is the first operation mode Md1 on the operating panel 23, the non-permission information, i.e., the change permission signal ensig indicating non-permission is transmitted to the control device 11 via the signal line 39. In response to the change permission signal ensig indicating non-permission, the control device 11 fixes the operation mode of the chopper 3 in the boost mode which is the second operation mode Md2.

In the motor control device 100 of embodiment 9, the chopper 3 is controlled on the basis of permission/non-permission of automatic operation mode change of the chopper 3 determined by the pilot. In the motor control device 100 of embodiment 9, in a case where automatic operation mode change of the chopper 3 is permitted, the operation mode of the chopper 3 is automatically changed on the basis of the environmental detected information sigev, the motor parameter detected information sigmp, and the like. In the motor control device 100 of embodiment 9, in a case where the automatic operation mode change of the chopper 3 is not permitted, the operation mode of the chopper 3 is fixed in the boost mode which is the second operation mode Md2. Since the motor control device 100 of embodiment 9 performs control for the operation mode of the chopper 3 on the basis of determination of permission/non-permission for operation mode change of the chopper 3 by the pilot who refers to values of environmental detected information, values of motor parameter detected information, and the like, the same effects as in the motor control device 100 of embodiment 1 are provided. In the motor control device 100 of embodiment 9, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 9 is improved in reliability of the entire device. In addition, in the motor control device 100 of embodiment 9, even if some of the plurality of environmental information detection sensors 35 and the plurality of motor parameter sensors 38 have failed or the display 34 has failed, it is possible to change the operation mode of the chopper 3 as appropriate through determination by the pilot, and thus, it is possible to restore the motor output even when the motor output or the like has become insufficient unexpectedly.

As described above, the motor control device 100 of embodiment 9 includes the power source device 90, the power supply device (inverter 5), the control device 11, and the operating panel 23 connected to the control device 11. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). The operating panel 23 includes the permission switch 51 for permitting change of the DC-output power conversion device (chopper 3) to the first operation mode Md1. In embodiment 9, in a case where the change permission signal ensig outputted from the permission switch 51 indicates permission, the control device 11 controls the DC-output power conversion device (chopper 3) in the first operation mode Md1 or the second operation mode Md2 by operation mode control A. The control device 11 executes the operation mode control A as follows. That is, when the flying object takes off from the ground, the control device 11 controls the DC-output power conversion device (chopper 3) in the second operation mode Md2, and when the control device 11 judges that flight information which is one or both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object, satisfies a predetermined condition, the control device 11 controls the DC-output power conversion device (chopper 3) in the first operation mode Md1. In embodiment 9, in a case where the change permission signal ensig outputted from the permission switch 51 indicates non-permission, the control device 11 controls the DC-output power conversion device (chopper 3) in the second operation mode Md2. With this configuration, in the motor control device 100 of embodiment 9, while the DC-output power conversion device (chopper 3) is controlled in the second operation mode Md2, when the change permission signal ensig outputted from the permission switch 51 indicates permission and the flight information is judged to satisfy the predetermined condition, the DC-output power conversion device (chopper 3) is controlled in the first operation mode Md1. Thus, even in a case of operating at a high altitude where the cosmic ray dose is high, reliability of the motor control device is improved.

Embodiment 10

Figure 61:
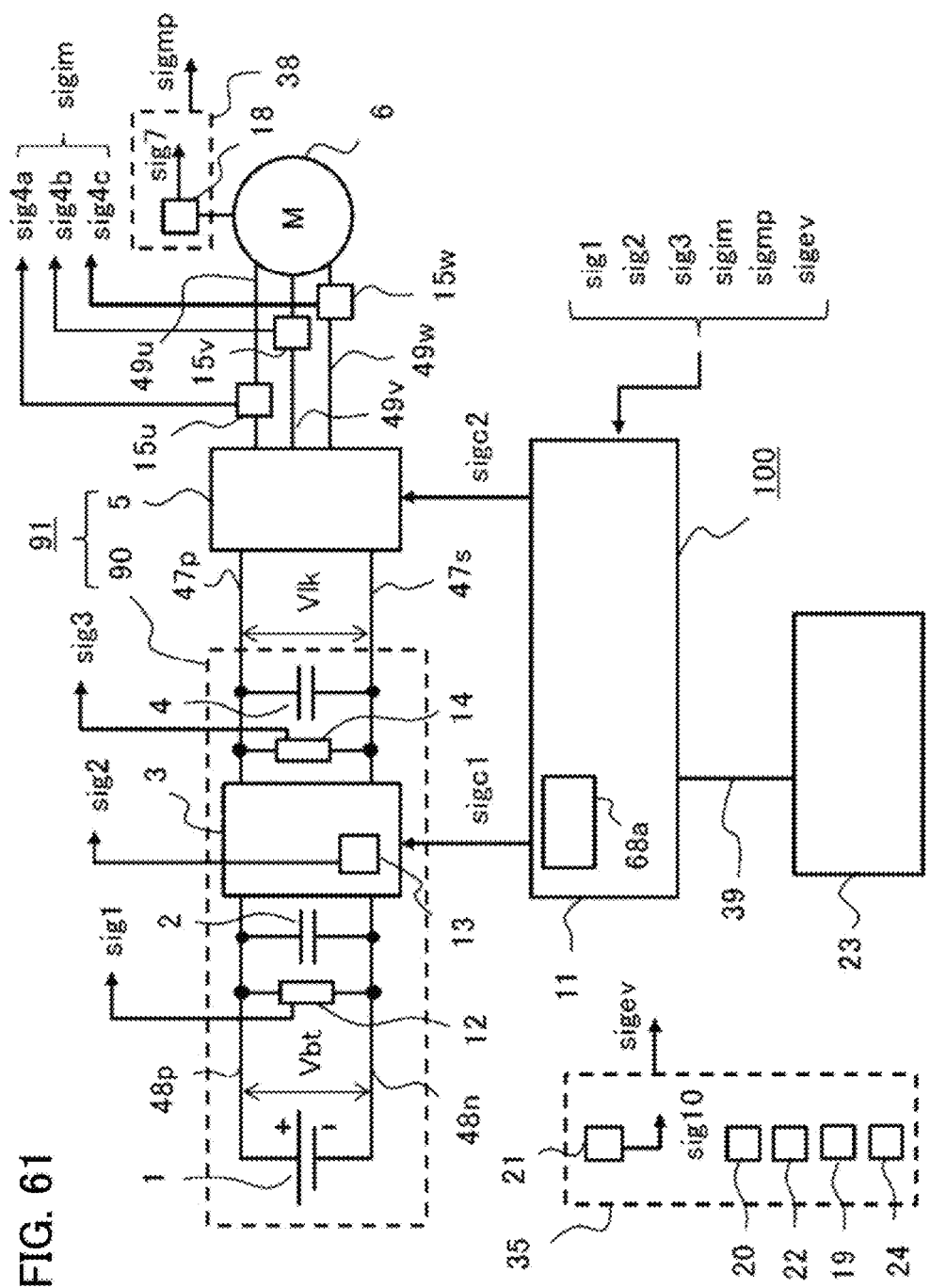
FIG. 61 shows a first example of a motor control device according to embodiment 10.
Figure 62:
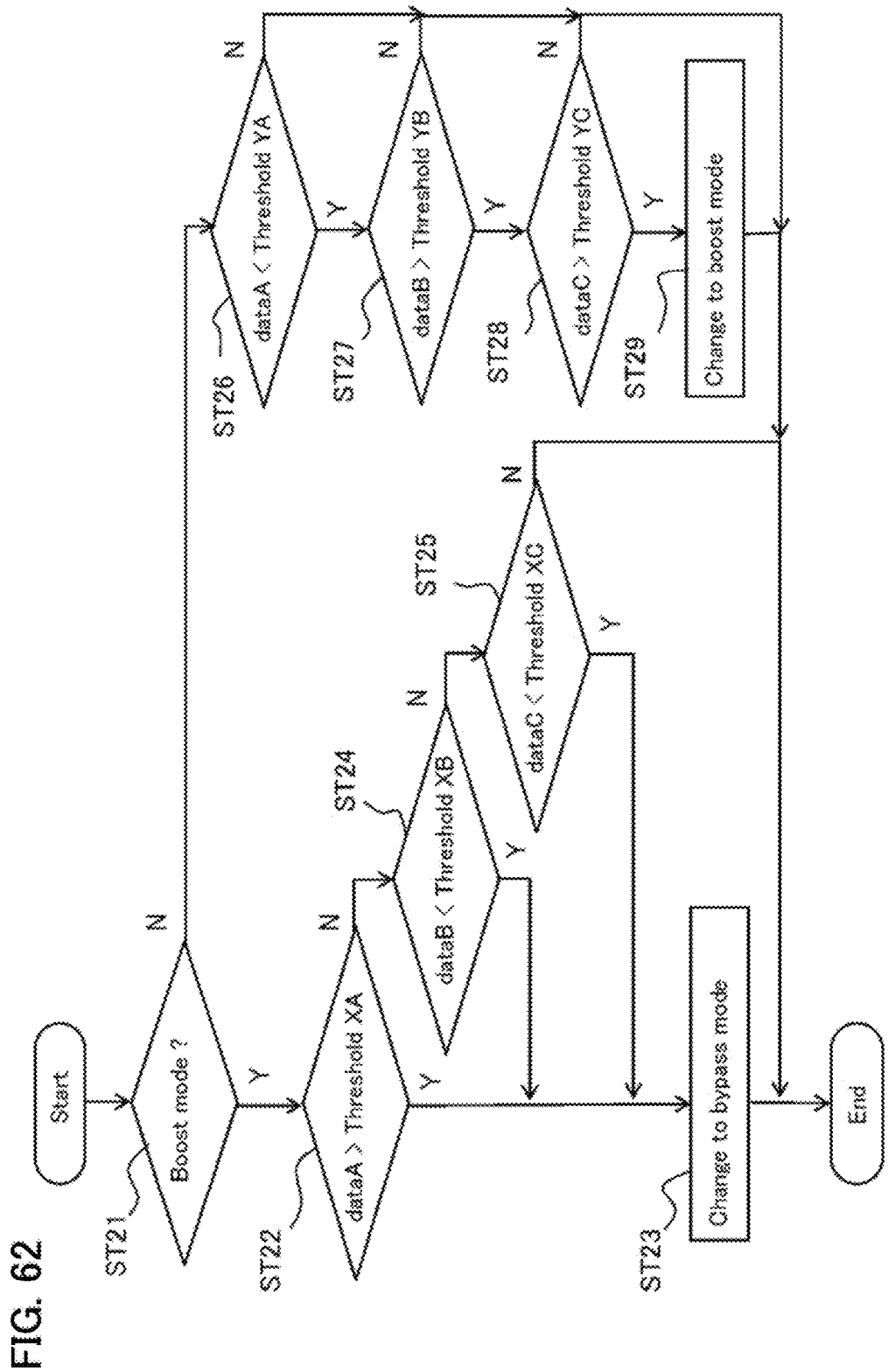
FIG. 62 shows a flowchart for explaining operation of an operation mode judgment unit in FIG. 61.
Figure 64:
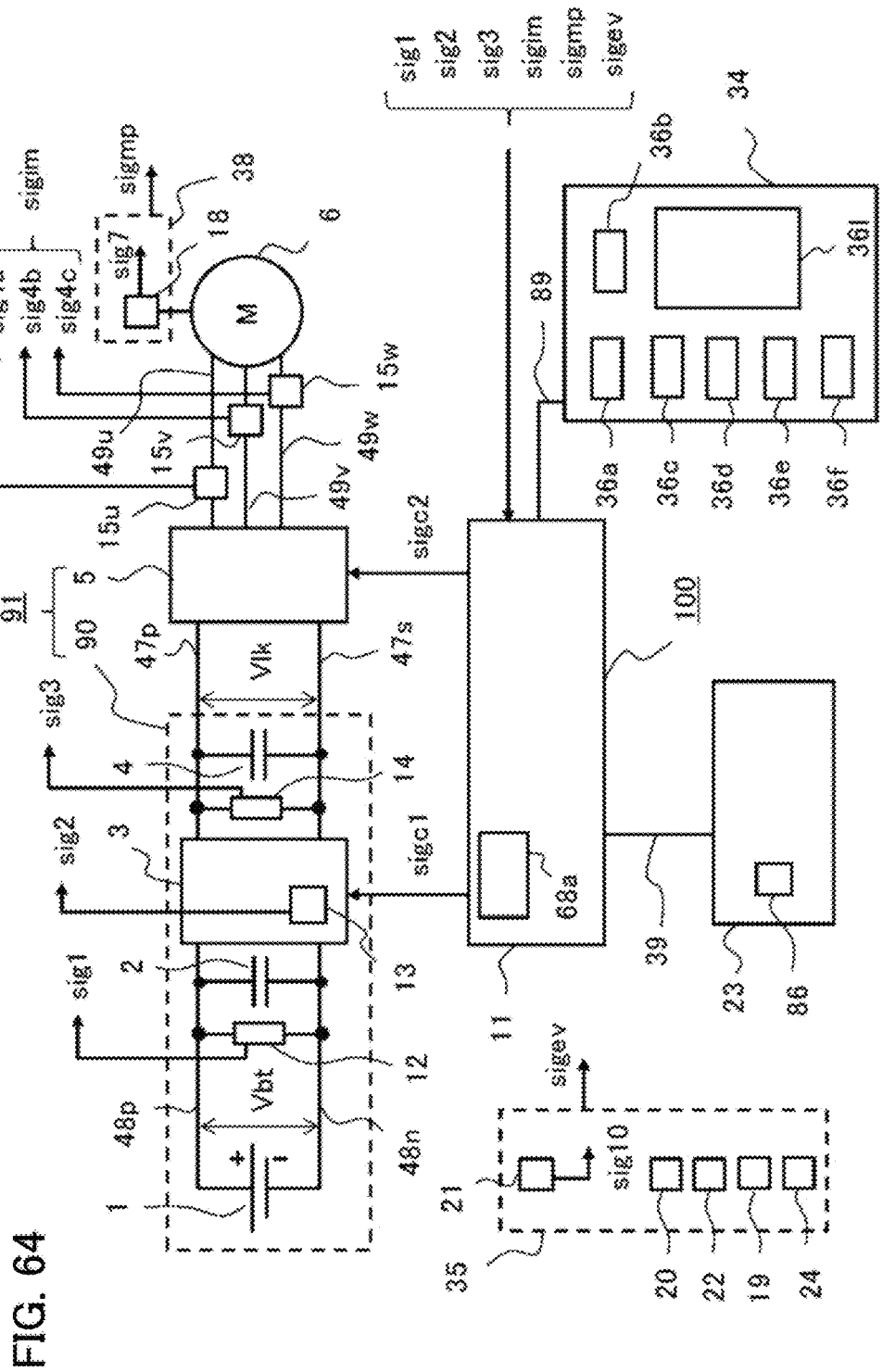
FIG. 64 shows a second example of the motor control device according to embodiment 10.

FIG. 61 shows a first example of a motor control device according to embodiment 10. FIG. 62 shows a flowchart for explaining operation of the operation mode judgment unit in FIG. 61, and FIG. 63 shows priority information according to embodiment 10. FIG. 64 shows a second example of the motor control device according to embodiment 10. In the motor control device 100 according to embodiment 10, the operation mode of the chopper 3 is changed on the basis of two or more kinds of environmental detected information sigev. The motor control device 100 in the first example of embodiment 10 basically has the same configuration as the motor control device 100 of embodiment 1, but includes a plurality of environmental information detection sensors 35 for detecting different environmental factors. In FIG. 61, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. Differences from the motor control device 100 of embodiment 1 will be mainly described.

In the motor control device 100 of embodiment 10, two or more kinds of factors among the environmental factors relevant to the flight altitude described in embodiments 1 to 6 are used for judgment for operation mode change of the chopper 3. In the boost mode which is the second operation mode Md2, since the DC-link voltage Vlk which is the output voltage of the chopper 3 is high, the failure rate due to cosmic rays on the chopper 3 and the inverter 5 increases. Therefore, in the motor control device 100 of embodiment 10, shift to the boost mode is performed only in a case where all the conditions for selected environmental factors are satisfied, whereby, as compared to the motor control devices 100 of embodiments 1 to 6, the failure rate due to a single event that occurs on the semiconductor elements composing the chopper 3 and the inverter 5 is reduced, so that reliability of the chopper 3 and the inverter 5 is improved.

Operation of the operation mode judgment unit 60 of the control device 11 will be described with reference to the flowchart in FIG. 62. FIG. 62 shows an example in which whether or not it is possible to change the operation mode of the chopper 3 is judged using three environmental factors. Here, dataA, dataB, and dataC are detected values in the priority information 87 shown in FIG. 63. In the flowchart in FIG. 62, the detected value dataA is a detected value of altitude information, the detected value dataB is a detected value of outside air pressure information, and the detected value dataC is a detected value of outside air temperature information, as an example. A threshold XA for the detected value dataA is the threshold X1 in the column of threshold X* for the altitude information in the priority information 87, a threshold YA for the detected value dataA is the threshold Y1 in the column of threshold Y* for the altitude information in the priority information 87. A threshold XB for the detected value dataB is the threshold X2 in the column of threshold X* for the outside air pressure information in the priority information 87, and a threshold YB for the detected value dataB is the threshold Y2 in the column of threshold Y* for the outside air pressure information in the priority information 87. A threshold XC for the detected value dataC is the threshold X4 in the column of threshold X* for the outside air temperature information in the priority information 87, and a threshold YC for the detected value dataC is the threshold Y4 in the column of threshold Y* for the outside air temperature information in the priority information 87.

In the priority information 87 shown in FIG. 63, three environmental factors, i.e., three kinds of environmental information, are selected in accordance with priority numbers indicating the priority ranks. The highest priority is the altitude information, the second highest priority is the outside air pressure information, and the third highest priority is the outside air temperature information. Judgments for the highest priority are step ST22 and step ST26. Judgments for the second highest priority are step ST24 and step ST27, and judgments for the third highest priority are step ST25 and step ST28. In the priority information 87, "*" of the threshold X* and the threshold Y* is a sign to be replaced with A, B, C, etc. in accordance with priorities. In judgment for each priority, ">" or "<" is selected in accordance with the information type shown in FIG. 12. In the case of the altitude information which is an example in which the information type is upward convex, whether the detected value dataA>the threshold XA is judged in a judgment step for changing to the bypass mode which is the first operation mode Md1, i.e., step ST22, and whether the detected value dataA<the threshold YA is judged in a judgment step for changing to the boost mode which is the second operation mode Md2, i.e., step ST26. In the case of the outside air pressure information which is an example in which the information type is downward convex, whether the detected value dataB<the threshold XB is judged in a judgment step for changing to the bypass mode which is the first operation mode Md1, i.e., step ST24, and whether the detected value dataB>the threshold YB is judged in a judgment step for changing to the boost mode which is the second operation mode Md2, i.e., step ST27. In the case of the outside air temperature information, the information type is downward convex, and therefore ">" and "<" are selected in the same manner as for the outside air pressure information.

First, the outline of the processing flow in FIG. 62 will be described. In a case where the present operation mode is the second operation mode Md2 (boost mode), i.e., in a case where the judgement result in step ST21 is YES, operation mode change judgement is performed from a high-order step. Then, if the judgment criterion in the high-order step is satisfied, judgment in a low-order step, i.e., judgment for the remaining factor is omitted and the operation mode is shifted to the first operation mode Md1 (bypass mode). On the other hand, in a case where the present operation mode is the first operation mode Md1 (bypass mode), i.e., in a case where the judgment result in step ST21 is NO, operation mode change judgements are performed, and if judgment criteria for all factors for shifting to the second operation mode Md2 (boost mode) are satisfied, the operation mode is shifted to the second operation mode Md2 (boost mode). In FIG. 64, the altitude information is set as a factor having the highest priority, the outside air pressure information is set as a factor having the second highest priority, and the outside air temperature information is set as a factor having the lowest priority.

In step ST21, whether or not the chopper 3 is in the boost mode (second operation mode Md2) is judged. In step ST21, if it is judged that the chopper 3 is in the boost mode, the process proceeds to step ST22, and if it is judged that the chopper 3 is not in the boost mode, the process proceeds to step ST26. In step ST22, if the detected value dataA of the detected environmental information having the highest priority is greater than the threshold XA, i.e., if the operation mode change judgment criterion is satisfied, the process proceeds to step ST23, and if the detected value dataA of the detected environmental information is not greater than the threshold XA, i.e., if the operation mode change judgment criterion is not satisfied, the process proceeds to step ST24. In step ST24, if the detected value dataB of the detected environmental information having the second highest priority is smaller than the threshold XB, i.e., if the operation mode change judgment criterion is satisfied, the process proceeds to step ST23, and if the detected value dataB of the detected environmental information is not smaller than the threshold XB, i.e., if the operation mode change judgment criterion is not satisfied, the process proceeds to step ST25. In step ST25, if the detected value dataC of the detected environmental information having the third highest priority is smaller than the threshold XC, i.e., if the operation mode change judgment criterion is satisfied, the process proceeds to step ST23, and if the detected value dataC of the detected environmental information is not smaller than the threshold XC, i.e., if the operation mode change judgment criterion is not satisfied, the operation mode signal msig is kept in the boost mode and the process is ended. In step ST23, the operation mode signal msig is changed to the bypass mode and the process is ended.

In step ST26, if the detected value dataA of the detected environmental information having the highest priority is smaller than the threshold YA, i.e., if the operation mode change judgment criterion is satisfied, the process proceeds to step ST27, and if the detected value dataA of the detected environmental information is not smaller than the threshold YA, i.e., if the operation mode change judgment criterion is not satisfied, the operation mode signal msig is kept in the bypass mode and the process is ended. In step ST27, if the detected value dataB of the detected environmental information having the second highest priority is greater than the threshold YB, i.e., if the operation mode change judgment criterion is satisfied, the process proceeds to step ST28, and if the detected value dataB of the detected environmental information is not greater than the threshold YB, i.e., if the operation mode change judgment criterion is not satisfied, the operation mode signal msig is kept in the bypass mode and the process is ended. In step ST28, if the detected value dataC of the detected environmental information having the third highest priority is greater than the threshold YC, i.e., if the operation mode change judgment criterion is satisfied, the process proceeds to step ST29, and if the detected value dataC of the detected environmental information is not greater than the threshold YC, i.e., if the operation mode change judgment criterion is not satisfied, the operation mode signal msig is kept in the bypass mode and the process is ended. In step ST29, the operation mode signal msig is changed to the boost mode and the process is ended.

In the above description, the example in which the environmental factors, the thresholds, and the priority ranks to be used for operation mode change judgement have been set in advance in product shipping, has been shown as the first example of the motor control device 100. However, at the time of flight of the aircraft or the like, the pilot may change the environmental factors, the thresholds, and the priority ranks to be used for operation mode change judgement. FIG. 64 shows the motor control device 100 configured such that the pilot is allowed to change the environmental factors, the thresholds, and the priority ranks to be used for operation mode change judgement. The motor control device 100 in a second example shown in FIG. 64 is different from the motor control device 100 in the first example shown in FIG. 61 in that the display 34 is provided for displaying environmental information detected by the environmental information detection sensor 35, and the like, and the operating panel 23 includes a priority selector 86. The display 34 is connected to the control device 11 via the signal line 89. In FIG. 64, the altitude indication 36a, the motor output indication 36b, the outside air pressure indication 36c, the air component concentration indication 36d, the outside air temperature indication 36e, the radiation dose indication 36f, and a priority information indication 36l are displayed as an example. The priority information indication 36l indicates, for example, the contents in the column of environmental information and the column of priority in the priority information 87. When the pilot inputs a priority number on the priority selector 86, the number is displayed on the column of priority. In the case where the priorities are set as shown in FIG. 63, operation mode change judgements are sequentially performed for the altitude information, the outside air pressure information, and the outside air temperature information in this order.

In the motor control device 100 of embodiment 10, as in the motor control devices 100 of embodiments 1 to 6, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 10 is improved in reliability of the entire device. Further, in the motor control device 100 of embodiment 10, since two or more kinds of factors among environmental factors are used for judgment for operation mode change of the chopper 3, reliability is more improved than in the motor control devices 100 of embodiments 1 to 6.

In the above description, the example in which change of the chopper 3 between the first operation mode Md1 and the second operation mode Md2 is performed with priorities set for information of environmental factors as in the motor control devices 100 of embodiments 1 to 6, has been shown. However, the present disclosure is not limited thereto. Change of the chopper 3 between the first operation mode Md1 and the second operation mode Md2 may be performed with priorities set for information of motor parameters, i.e., motor parameter commands, motor parameter detected information, or motor parameter estimated information. Alternatively, change of the chopper 3 between the first operation mode Md1 and the second operation mode Md2 may be performed with priorities set for information of environmental factors and information of motor parameters.

As described above, the motor control device 100 of embodiment 10 includes the power source device 90, the power supply device (inverter 5), and the control device 11. The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). In embodiment 10, on the basis of a plurality of kinds of flight information for which priorities are set, the control device 11 controls the DC-output power conversion device (chopper 3) in the first operation mode Md1 when a first condition is satisfied, the control device 11 controls the DC-output power conversion device (chopper 3) in the second operation mode Md2 when the first condition is not satisfied, the control device 11 controls the DC-output power conversion device (chopper 3) in the second operation mode Md2 when a second condition is satisfied, and the control device 11 controls the DC-output power conversion device (chopper 3) in the first operation mode Md1 when the second condition is not satisfied. The flight information is information of environmental factors (environmental detected information sigev) relevant to the flight altitude of the flying object. The first condition is that, in a state in which the DC-output power conversion device (chopper 3) is controlled in the second operation mode Md2, whether or not each information value (detected value dataA, dataB, dataC) based on the flight information has passed through the first flight information threshold (threshold X*) is judged in accordance with the priority, and the information value (detected value dataA, dataB, dataC) based on the flight information corresponding to a selected priority has passed through the first flight information threshold (threshold X*). The second condition is that, in a state in which the DC-output power conversion device (chopper 3) is controlled in the first operation mode Md1, whether or not each information value (detected value dataA, dataB, dataC) based on the flight information has passed through the second flight information threshold (threshold Y*) is judged in accordance with the priority, and the information values (detected values dataA, dataB, dataC) based on all kinds of the flight information for which the priorities are set have passed through the respective second flight information thresholds (thresholds Y*). With this configuration, in the motor control device 100 of embodiment 10, while the DC-output power conversion device (chopper 3) is controlled in the second operation mode Md2, when the flight information is judged to satisfy the predetermined condition, i.e., the first condition or is judged not to satisfy the second condition, the DC-output power conversion device (chopper 3) is controlled in the first operation mode Md1. Thus, even in a case of operating at a high altitude where the cosmic ray dose is high, reliability of the motor control device is improved.

Embodiment 11

Figure 65:
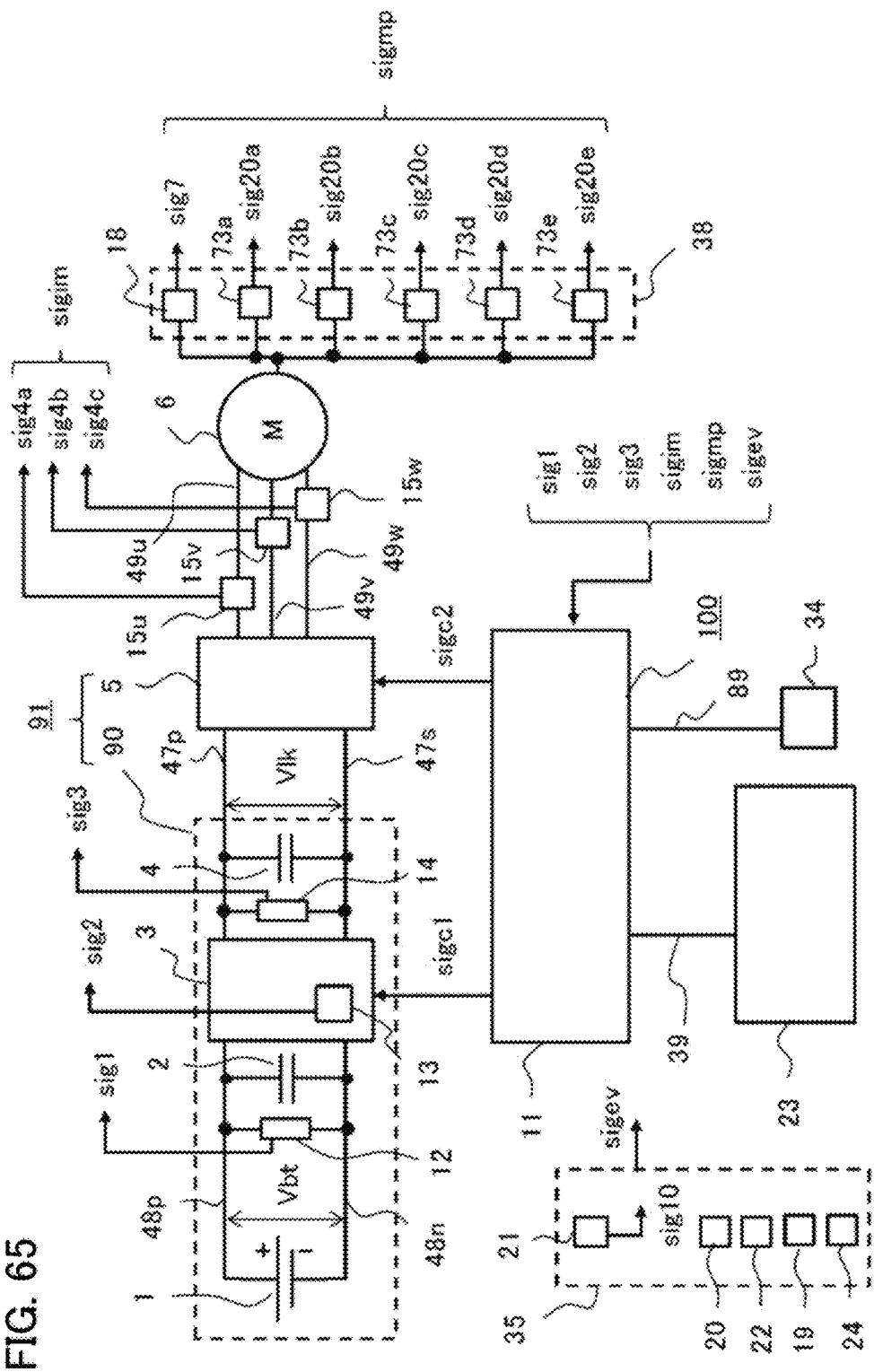
FIG. 65 shows the configuration of a motor control device according to embodiment 11.
Figure 66:
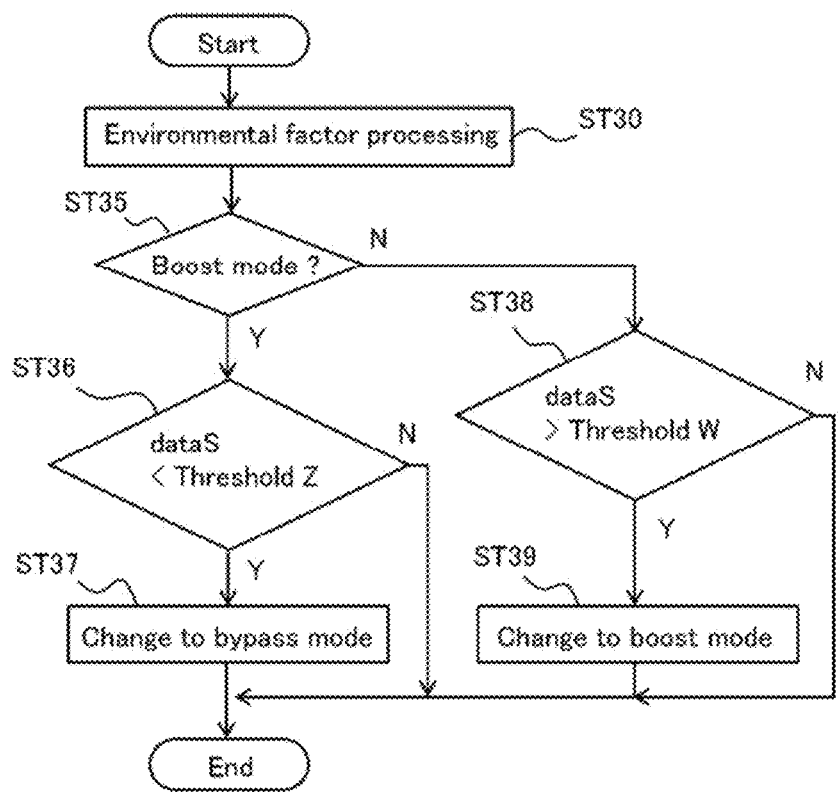
FIG. 66 shows a flowchart in a first example for explaining operation of an operation mode judgment unit in FIG. 65.
Figure 67:
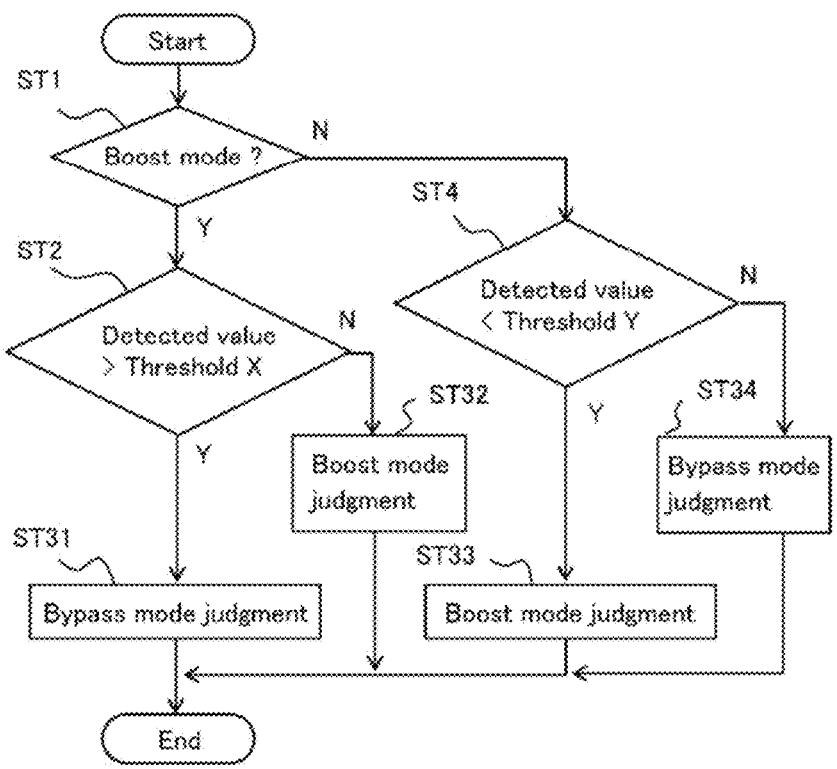
FIG. 67 shows a flowchart in a first example of environmental factor processing in FIG. 66.
Figure 68:
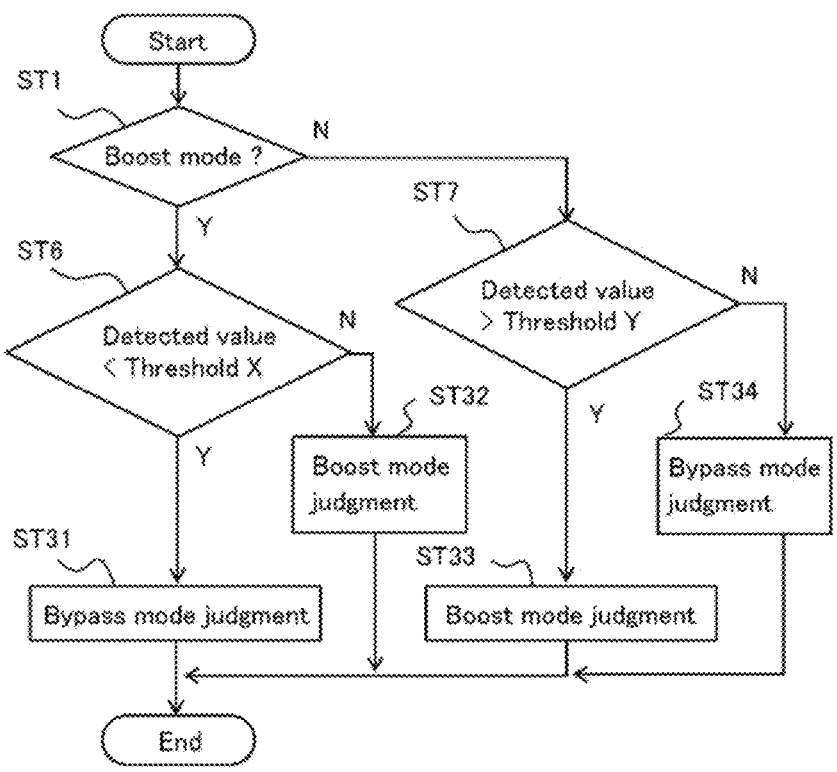
FIG. 68 shows a flowchart in a second example of environmental factor processing in FIG. 66.
Figure 69:
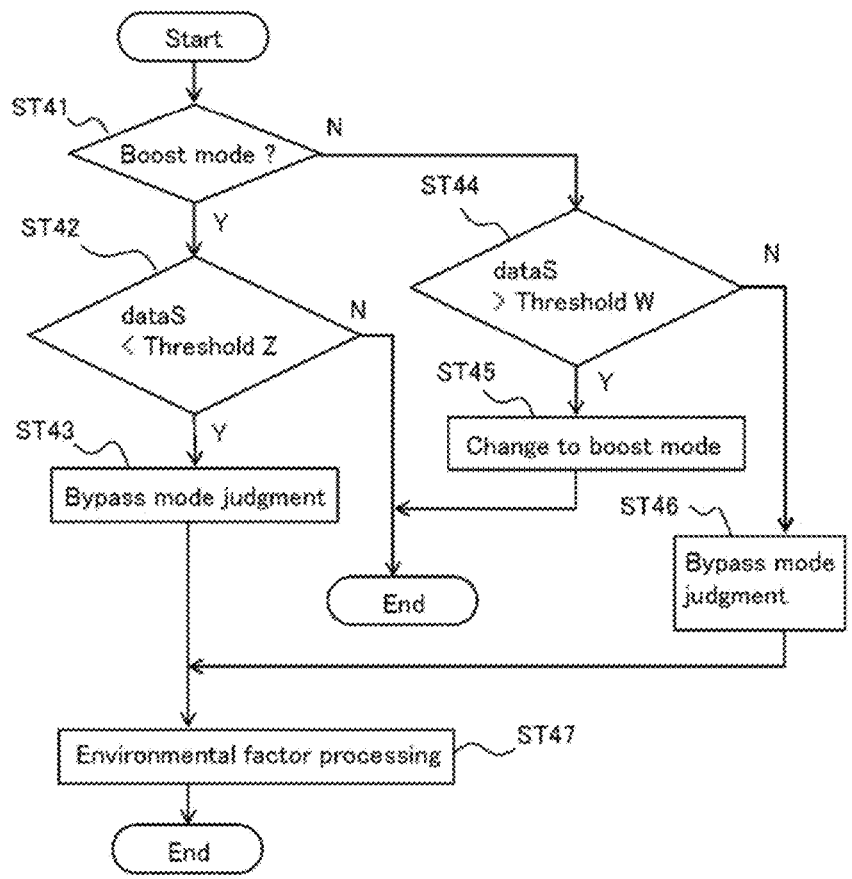
FIG. 69 shows a flowchart in a second example for explaining operation of the operation mode judgment unit in FIG. 65.

FIG. 65 shows the configuration of a motor control device according to embodiment 11, and FIG. 66 shows a flowchart in a first example for explaining operation of an operation mode judgment unit in FIG. 65. FIG. 67 shows a flowchart in a first example of environmental factor processing in FIG. 66, and FIG. 68 shows a flowchart in a second example of environmental factor processing in FIG. 66. FIG. 69 shows a flowchart in a second example for explaining operation of the operation mode judgment unit in FIG. 65. In the motor control device 100 of embodiment 11, the operation mode of the chopper 3 is changed using two kinds of information, i.e., information of environmental factors relevant to the flight altitude shown in embodiments 1 to 6 and information of motor parameters shown in embodiment 7. The motor control device 100 shown in FIG. 65 is configured such that the display 34 is added to the motor control device 100 in FIG. 42, as an example. In FIG. 65, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. The control device 11 includes the control signal generation unit 68a as in the control devices 11 of embodiments 1 to 7. In a case where the motor parameter commands in the first example of embodiment 7 are used as information of the motor parameters, the control device 11 includes the motor parameter command sensor 70 as in the control device 11 shown in FIG. 32. In a case where estimated information of the motor parameters in the third example of embodiment 7 are used as information of the motor parameters, the control device 11 includes the observer 64 as in the control device 11 shown in FIG. 48.

With reference to FIG. 66 to FIG. 68, the flowcharts in the first example for explaining operation of the operation mode judgment unit 60 of embodiment 11 will be described. In the operation mode judgment unit 60 in the first example of embodiment 11, judgment processing using information of the motor parameter is performed after execution of environmental factor processing in step ST30. The environmental factor processing in step ST30 is first operation mode judgment processing, and the judgment processing using information of the motor parameter is second operation mode judgment processing. In the environmental factor processing, the flowchart shown in FIG. 67, the flowchart shown in FIG. 68, or the like is executed. The flowchart shown in FIG. 67 corresponds to FIG. 13 described in embodiment 1, and the flowchart shown in FIG. 68 corresponds to FIG. 14 described in embodiment 1. The flowchart shown in FIG. 67 is different from the flowchart in FIG. 13 in that steps ST3 and ST5 are respectively replaced with steps ST31 and ST33, and steps ST32 and ST34 are added. The steps ST31 to ST34 which have not been described above will be mainly described. In step ST2, if the detected value of the detected environmental information is greater than the threshold X, i.e., if the operation mode change judgment criterion is satisfied, the process proceeds to step ST31, and if the detected value of the detected environmental information is not greater than the threshold X, i.e., if the operation mode change judgment criterion is not satisfied, the process proceeds to step ST32. In step ST31, a result of operation mode judgment is determined as bypass mode judgment, i.e., first operation mode judgment. In step ST32, a result of operation mode judgment is determined as boost mode judgment, i.e., second operation mode judgment. In step ST4, if the detected value of the detected environmental information is smaller than the threshold Y, i.e., if the operation mode change judgment criterion is satisfied, the process proceeds to step ST33, and if the detected value of the detected environmental information is not smaller than the threshold Y, i.e., if the operation mode change judgment criterion is not satisfied, the process proceeds to step ST34. In step ST33, a result of operation mode judgment is determined as boost mode judgment, i.e., second operation mode judgment. In step ST34, a result of operation mode judgment is determined as bypass mode judgment, i.e., first operation mode judgment.

The flowchart shown in FIG. 68 is different from the flowchart in FIG. 14 in that steps ST3 and ST5 are respectively replaced with steps ST31 and ST33, and steps ST32 and ST34 are added. The steps ST31 to ST34 which have not been described above will be mainly described. In step ST6, if the detected value of the detected environmental information is smaller than the threshold X, i.e., if the operation mode change judgment criterion is satisfied, the process proceeds to step ST31, and if the detected value of the detected environmental information is not smaller than the threshold X, i.e., if the operation mode change judgment criterion is not satisfied, the process proceeds to step ST32. In step ST31, a result of operation mode judgment is determined as bypass mode judgment, i.e., first operation mode judgment. In step ST32, a result of operation mode judgment is determined as boost mode judgment, i.e., second operation mode judgment. In step ST7, if the detected value of the detected environmental information is greater than the threshold Y, i.e., if the operation mode change judgment criterion is satisfied, the process proceeds to step ST33, and if the detected value of the detected environmental information is not greater than the threshold Y, i.e., if the operation mode change judgment criterion is not satisfied, the process proceeds to step ST34. In step ST33, a result of operation mode judgment is determined as boost mode judgment, i.e., second operation mode judgment. In step ST34, a result of operation mode judgment is determined as bypass mode judgment, i.e., first operation mode judgment.

Steps ST35 to ST39 correspond to any of the flowchart in the first example shown in FIG. 41, the flowchart in the second example shown in FIG. 47, and the flowchart in the third example shown in FIG. 54, described in embodiment 7. A motor parameter information value dataS in steps ST36 and ST38 is different among the first example, the second example, and the third example of embodiment 7. In the case of the first example of embodiment 7, the motor parameter information value dataS is a command value for the motor parameter, and the thresholds Z and W are the thresholds Za and Wa, respectively. In the case of the second example of embodiment 7, the motor parameter information value dataS is a detected value of the motor parameter, and the thresholds Z and W are the thresholds Zb and Wb, respectively. In the case of the third example of embodiment 7, the motor parameter information value dataS is an estimated value of the motor parameter, and the thresholds Z and W are the thresholds Zc and Wc, respectively.

In step ST35, whether or not the judgment result in step ST30 is the boost mode (second operation mode) is judged. In step ST35, if it is judged that the judgment result in step ST30 is the boost mode, the process proceeds to step ST36, and if it is judged that the judgment result in step ST30 is not the boost mode, the process proceeds to step ST38. In step ST36, if the motor parameter information value dataS is smaller than the threshold Z, i.e., if the operation mode change judgment criterion is satisfied, the process proceeds to step ST37, and if the motor parameter information value dataS is not smaller than the threshold Z, i.e., if the operation mode change judgment criterion is not satisfied, the operation mode signal msig is kept in the boost mode and the process is ended. In step ST37, the operation mode signal msig is changed to the bypass mode and the process is ended. In step ST38, if the motor parameter information value dataS is greater than the threshold W, i.e., if the operation mode change judgment criterion is satisfied, the process proceeds to step ST39, and if the motor parameter information value dataS is not greater than the threshold W, i.e., if the operation mode change judgment criterion is not satisfied, the operation mode signal msig is kept in the bypass mode and the process is ended. In step ST39, the operation mode signal msig is changed to the boost mode and the process is ended. In this example, whether or not the judgment result in step ST30 is the boost mode is judged in step ST35. However, as shown in FIG. 15 and FIG. 16, in step ST35 which is the first step, whether or not the judgment result in step ST30 is the bypass mode may be judged. In step ST35, if it is judged that the judgment result in step ST30 is the bypass mode, the process proceeds to step ST38, and if it is judged that the judgment result in step ST30 is not the bypass mode, the process proceeds to step ST36.

In the environmental factor processing in step ST30, the example in which the first operation mode judgment processing is performed using one environmental factor, i.e., one kind of environmental information, has been shown. However, the first operation mode judgment processing may be performed using a plurality of environmental factors, i.e., a plurality of kinds of environmental information, described in embodiment 10. For the aircraft, satisfying the control command such as the required motor output command is important in performing flight control, and thus information of the motor parameter is more important than information of the environmental factor. Therefore, the operation mode judgment processing using information of the motor parameter may be performed prior to the operation mode judgment processing using information of the environmental factor. In this case, after the operation mode judgment processing using information of the motor parameter is performed, the operation mode judgment processing using information of the environmental factor is performed, and then operation mode judgment is finally determined. In the operation mode judgment processing using information of the motor parameter, if the judgment result is the boost mode, the operation mode judgment processing using information of the environmental factor may be skipped. This example is shown in the flowchart in the second example in FIG. 69. The flowchart in the second example in FIG. 69 shows operation of the operation mode judgment unit 60 in the second example of embodiment 11. In the operation mode judgment unit 60 in the second example of embodiment 11, judgment processing using information of the motor parameter is performed, and if bypass mode judgment, i.e., first operation mode judgment is made in the judgment processing using information of the motor parameter, environmental factor processing in step ST47 is executed.

Steps ST41, ST42, ST44 in FIG. 69 are respectively the same as steps ST35, ST36, ST38 in FIG. 66. In step ST41, whether or not the chopper 3 is in the boost mode (second operation mode Md2) is judged. In step ST41, if it is judged that the chopper 3 is in the boost mode, the process proceeds to step ST42, and if it is judged that the chopper 3 is not in the boost mode, the process proceeds to step ST44. In step ST42, if the motor parameter information value dataS is smaller than the threshold Z, i.e., if the operation mode change judgment criterion is satisfied, the process proceeds to step ST43, and if the motor parameter information value dataS is not smaller than the threshold Z, i.e., if the operation mode change judgment criterion is not satisfied, the operation mode signal msig is kept in the boost mode and the process is ended. In step ST43, a result of operation mode judgment is determined as bypass mode judgment, i.e., first operation mode judgment, and the process proceeds to step ST47. In step ST44, if the motor parameter information value dataS is greater than the threshold W, i.e., if the operation mode change judgment criterion is satisfied, the process proceeds to step ST45, and if the motor parameter information value dataS is not greater than the threshold W, i.e., if the operation mode change judgment criterion is not satisfied, the process proceeds to step ST46. In step ST45, the operation mode signal msig is changed to the boost mode and the process is ended. In step ST46, a result of operation mode judgment is determined as bypass mode judgment, i.e., first operation mode judgment, and the process proceeds to step ST47.

In the environmental factor processing in step ST47, the flowchart shown in FIG. 13, the flowchart shown in FIG. 14, or the like is executed. The flowchart shown in FIG. 13 and the flowchart shown in FIG. 14 have been already described in embodiment 1, and therefore the description thereof is not repeated. It is noted that, since the environmental factor processing in step ST47 is executed in the case where bypass mode judgment, i.e., first operation mode judgment has been made, a processing flow including only steps ST4 and ST5 or a processing flow including only steps ST7 and ST5 may be performed. In a case where the operation mode change judgment criterion is not satisfied in step ST42, judgement opposite to step ST43 may be made, to determine boost mode judgment, i.e., second operation mode judgment, and then, the operation mode signal msig may be kept in the boost mode and the process may be ended. In the processing in step ST45, boost mode judgment, i.e., second operation mode judgment may be made, and then the operation mode signal msig may be changed to the boost mode and the process may be ended.

In the motor control device 100 of embodiment 11, as in the motor control device 100 shown in embodiment 9, operation mode change of the chopper 3 may be automatically performed in a case where operation mode change permission is given by the pilot. In this case, as the control device 11 and the operating panel 23, those shown in FIG. 58 are used. In this case, as in the motor control device 100 of embodiment 9, even if some of the plurality of environmental information detection sensors 35 and the plurality of motor parameter sensors 38 have failed or the display 34 has failed, it is possible to change the operation mode of the chopper 3 as appropriate through determination by the pilot, and thus, it is possible to restore the motor output even when the motor output or the like has become insufficient unexpectedly.

In the motor control device 100 of embodiment 11, as in the motor control devices 100 of embodiments 1 to 7, 9, and 10, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 11 is improved in reliability of the entire device. Further, in the motor control device 100 including the operation mode judgment unit 60 in the first example of embodiment 11, i.e., in the motor control device 100 in the first example of embodiment 11, final judgment for operation mode change of the chopper 3 and the corresponding control are performed on the basis of information of the motor parameter. Therefore, it is possible to respond to sudden request for changing the motor parameter such as the output of the motor 6 during operation at a high altitude. The motor control device 100 including the operation mode judgment unit 60 in the second example of embodiment 11, i.e., the motor control device 100 in the second example of embodiment 11 is configured such that, if boost mode judgment, i.e., second operation mode judgment is made in the judgment processing using information of the motor parameter, the operation mode is changed to the boost mode or kept in the boost mode and the process is ended, and if bypass mode judgment, i.e., first operation mode judgment is made in the judgment processing using information of the motor parameter, environmental factor processing is executed. Therefore, it is possible to respond to sudden request for changing the motor parameter such as the output of the motor 6 during operation at a high altitude.

As described above, the motor control device 100 of embodiment 11 controls the motor 6 of the flying object that takes off from the ground and flies. The motor control device 100 includes the power source device 90 which outputs DC power, the power supply device (inverter 5) which converts DC power to AC power and outputs the AC power to the motor 6, and the control device 11 for controlling the power source device 90 and the power supply device (inverter 5). The power source device 90 includes a power source (battery 1), a DC-output power conversion device (chopper 3) which converts output of the power source (battery 1) to DC power, and an output capacitor (capacitor 4) for smoothing output voltage (DC-link voltage Vlk) of the DC-output power conversion device (chopper 3). The DC-output power conversion device (chopper 3) has the first operation mode Md1 for outputting the first voltage (battery voltage Vbt) and the second operation mode Md2 for outputting the second voltage (boost voltage Va) higher than the first voltage (battery voltage Vbt). When the flying object takes off from the ground, the control device 11 controls the DC-output power conversion device (chopper 3) in the second operation mode Md2, and when the control device 11 judges that flight information which is both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object satisfies a predetermined condition, the control device 11 controls the DC-output power conversion device (chopper 3) in the first operation mode Md1. With this configuration, in the motor control device 100 of embodiment 11, while the DC-output power conversion device (chopper 3) is controlled in the second operation mode Md2, when the flight information is judged to satisfy the predetermined condition, the DC-output power conversion device (chopper 3) is controlled in the first operation mode Md1. Thus, even in a case of operating at a high altitude where the cosmic ray dose is high, reliability of the motor control device is improved.

To describe more specifically, the first motor control device 100 of embodiment 11 includes the power source device 90, the power supply device (inverter 5), the first control device 11, and the environmental information detection sensor 35 for detecting information of an environmental factor (environmental detected information sigev). The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). The first control device 11 of embodiment 11 generates a judgment result of environmental second operation mode judgment or environmental first operation mode judgment on the basis of the information of the environmental factor (environmental detected information sigev), as follows. In a state in which the DC-output power conversion device (chopper 3) is controlled in the second operation mode Md2, when the first control device 11 judges that the information value (detected value) based on the information of the environmental factor (environmental detected information sigev) has passed through the first environmental threshold (threshold X), the first control device 11 determines a judgment result as environmental first operation mode judgment, and when the first control device 11 judges that the information value (detected value) based on the information of the environmental factor (environmental detected information sigev) has not passed through the first environmental threshold (threshold X), the first control device 11 determines a judgment result as environmental second operation mode judgment. In embodiment 11, in a state in which the DC-output power conversion device (chopper 3) is controlled in the first operation mode Md1, when the first control device 11 judges that the information value (detected value) based on the information of the environmental factor (environmental detected information sigev) has passed through the second environmental threshold (threshold Y), the first control device 11 determines a judgment result as environmental second operation mode judgment, and when the first control device 11 judges that the information value (detected value) based on the information of the environmental factor information (environmental detected information sigev) has not passed through the second environmental threshold (threshold Y), the first control device 11 determines a judgment result as environmental first operation mode judgment. In embodiment 11, when the judgment result based on the information of the environmental factor (environmental detected information sigev) is environmental second operation mode judgment and the first control device 11 judges that the information value (motor parameter information value dataS) based on the information of the motor parameter (motor parameter command detected information sigmpc, motor parameter detected information sigmp, motor parameter estimated information sigmpe) is smaller than the first parameter threshold (threshold Z) (change condition B11a), the first control device 11 controls the DC-output power conversion device (chopper 3) in the first operation mode Md1. In embodiment 11, when the judgment result based on the information of the environmental factor (environmental detected information sigev) is environmental first operation mode judgment and the first control device 11 judges that the information value (motor parameter information value dataS) based on the information of the motor parameter (motor parameter command detected information sigmpc, motor parameter detected information sigmp, motor parameter estimated information sigmpe) is greater than the second parameter threshold (threshold W) greater than the first parameter threshold (threshold Z), the first control device 11 controls the DC-output power conversion device (chopper 3) in the second operation mode Md2. With this configuration, in the motor control device 100 in the first example of embodiment 11, while the DC-output power conversion device (chopper 3) is controlled in the second operation mode Md2, when the flight information is judged to satisfy the predetermined condition, i.e., the change condition B11a, the DC-output power conversion device (chopper 3) is controlled in the first operation mode Md1. Thus, even in a case of operating at a high altitude where the cosmic ray dose is high, reliability of the motor control device is improved.

The second motor control device 100 of embodiment 11 includes the power source device 90, the power supply device (inverter 5), the second control device 11, and the environmental information detection sensor 35 for detecting information of an environmental factor (environmental detected information sigev). The power source device 90 includes the DC-output power conversion device (chopper 3) having the first operation mode Md1 for outputting the first voltage (battery voltage Vbt) and the second operation mode Md2 for outputting the second voltage (boost voltage Va) higher than the first voltage (battery voltage Vbt). The second control device 11 of embodiment 11 generates a judgment result of internal second operation mode judgment or internal first operation mode judgment on the basis of the information of the motor parameter (motor parameter command detected information sigmpc, motor parameter detected information sigmp, motor parameter estimated information sigmpe), as follows. In a state in which the DC-output power conversion device (chopper 3) is controlled in the second operation mode Md2, when the second control device 11 judges that the information value (motor parameter information value dataS) based on the information of the motor parameter (motor parameter command detected information sigmpc, motor parameter detected information sigmp, motor parameter estimated information sigmpe) is smaller than the first parameter threshold (threshold Z), the second control device 11 determines a judgment result as internal first operation mode judgment, and when the second control device 11 judges that the information value (motor parameter information value dataS) based on the information of the motor parameter (motor parameter command detected information sigmpc, motor parameter detected information sigmp, motor parameter estimated information sigmpe) is not smaller than the first environmental threshold (threshold Z), the second control device 11 determines a judgment result as internal second operation mode judgment. In embodiment 11, in a state in which the DC-output power conversion device (chopper 3) is controlled in the first operation mode Md1, when the second control device 11 judges that the information value (motor parameter information value dataS) based on the information of the motor parameter (motor parameter command detected information sigmpc, motor parameter detected information sigmp, motor parameter estimated information sigmpe) is greater than the second parameter threshold (threshold W) greater than the first parameter threshold (threshold Z), the second control device 11 determines a judgment result as internal second operation mode judgment, and when the second control device 11 judges that the information value (motor parameter information value dataS) based on the information of the motor parameter (motor parameter command detected information sigmpc, motor parameter detected information sigmp, motor parameter estimated information sigmpe) is not greater than the second parameter threshold (threshold W), the second control device 11 determines a judgment result as internal first operation mode judgment. In embodiment 11, when the judgment result based on the information of the motor parameter (motor parameter command detected information sigmpc, motor parameter detected information sigmp, motor parameter estimated information sigmpe) is internal second operation mode judgment, the second control device 11 controls the DC-output power conversion device (chopper 3) in the second operation mode Md2. In embodiment 11, when the judgment result based on the information of the motor parameter (motor parameter command detected information sigmpc, motor parameter detected information sigmp, motor parameter estimated information sigmpe) is internal first operation mode judgment, and in a state in which the DC-output power conversion device (chopper 3) is controlled in the second operation mode, the second control device 11 judges that the information value (detected value) based on the information of the environmental factor (environmental detected information sigev) has passed through the first environmental threshold (threshold X) (change condition B11b), the second control device 11 controls the DC-output power conversion device (chopper 3) in the first operation mode Md1. In embodiment 11, when the judgment result based on the information of the motor parameter (motor parameter command detected information sigmpc, motor parameter detected information sigmp, motor parameter estimated information sigmpe) is internal first operation mode judgment, and in a state in which the DC-output power conversion device (chopper 3) is controlled in the first operation mode Md1, the second control device 11 judges that the information value (detected value) based on the information of the environmental factor (environmental detected information sigev) has passed through the second environmental threshold (threshold Y), the second control device 11 controls the DC-output power conversion device (chopper 3) in the second operation mode Md2. With this configuration, in the motor control device 100 in the second example of embodiment 11, while the DC-output power conversion device (chopper 3) is controlled in the second operation mode Md2, when the flight information is judged to satisfy the predetermined condition, i.e., the change condition B11b, the DC-output power conversion device (chopper 3) is controlled in the first operation mode Md1. Thus, even in a case of operating at a high altitude where the cosmic ray dose is high, reliability of the motor control device is improved.

Embodiment 12

Figure 70:
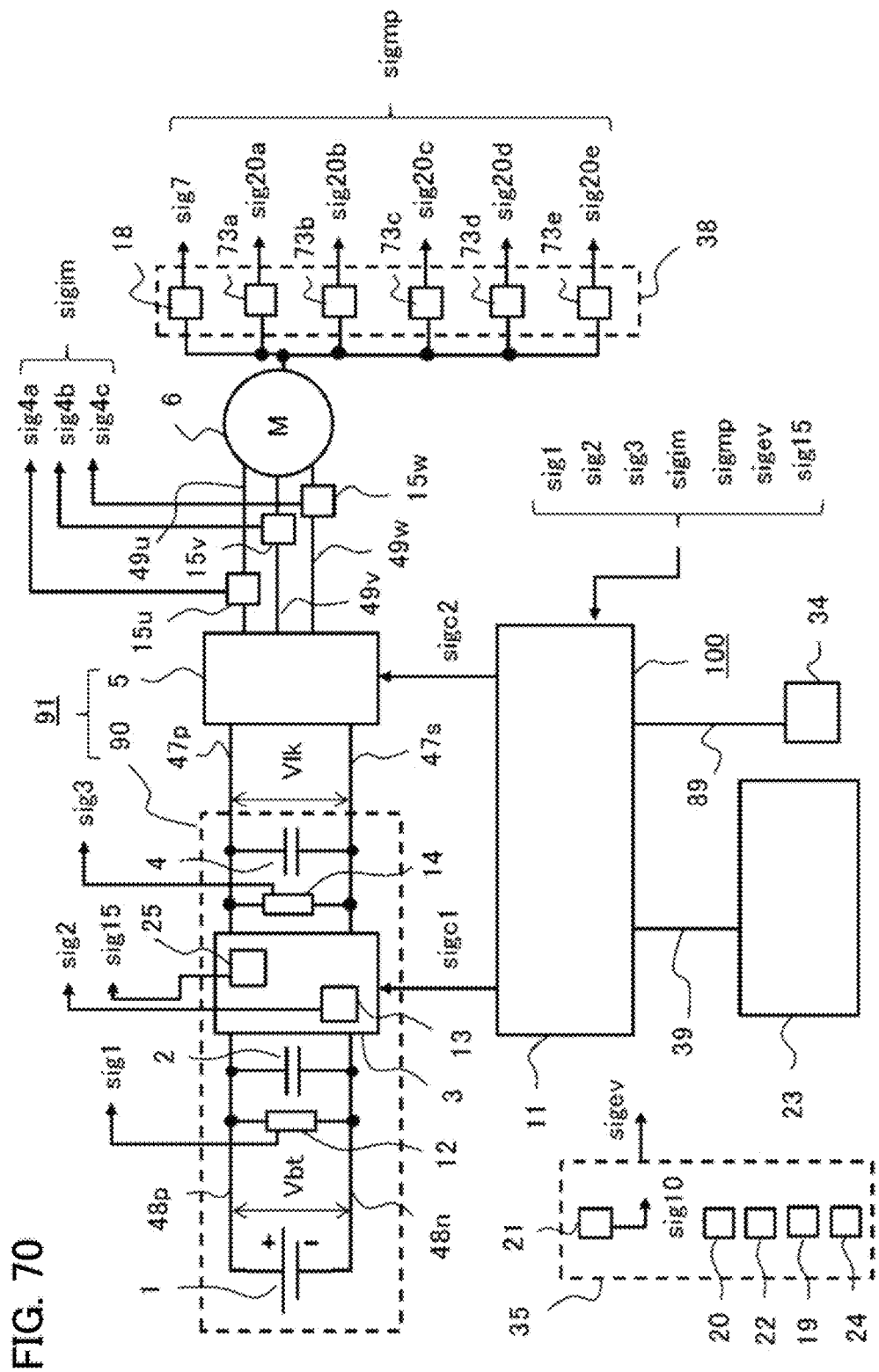
FIG. 70 shows the configuration of a motor control device according to embodiment 12.
Figure 71:
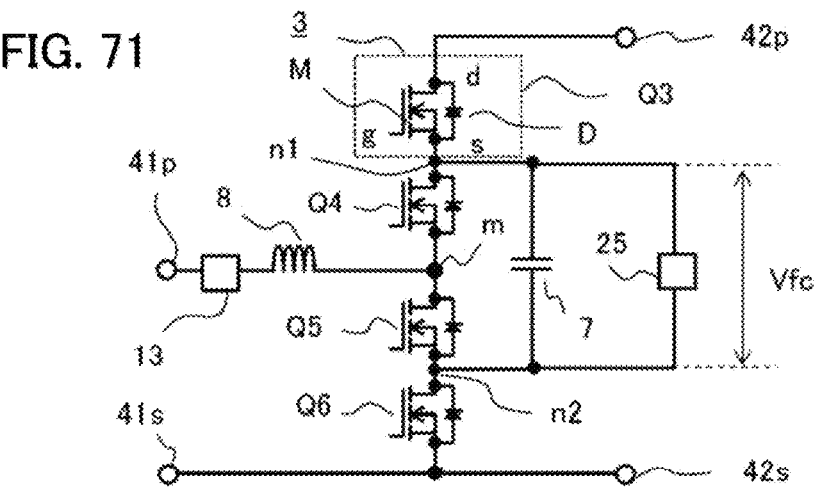
FIG. 71 shows the configuration of a chopper in FIG. 70.
Figure 72:
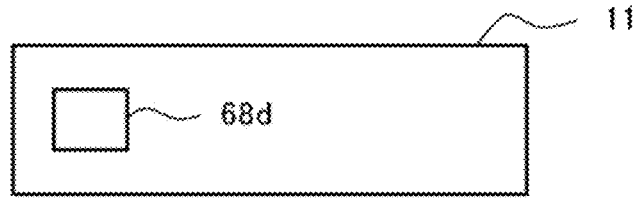
FIG. 72 shows a first example of a control device in FIG. 70.
Figure 73:
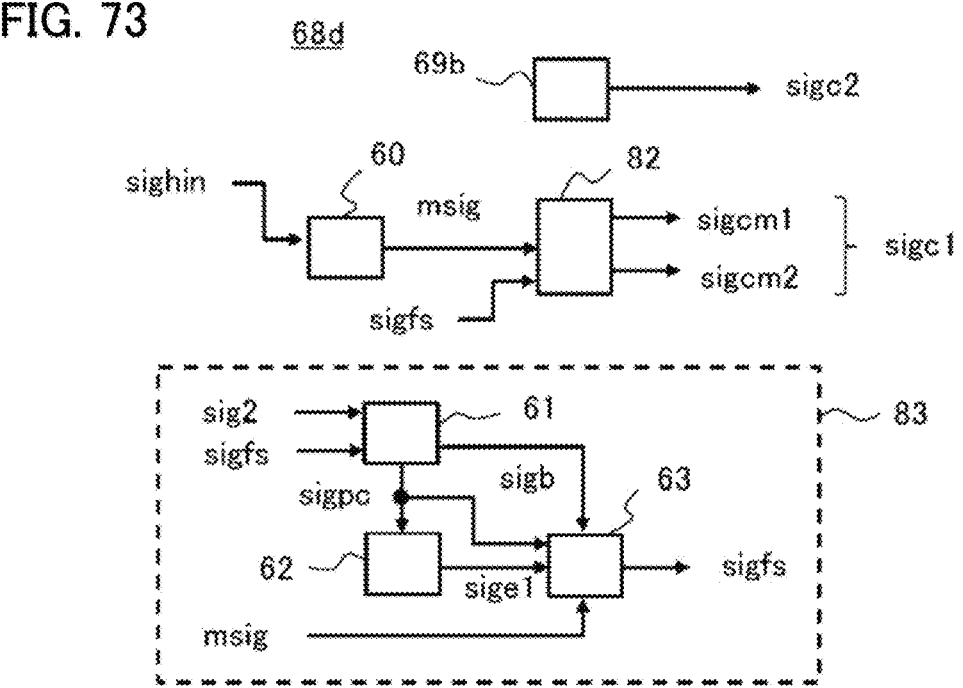
FIG. 73 shows the configuration of a control signal generation unit in FIG. 72.
Figure 74:
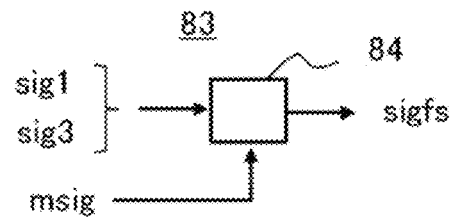
FIG. 74 shows a second example of a switching frequency generation unit in FIG. 73.
Figure 75:
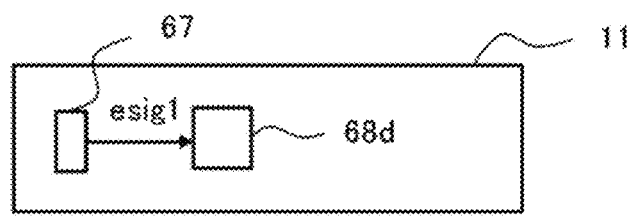
FIG. 75 shows a second example of the control device in FIG. 70.
Figure 76:
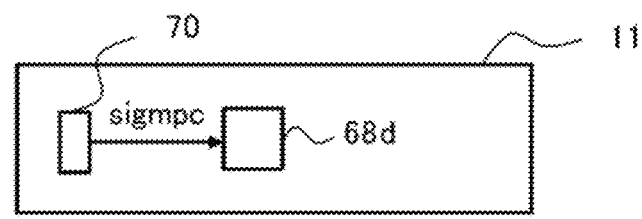
FIG. 76 shows a third example of the control device in FIG. 70.
Figure 77:
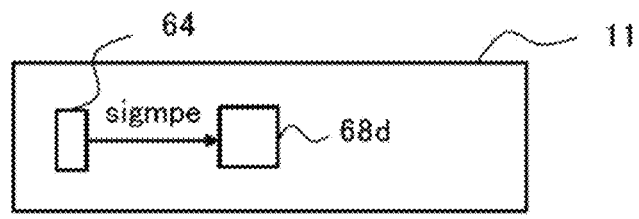
FIG. 77 shows a fourth example of the control device in FIG. 70.
Figure 78:
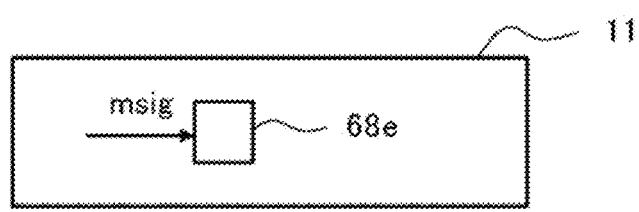
FIG. 78 shows a fifth example of the control device in FIG. 70.
Figure 79:
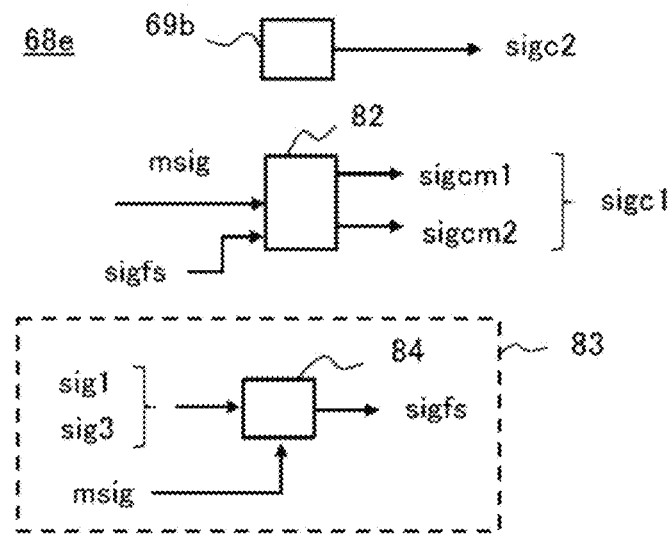
FIG. 79 shows the configuration of a control signal generation unit in FIG. 78.
Figure 80:
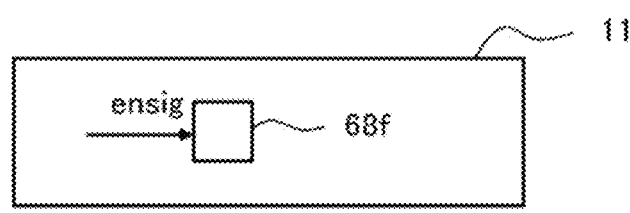
FIG. 80 shows a sixth example of the control device in FIG. 70.
Figure 81:
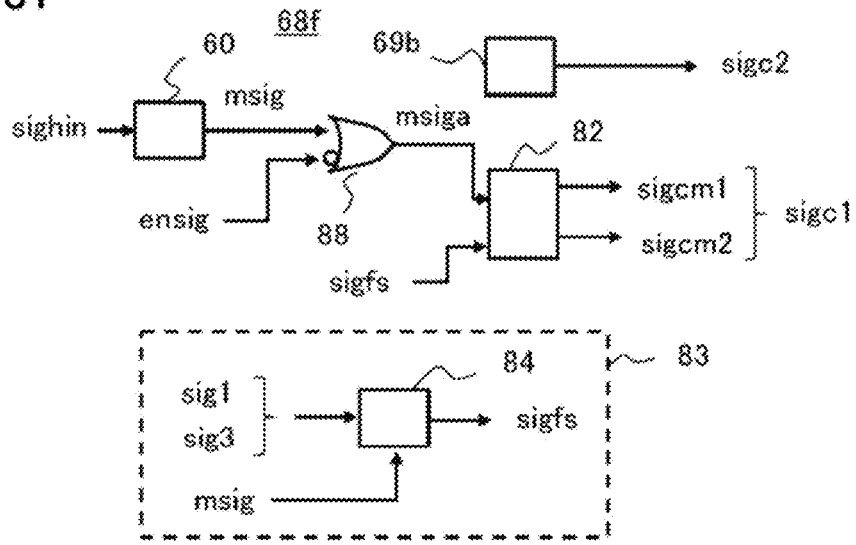
FIG. 81 shows the configuration of a control signal generation unit in FIG. 80.
Figure 82:
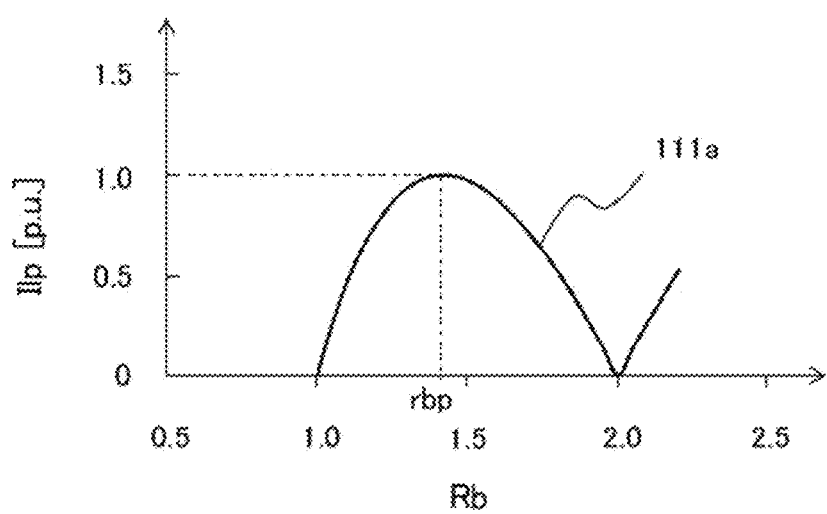
FIG. 82 shows ripple current characteristics at a constant switching frequency.
Figure 83:
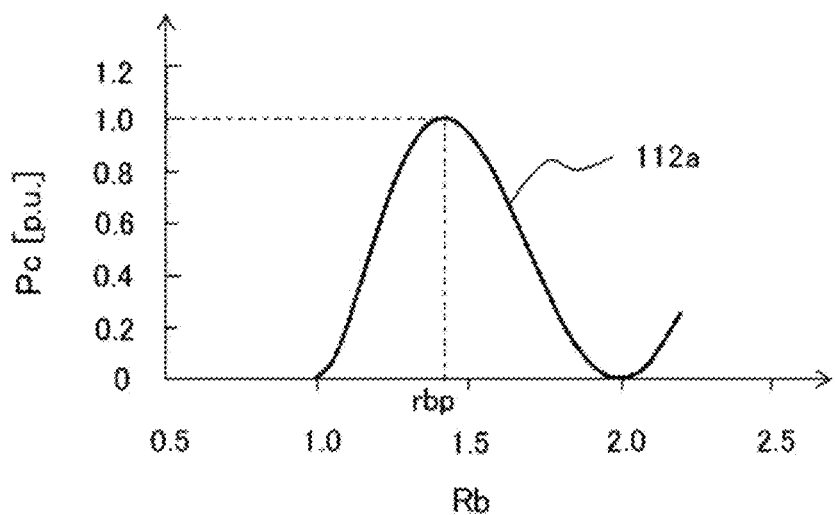
FIG. 83 shows hysteresis loss characteristics at a constant switching frequency.
Figure 84:
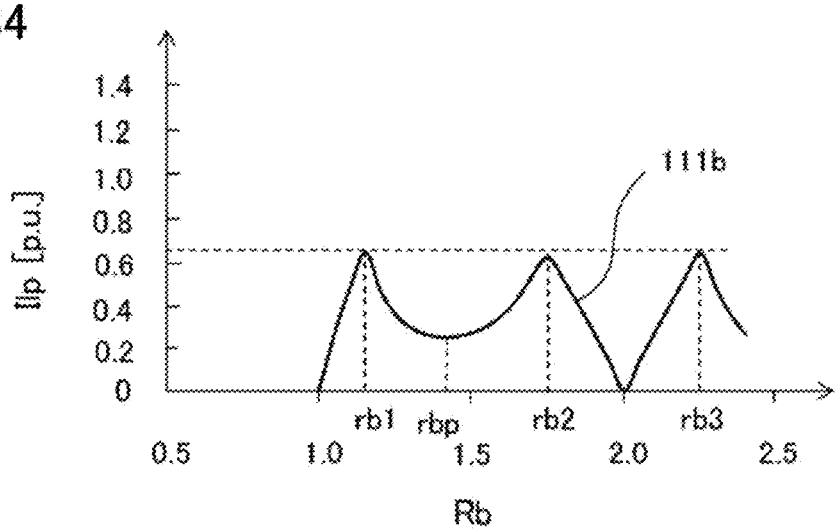
FIG. 84 shows ripple current characteristics in embodiment 12.
Figure 85:
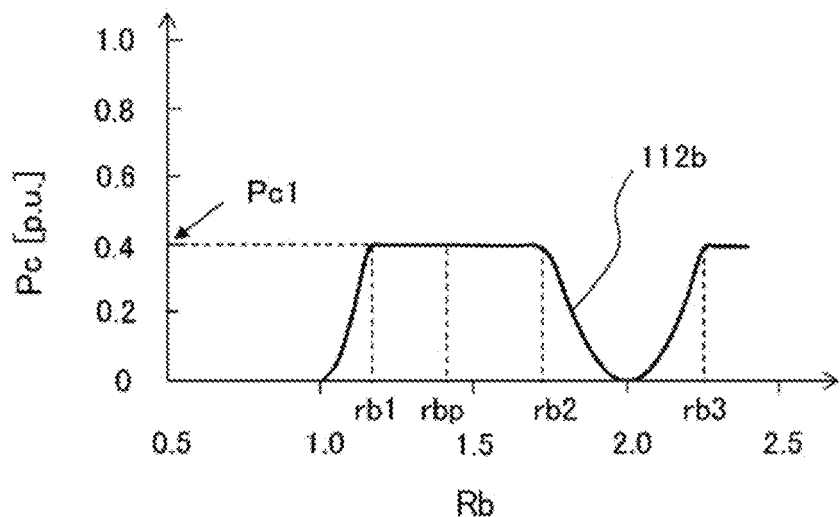
FIG. 85 shows hysteresis loss characteristics in embodiment 12.
Figure 86:
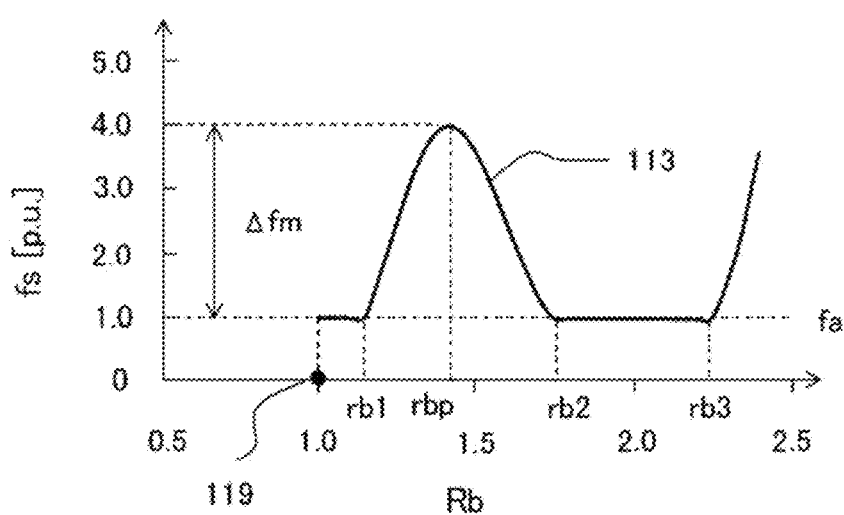
FIG. 86 shows switching frequency characteristics in embodiment 12.
Figure 87:
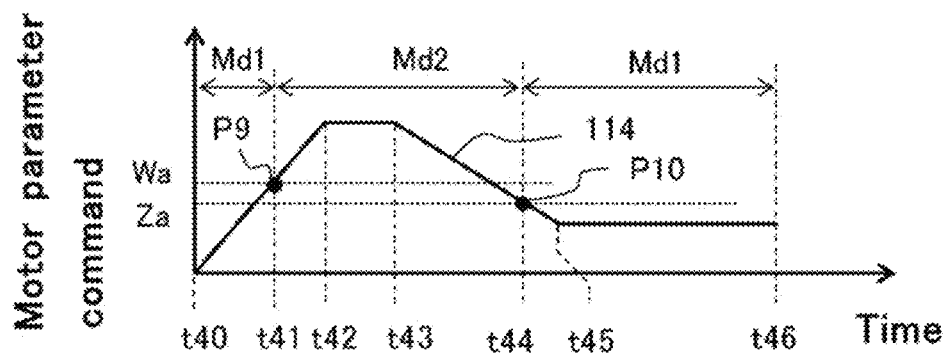
FIG. 87 shows timings in a first example for explaining operation of the motor control device in FIG. 70.
Figure 88:
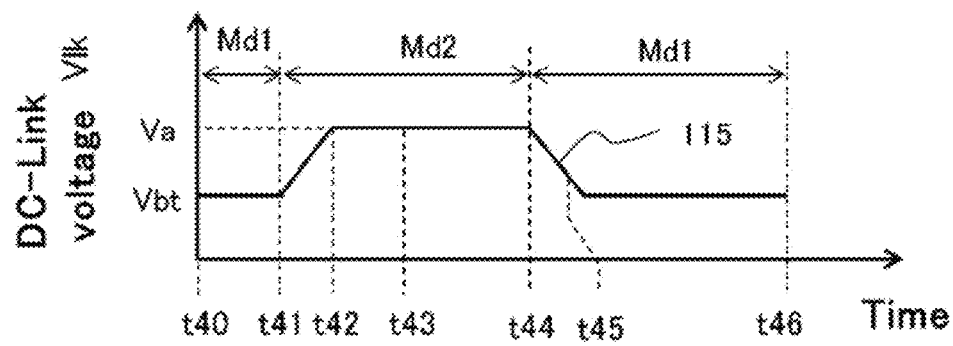
FIG. 88 shows timings in the first example for explaining operation of the motor control device in FIG. 70.
Figure 89:
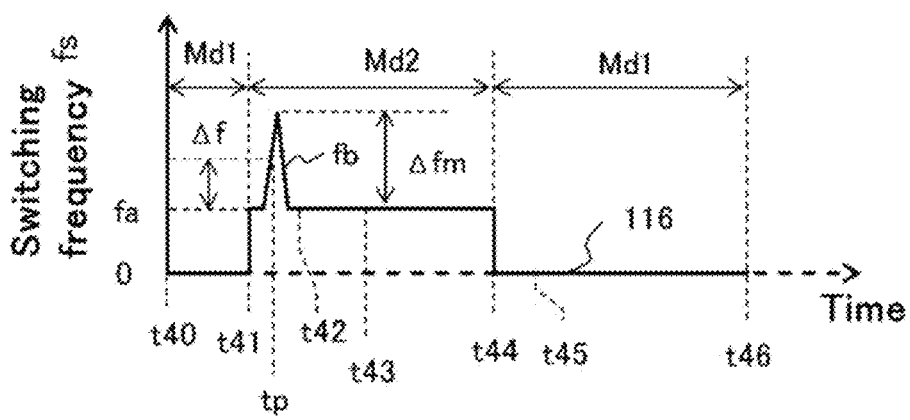
FIG. 89 shows timings in the first example for explaining operation of the motor control device in FIG. 70.
Figure 90:
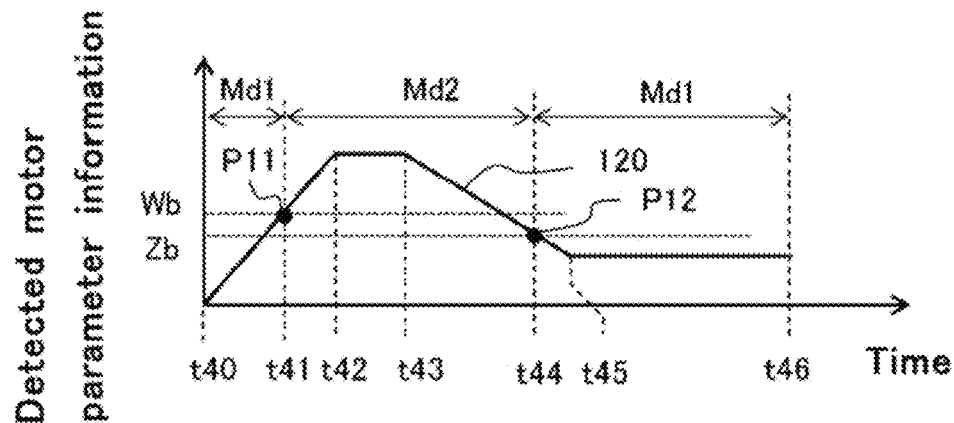
FIG. 90 shows timings in a second example for explaining operation of the motor control device in FIG. 70.
Figure 91:
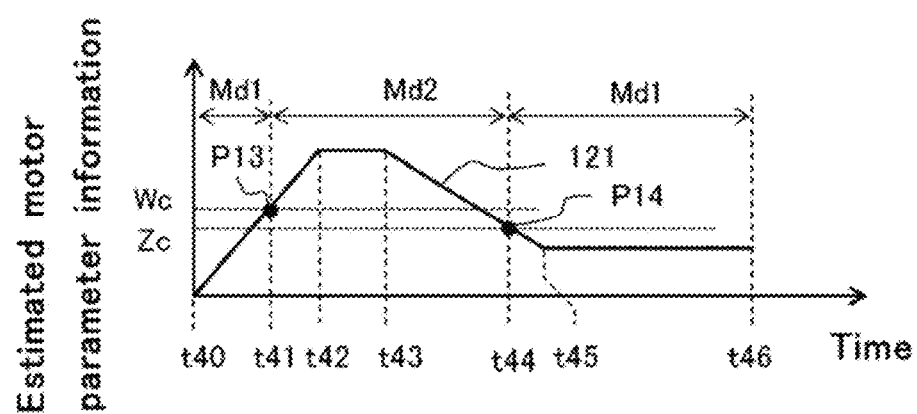
FIG. 91 shows timings in a third example for explaining operation of the motor control device in FIG. 70.

FIG. 70 shows the configuration of a motor control device according to embodiment 12. FIG. 71 shows the configuration of a chopper in FIG. 70, and FIG. 72 shows a first example of a control device in FIG. 70. FIG. 73 shows the configuration of a control signal generation unit in FIG. 72. FIG. 74 shows a second example of a switching frequency generation unit in FIG. 73. FIG. 75 shows a second example of the control device in FIG. 70, FIG. 76 shows a third example of the control device in FIG. 70, and FIG. 77 shows a fourth example of the control device in FIG. 70. FIG. 78 shows a fifth example of the control device in FIG. 70, and FIG. 79 shows the configuration of a control signal generation unit in FIG. 78. FIG. 80 shows a sixth example of the control device in FIG. 70, and FIG. 81 shows the configuration of a control signal generation unit in FIG. 80. FIG. 82 shows ripple current characteristics at a constant switching frequency, and FIG. 83 shows hysteresis loss characteristics at a constant switching frequency. FIG. 84 shows ripple current characteristics in embodiment 12, FIG. 85 shows hysteresis loss characteristics in embodiment 12, and FIG. 86 shows switching frequency characteristics in embodiment 12. FIG. 87, FIG. 88, and FIG. 89 show timings in a first example for explaining operation of the motor control device in FIG. 70. FIG. 90 shows timings in a second example for explaining operation of the motor control device in FIG. 70, and FIG. 91 shows timings in a third example for explaining operation of the motor control device in FIG. 70.

In the motor control device 100 of embodiment 12, the chopper 3 is a multilevel-type chopper and the configuration is made so as to reduce hysteresis loss in the reactor 8. As a method for changing the operation mode of the chopper 3, the operation mode change method described in any of embodiments 1 to 11 may be applied. The motor control device 100 shown in FIG. 70 is different from the motor control device 100 shown in FIG. 65 in that a flying capacitor voltage sensor 25 is provided at the chopper 3, and detected information sig15 outputted from the flying capacitor voltage sensor 25 is inputted to the control device 11.

Additional matters in the motor control device 100 of embodiment 12 will be mainly described. As shown in FIG. 71, the flying capacitor voltage sensor 25 outputs the detected information sig15 which is voltage information of the flying capacitor 7 of the chopper 3, i.e., information of flying capacitor voltage Vfc. Voltage between the connection point n1 and the connection point n2 to which the flying capacitor 7 is connected, is the flying capacitor voltage Vfc. The control device 11 includes any of a control signal generation unit 68d, a control signal generation unit 68e, or a control signal generation unit 68f, depending on the operation mode change method for the chopper 3.

First, a problem of the multilevel-type chopper in a case of being controlled at a constant switching frequency will be described. FIG. 82 and FIG. 83 respectively show ripple current characteristics 111a and hysteresis loss characteristics 112a in a case where the chopper 3 shown in FIG. 71 is controlled by a conventional method, i.e., at a constant switching frequency. The control method for controlling the chopper 3 at a constant switching frequency may be referred to as comparative-example control method or simply as comparative example. In FIG. 82 and FIG. 83, the horizontal axes indicate a boost ratio Rb. In FIG. 82, the vertical axis indicates ripple current Ilp, which is represented by a PU system. In FIG. 83, the vertical axis indicates hysteresis loss Pc, which is represented by a PU system. The multilevel-type chopper has such characteristics that the ripple current Ilp is ideally minimized when the boost ratio Rb is 1-fold (Rb=1) and 2-fold (Rb=2). However, when the boost ratio Rb is in a range of more than 1-fold to less than 2-fold and in a range of greater than 2-fold, the ripple current Ilp increases. The reactor 8 has an iron core, and the amount of iron loss including the hysteresis loss Pc is determined by a change amount B of a magnetic flux density generated due to high-frequency ripple current Ilp, the switching frequency fs of the semiconductor switching elements, and the iron core material of the reactor 8. The hysteresis loss Pc increases with increase in the high-frequency ripple current Ilp. Increase in the hysteresis loss Pc not only influences the efficiency of the motor control device but also causes a problem that parts of the motor control device are increased in size and weight for coping with heat generation of the reactor 8. Size increase and weight increase of the motor control device can make it difficult to ensure a placement space and achieve a weight condition in the aircraft or the like to which the motor control device is mounted, thus causing a significant problem.

In the motor control device 100 of embodiment 12, the operation modes of the chopper 3 are the bypass mode which is the first operation mode Md1 and the boost mode which is the second operation mode Md2. When the chopper 3 is being operated in the bypass mode, the DC-link voltage Vlk which is the output voltage is the battery voltage Vbt and the output of the chopper 3 is Vbt/Vbt-fold output, i.e., 1-fold output. The boost ratio Rb of the chopper 3 is a factor obtained by dividing the DC-link voltage Vlk in each operation mode by the battery voltage Vbt, and therefore the boost ratio Rb in the bypass mode is Vbt/Vbt, i.e., 1. In this case, the conduction ratio of the chopper 3 is 0, so that the semiconductor switching elements Q5, Q6 stop switching and high-frequency ripple current does not occur. The semiconductor switching elements Q3, Q4 are turned on for synchronous rectification. In the bypass mode, without using synchronous rectification, the semiconductor switching elements Q3, Q4, Q5, Q6 may be all turned off and current may be caused to flow through the diodes D of the semiconductor switching elements Q3, Q4.

In the boost mode, the motor control device 100 of embodiment 12 performs boost operation in which the target command value for the DC-link voltage Vlk, i.e., the boost voltage Va is set to a value that is approximately two times of the battery voltage Vbt of the battery 1 which is the input, as described in embodiment 1. When the chopper 3 is operated in the boost mode, the DC-link voltage Vlk which is the output voltage is the boost voltage Va, and the output of the chopper 3 is Va/Vbt-fold output. In this case, the boost ratio Rb of the chopper 3 is Va/Vbt. In addition, the flying capacitor voltage Vfc of the flying capacitor 7 of the chopper 3 is controlled to be approximately half the value of the DC-link voltage Vlk. In the bypass mode, when the DC-link voltage Vlk is the battery voltage Vbt, the flying capacitor voltage Vfc is Vbt/2. In the boost mode, when the boost voltage Va which is the DC-link voltage Vlk is approximately 2×Vbt, the flying capacitor voltage Vfc is approximately Vbt.

When the operation mode of the chopper 3 is changed between the boost mode and the bypass mode, a transient state arises until reaching a steady state at the target voltage for the DC-link voltage Vlk. In the transient state, the boost ratio Rb has a value between 1 and 2, and therefore high-frequency ripple current increases as shown in FIG. 82. It is noted that a case where the boost ratio Rb is 2 is a case where the boost voltage Va is 2×Vbt.

As described above, the amount of iron loss occurring in the iron core of the reactor 8 is determined by the change amount B of a magnetic flux density generated due to high-frequency ripple current Ilp, the switching frequency fs of the semiconductor switching elements, and the used iron core material of the reactor 8. As a calculation formula for obtaining iron loss including hysteresis loss Pc and eddy current loss, Steinmetz's equation is known. By taking out a component of hysteresis loss Pc from the Steinmetz's equation, Expression (1) is obtained.

$$Pc = K \times fs \times B^{1.6} \qquad (1)$$

Here, K is a loss factor, fs is the switching frequency of the semiconductor switching elements, and B is the change amount of the magnetic flux density.

Generally, in a core of a reactor used in a switching circuit such as a chopper, iron loss due to a hysteresis loop, i.e., hysteresis loss Pc occurs. The hysteresis loss Pc occurs due to magnetic flux density change caused by switching of the semiconductor switching elements, and therefore increases by an amount corresponding to increase in the switching frequency even if an upper limit is set for the magnetic flux density change. Thus, the hysteresis loss Pc increases as shown in FIG. 83, and heat generation of the reactor increases.

On the basis of the detected information sig1 which is information of the battery voltage Vbt obtained from the battery voltage sensor 12 and the detected information sig3 which is information of the DC-link voltage Vlk obtained from the DC-link voltage sensor 14, the motor control device 100 of embodiment 12 changes the switching frequency fs of the semiconductor switching elements of the chopper 3 with respect to the ratio between those voltages. When the chopper 3 operates in the bypass mode, the semiconductor switching elements do not perform switching and therefore the switching frequency fs is zero (0). When the chopper 3 operates in the boost mode and is in a steady state in which the DC-link voltage Vlk has become the boost voltage Va, the motor control device 100 of embodiment 12 operates the chopper 3 with the switching frequency fs set at the switching frequency fa which is a fundamental frequency. In a transient state when the chopper 3 shifts from the bypass mode to the boost mode, the motor control device 100 of embodiment 12 operates the chopper 3 with the switching frequency fs set at a switching frequency fb increasing from the switching frequency fa as shown in FIG. 89. The transient state when the chopper 3 shifts from the bypass mode to the boost mode may be referred to as voltage increase transient state.

In the motor control device 100 including the control device 11 in the first example shown in FIG. 72, when the motor parameter command is changed as in motor parameter command characteristics 114 of the inverter 5 as shown in FIG. 87, the DC-link voltage and the switching frequency are changed as in DC-link voltage characteristics 115 and switching frequency characteristics 116 of the chopper 3 shown in FIG. 88 and FIG. 89. In FIG. 87, FIG. 88, and FIG. 89, the horizontal axes indicate time. In FIG. 87, FIG. 88, and FIG. 89, the vertical axes indicate the motor parameter command, the DC-link voltage Vlk, and the switching frequency fs, respectively. The motor parameter command characteristics 114 are an example in which the value thereof increases from time t40 to time t42, remains constant from time t42 to time t43, decreases from time t43 to time t45, and remains constant from time t45 to time t46. At time t40, the control device 11 operates the chopper 3 in the first operation mode Md1, i.e., the bypass mode, and thus the DC-link voltage Vlk is the battery voltage Vbt and the switching frequency fs of the chopper 3 is zero (0).

While the chopper 3 is operating in the first operation mode Md1, when the motor parameter command characteristics 114 of the inverter 5 indicate a value higher than the threshold Wa at time t41, the control device 11 changes the operation mode of the chopper 3 to the second operation mode Md2, i.e., the boost mode, to start boost operation of the chopper 3, thus increasing the DC-link voltage Vlk from the battery voltage Vbt to the boost voltage Va. At time t41, the control device 11 increases the switching frequency fs from 0 to the switching frequency fa. In the voltage increase transient state from time t41 to time t42, the control device 11 changes the switching frequency fs to the switching frequency fb which is Δf+fa. Here, Δf is a change switching frequency and changes from 0 to a maximum change switching frequency Mm. In FIG. 89, a difference between the switching frequency fa and the switching frequency fb at time tp is shown as the change switching frequency Δf. Here, the maximum change switching frequency Mm is controlled so that the hysteresis loss Pc does not exceed a tolerable loss value. A loss threshold Pc1 smaller than the tolerable loss value by a set margin Pc2 is set so that the hysteresis loss Pc does not exceed the tolerable loss value. When a calculated value Dpc of the hysteresis loss Pc has become the loss threshold Pc1, the control signal generation unit 68*d* described later increases the switching frequency fs so that the calculated value Dpc of the hysteresis loss Pc does not exceed the loss threshold Pc1. In a state in which the change switching frequency Δf is greater than 0, when the calculated value Dpc of the hysteresis loss Pc becomes smaller than the loss threshold Pc1, the control signal generation unit 68*d* reduces the change switching frequency Δf, and when the change switching frequency Δf has become 0, the control signal generation unit 68*d* stops reducing the change switching frequency Δf.

While the chopper 3 is operating in the second operation mode Md2, when the motor parameter command characteristics 114 of the inverter 5 indicate a value lower than the threshold Za at time t44, the control device 11 changes the operation mode of the chopper 3 to the first operation mode Md1, i.e., the bypass mode, to start bypass operation of the chopper 3, thus reducing the DC-link voltage Vlk from the boost voltage Va to the battery voltage Vbt. FIG. 88 shows the example of the DC-link voltage characteristics 115 in which the DC-link voltage Vlk starts to decrease from time t44 and reaches the battery voltage Vbt at time t45. At time t44, the control device 11 sets the switching frequency fs to 0 and outputs, as the control signal sigc1, the first second mode control signal sigcm1 for performing control in the first second operation mode. The threshold Za is lower than the threshold Wa. A point where the value of the motor parameter command characteristics 114 in the first operation mode becomes the threshold Wa is a mode change point P9, and a point where the value of the motor parameter command characteristics 114 in the second operation mode becomes the threshold Za is a mode change point P10.

In the motor control device 100 of embodiment 12, by changing the switching frequency fs as shown in FIG. 86, the ripple current Ilp of the chopper 3 can be made smaller as shown in FIG. 84 than in the comparative example, and the hysteresis loss Pc of the chopper 3 can be made smaller as shown in FIG. 85 than in the comparative example. In FIG. 84, FIG. 85, and FIG. 86, the horizontal axes indicate the boost ratio Rb. In FIG. 84, the vertical axis indicates the ripple current Ilp, which is represented by a PU system. In FIG. 85, the vertical axis indicates the hysteresis loss Pc, which is represented by a PU system. In FIG. 86, the vertical axis indicates the switching frequency fs, which is represented by a PU system. A state point 119 indicates a state when the chopper 3 is in the bypass mode. In the switching frequency characteristics 113, when operation mode shifts from the bypass mode at the state point 119 to the boost mode, the switching frequency changes stepwise at the boost ratio Rb=1.0 and thus becomes 1.0 [p.u.]. The reference of the PU system for the switching frequency fs is the switching frequency fa, and therefore the switching frequency fs changes to the switching frequency fa at the boost ratio Rb=1.0.

At a boost ratio value rb1 of the boost ratio Rb, when the hysteresis loss Pc reaches the loss threshold Pc1, the motor control device 100 increases the switching frequency fs of the chopper 3. In a region where the boost ratio Rb is from the boost ratio value rb1 to a boost ratio value rbp, the difference of the switching frequency fs from the switching frequency fa, i.e., the change switching frequency Δf increases, and when the boost ratio Rb reaches the boost ratio value rbp, the change switching frequency Δf becomes the maximum change switching frequency Mm. In a region where the boost ratio Rb is from the boost ratio value rbp to a boost ratio value rb2, the change switching frequency Δf decreases, and when the boost ratio Rb reaches the boost ratio value rb2, the change switching frequency Δf becomes 0 and the switching frequency fs becomes 1.0 [p.u.]. In this region where the boost ratio Rb is from the boost ratio value rb1 to the boost ratio value rb2, the hysteresis loss Pc is kept at the loss threshold Pc1 as in the hysteresis loss characteristics 112b shown in FIG. 85. In FIG. 85, the loss threshold Pc1 is 0.4 [p.u.].

In the comparative example in which the chopper 3 is controlled at a constant switching frequency, as shown in FIG. 82 and FIG. 83, the values of the ripple current characteristics 111a and the hysteresis loss characteristics 112a are maximized when the boost ratio Rb is the boost ratio value rbp. The hysteresis loss characteristics 112a, 112b correspond to the calculated value Dpc of the hysteresis loss Pc calculated by the motor control device 100. As described above, when the calculated value Dpc of the hysteresis loss Pc has become the loss threshold Pc1, the motor control device 100 of embodiment 12 increases the switching frequency fs so that the calculated value Dpc of the hysteresis loss Pc does not exceed the loss threshold Pc1. The period in which this control is performed is a period in which the boost ratio Rb in the hysteresis loss characteristics 112b is from the boost ratio value rb1 to the boost ratio value rb2. When the boost ratio Rb is from the boost ratio value rb2 to 2.0, the calculated value Dpc of the hysteresis loss Pc is smaller than the loss threshold Pc1 and therefore the switching frequency fs is set to 1.0 [p.u.]. In the region where the boost ratio Rb is from the boost ratio value rb1 to the boost ratio value rb2, the value of the ripple current characteristics 111b decreases along with increase in the switching frequency fs, and becomes a minimum value when the boost ratio Rb is the boost ratio value rbp.

When the boost ratio Rb becomes greater than 2.0, the values of the ripple current characteristics 111b and the hysteresis loss characteristics 112b increase. When the boost ratio Rb becomes a boost ratio value rb3, the value of the hysteresis loss characteristics 112b becomes the loss threshold Pc1, and therefore the chopper 3 is controlled in the same manner as in the period in which the boost ratio Rb is from the boost ratio value rb1 to the boost ratio value rb2. Thus, the value of the switching frequency characteristics 113 increases and the value of the hysteresis loss characteristics 112b is kept at the loss threshold Pc1.

The motor control device 100 of embodiment 12 changes the switching frequency fs of the chopper 3 to a high frequency so as to reduce the hysteresis loss Pc to the tolerable loss value or lower. That is, when the calculated value Dpc of the hysteresis loss Pc has become the loss threshold Pc1, the motor control device 100 of embodiment 12 increases the switching frequency fs so that the calculated value Dpc of the hysteresis loss Pc does not exceed the loss threshold Pc1. The values of the ripple current characteristics 111a shown in FIG. 82 and the hysteresis loss characteristics 112a shown in FIG. 83 change along with each other with respect to the boost ratio Rb. Since the ripple current Ilp is associated with the change amount B of the magnetic flux density, the change amount B of the magnetic flux density is controlled to be smaller than a value when the hysteresis loss Pc becomes the loss threshold Pc1, and the switching frequency fs of the chopper 3 is changed to a high frequency, whereby the hysteresis loss Pc can be reduced to the tolerable loss value or lower. As shown in Expression (1), the hysteresis loss Pc changes by the 1.6th power with respect to the change amount B of the magnetic flux density, and thus changes at a greater rate than change of the switching frequency fs. Therefore, reducing the change amount B of the magnetic flux density, i.e., reducing the ripple current Ilp is effective.

For example, the maximum hysteresis loss before improvement is defined as 1 [p.u.] as shown in FIG. 83, and the loss threshold Pc1 of the hysteresis loss Pc is set at 0.4 [p.u.]. In this case, in a region where the boost ratio Rb is from 1.0 [p.u.] to the boost ratio value rb1 and a region where the boost ratio Rb is from the boost ratio value rb2 to the boost ratio value rb3, the switching frequency fs need not be changed, and outside these boost ratio regions, the switching frequency fs is increased as shown in FIG. 86, whereby the hysteresis loss Pc can be reduced. The boost ratio values rb1, rb2, rb3 are, for example, 1.15, 1.75, 2.25, respectively.

With the motor control device 100 of embodiment 12, in a transient state in which the multilevel-type chopper 3 is not in an ideal boost ratio state, hysteresis loss of the reactor 8 can be reduced and heat generation of the reactor 8 can be suppressed. Thus, in the motor control device 100 of embodiment 12, the reactor 8 can be downsized and the cost for cooling can be reduced. In the above description, the voltage increase transient state has been described. However, the same effects are provided also in a transient state in which the chopper 3 shifts from the boost mode to the bypass mode.

Thus far, the method for reducing hysteresis loss of the reactor 8 in the multilevel-type chopper 3 has been described. Next, a specific example of combination of the method for reducing the hysteresis loss and the method for changing the operation mode of the chopper 3, i.e., the operation mode change method described in each of embodiments 1 to 11, will be described. The control device 11 in the first example shown in FIG. 72 is a control device for executing the operation mode change method shown in embodiments 1 to 5 and the second example of embodiment 7. The control signal generation unit 68$d$ shown in FIG. 73 is different from the control signal generation unit 68$a$ shown in FIG. 5 in that the first signal generation unit 69$a$ is replaced with a first signal generation unit 82 and a switching frequency generation unit 83 is added. Differences from the control signal generation unit 68$a$ will be mainly described. The switching frequency generation unit 83 in the first example includes a hysteresis loss calculation unit 61, a judgment unit 62, and a switching frequency change unit 63.

The hysteresis loss calculation unit 61 calculates the hysteresis loss Pc and the change amount B of the magnetic flux density on the basis of the detected information sig2 which is information of current flowing through the reactor 8 and the switching frequency signal sigfs which is information of the switching frequency fs generated by the switching frequency change unit 63, and outputs a loss signal sigpc which is information of the hysteresis loss Pc and a magnetic flux density change amount signal sigb which is information of the change amount B of the magnetic flux density.

The change amount B of the magnetic flux density is calculated on the basis of the ripple current Ilp of the reactor 8 obtained from the detected information sig2. The hysteresis loss calculation unit 61 has the model of the hysteresis loss Pc shown in Expression (1), calculates the calculated value Dpc of the hysteresis loss Pc by this model, and outputs information of the calculated value Dpc as the loss signal sigpc. In calculation for the hysteresis loss Pc, the switching frequency fs indicated by the switching frequency signal sigfs is used. The judgment unit 62 judges whether the calculated value Dpc of the hysteresis loss Pc is not smaller than the loss threshold Pc1 on the basis of the loss signal sigpc, and outputs a loss judgment signal sige1 indicating that the calculated value Dpc is not smaller than the loss threshold Pc1. Judging whether the calculated value Dpc is not smaller than the loss threshold Pc1 corresponds to judging whether the calculated value Dpc has become equal to or exceeded the loss threshold Pc1.

The switching frequency change unit 63 has a model of Expression (2) for calculating the switching frequency fs.

$$fs = Dpc \times K^{-1} \times B^{-1.6} \quad (2)$$

Expression (2) is obtained by arranging Expression (1) into an expression for fs and then replacing Pc with the calculated value Dpc.

In a case where the operation mode signal msig indicates the bypass mode, the switching frequency change unit 63 outputs the switching frequency signal sigfs indicating that the switching frequency fs is 0. In a case where the operation mode signal msig has changed from the bypass mode to the boost mode, the switching frequency change unit 63 outputs the switching frequency signal sigfs indicating that the switching frequency 0 fs is fa which is the fundamental frequency. In a case where the operation mode signal msig indicates the boost mode, in response to the loss judgment signal sige1, the switching frequency change unit 63 calculates the switching frequency fs by the model of Expression (2) using the calculated value Dpc indicated by the loss signal sigpc and the change amount B of the magnetic flux density indicated by the magnetic flux density change amount signal sigb, and outputs the switching frequency signal sigfs which is information of the switching frequency fs.

The first signal generation unit 82 receives the operation mode signal msig and the switching frequency signal sigfs. In response to the operation mode signal msig indicating the first operation mode, i.e., the bypass mode, the first signal generation unit 82 outputs, as the control signal sigc1, the first mode control signal sigcm1 for controlling the chopper 3 in the first operation mode. In response to the operation mode signal msig indicating the second operation mode, i.e., the boost mode, the first signal generation unit 82 outputs, as the control signal sigc1, the second mode control signal sigcm2 for controlling the chopper 3 in the second operation mode with the switching frequency fs based on the switching frequency signal sigfs. That is, the second mode control signal sigcm2 changing depending on the switching frequency fs is outputted as the control signal sigc1.

As described above, the switching frequency generation unit 83 outputs the switching frequency signal sigfs with different switching frequencies fs in accordance with a case where the operation mode signal msig indicates the bypass mode (case of first condition), a case where the operation mode signal msig has changed from the bypass mode to the boost mode (case of second condition), and a case where the operation mode signal msig indicates the boost mode and the calculated value Dpc is judged not to be smaller than the loss threshold Pc1 (case of third condition). In the case of the first condition, the switching frequency generation unit 83 outputs the switching frequency signal sigfs indicating that the switching frequency fs is 0, in the case of the second condition, the switching frequency generation unit 83 outputs the switching frequency signal sigfs indicating that the switching frequency fs is fa which is the fundamental frequency, and in the case of the third condition, the switching frequency generation unit 83 outputs the switching frequency signal sigfs indicating that the switching frequency fs is the switching frequency fb higher than fa which is the fundamental frequency.

The switching frequency generation unit 83 may be configured as in a second example shown in FIG. 74. The switching frequency generation unit 83 in the second example includes a frequency change unit 84 which, on the basis of the detected information sig1 which is information of the battery voltage Vbt, the detected information sig3 which is information of the DC-link voltage Vlk, and the operation mode signal msig, calculates the switching frequency fs and outputs the switching frequency signal sigfs which is information of the switching frequency fs. The frequency change unit 84 has a model of the switching frequency characteristics 113 shown in FIG. 86, i.e., a model of the switching frequency fs. The frequency change unit 84 calculates the boost ratio Rb as shown by Expression (3) on the basis of the battery voltage Vbt obtained from the detected information sig1 and the DC-link voltage Vlk obtained from the detected information sig3.

$$Rb = Vlk/Vbt \quad (3)$$

In a case where the operation mode signal msig indicates the bypass mode, the frequency change unit 84 outputs the switching frequency signal sigfs indicating that the switching frequency fs is 0. In a case where the operation mode signal msig has changed from the bypass mode to the boost mode, the frequency change unit 84 outputs the switching frequency signal sigfs indicating that the switching frequency fs is fa which is the fundamental frequency, using the model of the switching frequency fs. In a case where the operation mode signal msig indicates the boost mode, the frequency change unit 84 calculates the switching frequency fs from the boost ratio Rb, using the model of the switching frequency fs, and outputs the switching frequency signal sigfs which is information of the switching frequency fs. In the model of the switching frequency characteristics 113 shown in FIG. 86, i.e., the model of the switching frequency fs, the switching frequency fb higher than fa which is the fundamental frequency is outputted at the boost ratio Rb when the value of the hysteresis loss characteristics 112a is judged not to be smaller than the loss threshold Pc1.

The frequency change unit 84 may have a model of the ripple current characteristics 111a shown in FIG. 82, a model of the hysteresis loss characteristics 112a shown in FIG. 83, and the model of the Expression (2) for calculating the switching frequency fs. The frequency change unit 84 calculates the calculated value Dpc of the hysteresis loss Pc at the boost ratio Rb calculated from the detected information sig1 and the detected information sig3, by the model of the hysteresis loss characteristics 112a, and calculates the change amount B of the magnetic flux density at the boost ratio Rb, by the model of the ripple current characteristics 111a.

In a case where the operation mode signal msig indicates the bypass mode, the frequency change unit 84 outputs the switching frequency signal sigfs indicating that the switching frequency fs is 0. In a case where the operation mode signal msig has changed from the bypass mode to the boost mode, the frequency change unit 84 outputs the switching frequency signal sigfs indicating that the switching frequency fs is fa which is the fundamental frequency. In a case where the operation mode signal msig indicates the boost mode and the calculated value Dpc is judged not to be smaller than the loss threshold Pc1, the frequency change unit 84 calculates the switching frequency fs by the model of Expression (2) using the calculated value Dpc and the change amount B of the magnetic flux density, and outputs the switching frequency signal sigfs which is information of the switching frequency fs.

As in the switching frequency generation unit 83 in the first example, the switching frequency generation unit 83 in the second example, which includes the frequency change unit 84, outputs the switching frequency signal sigfs with different switching frequencies fs in accordance with a case where the operation mode signal msig indicates the bypass mode (case of first condition), a case where the operation mode signal msig has changed from the bypass mode to the boost mode (case of second condition), and a case where the operation mode signal msig indicates the boost mode and the calculated value Dpc is judged not to be smaller than the loss threshold Pc1 (case of third condition). In the case of the first condition, the switching frequency generation unit 83 outputs the switching frequency signal sigfs indicating that the switching frequency fs is 0, in the case of the second condition, the switching frequency generation unit 83 outputs the switching frequency signal sigfs indicating that the switching frequency fs is fa which is the fundamental frequency, and in the case of the third condition, the switching frequency generation unit 83 outputs the switching frequency signal sigfs indicating that the switching frequency fs is the switching frequency fb higher than fa which is the fundamental frequency.

The control device 11 that executes the operation mode change method shown in any of embodiments 1 to 5 is the control device 11 shown in FIG. 72, as described above. In this case, the environmental detected information sigev outputted from the environmental information detection sensor 35 is inputted as the input information sighin to the control signal generation unit 68d. In the control device 11 in the first example shown in FIG. 72, the control signal generation unit 68d changes the operation mode of the chopper 3 on the basis of the environmental detected information sigev, and controls the switching frequency fs of the chopper 3 in the transient state when the operation mode of the chopper 3 is changed. The control device 11 in the second example shown in FIG. 75 is the control device that executes the operation mode change method shown in embodiment 6. The control device 11 includes the altitude estimation unit 67 and the control signal generation unit 68d. The estimated altitude information esig1 outputted from the altitude estimation unit 67 is inputted as the input information sighin to the control signal generation unit 68d. In the control device 11 in the second example shown in FIG. 75, the control signal generation unit 68d changes the operation mode of the chopper 3 on the basis of the estimated altitude information esig1, and controls the switching frequency fs of the chopper 3 in the transient state when the operation mode of the chopper 3 is changed.

The control device 11 in the third example shown in FIG. 76 is the control device that executes the operation mode change method shown in the first example of embodiment 7. The control device 11 includes the motor parameter command sensor 70 and the control signal generation unit 68d. The motor parameter command detected information sigmpc outputted from the motor parameter command sensor 70 is inputted as the input information sighin to the control signal generation unit 68d. In the control device 11 in the third example shown in FIG. 76, the control signal generation unit 68d changes the operation mode of the chopper 3 on the basis of the motor parameter command detected information sigmpc, and controls the switching frequency fs of the chopper 3 in the transient state when the operation mode of the chopper 3 is changed. The motor parameter command characteristics obtained from the motor parameter command detected information sigmpc are the motor parameter command characteristics 114 shown in FIG. 87, for example.

The control device 11 that executes the operation mode change method shown in the second example of embodiment 7 is the control device 11 shown in FIG. 72, as described above. In this case, the motor parameter detected information sigmp outputted from the motor parameter sensor 38 is inputted as the input information sighin to the control signal generation unit 68d. The detected motor parameter characteristics obtained from the motor parameter detected information sigmp are detected motor parameter characteristics 120 shown in FIG. 90, for example. The detected motor parameter characteristics 120 are an example in which the value thereof changes at the same timings as in the motor parameter command characteristics 114 shown in FIG. 87. Operation of the control device 11 is the same as the operation described with reference to FIG. 87 to FIG. 89. However, the thresholds Wa, Za are replaced with the thresholds Wb, Zb. The threshold Zb is lower than the threshold Wb. A point where the value of the detected motor parameter characteristics 120 in the first operation mode becomes the threshold Wb is a mode change point P11, and a point where the value of the detected motor parameter characteristics 120 in the second operation mode becomes the threshold Zb is a mode change point P12.

The control device 11 in the fourth example shown in FIG. 77 is the control device that executes the operation mode change method shown in the third example of embodiment 7. The control device 11 includes the observer 64 and the control signal generation unit 68d. The motor parameter estimated information sigmpe outputted from the observer 64 is inputted as the input information sighin to the control signal generation unit 68d. In the control device 11 in the fourth example shown in FIG. 77, the control signal generation unit 68d changes the operation mode of the chopper 3 on the basis of the motor parameter estimated information sigmpe, and controls the switching frequency fs of the chopper 3 in the transient state when the operation mode of the chopper 3 is changed.

The estimated motor parameter characteristics obtained from the motor parameter estimated information sigmpe are estimated motor parameter characteristics 121 shown in FIG. 91, for example. The estimated motor parameter characteristics 121 are an example in which the value thereof changes at the same timings as in the motor parameter command characteristics 114 shown in FIG. 87. Operation of the control device 11 is the same as the operation described with reference to FIG. 87 to FIG. 89. However, the thresholds Wa, Za are replaced with the thresholds Wc, Zc. The threshold Zc is lower than the threshold Wc. A point where the value of the estimated motor parameter characteristics 121 in the first operation mode becomes the threshold Wc is a mode change point P13, and a point where the value of the estimated motor parameter characteristics 121 in the second operation mode becomes the threshold Zc is a mode change point P14.

The control device 11 in the fifth example shown in FIG. 78 is the control device that executes the operation mode change method shown in embodiment 8. In the motor control device 100 of embodiment 12 for executing the operation mode change method shown in embodiment 8, the operating panel 23 includes the selection switch 37 as shown in FIG. 55. The control device 11 includes the control signal generation unit 68e. The operation mode signal msig outputted from the selection switch 37 on the basis of an instruction from the pilot is inputted to the control signal generation unit 68e. The control signal generation unit 68e shown in FIG. 79 is different from the control signal generation unit 68b shown in FIG. 56 in that the first signal generation unit 69a is replaced with the first signal generation unit 82 to which the switching frequency signal sigfs is also inputted, and the switching frequency generation unit 83 is added. In FIG. 79, the switching frequency generation unit 83 in the second example shown in FIG. 74 is shown. In the control device 11 in the fifth example shown in FIG. 78, the control signal generation unit 68e changes the operation mode of the chopper 3 on the basis of the operation mode signal msig outputted from the selection switch 37, and controls the switching frequency fs of the chopper 3 in the transient state when the operation mode of the chopper 3 is changed.

The control device 11 in the sixth example shown in FIG. 80 is the control device that executes the operation mode change method shown in embodiment 9. In the motor control device 100 of embodiment 12 for executing the operation mode change method shown in embodiment 9, the operating panel 23 includes the permission switch 51 as shown in FIG. 58. The control device 11 includes the control signal generation unit 68f. The change permission signal ensig outputted from the permission switch 51 on the basis of determination by the pilot is inputted to the control signal generation unit 68f. The input information sighin is the environmental detected information sigev, the motor parameter detected information sigmp, and the like. The control signal generation unit 68f shown in FIG. 81 is different from the control signal generation unit 68c shown in FIG. 59 in that the first signal generation unit 69a is replaced with the first signal generation unit 82 to which the switching frequency signal sigfs is also inputted, and the switching frequency generation unit 83 is added. In FIG. 81, the switching frequency generation unit 83 in the second example shown in FIG. 74 is shown. In the control device 11 in the sixth example shown in FIG. 80, the control signal generation unit 68f changes the operation mode of the chopper 3 on the basis of the change permission signal ensig outputted from the permission switch 51 and the input information sighin such as the environmental detected information sigev and the motor parameter detected information sigmp, and controls the switching frequency fs of the chopper 3 in the transient state when the operation mode of the chopper 3 is changed.

As described above, with the motor control device 100 of embodiment 12, in the transient state in which the multi-level-type chopper 3 is not in an ideal boost ratio state, hysteresis loss of the reactor 8 can be reduced and heat generation of the reactor 8 can be suppressed. Thus, in the motor control device 100 of embodiment 12, the reactor 8 can be downsized and the cost for cooling can be reduced. In addition, in the motor control device 100 of embodiment 12, as in the motor control devices 100 of embodiments 1 to 11, during operation at a high altitude which occupies a most period in operation of the aircraft or the like, voltages applied to the semiconductor elements composing the chopper 3 and the inverter 5, i.e., the semiconductor switching elements Q1 to Q12, can be reduced. Thus, the failure rate due to a single event that occurs on the semiconductor elements composing the chopper 3 and the inverter 5 is reduced, so that reliability of the chopper 3 and the inverter 5 is improved. Owing to improvement in reliability of the chopper 3 and the inverter 5, the motor control device 100 of embodiment 12 is improved in reliability of the entire device. Further, in the motor control device 100 of embodiment 12, by applying the operation mode change method shown in embodiment 11, it is possible to respond to sudden request for changing the motor parameter such as the output of the motor 6 during operation at a high altitude.

In the motor control device 100 of embodiment 12, if operation is performed with the output voltage of the chopper 3 set only at voltage equal to the battery voltage Vbt and at the boost voltage Va which is two times of the battery voltage Vbt, the change amount B of the magnetic flux density of the reactor 8 can be minimized as in the ripple current characteristics 111b shown in FIG. 84, whereby magnetic flux density change in the reactor 8 can be suppressed to a minimum level. This is because the change amount B of the magnetic flux density in the reactor 8 occurs due to the ripple current Ilp and thus the change amount B of the magnetic flux density of the reactor 8 can be minimized as in the ripple current characteristics 111b shown in FIG. 84. Further, in the motor control device 100 of embodiment 12, when the DC-link voltage Vlk is intermediate voltage between voltage equal to the battery voltage Vbt and the boost voltage Va which is two times of the battery voltage Vbt, ripple current can be reduced by high-frequency setting, the magnetic flux density change amount can be reduced to a certain value or lower so that saturation can be suppressed, and increase in hysteresis loss due to high-frequency setting can be suppressed.

Also in a case where the boost voltage Va is approximately two times of the battery voltage Vbt, in the motor control device 100 of embodiment 12, when the DC-link voltage Vlk is intermediate voltage between voltage equal to the battery voltage Vbt and the boost voltage Va which is two times of the battery voltage Vbt, ripple current can be reduced by high-frequency setting, the magnetic flux density change amount can be reduced to a certain value or lower so that saturation can be suppressed, and increase in hysteresis loss due to high-frequency setting can be suppressed. In addition, in the motor control device 100 of embodiment 12, by reducing ripple current to a certain value or lower through high-frequency setting of the switching frequency both in the steady state and the transient state of the chopper 3, magnetic saturation of the iron core of the reactor 8 and heat generation due to hysteresis loss can be suppressed, and thus the reactor 8 used in the multilevel-type chopper can be downsized.

As described above, the motor control device 100 of embodiment 12 includes the power source device 90, the power supply device (inverter 5), and the control device 11. The power source device 90 includes the DC power source (battery 1) and the multilevel-type chopper 3 which is the DC-output power conversion device having the first operation mode Md1 for outputting the first voltage (battery voltage Vbt) and the second operation mode Md2 for outputting the second voltage (boost voltage Va) higher than the first voltage (battery voltage Vbt). The multilevel-type chopper 3 includes, between the high-potential-side output terminal 42p, and the low-potential-side output terminal 42s and the low-potential-side input terminal 41s, the high-potential-side series unit composed of the plurality of semiconductor switching elements Q3, Q4 connected in series and the low-potential-side series unit composed of the plurality of semiconductor switching elements Q5, Q6 connected in series, and includes the reactor 8 between the high-potential-side input terminal 41p and the connection point m between the high-potential-side series unit and the low-potential-side series unit. In embodiment 12, when the flying object takes off from the ground, the control device 11 controls the multilevel-type chopper 3 in the second operation mode Md2. Then, when the control device 11 judges that flight information which is one or both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object satisfies a predetermined condition, or when the control device 11 has received the operation mode signal msig for which the first operation mode Md1 is selected on the basis of the flight information during control for the motor 6, the control device 11 controls the multilevel-type chopper 3 in the first operation mode Md1. In embodiment 12, in a case of controlling the multilevel-type chopper 3 in the second operation mode Md2, the control device 11 executes switching control for the plurality of semiconductor switching elements Q3, Q4, Q5, Q6 using a first switching frequency (switching frequency fa) and a second switching frequency (switching frequency fb) higher than the first switching frequency (switching frequency fa), and causes the multilevel-type chopper 3 to output the second voltage (boost voltage Va) which is the output voltage boosted from the first voltage (battery voltage Vbt) which is the input voltage of the multilevel-type chopper 3. The ratio of the output voltage (boost voltage Va) to the input voltage (battery voltage Vbt) is defined as boost ratio Rb. The predetermined condition for the flight information is any of the change conditions described in embodiments 1 to 7 and embodiments 9 to 11. That is, each of the change condition B1 to the change condition B6, the change condition B7a, the change condition B7b, the change condition B7c, the change condition B11a, and the change condition B11a is the predetermined condition for the flight information. In addition, the case where "the first condition is satisfied" or the case where "the second condition is not satisfied" as described in embodiment 10 is also the predetermined condition for the flight information. In a case of applying the operation mode change method of embodiment 9, a condition that the change permission signal ensig outputted from the permission switch 51 indicates permission is added. The case of receiving the operation mode signal msig for which the first operation mode Md1 is selected on the basis of the flight information during control for the motor 6 is used when the operation mode change method of embodiment 8 is applied. In embodiment 12, in a case of changing the operation mode of the multilevel-type chopper 3 from the first operation mode Md1 and controlling the multilevel-type chopper 3 in the second operation mode Md2, the control device 11 executes switching control for the plurality of semiconductor switching elements Q3, Q4, Q5, Q6 at the first switching frequency (switching frequency fa), and when the boost ratio Rb is in a predetermined boost ratio range, the control device 11 executes switching control for the plurality of semiconductor switching elements Q3, Q4, Q5, Q6 at the second switching frequency (switching frequency fb) so that the switching frequency fs for the switching control changes in accordance with the boost ratio Rb. The predetermined boost ratio range is a range in which the boost ratio Rb is the boost ratio value rb1 or more and the boost ratio value rb2 or less, and a range in which the boost ratio Rb is the boost ratio value rb3 or more and 2.5 or less. With this configuration, in the motor control device 100 of embodiment 12, while the multilevel-type chopper 3 which is the DC-output power conversion device is controlled in the second operation mode Md2, when the flight information is judged to satisfy a predetermined condition, or when the operation mode signal msig for which the first operation mode Md1 is selected on the basis of the flight information is received during control for the motor 6, the multilevel-type chopper 3 which is the DC-output power conversion device is controlled in the first operation mode Md1. Thus, even in a case of operating at a high altitude where the cosmic ray dose is high, reliability of the motor control device is improved. In addition, in the motor control device 100 of embodiment 12, when the boost ratio Rb is in a predetermined boost ratio range, switching control for the plurality of semiconductor switching elements Q3, Q4, Q5, Q6 is executed using the second switching frequency (switching frequency fb) higher than the first switching frequency (switching frequency fa). Thus, the ripple current Ilp of the reactor 8 can be reduced as compared to a configuration not using the second switching frequency (switching frequency fb), and the hysteresis loss Pc of the reactor 8 can be reduced as compared to a configuration not using the second switching frequency (switching frequency fb).

Embodiment 13

Figure 92:
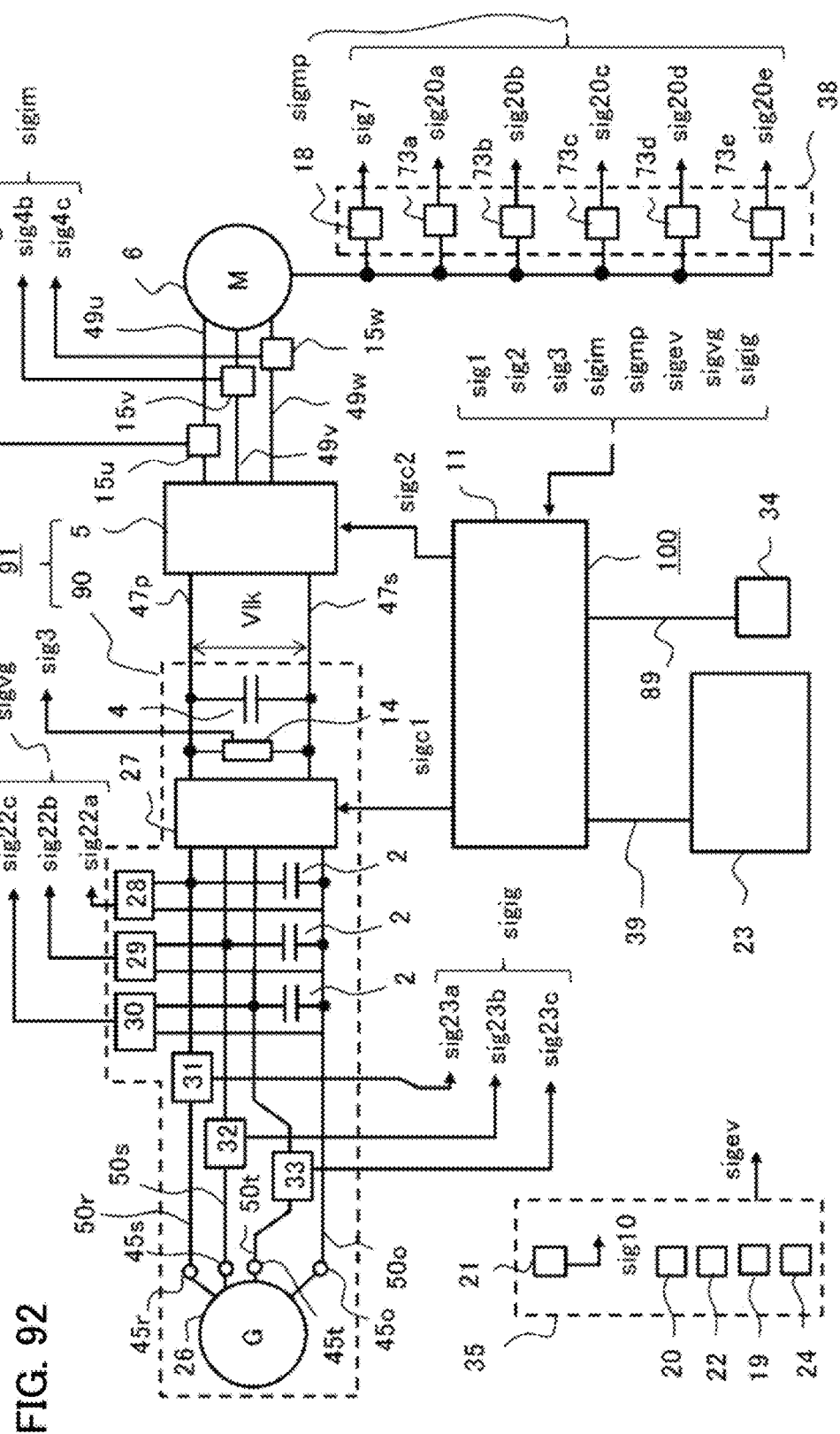
FIG. 92 shows the configuration of a motor control device according to embodiment 13.
Figure 93:
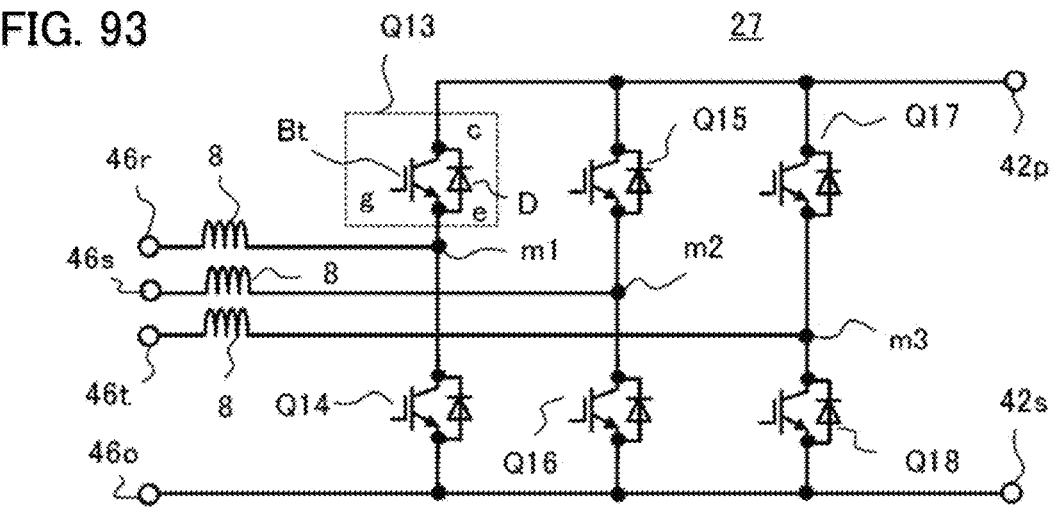
FIG. 93 shows the configuration of an AC/DC converter in FIG. 92.
Figure 94:
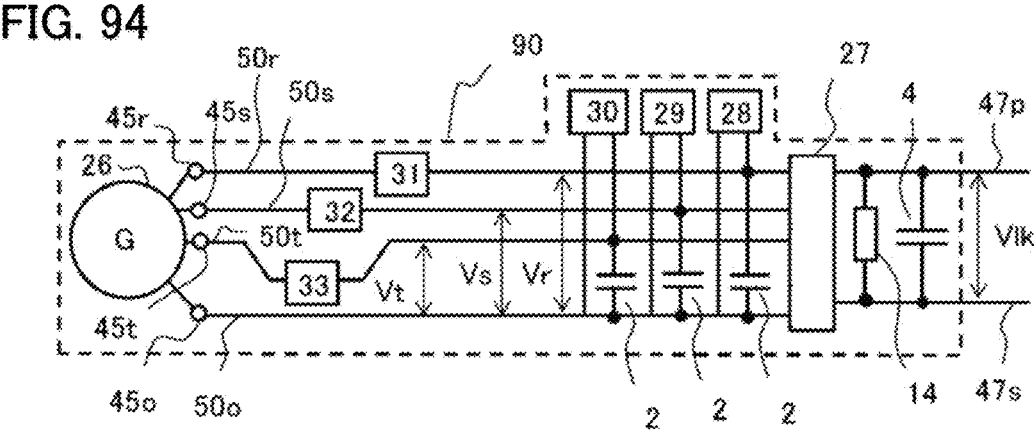
FIG. 94 shows voltage of an electric generator in FIG. 92.
Figure 95:
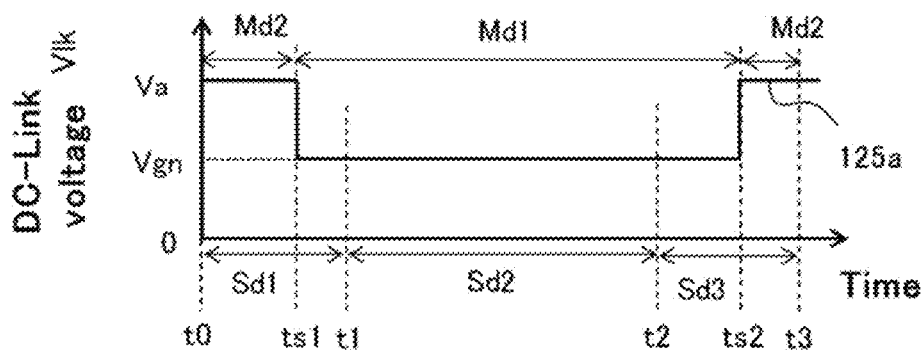
FIG. 95 shows timings in a first example for explaining operation of the motor control device according to embodiment 13.
Figure 96:
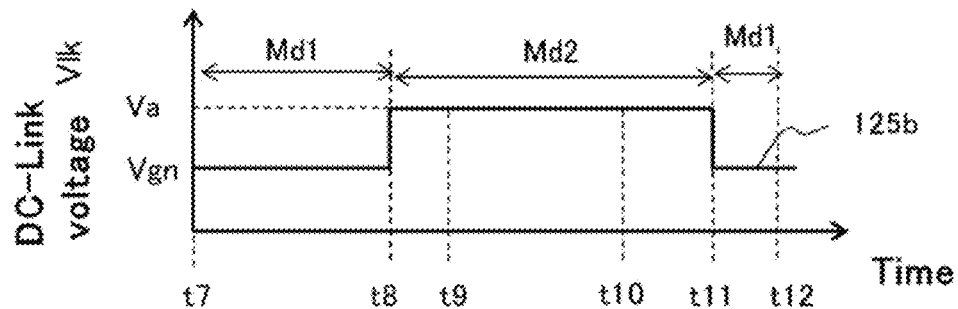
FIG. 96 shows timings in a second example for explaining operation of the motor control device according to embodiment 13.
Figure 97:
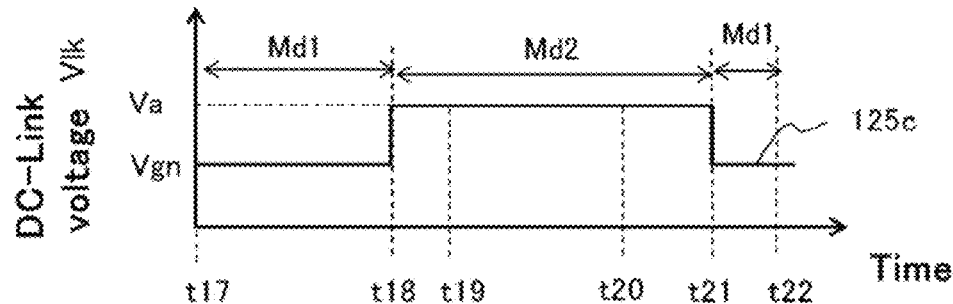
FIG. 97 shows timings in a third example for explaining operation of the motor control device according to embodiment 13.
Figure 98:
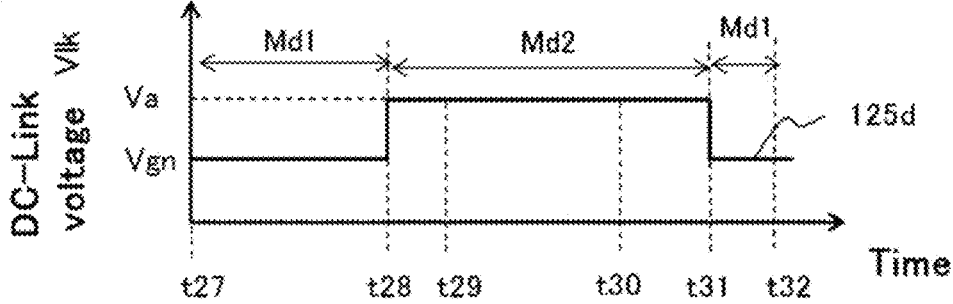
FIG. 98 shows timings in a fourth example for explaining operation of the motor control device according to embodiment 13.
Figure 99:
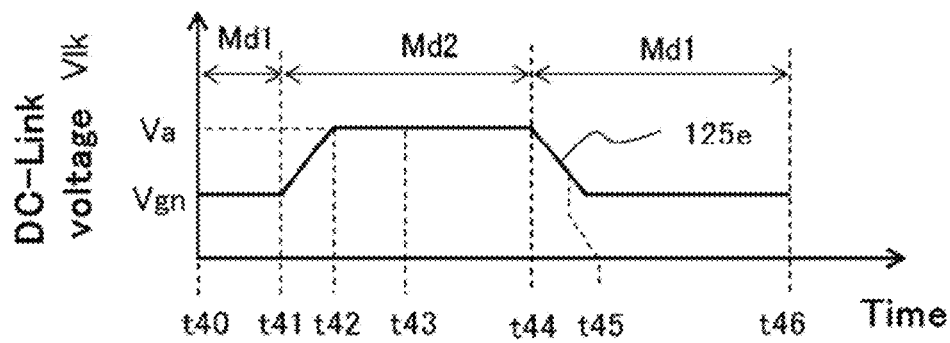
FIG. 99 shows timings in a fifth example for explaining operation of the motor control device according to embodiment 13.

FIG. 92 shows the configuration of a motor control device according to embodiment 13. FIG. 93 shows the configuration of an AC/DC converter in FIG. 92, and FIG. 94 shows voltages of an electric generator in FIG. 92. FIG. 95 shows timings in a first example for explaining operation of the motor control device according to embodiment 13. FIG. 96 shows timings in a second example for explaining operation of the motor control device according to embodiment 13, and FIG. 97 shows timings in a third example for explaining operation of the motor control device according to embodiment 13. FIG. 98 shows timings in a fourth example for explaining operation of the motor control device according to embodiment 13, and FIG. 99 shows timings in a fifth example for explaining operation of the motor control device according to embodiment 13. In the motor control device 100 of embodiment 13, the power source device 90 includes an electric generator 26 and an AC/DC converter 27 instead of the battery 1 and the chopper 3, and the DC-link voltage Vlk which is the output voltage of the AC/DC converter 27 is controlled to either normal voltage Vgn or boost voltage Va, using the operation mode change methods described in embodiments 1 to 11. The motor control device 100 of embodiment 13 is different from the motor control device 100 of embodiment 1 in that the power source device 90 includes the electric generator 26 and the AC/DC converter 27 instead of the battery 1 and the chopper 3, and the display 34 is provided. Differences from the motor control device 100 of embodiment 1 will be mainly described. In FIG. 92, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. In FIG. 92, as examples of the motor parameter sensors 38, the motor speed sensor 73*a*, the motor output sensor 73*b*, the motor AC voltage sensor 73*c*, the motor current sensor 73*d*, and the motor torque sensor 73*e* described in the second example (see FIG. 42) of embodiment 7, as well as the position sensor 18, are provided. The display 34 is connected to the control device 11 via the signal line 89.

The power source device 90 includes an R-phase power line 50*r* connecting an R terminal 45*r* of the electric generator 26 and an R-side input terminal 46*r* of the AC/DC converter 27, an S-phase power line 50*s* connecting an S terminal 45*s* of the electric generator 26 and an S-side input terminal 46*s* of the AC/DC converter 27, a T-phase power line 50*t* connecting a T terminal 45*t* of the electric generator 26 and a T-side input terminal 46*t* of the AC/DC converter 27, and an O-phase power line 50*o* connecting an O terminal 45*o* of the electric generator 26 and an O-side input terminal 46*o* of the AC/DC converter 27. In addition, the power source device 90 includes a capacitor 2 connected between the R-phase power line 50*r* and the O-phase power line 50*o*, an input R-phase voltage sensor 28 for detecting R-phase voltage Vr which is voltage between the R-phase power line 50*r* and the O-phase power line 50*o*, a capacitor 2 connected between the S-phase power line 50*s* and the O-phase power line 50*o*, an input S-phase voltage sensor 29 for detecting S-phase voltage Vs which is voltage between the S-phase power line 50*s* and the O-phase power line 50*o*, a capacitor 2 connected between the T-phase power line 50*t* and the O-phase power line 50*o*, and an input T-phase voltage sensor 30 for detecting T-phase voltage Vt which is voltage between the T-phase power line 50*t* and the O-phase power line 50*o*. In addition, the power source device 90 includes an input R-phase current sensor 31 for detecting current flowing through the R-phase power line 50*r*, an input S-phase current sensor 32 for detecting current flowing through the S-phase power line 50*s*, an input T-phase current sensor 33 for detecting current flowing through the T-phase power line 50*t*, a DC-link capacitor 4 connected between a high-potential-side power line 47*p* connecting to a high-potential-side output terminal 42*p* of the AC/DC converter 27 and a low-potential-side power line 47*s* connecting to a low-potential-side output terminal 42*s* of the AC/DC converter 27, and a DC-link voltage sensor 14 for detecting DC-link voltage Vlk of the capacitor 4 which is voltage between the high-potential-side power line 47*p* and the low-potential-side power line 47*s*. The high-potential-side power line 47*p* and the low-potential-side power line 47*s* are DC bus bars of the inverter 5.

The input R-phase voltage sensor 28 outputs detected information sig22*a* which is information of voltage between the R-phase power line 50*r* and the O-phase power line 50*o*, i.e., the R-phase voltage Vr of the electric generator 26. The input S-phase voltage sensor 29 outputs detected information sig22*b* which is information of voltage between the S-phase power line 50*s* and the O-phase power line 50*o*, i.e., the S-phase voltage Vs of the electric generator 26. The input T-phase voltage sensor 30 outputs detected information sig22*c* which is information of voltage between the T-phase power line 50*t* and the O-phase power line 50*o*, i.e., the T-phase voltage Vt of the electric generator 26. The detected information sig22*a*, sig22*b*, sig22*c* is electric generator voltage detected information sigvg. The input R-phase current sensor 31 outputs detected information sig23*a* which is information of current flowing through the R-phase power line 50*r*, i.e., the R-phase current. The input S-phase current sensor 32 outputs detected information sig23*b* which is information of current flowing through the S-phase power line 50*s*, i.e., the S-phase current. The input T-phase current sensor 33 outputs detected information sig23*c* which is information of current flowing through the T-phase power line 50*t*, i.e., the T-phase current. The detected information sig23*a*, sig23*b*, sig23*c* is electric generator current detected information sigig.

The AC/DC converter 27 is a power factor correction (PFC) circuit including six semiconductor switching elements Q13, Q14, Q15, Q16, Q17, Q18, for example. The semiconductor switching elements Q13 to Q18 are self-turn-off power semiconductor elements such as IGBTs or MOSFETs. In this example, the semiconductor switching elements Q13 to Q18 are IGBTs. Terminals of each semiconductor switching element Q13 to Q18 are a collector terminal c, an emitter terminal e, and a gate terminal g. Each semiconductor switching element Q13 to Q18 has a transistor Bt which is an IGBT, and a diode D. A reactor 8 is connected to a connection point m1 between the semiconductor switching elements Q13, Q14 connected in series. A reactor 8 is connected to a connection point m2 between the semiconductor switching elements Q15, Q16 connected in series. A reactor 8 is connected to a connection point m3 between the semiconductor switching elements Q17, Q18 connected in series. The collector terminals c of the semiconductor switching elements Q13, Q15, Q17 are connected to the high-potential-side output terminal 42*p*, and the emitter terminals e of the semiconductor switching elements Q14, Q16, Q18 are connected to the O-side input terminal 46o and the low-potential-side output terminal 42s. The emitter terminals e of the semiconductor switching elements Q13, Q15, Q17 are respectively connected to the collector terminals c of the semiconductor switching elements Q14, Q16, Q18.

The AC/DC converter 27 in the motor control device 100 of embodiment 13 has, as operation modes during operation, a bypass mode which is a first operation mode and a boost mode which is a second operation mode. The AC/DC converter 27 in the first operation mode operates as in diode rectification through switching operations of the semiconductor switching elements Q13, Q14, Q15, Q16, Q17, Q18 on the basis of the control signal sigc1 from the control device 11, to perform conversion to the normal voltage Vgn which is DC voltage of the active voltage of the R-phase voltage Vr, the S-phase voltage Vs, and the T-phase voltage Vt of the electric generator 26, and directly transmits the converted voltage to the capacitor 4. The AC/DC converter 27 in the second operation mode performs boost operation through switching operations of the semiconductor switching elements Q13, Q14, Q15, Q16, Q17, Q18 so that the DC-link voltage Vlk which is the voltage across the capacitor 4 becomes the boost voltage Va which is approximately two times of the active voltage value in the first operation mode, i.e., the value of the normal voltage Vgn. These power conversion controls are executed by the control device 11.

DC-link voltage characteristics 125a shown in FIG. 95 represent timings for controlling the DC-link voltage Vlk to either the normal voltage Vgn or the boost voltage Va, using the operation mode change method described in any of embodiments 1 to 6. That is, FIG. 95 corresponds to FIG. 9. DC-link voltage characteristics 125b shown in FIG. 96 represent timings for controlling the DC-link voltage Vlk to either the normal voltage Vgn or the boost voltage Va, using the operation mode change method described in the first example of embodiment 7. That is, FIG. 96 corresponds to FIG. 38. DC-link voltage characteristics 125c shown in FIG. 97 represent timings for controlling the DC-link voltage Vlk to either the normal voltage Vgn or the boost voltage Va, using the operation mode change method described in the second example of embodiment 7. That is, FIG. 97 corresponds to FIG. 44. DC-link voltage characteristics 125d shown in FIG. 98 represent timings for controlling the DC-link voltage Vlk to either the normal voltage Vgn or the boost voltage Va, using the operation mode change method described in the third example of embodiment 7. That is, FIG. 98 corresponds to FIG. 51. DC-link voltage characteristics 125e shown in FIG. 99 represent timings for controlling the DC-link voltage Vlk to either the normal voltage Vgn or the boost voltage Va in the motor control device 100 of embodiment 12, using the operation mode change method described in any of embodiments 1 to 11. That is, FIG. 99 corresponds to FIG. 88.

In the motor control device 100 of embodiment 13, in a case of changing the DC-link voltage Vlk using the operation mode change method described in any of embodiments 1 to 11, the operation mode of the chopper 3 is replaced with the operation mode of the AC/DC converter 27, and the battery voltage Vbt is replaced with the normal voltage Vgn. As the environmental information detection sensors 35 and the motor parameter sensors 38, the specific sensors shown in the operation mode change method described in any of embodiments 1 to 11 may be used, and in a case of using the operation mode change method described in the second example of embodiment 7, the control device 11 includes the motor parameter command sensor 70. The control device 11, the operating panel 23, and the display 34 are configured as described in each of embodiments 1 to 11, depending on the operation mode change method described in the applied one of embodiments 1 to 11.

The motor control device 100 of embodiment 13 performs operation mode change of the AC/DC converter 27 in the same manner as in embodiments 1 to 12. In a case of changing the switching frequency fs of the AC/DC converter 27 as in embodiment 12, three arms of the AC/DC converter 27, i.e., the R-phase arm to which the R-side input terminal 46r is connected, the S-phase arm to which the S-side input terminal 46s is connected, and the T-phase arm to which the T-side input terminal 46t is connected, are each formed by four semiconductor switching elements as shown in FIG. 71 and are each provided with the flying capacitor 7. In a case of changing the operation mode of the AC/DC converter 27 using the operation mode change method described in embodiment 1, the operation mode is changed using altitude information which is environmental information obtained from the altitude sensor 21. In a case of changing the operation mode of the AC/DC converter 27 using the operation mode change method described in embodiment 2, the operation mode is changed using outside air pressure information which is environmental information obtained from the outside air pressure sensor 20. In a case of changing the operation mode of the AC/DC converter 27 using the operation mode change method described in embodiment 3, the operation mode is changed using air component concentration information which is environmental information obtained from the air component concentration sensor 22. In a case of changing the operation mode of the AC/DC converter 27 using the operation mode change method described in embodiment 4, the operation mode is changed using the outside air temperature information which is environmental information obtained from the outside air temperature sensor 19. In a case of changing the operation mode of the AC/DC converter 27 using the operation mode change method described in embodiment 5, the operation mode is changed using radiation dose information which is environmental information obtained from the radiation sensor 24.

In a case of changing the operation mode of the AC/DC converter 27 using the operation mode change method described in embodiment 6, the altitude information is estimated on the basis of environmental information obtained from any of the outside air temperature sensor 19, the outside air pressure sensor 20, the air component concentration sensor 22, or the radiation sensor 24, and the operation mode is changed using the estimated altitude information. In a case of changing the operation mode of the AC/DC converter 27 using the operation mode change method described in the first example of embodiment 7, the operation mode is changed using the motor parameter command which is information of a motor parameter obtained from the motor parameter command sensor 70. In a case of changing the operation mode of the AC/DC converter 27 using the operation mode change method described in the second example of embodiment 7, the operation mode is changed using detected information of a motor parameter which is information of a motor parameter obtained from the motor parameter sensor 38. In a case of changing the operation mode of the AC/DC converter 27 using the operation mode change method described in the third example of embodiment 7, the operation mode is changed using estimated information of a motor parameter which is information of a motor parameter obtained from the observer 64. In a case of changing the operation mode of the AC/DC converter 27 using the operation mode change method described in embodiment 8, the operation mode is changed using the operation mode signal msig outputted from the selection switch 37 of the operating panel 23 on the basis of an instruction from the pilot.

In a case of changing the operation mode of the AC/DC converter 27 using the operation mode change method described in embodiment 9, operation mode change permission is given from the pilot and then the operation mode is changed using environmental information described in embodiments 1 to 6 or information of a motor parameter described in embodiment 7. In a case of changing the operation mode of the AC/DC converter 27 using the operation mode change method described in embodiment 10, the operation mode is changed with priorities set for two or more kinds of information among environmental factors such as the altitude information, the outside air pressure information, the air component concentration information, the outside air temperature information, and the radiation dose information. In a case of changing the operation mode of the AC/DC converter 27 using the operation mode change method described in embodiment 11, the operation mode is changed using two kinds of information, i.e., information of environmental factors such as the altitude information, the outside air pressure information, the air component concentration information, the outside air temperature information, and the radiation dose information, and information of motor parameters described in embodiment 7.

In the motor control device 100 of embodiment 13, as in the motor control devices 100 of embodiments 1 to 12, during operation at a high altitude which occupies a most period in operation of the aircraft or the like, voltages applied to the semiconductor elements composing the AC/DC converter 27 and the inverter 5, i.e., the semiconductor switching elements Q7 to Q18, can be reduced. Thus, the failure rate due to a single event that occurs on the semiconductor elements composing the AC/DC converter 27 and the inverter 5 is reduced, so that reliability of the AC/DC converter 27 and the inverter 5 is improved. Owing to improvement in reliability of the AC/DC converter 27 and the inverter 5, the motor control device 100 of embodiment 13 is improved in reliability of the entire device.

As described above, the motor control device 100 of embodiment 13 controls the motor 6 of the flying object that takes off from the ground and flies. The motor control device 100 includes the power source device 90 which outputs DC power, the power supply device (inverter 5) which converts DC power to AC power and outputs the AC power to the motor 6, and the control device 11 for controlling the power source device 90 and the power supply device (inverter 5). The power source device 90 includes a power source (electric generator 26), a DC-output power conversion device (AC/DC converter 27) which converts output of the power source (electric generator 26) to DC power, and an output capacitor (capacitor 4) for smoothing output voltage (DC-link voltage Vlk) of the DC-output power conversion device (AC/DC converter 27). The DC-output power conversion device (AC/DC converter 27) has the first operation mode Md1 for outputting the first voltage (normal voltage Vgn) and the second operation mode Md2 for outputting the second voltage (boost voltage Va) higher than the first voltage (normal voltage Vgn). When the flying object takes off from the ground, the control device 11 controls the DC-output power conversion device (AC/DC converter 27) in the second operation mode Md2. Then, when the control device 11 judges that flight information which is one or both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object satisfies a predetermined condition, or when the control device 11 has received the operation mode signal msig for which the first operation mode Md1 is selected on the basis of the flight information during control for the motor 6, the control device 11 controls the DC-output power conversion device (AC/DC converter 27) in the first operation mode Md1. The predetermined condition for the flight information is any of the change conditions described in embodiments 1 to 7 and embodiments 9 to 11. That is, each of the change condition B1 to change condition B6, the change condition B7a, the change condition B7b, the change condition B7c, the change condition B11a, and the change condition B11a is the predetermined condition for the flight information. In addition, the case where "the first condition is satisfied" or the case where "the second condition is not satisfied" as described in embodiment 10 is also the predetermined condition for the flight information. In a case of applying the operation mode change method of embodiment 9, a condition that the change permission signal ensig outputted from the permission switch 51 indicates permission is added. The case of receiving the operation mode signal msig for which the first operation mode Md1 is selected on the basis of the flight information during control for the motor 6 is used when the operation mode change method of embodiment 8 is applied. With this configuration, in the motor control device 100 of embodiment 13, while the DC-output power conversion device (AC/DC converter 27) is controlled in the second operation mode Md2, when the flight information is judged to satisfy a predetermined condition, or when the operation mode signal msig for which the first operation mode Md1 is selected on the basis of the flight information is received during control for the motor 6, the DC-output power conversion device (AC/DC converter 27) is controlled in the first operation mode Md1. Thus, even in a case of operating at a high altitude where the cosmic ray dose is high, reliability of the motor control device is improved.

Embodiment 14

Figure 100:
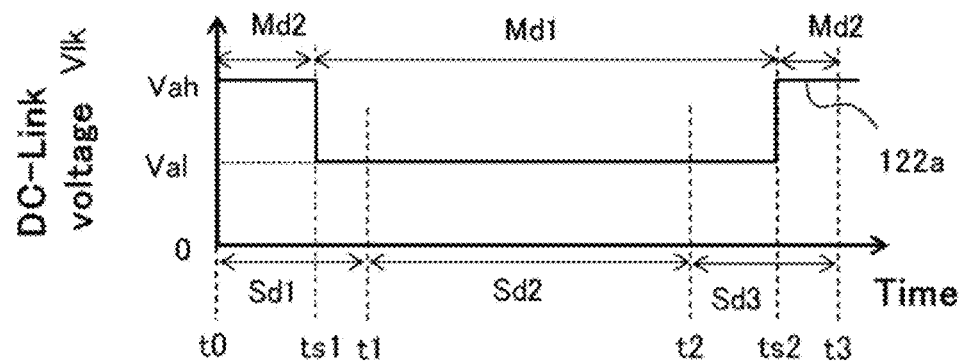
FIG. 100 shows timings in a first example for explaining operation of a motor control device according to embodiment 14.
Figure 101:
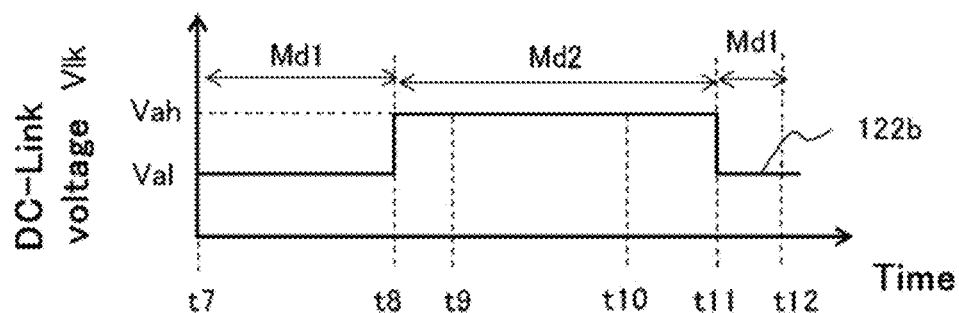
FIG. 101 shows timings in a second example for explaining operation of the motor control device according to embodiment 14.
Figure 102:
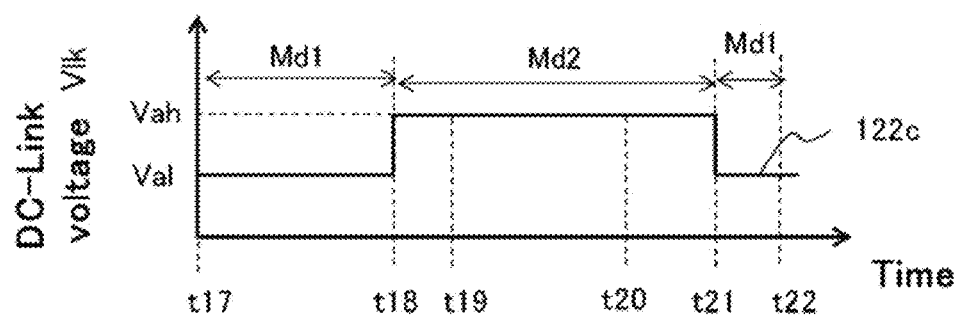
FIG. 102 shows timings in a third example for explaining operation of the motor control device according to embodiment 14.
Figure 103:
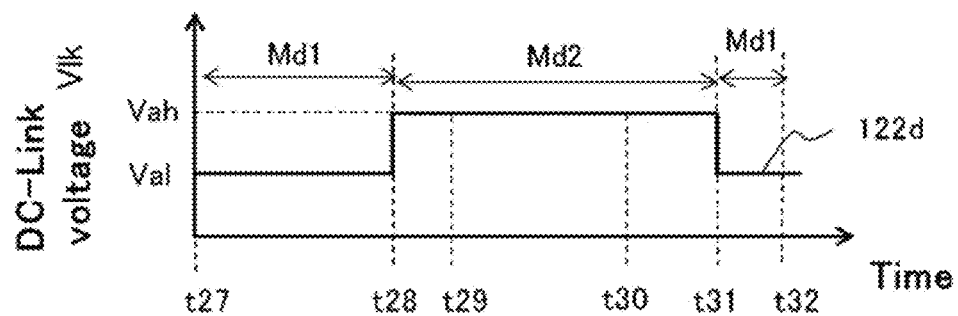
FIG. 103 shows timings in a fourth example for explaining operation of the motor control device according to embodiment 14.
Figure 104:
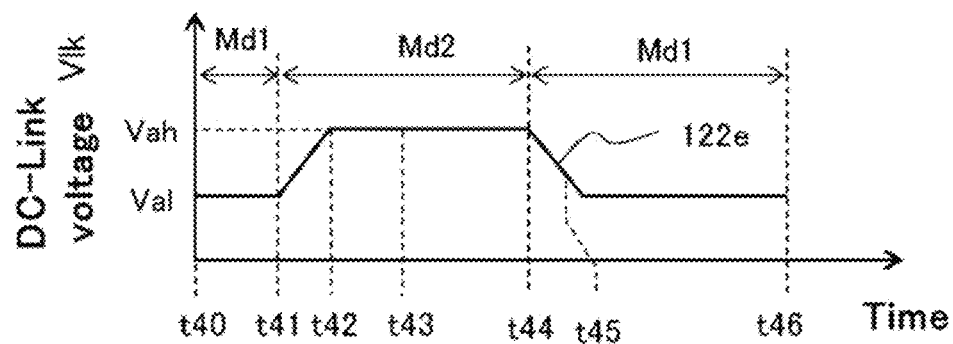
FIG. 104 shows timings in a fifth example for explaining operation of the motor control device according to embodiment 14.

FIG. 100 shows timings in a first example for explaining operation of a motor control device according to embodiment 14. FIG. 101 shows timings in a second example for explaining operation of the motor control device according to embodiment 14, and FIG. 102 shows timings in a third example for explaining operation of the motor control device according to embodiment 14. FIG. 103 shows timings in a fourth example for explaining operation of the motor control device according to embodiment 14, and FIG. 104 shows timings in a fifth example for explaining operation of the motor control device according to embodiment 14. In the motor control device 100 of embodiment 14, the power source device 90 including the multilevel-type chopper 3 described in embodiment 1, the power source device 90 described in embodiment 12, or the power source device 90 described in embodiment 13, is applied, and the DC-link voltage Vlk which is the output voltage of the multilevel-type chopper 3 or the AC/DC converter 27 is controlled to either boost voltage Val or boost voltage Vah using the operation mode change method described in any of embodiments 1 to 11. Here, the multilevel-type chopper 3 or the AC/DC converter 27 is referred to as DC-output power conversion device.

In the motor control device 100 of embodiment 14, the DC-output power conversion device is operated using two operation modes, i.e., a low boost mode and a high boost mode. In the low boost mode, the DC-output power conversion device outputs boost voltage Val which is first DC voltage, as the DC-link voltage Vlk, and in the high boost mode, the DC-output power conversion device outputs boost voltage Vah which is second DC voltage, as the DC-link voltage Vlk. The boost voltage Vah is higher than the boost voltage Val. The two operation modes of the DC-output power conversion device are the low boost mode corresponding to the first operation mode used when the altitude is high or the output of the motor 6 is low, and the high boost mode corresponding to the second operation mode used when the altitude is low or the output of the motor 6 is high.

The DC-output power conversion device in the first operation mode performs boost operation through switching operations of the semiconductor switching elements so that the DC-link voltage Vlk becomes the boost voltage Val which is the first DC voltage on the basis of the control signal sigc1 which is the first mode control signal sigcm1 from the control device 11. The DC-output power conversion device in the second operation mode performs boost operation through switching operations of the semiconductor switching elements so that the DC-link voltage Vlk becomes the boost voltage Vah which is the second DC voltage on the basis of the control signal sigc1 which is the second mode control signal sigcm2 from the control device 11. These power conversion controls are executed by the control device 11.

DC-link voltage characteristics 122a shown in FIG. 100 represent timings for controlling the DC-link voltage Vlk to either the boost voltage Val or the boost voltage Vah, using the operation mode change method described in any of embodiments 1 to 6. That is, FIG. 100 corresponds to FIG. 9. DC-link voltage characteristics 122b shown in FIG. 101 represent timings for controlling the DC-link voltage Vlk to either the boost voltage Val or the boost voltage Vah, using the operation mode change method described in the first example of embodiment 7. That is, FIG. 101 corresponds to FIG. 38. DC-link voltage characteristics 122c shown in FIG. 102 represent timings for controlling the DC-link voltage Vlk to either the boost voltage Val or the boost voltage Vah, using the operation mode change method described in the second example of embodiment 7. That is, FIG. 102 corresponds to FIG. 44. DC-link voltage characteristics 122d shown in FIG. 103 represent timings for controlling the DC-link voltage Vlk to either the boost voltage Val or the boost voltage Vah, using the operation mode change method described in the third example of embodiment 7. That is, FIG. 103 corresponds to FIG. 51. DC-link voltage characteristics 122e shown in FIG. 104 represent timings for controlling the DC-link voltage Vlk to either the boost voltage Val or the boost voltage Vah in the motor control device 100 of embodiment 12, using the operation mode change method described in any of embodiments 1 to 11. That is, FIG. 104 corresponds to FIG. 88.

In the motor control device 100 of embodiment 14, in a case where the power source device 90 having the multilevel-type chopper 3 is provided and the DC-link voltage Vlk is changed using the operation mode change method described in any of embodiments 1 to 11, the bypass mode and the boost mode are respectively replaced with the low boost mode and the high boost mode, and the battery voltage Vbt and the boost voltage Va are respectively replaced with the boost voltage Val and the boost voltage Vah. In the motor control device 100 of embodiment 14, in a case where the power source device 90 having the electric generator 26 and the AC/DC converter 27 is provided and the DC-link voltage Vlk is changed using the operation mode change method described in any of embodiments 1 to 11, the bypass mode and the boost mode are respectively replaced with the low boost mode and the high boost mode, and the normal voltage Vgn and the boost voltage Va are respectively replaced with the boost voltage Val and the boost voltage Vah. As the environmental information detection sensors 35 and the motor parameter sensors 38, the specific sensors shown in the operation mode change method described in any of embodiments 1 to 11 may be used, and in a case of using the operation mode change method described in the second example of embodiment 7, the control device 11 includes the motor parameter command sensor 70. The control device 11, the operating panel 23, and the display 34 are configured as described in each of embodiments 1 to 12, depending on the operation mode change method described in the applied one of embodiments 1 to 12.

The motor control device 100 of embodiment 14 performs operation mode change of the DC-output power conversion device in the same manner as in embodiments 1 to embodiment 11. In a case of changing the operation mode of the DC-output power conversion device using the operation mode change method described in embodiment 1, the operation mode is changed using altitude information which is environmental information obtained from the altitude sensor 21. In a case of changing the operation mode of the DC-output power conversion device using the operation mode change method described in embodiment 2, the operation mode is changed using outside air pressure information which is environmental information obtained from the outside air pressure sensor 20. In a case of changing the operation mode of the DC-output power conversion device using the operation mode change method described in embodiment 3, the operation mode is changed using air component concentration information which is environmental information obtained from the air component concentration sensor 22. In a case of changing the operation mode of the DC-output power conversion device using the operation mode change method described in embodiment 4, the operation mode is changed using the outside air temperature information which is environmental information obtained from the outside air temperature sensor 19. In a case of changing the operation mode of the DC-output power conversion device using the operation mode change method described in embodiment 5, the operation mode is changed using radiation dose information which is environmental information obtained from the radiation sensor 24.

In a case of changing the operation mode of the DC-output power conversion device using the operation mode change method described in embodiment 6, the altitude information is estimated on the basis of environmental information obtained from any of the outside air temperature sensor 19, the outside air pressure sensor 20, the air component concentration sensor 22, or the radiation sensor 24, and the operation mode is changed using the estimated altitude information. In a case of changing the operation mode of the DC-output power conversion device using the operation mode change method described in the first example of embodiment 7, the operation mode is changed using the motor parameter command which is information of a motor parameter obtained from the motor parameter command sensor 70. In a case of changing the operation mode of the DC-output power conversion device using the operation mode change method described in the second example of embodiment 7, the operation mode is changed using detected information of a motor parameter which is information of a motor parameter obtained from the motor parameter sensor 38. In a case of changing the operation mode of the DC-output power conversion device using the operation mode change method described in the third example of embodiment 7, the operation mode is changed using estimated information of a motor parameter which is information of a motor parameter obtained from the observer 64. In a case of changing the operation mode of the DC-output power conversion device using the operation mode change method described in embodiment 8, the operation mode is changed using the operation mode signal msig outputted from the selection switch 37 of the operating panel 23 on the basis of an instruction from the pilot.

In a case of changing the operation mode of the DC-output power conversion device using the operation mode change method described in embodiment 9, operation mode change permission is given from the pilot and then the operation mode is changed using environmental information described in embodiments 1 to 6 or information of a motor parameter described in embodiment 7. In a case of changing the operation mode of the DC-output power conversion device using the operation mode change method described in embodiment 10, the operation mode is changed with priorities set for two or more kinds of information among environmental factors such as the altitude information, the outside air pressure information, the air component concentration information, the outside air temperature information, and the radiation dose information. In a case of changing the operation mode of the DC-output power conversion device using the operation mode change method described in embodiment 11, the operation mode is changed using two kinds of information, i.e., information of environmental factors such as the altitude information, the outside air pressure information, the air component concentration information, the outside air temperature information, and the radiation dose information, and information of motor parameters described in embodiment 7.

In the motor control device 100 of embodiment 14, even if the voltage of the input power source for the DC-output power conversion device, i.e., any of the battery voltage Vbt, the R-phase voltage Vr, the S-phase voltage Vs, and the T-phase voltage Vt is low, the voltage can be converted to voltage required for driving the motor 6, by the DC-output power conversion device, and as in the motor control devices 100 of embodiments 1 to 12, during operation at a high altitude which occupies a most period in operation of the aircraft or the like, voltages applied to the semiconductor elements composing the DC-output power conversion device and the inverter 5, i.e., the semiconductor switching elements, can be reduced. Thus, the failure rate due to a single event that occurs on the semiconductor elements composing the DC-output power conversion device and the inverter 5 is reduced, so that reliability of the DC-output power conversion device and the inverter 5 is improved. Owing to improvement in reliability of the DC-output power conversion device and the inverter 5, the motor control device 100 of embodiment 14 is improved in reliability of the entire device.

Embodiment 15

Figure 105:
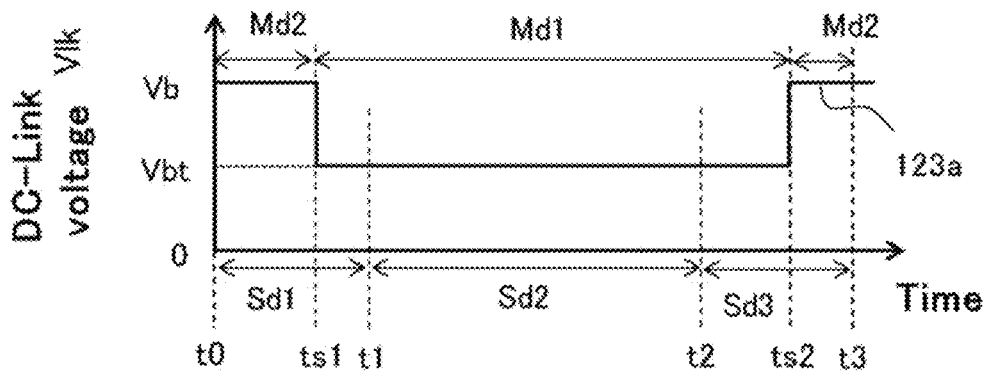
FIG. 105 shows timings in a first example for explaining operation of a motor control device according to embodiment 15.
Figure 106:
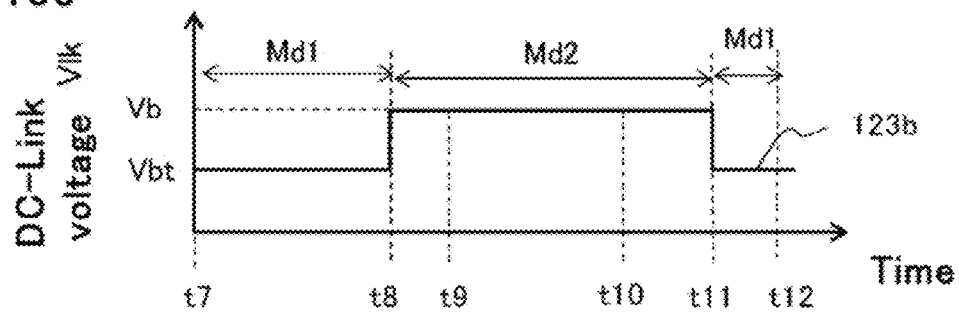
FIG. 106 shows timings in a second example for explaining operation of the motor control device according to embodiment 15.
Figure 107:
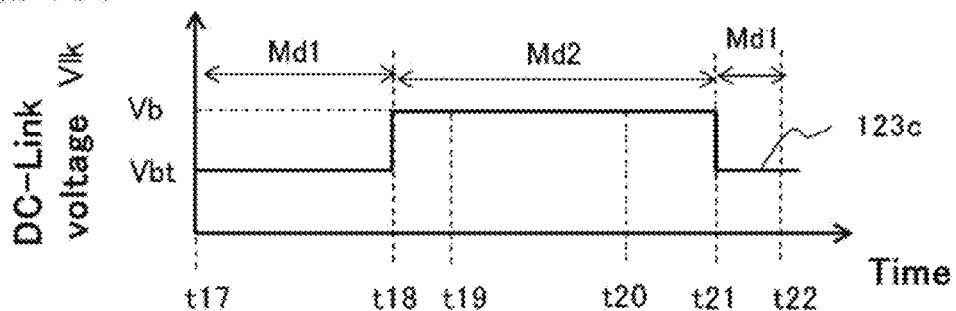
FIG. 107 shows timings in a third example for explaining operation of the motor control device according to embodiment 15.
Figure 108:
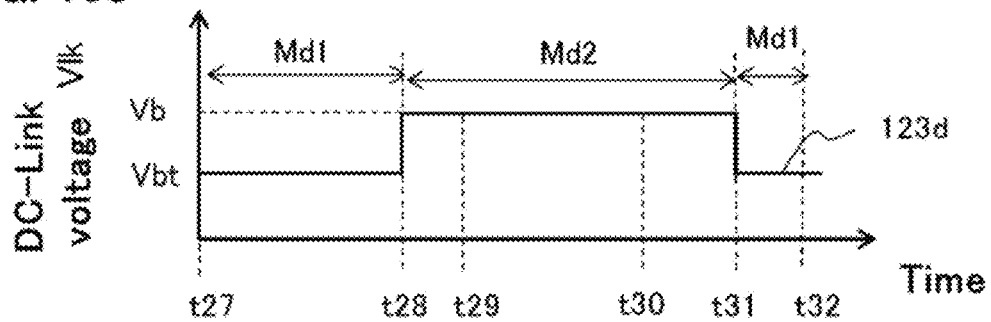
FIG. 108 shows timings in a fourth example for explaining operation of the motor control device according to embodiment 15.
Figure 109:
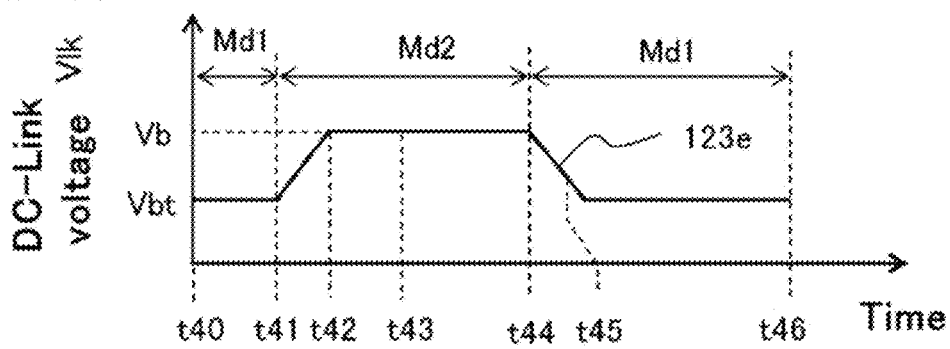
FIG. 109 shows timings in a fifth example for explaining operation of the motor control device according to embodiment 15.

FIG. 105 shows timings in a first example for explaining operation of a motor control device according to embodiment 15. FIG. 106 shows timings in a second example for explaining operation of the motor control device according to embodiment 15, and FIG. 107 shows timings in a third example for explaining operation of the motor control device according to embodiment 15. FIG. 108 shows timings in a fourth example for explaining operation of the motor control device according to embodiment 15, and FIG. 109 shows timings in a fifth example for explaining operation of the motor control device according to embodiment 15. In embodiments 1 to 13, the example in which the boost voltage Va in the boost mode which is the second voltage is approximately two times of the bypass mode input voltage of the DC-output power conversion device such as the chopper 3 or the AC/DC converter 27, i.e., the battery voltage Vbt or the normal voltage Vgn, has been described. However, the boost voltage Va is not limited thereto. Instead of being approximately two times of the battery voltage Vbt or the normal voltage Vgn, the boost voltage Va may be boost voltage Vb that is the DC-link voltage Vlk or more and that enables the inverter 5 to output the output voltage required for output control for the motor 6. The boost voltage Vb is lower than the boost voltage Va.

DC-link voltage characteristics 123a shown in FIG. 105 represent timings for controlling the DC-link voltage Vlk to either the battery voltage Vbt which is the first voltage or the boost voltage Vb which is the second voltage, using the operation mode change method described in any of embodiments 1 to 6. That is, FIG. 105 corresponds to FIG. 9. DC-link voltage characteristics 123b shown in FIG. 106 represent timings for controlling the DC-link voltage Vlk to either the battery voltage Vbt or the boost voltage Vb, using the operation mode change method described in the first example of embodiment 7. That is, FIG. 106 corresponds to FIG. 38. DC-link voltage characteristics 123c shown in FIG. 107 represent timings for controlling the DC-link voltage Vlk to either the battery voltage Vbt or the boost voltage Vb, using the operation mode change method described in the second example of embodiment 7. That is, FIG. 107 corresponds to FIG. 44. DC-link voltage characteristics 123d shown in FIG. 108 represent timings for controlling the DC-link voltage Vlk to either the battery voltage Vbt or the boost voltage Vb, using the operation mode change method described in the third example of embodiment 7. That is, FIG. 108 corresponds to FIG. 51. DC-link voltage characteristics 123e shown in FIG. 109 represent timings for controlling the DC-link voltage Vlk to either the battery voltage Vbt or the boost voltage Vb in the motor control device 100 of embodiment 12, using the operation mode change method described in any of embodiments 1 to 11. That is, FIG. 109 corresponds to FIG. 88. In a case of using the operation mode change method described in any of embodiments 1 to 11 in the configuration of the motor control device 100 of embodiment 13, the battery voltage Vbt which is the bypass mode input voltage in FIG. 105 to FIG. 109 is replaced with the normal voltage Vgn.

In the motor control device 100 of embodiment 15, as in the motor control devices 100 of embodiments 1 to 13, during operation at a high altitude which occupies a most period in operation of the aircraft or the like, voltages applied to the semiconductor elements composing the DC-output power conversion device such as the chopper 3 or the AC/DC converter 27 and the inverter 5, i.e., the semiconductor switching elements, can be reduced. Thus, the failure rate due to a single event that occurs on the semiconductor elements composing the DC-output power conversion device and the inverter 5 is reduced, so that reliability of the DC-output power conversion device and the inverter 5 is improved. Owing to improvement in reliability of the DC-output power conversion device and the inverter 5, the motor control device 100 of embodiment 15 is improved in reliability of the entire device. In addition, in the motor control device 100 of embodiment 15, since the DC-link voltage Vlk which is voltage inputted to the inverter 5 is lowered, voltage applied to the motor 6 can be reduced accordingly, and thus insulation withstand voltage requirements for components of the motor 6 can be lowered.

Embodiment 16

Figure 110:
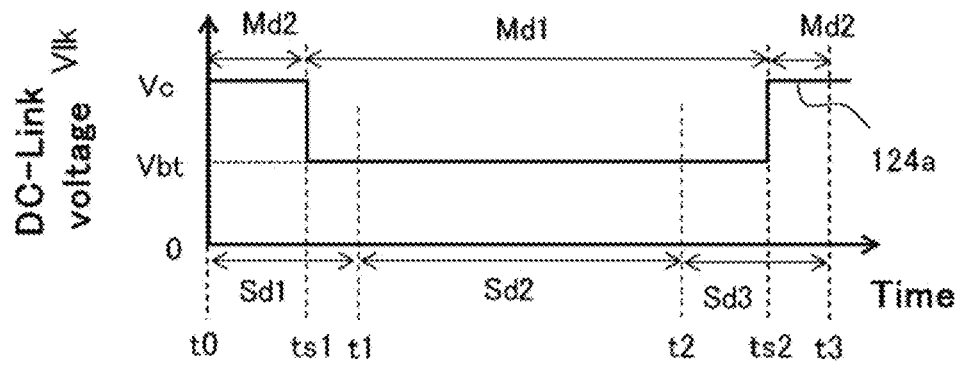
FIG. 110 shows timings in a first example for explaining operation of a motor control device according to embodiment 16.
Figure 111:
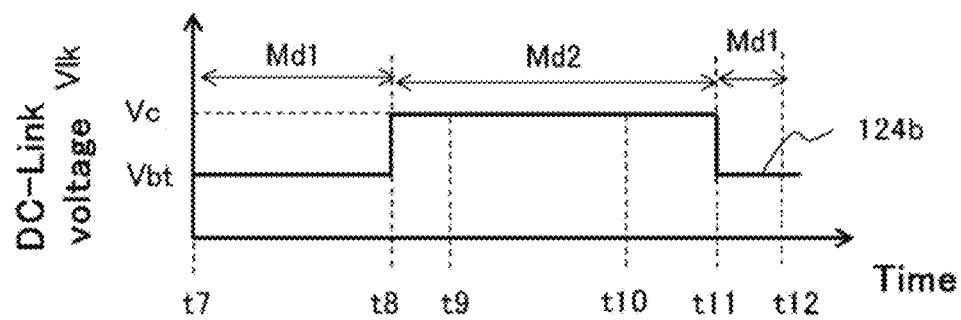
FIG. 111 shows timings in a second example for explaining operation of the motor control device according to embodiment 16.
Figure 112:
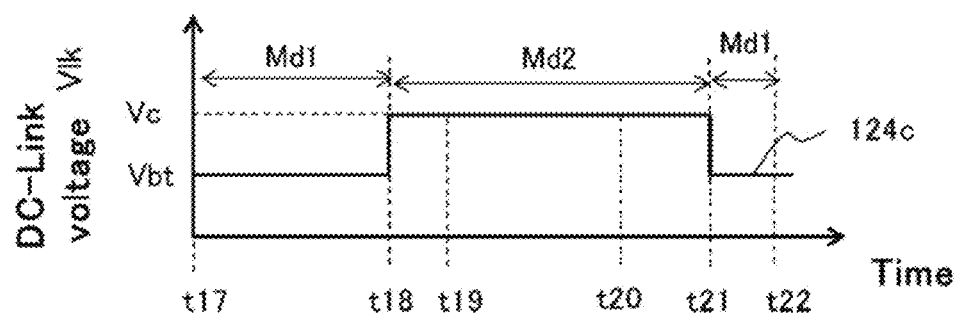
FIG. 112 shows timings in a third example for explaining operation of the motor control device according to embodiment 16.
Figure 113:
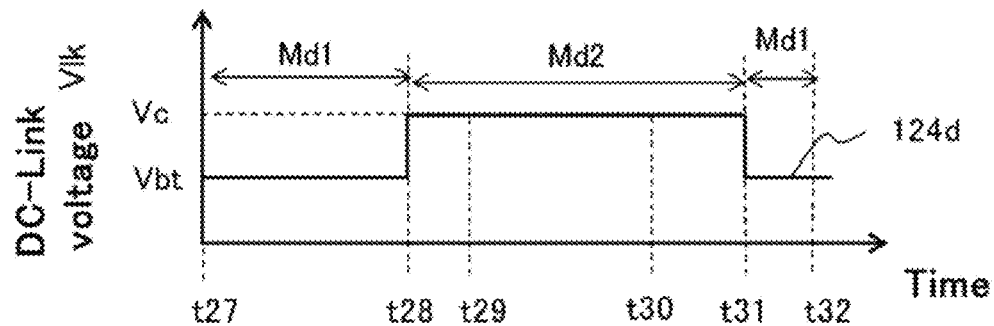
FIG. 113 shows timings in a fourth example for explaining operation of the motor control device according to embodiment 16.
Figure 114:
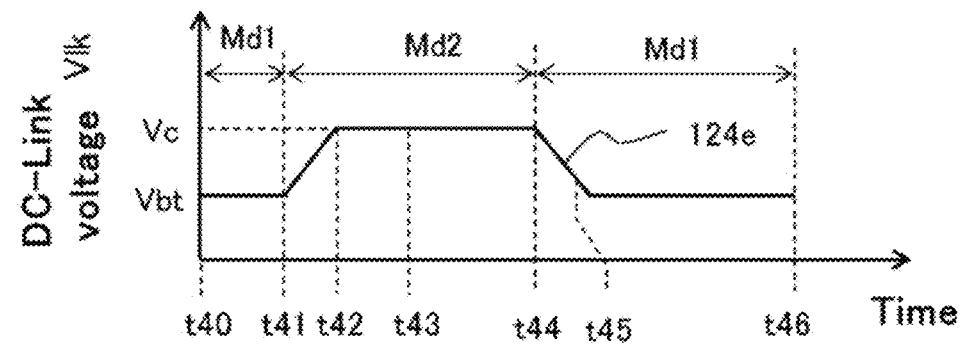
FIG. 114 shows timings in a fifth example for explaining operation of the motor control device according to embodiment 16.

FIG. 110 shows timings in a first example for explaining operation of a motor control device according to embodiment 16. FIG. 111 shows timings in a second example for explaining operation of the motor control device according to embodiment 16, and FIG. 112 shows timings in a third example for explaining operation of the motor control device according to embodiment 16. FIG. 113 shows timings in a fourth example for explaining operation of the motor control device according to embodiment 16, and FIG. 114 shows timings in a fifth example for explaining operation of the motor control device according to embodiment 16. In embodiments 1 to 13, the example in which the boost voltage Va in the boost mode which is the second voltage is approximately two times of the bypass mode input voltage of the DC-output power conversion device such as the chopper 3 or the AC/DC converter 27, i.e., the battery voltage Vbt or the normal voltage Vgn, has been described. However, the boost voltage Va is not limited thereto. In a case where the DC-link voltage Vlk is boosted to control target voltage lower than approximately two times of the battery voltage Vbt or the normal voltage Vgn, the boost voltage Va may be boost voltage Vc which is the upper limit of the control target voltage. The boost voltage Vc is lower than the boost voltage Va.

DC-link voltage characteristics 124a shown in FIG. 110 represent timings for controlling the DC-link voltage Vlk to either the battery voltage Vbt which is the first voltage or the boost voltage Vc which is the second voltage, using the operation mode change method described in any of embodiments 1 to 6. That is, FIG. 110 corresponds to FIG. 9. DC-link voltage characteristics 124b shown in FIG. 111 represent timings for controlling the DC-link voltage Vlk to either the battery voltage Vbt or the boost voltage Vc, using the operation mode change method described in the first example of embodiment 7. That is, FIG. 111 corresponds to FIG. 38. DC-link voltage characteristics 124c shown in FIG. 112 represent timings for controlling the DC-link voltage Vlk to either the battery voltage Vbt or the boost voltage Vc, using the operation mode change method described in the second example of embodiment 7. That is, FIG. 112 corresponds to FIG. 44. DC-link voltage characteristics 124d shown in FIG. 113 represent timings for controlling the DC-link voltage Vlk to either the battery voltage Vbt or the boost voltage Vc, using the operation mode change method described in the third example of embodiment 7. That is, FIG. 113 corresponds to FIG. 51. DC-link voltage characteristics 124e shown in FIG. 114 represent timings for controlling the DC-link voltage Vlk to either the battery voltage Vbt or the boost voltage Vc in the motor control device 100 of embodiment 12, using the operation mode change method described in any of embodiments 1 to 11. That is, FIG. 114 corresponds to FIG. 88. In a case of using the operation mode change method described in any of embodiments 1 to 11 in the configuration of the motor control device 100 of embodiment 13, the battery voltage Vbt which is the bypass mode input voltage in FIG. 110 to FIG. 114 is replaced with the normal voltage Vgn.

In the motor control device 100 of embodiment 16, as in the motor control devices 100 of embodiments 1 to 13, during operation at a high altitude which occupies a most period in operation of the aircraft or the like, voltages applied to the semiconductor elements composing the DC-output power conversion device such as the chopper 3 or the AC/DC converter 27 and the inverter 5, i.e., the semiconductor switching elements, can be reduced. Thus, the failure rate due to a single event that occurs on the semiconductor elements composing the DC-output power conversion device and the inverter 5 is reduced, so that reliability of the DC-output power conversion device and the inverter 5 is improved. In addition, in the motor control device 100 of embodiment 16, since the boost voltage is limited by the upper limit of the control target voltage for the DC-link voltage Vlk, excessively high voltage can be suppressed. Thus, owing to improvement in reliability of the DC-output power conversion device and the inverter 5, the motor control device 100 of embodiment 16 is improved in reliability of the entire device.

Embodiment 17

Figure 115:
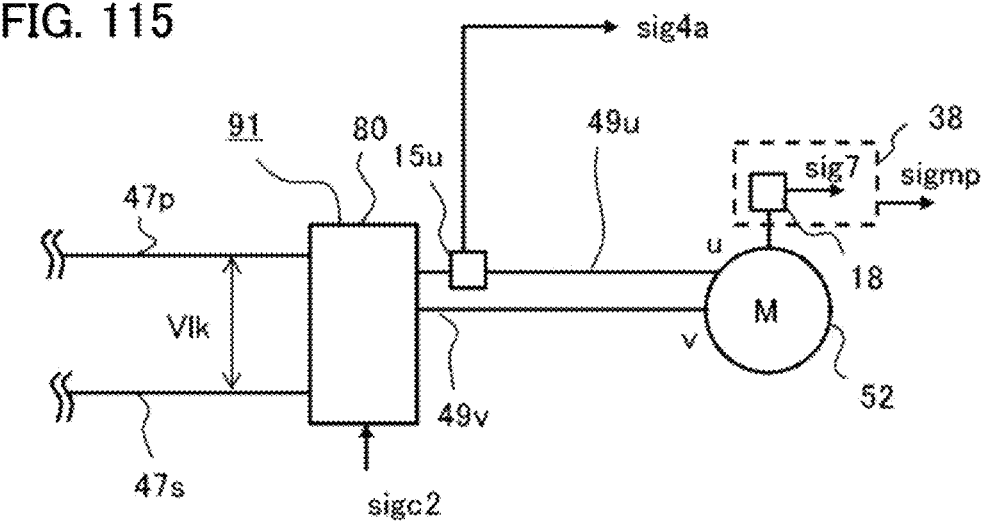
FIG. 115 shows a specific part in a first example of a motor control device according to embodiment 17.
Figure 116:
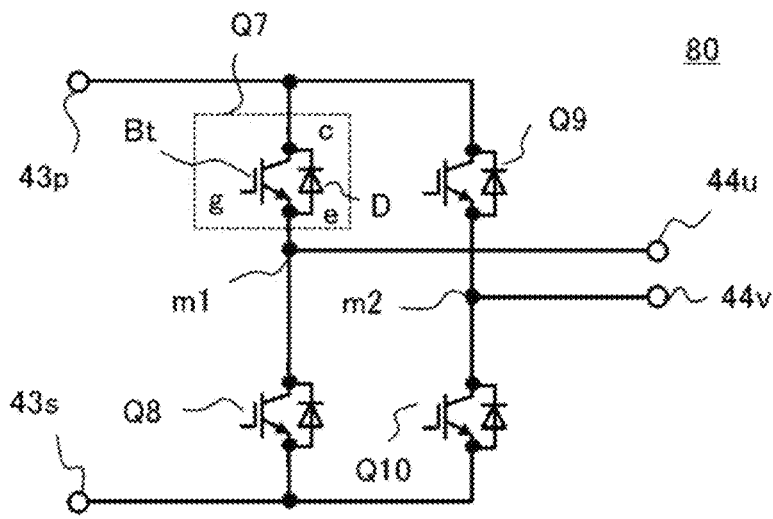
FIG. 116 shows the configuration of an inverter in FIG. 115.
Figure 117:
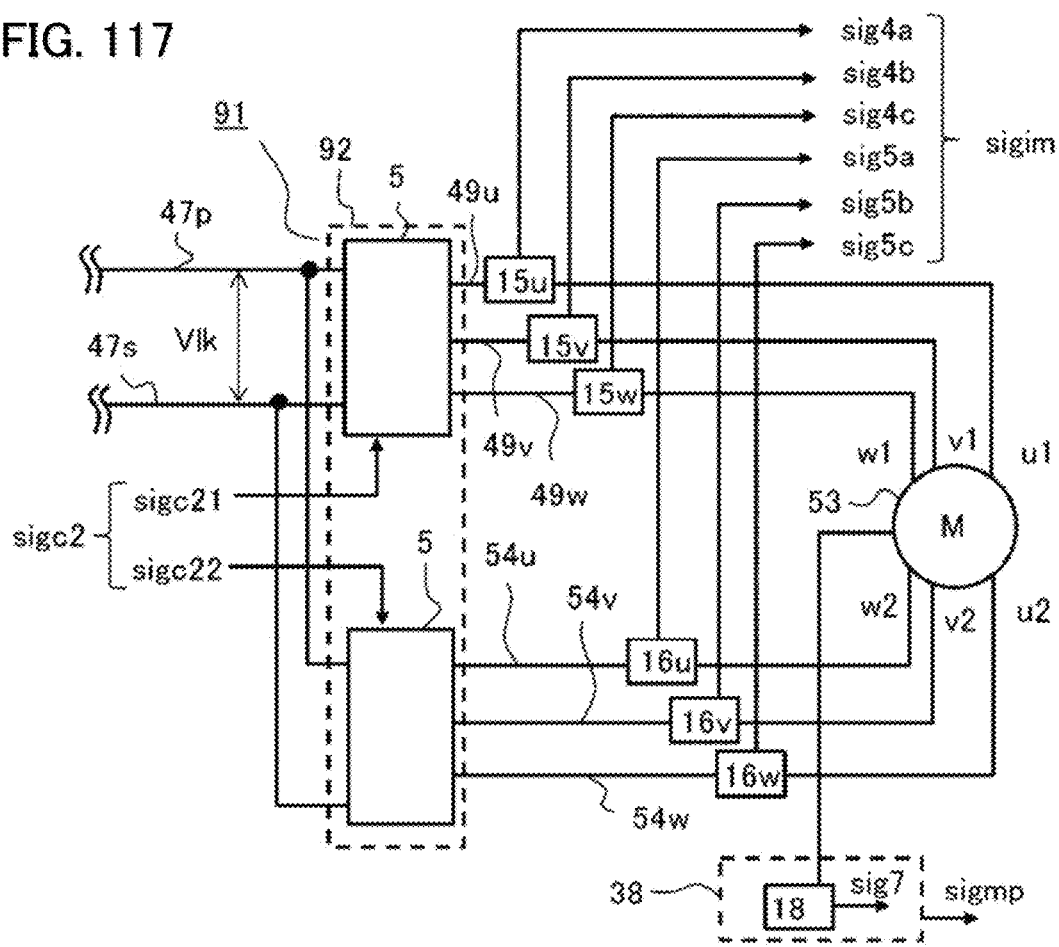
FIG. 117 shows a specific part in a second example of the motor control device according to embodiment 17.

FIG. 115 shows a specific part in a first example of a motor control device according to embodiment 17, and FIG. 116 shows the configuration of an inverter in FIG. 115. FIG. 117 shows a specific part in a second example of the motor control device according to embodiment 17. In the motor control devices 100 of embodiments 1 to 16, a configuration for controlling the motor 6 for three-phase power is used, that is, the inverter 5 has a configuration for three-phase power. However, the present disclosure is not limited thereto. As shown in FIG. 115, a control target motor may be a motor 52 which is a single-phase motor, and the inverter may be an inverter 80 for single-phase power. Alternatively, as shown in FIG. 117, a control target motor may be a motor 53 which is a duplex three-phase motor, and an inverter device 92 for controlling the motor 53 may be provided. The inverter device 92 includes two inverters 5.

In the motor control device 100 of embodiment 17, the same effects as in the motor control devices 100 of embodiments 1 to 16 are provided even when the inverter is the inverter 80 for single-phase power or the inverter device 92 for duplex three-phase power. Differences from the motor control device 100 of embodiment 1 will be mainly described.

The inverter 80 in the motor control device 100 in the first example of embodiment 17 shown in FIG. 116 is different from the inverter 5 shown in FIG. 4 in that the inverter 80 has a two-arm structure composed of semiconductor switching elements Q7 to Q10. In the inverter 80, AC power is outputted from the two output terminals, i.e., the U-side output terminal 44u and the V-side output terminal 44v, to the motor 52, and therefore the V phase current sensor 15v for the V-phase power line 49v is not needed.

The motor 53 has a U phase input terminal u1, a V phase input terminal v1, and a W phase input terminal w1 in a first system and a U phase input terminal u2, a V phase input terminal v2, and a W phase input terminal w2 in a second system. The U-side output terminal 44u, the V-side output terminal 44v, and the W-side output terminal 44w of the inverter 5 in the first system of the inverter device 92 are respectively connected to the U phase input terminal u1, the V phase input terminal v1, and the W phase input terminal w1 in the first system of the motor 53 via the U-phase power line 49*u*, the V-phase power line 49*v*, and the W-phase power line 49*w*. The U-side output terminal 44*u*, the V-side output terminal 44*v*, and the W-side output terminal 44*w* of the inverter 5 in the second system of the inverter device 92 are respectively connected to the U phase input terminal u2, the V phase input terminal v2, and the W phase input terminal w2 in the second system of the motor 53 via a U-phase power line 54*u*, a V-phase power line 54*v*, and a W-phase power line 54*w*. The motor control device 100 in the second example of embodiment 17 is provided with the U phase current sensor 15*u*, the V phase current sensor 15*v*, and the W phase current sensor 15*w*, and in addition, a U phase current sensor 16*u*, a V phase current sensor 16*v*, and a W phase current sensor 16*w*.

The U phase current sensor 15*u* outputs detected information sig4*a* which is information of current flowing through the U-phase power line 49*u*. The V phase current sensor 15*v* outputs detected information sig4*b* which is information of current flowing through the V-phase power line 49*v*, and the W phase current sensor 15*w* outputs detected information sig4*c* which is information of current flowing through the W-phase power line 49*w*. The U phase current sensor 16*u* outputs detected information sig5*a* which is information of current flowing through the U-phase power line 54*u*. The V phase current sensor 16*v* outputs detected information sig5*b* which is information of current flowing through the V-phase power line 54*v*, and the W phase current sensor 16*w* outputs detected information sig5*c* which is information of current flowing through the W-phase power line 54*w*. The detected information sig4*a*, sig4*b*, sig4*c*, sig5*a*, sig5*b*, sig5*c* is motor current detected information sigim.

The control device 11 in the motor control device 100 in the second example of embodiment 17 outputs the control signal sigc1 for controlling the chopper 3 and the control signal sigc2 for controlling the inverter device 92, on the basis of the detected information sig1, sig2, sig3, the motor current detected information sigim, the motor parameter detected information sigmp, the environmental detected information sigev, and an input signal from the operating panel 23. The control signal sigc2 includes a control signal sigc21 for controlling the inverter 5 in the first system and a control signal sigc22 for controlling the inverter 5 in the second system.

The semiconductor switching elements Q1 to Q18 may be silicon semiconductor elements made from silicon, or wide bandgap semiconductor elements made from a wide bandgap semiconductor material having a greater bandgap than silicon. Examples of the wide bandgap semiconductor material include silicon carbide (SiC), a gallium nitride based material including gallium nitride (GaN), and diamond. In a case where the semiconductor switching elements Q1 to Q18 are semiconductor elements made from a wide bandgap semiconductor material, i.e., wide bandgap semiconductor elements, the switching speed is faster and switching loss is smaller than in a case of silicon semiconductor elements. Further, the wide bandgap semiconductor elements are higher in withstand voltage and heat resistance than the silicon semiconductor elements. Therefore, in the case where the semiconductor switching elements Q1 to Q18 are wide bandgap semiconductor elements, a heatsink or the like serving as a cooler for the semiconductor switching elements Q1 to Q18 can be downsized or such a heatsink or the like may be unnecessary.

In the above examples, one or a plurality of kinds among altitude information of the flying object, outside air pressure information outside the flying object, air component concentration information outside the flying object, outside air temperature information outside the flying object, and radiation dose information of radiation showering to the flying object, are used as information of an environmental factor. However, information of an environmental factor is not limited thereto. Information of an environmental factor may be complex information generated from some of the above kinds of information. For example, complex information 1 which is complex information generated from the altitude information and the radiation dose information whose characteristics have an upward convex shape is information obtained by summing these kinds of information that are weighted. Weighting coefficients for the altitude information, the outside air pressure information, the air component concentration information, the outside air temperature information, and the radiation dose information are defined as k1, k2, k3, k4, and k5, respectively. The characteristics of the complex information 1 can be represented as characteristics in which the detected altitude information characteristics 56*a* multiplied by k1 and the detected radiation dose information characteristics 56*j* multiplied by k5 are summed. Complex information 2 which is complex information generated from the outside air pressure information, the air component concentration information, and the outside air temperature information whose characteristics have a downward convex shape is information obtained by summing these kinds of information that are weighted. The characteristics of the complex information 2 can be represented as characteristics in which the detected outside air pressure information characteristics 56*d* multiplied by k2, the detected air component concentration information characteristics 56*e* multiplied by k3, and the detected outside air temperature information characteristics 56*i* multiplied by k4 are summed. In a case of generating complex information from information of an environmental factor whose characteristics have an upward convex shape and information of an environmental factor whose characteristics have a downward convex shape, increase and decrease of the information value may be inverted to match one of these two shapes to another one so that the shapes of these characteristics are uniformed, and then the respective kinds of information may be weighted and summed, whereby complex information having an upward convex shape or a downward convex shape can be generated.

In the above description, as the motor parameter command which is an example of information of a motor parameter, one or a plurality of kinds among the motor speed command, the motor output command, the motor AC voltage command, the motor current command, and the motor torque command are used. However, the present disclosure is not limited thereto. The motor parameter command may be complex information generated from some of the above kinds of information. In the above description, as the motor parameter detected information which is an example of information of a motor parameter, one or a plurality of kinds among the detected motor speed information, the detected motor output information, the detected motor AC voltage information, the detected motor current information, and the detected motor torque information are used. However, the present disclosure is not limited thereto. The motor parameter detected information may be complex information generated from some of the above kinds of information. In the above description, as the estimated information of a motor parameter which is an example of information of a motor parameter, one or a plurality of kinds among the estimated motor speed information, the estimated motor output information, and the estimated motor torque information are used. However, the present disclosure is not limited thereto. The estimated information of a motor parameter may be complex information generated from some of the above kinds of information. Further, complex information of information of motor parameters may be complex information generated from a motor parameter command for the motor, motor parameter detected information of the motor, and motor parameter estimated information of the motor. Such complex information of information of motor parameters can be generated in the same manner as the complex information of information of environmental factors.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF REFERENCE CHARACTERS 1 battery (power source)
3 chopper (DC-output power conversion device)
4 capacitor (output capacitor)
5 inverter (power supply device)
6 motor
8 reactor
11 control device
19 outside air temperature sensor
20 outside air pressure sensor
21 altitude sensor
22 air component concentration sensor
23 operating panel
24 radiation sensor
26 electric generator (power source)
27 AC/DC converter (DC-output power conversion device)
34 display
35 environmental information detection sensor
36a altitude indication
36b motor output indication
36c outside air pressure indication
36d air component concentration indication
36e outside air temperature indication
36f radiation dose indication
36g motor speed indication
36h motor AC voltage indication
36i motor current indication
36j motor torque indication
36k judgment result indication
36l priority information indication
37 selection switch
38 motor parameter sensor
41p high-potential-side input terminal
41s low-potential-side input terminal
42p high-potential-side output terminal
42s low-potential-side output terminal
51 permission switch
52, 53 motor
55a oxygen concentration sensor
55b nitrogen concentration sensor
55c carbon dioxide concentration sensor
64 observer
70 motor parameter command sensor
71a motor speed command sensor
71b motor output command sensor
71c motor AC voltage command sensor
71d motor current command sensor
71e motor torque command sensor
73a motor speed sensor
73b motor output sensor
73c motor AC voltage sensor
73d motor current sensor
73e motor torque sensor
80 inverter (power supply device)
90 power source device
91 driving device
100 motor control device
dataA, dataB, dataC detected value
dataS motor parameter information value
ensig change permission signal
esig1 estimated altitude information
fa switching frequency
fb switching frequency
fs switching frequency
m connection point
Md1 first operation mode
Md2 second operation mode
msig operation mode signal
sig8 detected information
sig9 detected information
sig10 detected information
sig11 detected information
sig12 detected information
sig13a, sig13b, sig13c detected information
sig19a, sig19b, sig19c, sig19d, sig19e detected information
sig20a, sig20b, sig20c, sig20d, sig20e detected information
sig21a, sig21b, sig21c estimated information
sigev environmental detected information
sigmp motor parameter detected information
sigmpc motor parameter command detected information
sigmpe motor parameter estimated information
Q1, Q2, Q3, Q4 semiconductor switching element
Q5, Q6, Q7, Q8 semiconductor switching element
Q9, Q10, Q11, Q12 semiconductor switching element
Q13, Q14, Q15, Q16, Q17, Q18 semiconductor switching element
Rb boost ratio
rb1, rb2, rb3 boost ratio value
rbp boost ratio value
Vlk DC-link voltage (output voltage)
Vbt battery voltage (input voltage, first voltage)
Vr R-phase voltage (input voltage)
Vs S-phase voltage (input voltage)
Vt T-phase voltage (input voltage)
Va boost voltage (second voltage)
Vah boost voltage (second voltage)
Vb boost voltage (second voltage)
Vc boost voltage (second voltage)
Val boost voltage (first voltage)
Vgn normal voltage (first voltage)
X, X*, XA, XB, XC threshold
Y, Y*, YA, YB, YC threshold Z, Za, Zb, Zc threshold
Za1, Za2, Za3, Za4, Za5 threshold
Zb1, Zb2, Zb3, Zb4, Zb5 threshold
Zc1, Zc2, Zc3 threshold
W, Wa, Wb, Wc threshold
Wa1, Wa2, Wa3, Wa4, Wa5 threshold
Wb1, Wb2, Wb3, Wb4, Wb5 threshold
Wc1, Wc2, Wc3 threshold

The invention claimed is:

1. A motor control device for controlling a motor of a flying object that takes off from a ground and flies, the motor control device comprising:
 a power source device which outputs DC power;
 a power supply device which converts the DC power to AC power and outputs the AC power to the motor; and
 a control device for controlling the power source device and the power supply device, wherein
 the power source device includes a power source, a DC-output power conversion device for converting output of the power source to DC power, and an output capacitor for smoothing output voltage of the DC-output power conversion device,
 the DC-output power conversion device has a first operation mode for outputting first voltage and a second operation mode for outputting second voltage higher than the first voltage,
 when the flying object takes off from the ground, the control device controls the DC-output power conversion device in the second operation mode, and
 when the control device judges that flight information which is one or both of information of a motor parameter obtained along with control for the motor and information of an environmental factor relevant to a flight altitude of the flying object satisfies a predetermined condition, or when the control device has received an operation mode signal for which the first operation mode is selected on the basis of the flight information during control for the motor, the control device controls the DC-output power conversion device in the first operation mode.

2. The motor control device according to claim 1, further comprising an environmental information detection sensor for detecting the information of the environmental factor, wherein
 the flight information is the information of the environmental factor,
 in a state in which the DC-output power conversion device is controlled in the second operation mode, when the control device judges that an information value based on the information of the environmental factor has passed through a first environmental threshold, the control device controls the DC-output power conversion device in the first operation mode, and
 in a state in which the DC-output power conversion device is controlled in the first operation mode, when the control device judges that the information value based on the information of the environmental factor has passed through a second environmental threshold, the control device controls the DC-output power conversion device in the second operation mode.

3. The motor control device according to claim 1, wherein
 the flight information is the information of the motor parameter,
 in a state in which the DC-output power conversion device is controlled in the second operation mode, when the control device judges that an information value based on the information of the motor parameter is smaller than a first parameter threshold, the control device controls the DC-output power conversion device in the first operation mode, and
 in a state in which the DC-output power conversion device is controlled in the first operation mode, when the control device judges that the information value based on the information of the motor parameter is greater than a second parameter threshold greater than the first parameter threshold, the control device controls the DC-output power conversion device in the second operation mode.

4. The motor control device according to claim 1, further comprising an environmental information detection sensor for detecting the information of the environmental factor, wherein
 the flight information is the information of the motor parameter and the information of the environmental factor,
 in a state in which the DC-output power conversion device is controlled in the second operation mode, when the control device judges that an information value based on the information of the environmental factor has passed through a first environmental threshold, the control device determines a judgment result as environmental first operation mode judgment, and when the control device judges that the information value based on the information of the environmental factor has not passed through the first environmental threshold, the control device determines a judgment result as environmental second operation mode judgment,
 in a state in which the DC-output power conversion device is controlled in the first operation mode, when the control device judges that the information value based on the information of the environmental factor has passed through a second environmental threshold, the control device determines a judgment result as the environmental second operation mode judgment, and when the control device judges that the information value based on the information of the environmental factor has not passed through the second environmental threshold, the control device determines a judgment result as the environmental first operation mode judgment,
 when the judgment result based on the information of the environmental factor is the environmental second operation mode judgment and the control device judges that an information value based on the information of the motor parameter is smaller than a first parameter threshold, the control device controls the DC-output power conversion device in the first operation mode, and
 when the judgment result based on the information of the environmental factor is the environmental first operation mode judgment and the control device judges that the information value based on the information of the motor parameter is greater than a second parameter threshold greater than the first parameter threshold, the control device controls the DC-output power conversion device in the second operation mode.

5. The motor control device according to claim 1, further comprising an environmental information detection sensor for detecting the information of the environmental factor, wherein
 the flight information is the information of the motor parameter and the information of the environmental factor, in a state in which the DC-output power conversion device is controlled in the second operation mode, when the control device judges that an information value based on the information of the motor parameter is smaller than a first parameter threshold, the control device determines a judgment result as internal first operation mode judgment, and when the control device judges that the information value based on the information of the motor parameter is not smaller than the first parameter threshold, the control device determines a judgment result as internal second operation mode judgment, in a state in which the DC-output power conversion device is controlled in the first operation mode, when the control device judges that the information value based on the information of the motor parameter is greater than a second parameter threshold greater than the first parameter threshold, the control device determines a judgment result as the internal second operation mode judgment, and when the control device judges that the information value based on the information of the motor parameter is not greater than the second parameter threshold, the control device determines a judgment result as the internal first operation mode judgment, when the judgment result based on the information of the motor parameter is the internal second operation mode judgment, the control device controls the DC-output power conversion device in the second operation mode, when the judgment result based on the information of the motor parameter is the internal first operation mode judgment, and in a state in which the DC-output power conversion device is controlled in the second operation mode, the control device judges that an information value based on the information of the environmental factor has passed through a first environmental threshold, the control device controls the DC-output power conversion device in the first operation mode, and when the judgment result based on the information of the motor parameter is the internal first operation mode judgment, and in a state in which the DC-output power conversion device is controlled in the first operation mode, the control device judges that the information value based on the information of the environmental factor has passed through a second environmental threshold, the control device controls the DC-output power conversion device in the second operation mode.

6. The motor control device according to claim 1, wherein on the basis of a plurality of kinds of the flight information for which priorities are set, when a first condition is satisfied, the control device controls the DC-output power conversion device in the first operation mode, and when the first condition is not satisfied, the control device controls the DC-output power conversion device in the second operation mode, and when a second condition is satisfied, the control device controls the DC-output power conversion device in the second operation mode, and when the second condition is not satisfied, the control device controls the DC-output power conversion device in the first operation mode, the first condition is that, in a state in which the DC-output power conversion device is controlled in the second operation mode, whether or not each information value based on the flight information has passed through a first flight information threshold is judged in accordance with the priority, and the information value based on the flight information corresponding to a selected priority has passed through the first flight information threshold, and the second condition is that, in a state in which the DC-output power conversion device is controlled in the first operation mode, whether or not each information value based on the flight information has passed through a second flight information threshold is judged in accordance with the priority, and the information values based on all kinds of the flight information for which the priorities are set have passed through the respective second flight information thresholds.

7. The motor control device according to claim 2, wherein the environmental information detection sensor is any of an altitude sensor for detecting altitude information of the flying object, an outside air pressure sensor for detecting outside air pressure information outside the flying object, an air component concentration sensor for detecting air component concentration information outside the flying object, an outside air temperature sensor for detecting outside air temperature information outside the flying object, or a radiation sensor for detecting radiation dose information of radiation showering to the flying object, and the information of the environmental factor is estimated altitude information obtained by estimating an altitude from any of the outside air pressure information, the air component concentration information, the outside air temperature information, or the radiation dose information detected by the environmental information detection sensor, or is the altitude information detected by the altitude sensor.

8. The motor control device according to claim 3, wherein the information of the motor parameter is a motor parameter command for the motor, the control device includes a motor parameter command sensor for detecting the motor parameter command, the motor parameter command is any of a motor speed command, a motor output command, a motor AC voltage command, a motor current command, or a motor torque command, or complex information generated from a plurality of these kinds of information, and the first parameter threshold is a first parameter command threshold, and the second parameter threshold is a second parameter command threshold.

9. The motor control device according to claim 2, wherein the information of the environmental factor is any of altitude information of the flying object, outside air pressure information outside the flying object, air component concentration information outside the flying object, outside air temperature information outside the flying object, or radiation dose information of radiation showering to the flying object, or complex information generated from a plurality of these kinds of information.

10. The motor control device according to claim 3, wherein the information of the motor parameter is motor parameter detected information of the motor, the motor control device further comprises a motor parameter sensor for detecting the motor parameter detected information, the motor parameter detected information is any of detected motor speed information, detected motor output information, detected motor AC voltage information, detected motor current information, or detected motor torque information, or complex information generated from a plurality of these kinds of information, and the first parameter threshold is a first parameter detection threshold, and the second parameter threshold is a second parameter detection threshold.

11. The motor control device according to claim 3, wherein the information of the motor parameter is motor parameter estimated information of the motor, the control device includes an observer for outputting the motor parameter estimated information, the motor parameter estimated information is any of estimated motor speed information, estimated motor output information, or estimated motor torque information, or complex information generated from a plurality of these kinds of information, and the first parameter threshold is a first parameter estimation threshold, and the second parameter threshold is a second parameter estimation threshold.

12. The motor control device according to claim 1, further comprising an operating panel connected to the control device, wherein the operating panel includes either a first switch for permitting change of the DC-output power conversion device to the first operation mode or a second switch for selecting the first operation mode or the second operation mode, when a change permission signal outputted from the first switch indicates permission, the control device uses both of the first operation mode and the second operation mode for control of the DC-output power conversion device, and when the second switch selects the first operation mode, the control device controls the DC-output power conversion device in the first operation mode, and when the second switch selects the second operation mode, the control device controls the DC-output power conversion device in the second operation mode.

13. The motor control device according to claim 1, wherein the second voltage is 1.7 times or more and 2.3 times or less of the first voltage.

14. The motor control device according to claim 1, wherein a combination of the power source and the DC-output power conversion device is any of a first combination of a DC power source and a chopper, a second combination of a DC power source and a multilevel-type chopper, or a third combination of an AC power source and an AC/DC converter capable of boosting.

15. The motor control device according to claim 14, wherein the multilevel-type chopper includes, between a high-potential-side output terminal, and a low-potential-side output terminal and a low-potential-side input terminal, a high-potential-side series unit composed of a plurality of semiconductor switching elements connected in series and a low-potential-side series unit composed of a plurality of semiconductor switching elements connected in series, the multilevel-type chopper includes a reactor between a high-potential-side input terminal and a connection point between the high-potential-side series unit and the low-potential-side series unit, in a case of controlling the multilevel-type chopper in the second operation mode, the control device executes switching control for a plurality of the semiconductor switching elements using a first switching frequency and a second switching frequency higher than the first switching frequency, and causes the multilevel-type chopper to output the second voltage which is output voltage boosted from the first voltage which is input voltage of the multilevel-type chopper, in a case of changing an operation mode of the multilevel-type chopper from the first operation mode and controlling the multilevel-type chopper in the second operation mode, the control device executes switching control for a plurality of the semiconductor switching elements at the first switching frequency, and when a boost ratio which is a ratio of the output voltage to the input voltage is in a predetermined boost ratio range, the control device executes switching control for a plurality of the semiconductor switching elements at the second switching frequency so that a switching frequency for the switching control changes in accordance with the boost ratio.

\* \* \* \* \*